US008542986B2

(12) United States Patent
Sasaki et al.

(10) Patent No.: US 8,542,986 B2
(45) Date of Patent: *Sep. 24, 2013

(54) RECORDING MEDIUM, PLAYBACK DEVICE, AND INTEGRATED CIRCUIT

(75) Inventors: Taiji Sasaki, Osaka (JP); Hiroshi Yahata, Osaka (JP); Wataru Ikeda, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/370,634

(22) Filed: Feb. 10, 2012

(65) Prior Publication Data

US 2012/0155830 A1 Jun. 21, 2012

Related U.S. Application Data

(62) Division of application No. 12/708,616, filed on Feb. 19, 2010, now Pat. No. 8,139,925.

(60) Provisional application No. 61/154,001, filed on Feb. 20, 2009.

(51) Int. Cl.
*H04N 9/80* (2006.01)

(52) U.S. Cl.
USPC .......................................................... 386/353

(58) Field of Classification Search
None
See application file for complete search history.

(56) References Cited

U.S. PATENT DOCUMENTS

| | | | |
|---|---|---|---|
| 5,923,869 A | 7/1999 | Kashiwagi et al. | |
| 6,393,574 B1 | 5/2002 | Kashiwagi et al. | |
| 6,470,460 B1 | 10/2002 | Kashiwagi et al. | |
| 6,573,819 B1 | 6/2003 | Oshima et al. | |
| 6,574,423 B1 | 6/2003 | Oshima et al. | |
| 6,925,250 B1* | 8/2005 | Oshima et al. | 386/329 |
| 2001/0053281 A1 | 12/2001 | Kashiwagi et al. | |
| 2001/0055474 A1 | 12/2001 | Kashiwagi et al. | |
| 2002/0001454 A1 | 1/2002 | Kashiwagi et al. | |
| 2002/0001455 A1 | 1/2002 | Kashiwagi et al. | |
| 2002/0003944 A1 | 1/2002 | Kashiwagi et al. | |
| 2002/0003945 A1 | 1/2002 | Kashiwagi et al. | |
| 2002/0003950 A1 | 1/2002 | Kashiwagi et al. | |
| 2002/0003951 A1 | 1/2002 | Kashiwagi et al. | |
| 2002/0025143 A1 | 2/2002 | Kashiwagi et al. | |
| 2003/0053797 A1 | 3/2003 | Oshima et al. | |

(Continued)

FOREIGN PATENT DOCUMENTS

| | | |
|---|---|---|
| JP | 11-18058 | 1/1999 |
| JP | 11-191895 | 7/1999 |

(Continued)

*Primary Examiner* — Thai Tran
*Assistant Examiner* — Sunghyoun Park
(74) *Attorney, Agent, or Firm* — Wenderoth, Lind & Ponack, L.L.P.

(57) ABSTRACT

Provided is a recording medium that enables seamless connection between preceding playitems which are stream data arranged prior to a position where a long jump occurs, such as a layer boundary, and succeeding playitems which are stream data arranged subsequent to the position where the long jump occurs. A block exclusively for 2D playback $Ln_{2D}$ is arranged succeeding a 3D extent block in which a depth map data block, a right-view data block, and a left-view data block are arranged in an interleaved manner. A 3D extent block including a block exclusively for 3D playback $L3_{SS}$ is arranged between the block exclusively for 2D playback and a long jump point LB. The block exclusively for 2D playback and the block exclusively for 3D playback are identical in content.

1 Claim, 104 Drawing Sheets

(56) References Cited

U.S. PATENT DOCUMENTS

| | | |
|---|---|---|
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0142041 A1* | 6/2009 | Nagasawa et al. ............ 386/124 |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0067873 A1 | 3/2010 | Sasaki et al. |
| 2010/0202759 A1 | 8/2010 | Sasaki et al. |

FOREIGN PATENT DOCUMENTS

| | | |
|---|---|---|
| JP | 2000-134642 | 5/2000 |
| JP | 2000-270347 | 9/2000 |
| WO | 2010/032404 | 3/2010 |

\* cited by examiner

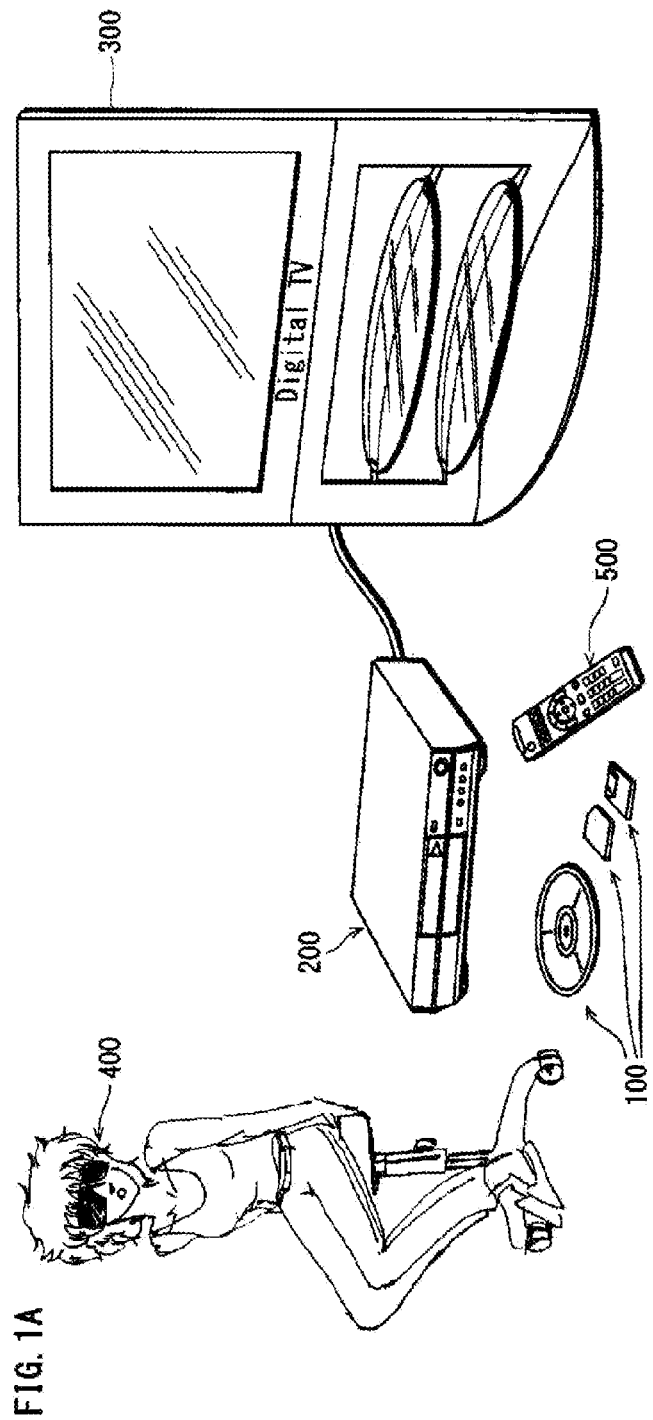
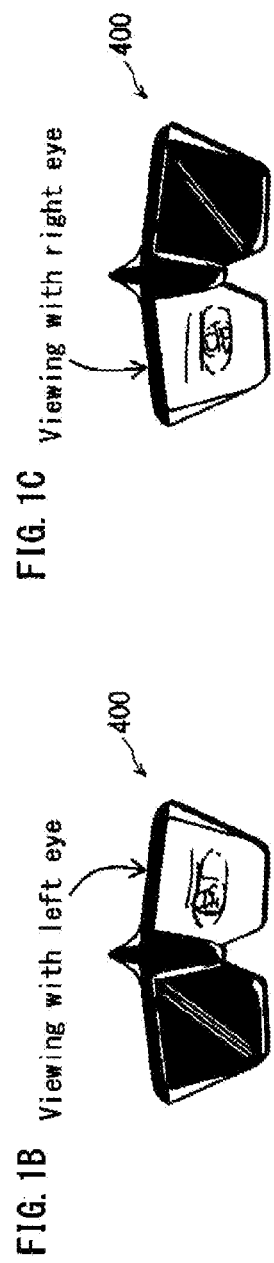
FIG. 1A
FIG. 1B Viewing with left eye
FIG. 1C Viewing with right eye

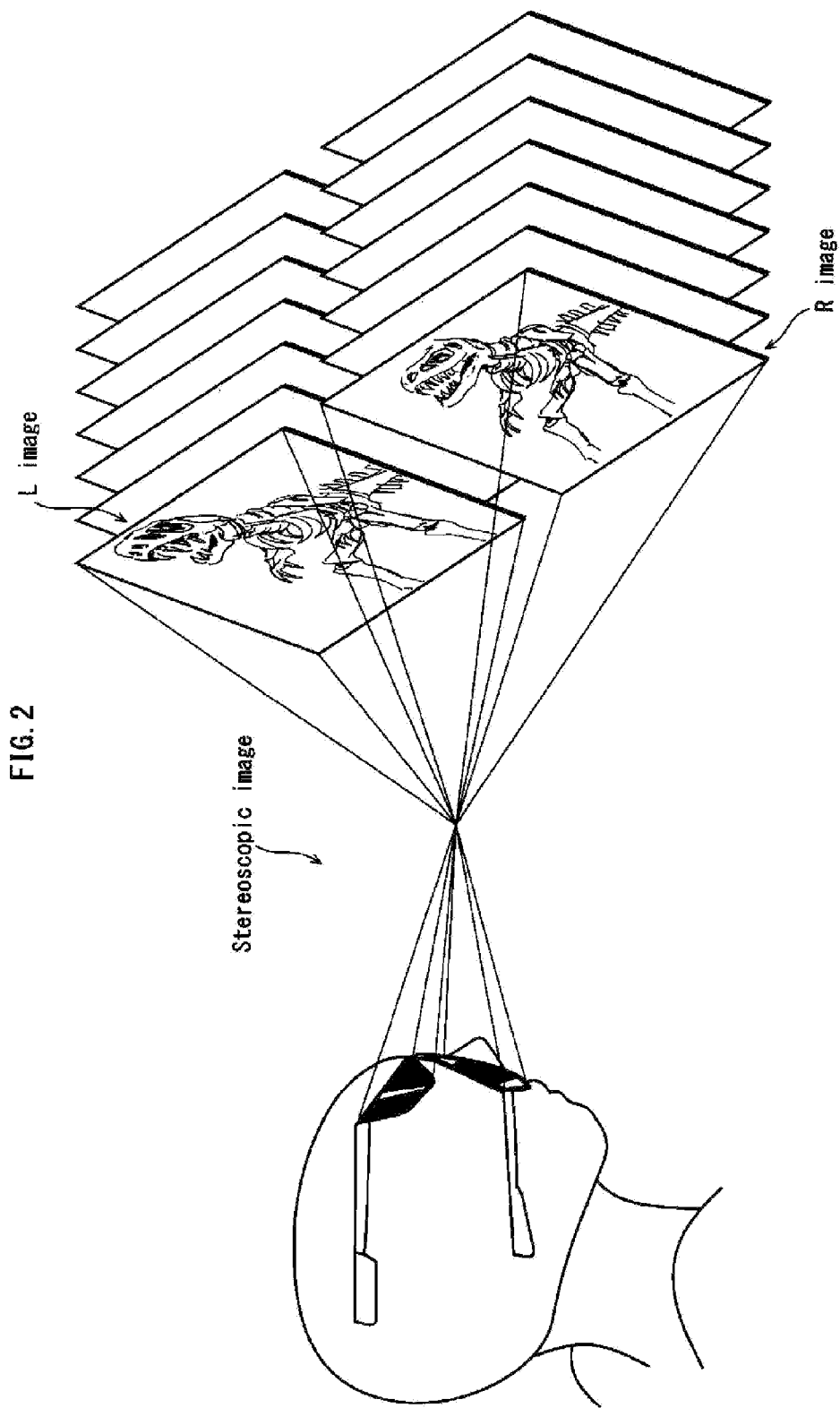

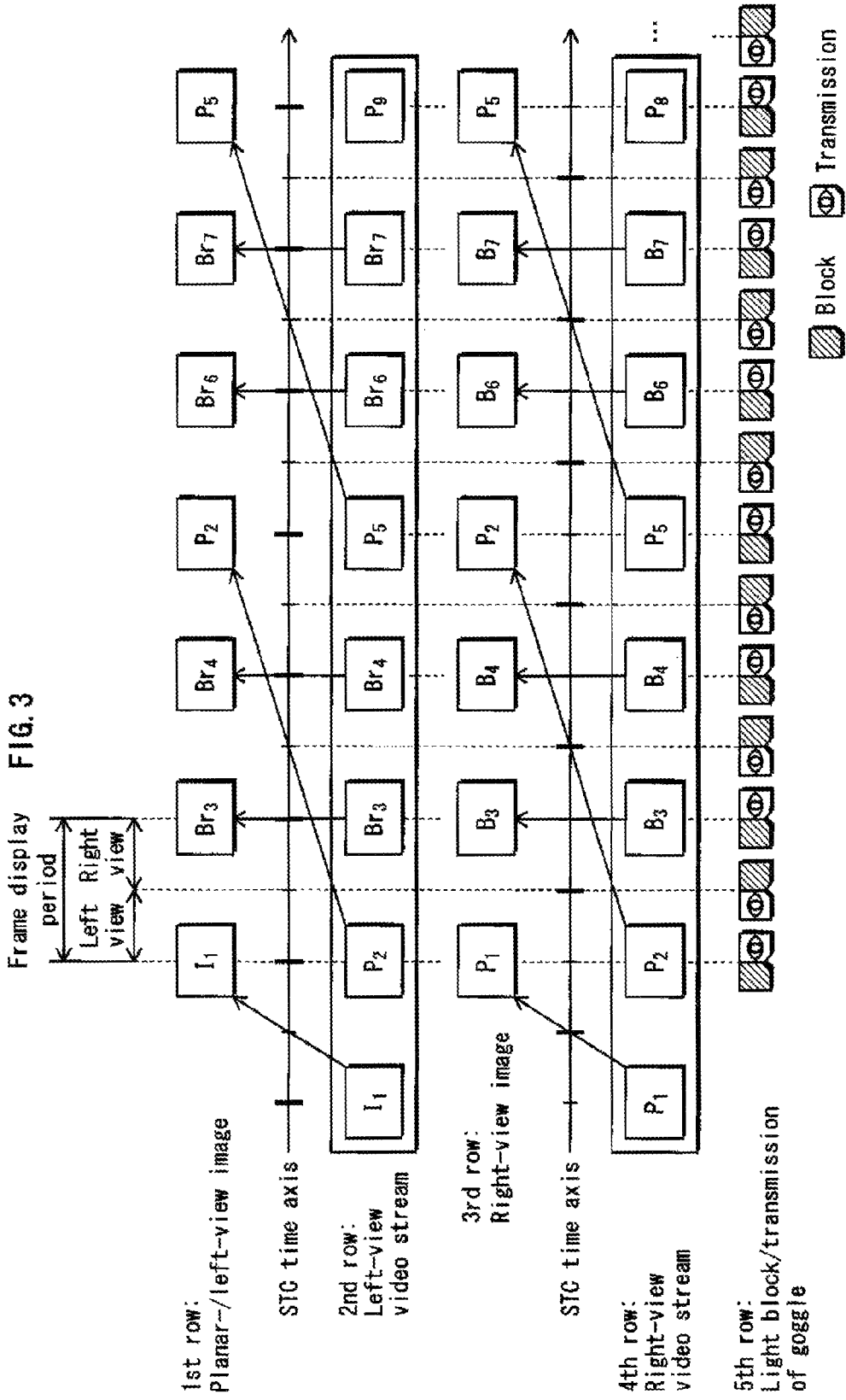

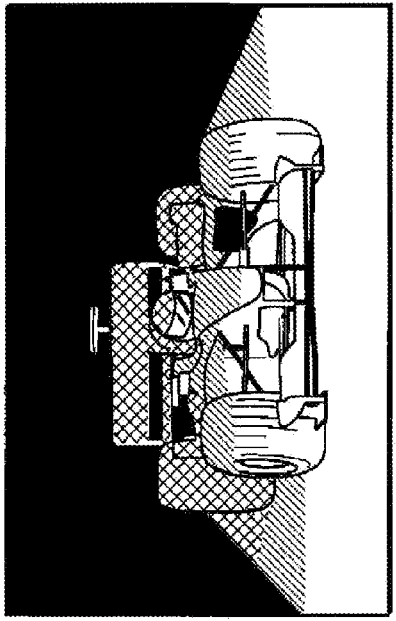
FIG. 4B Grayscale representing depth
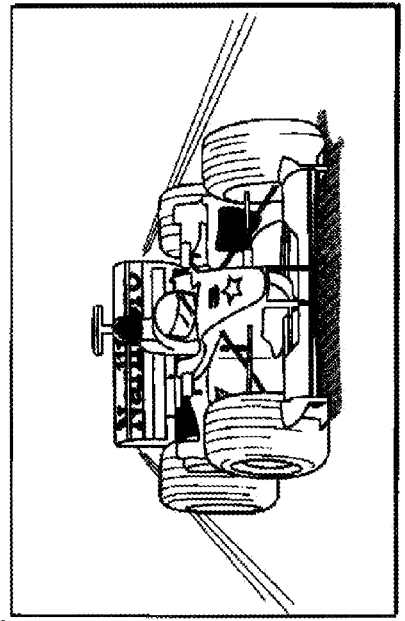
FIG. 4D
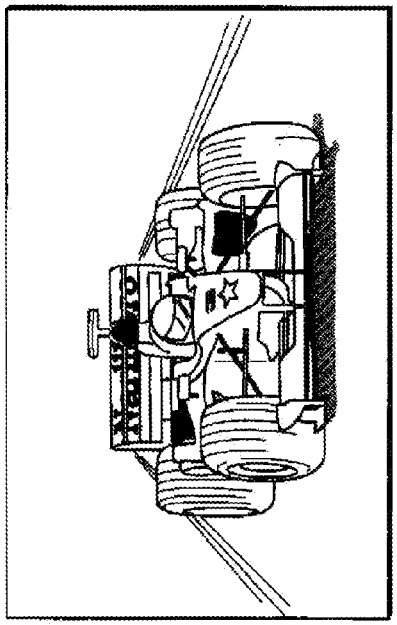
FIG. 4A
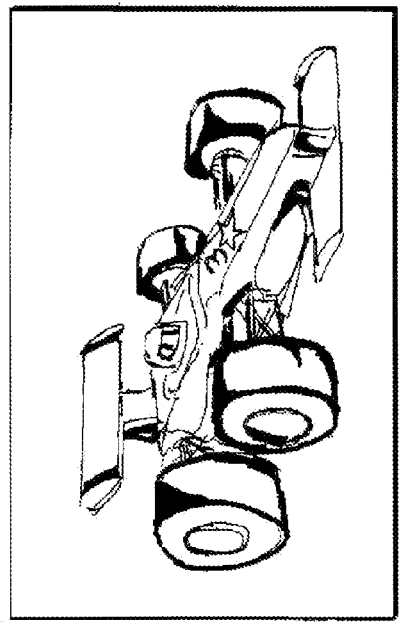
FIG. 4C FIG. 8
FIG. 8A
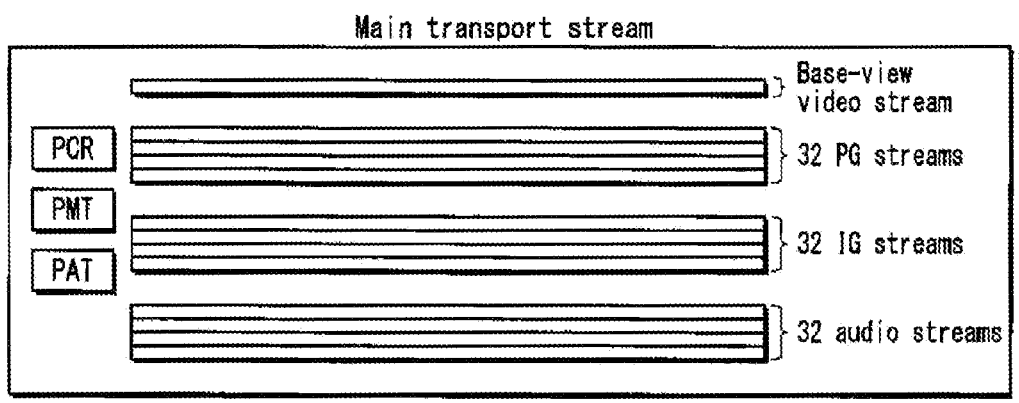
FIG. 8B
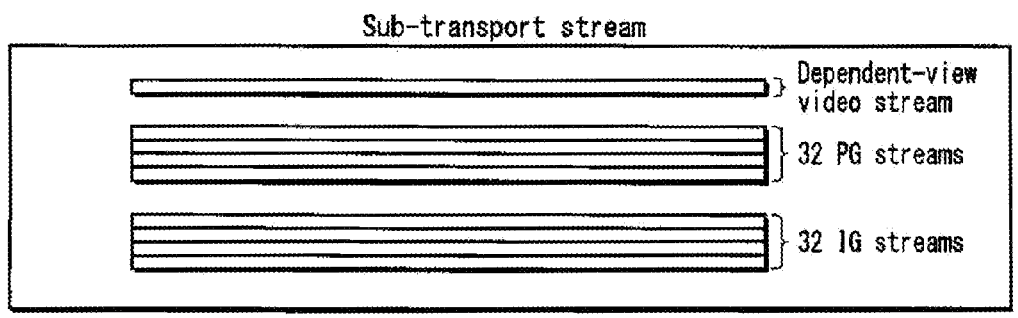

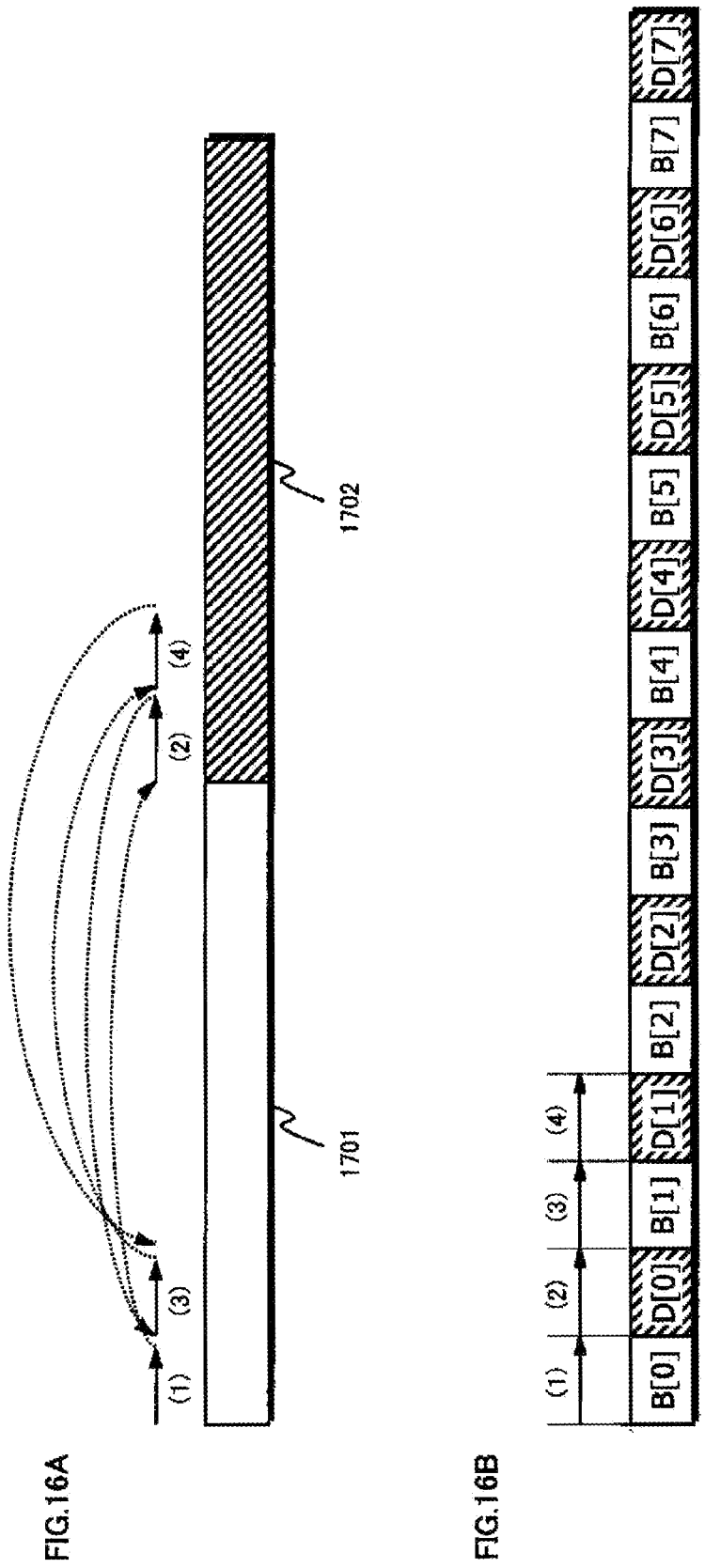

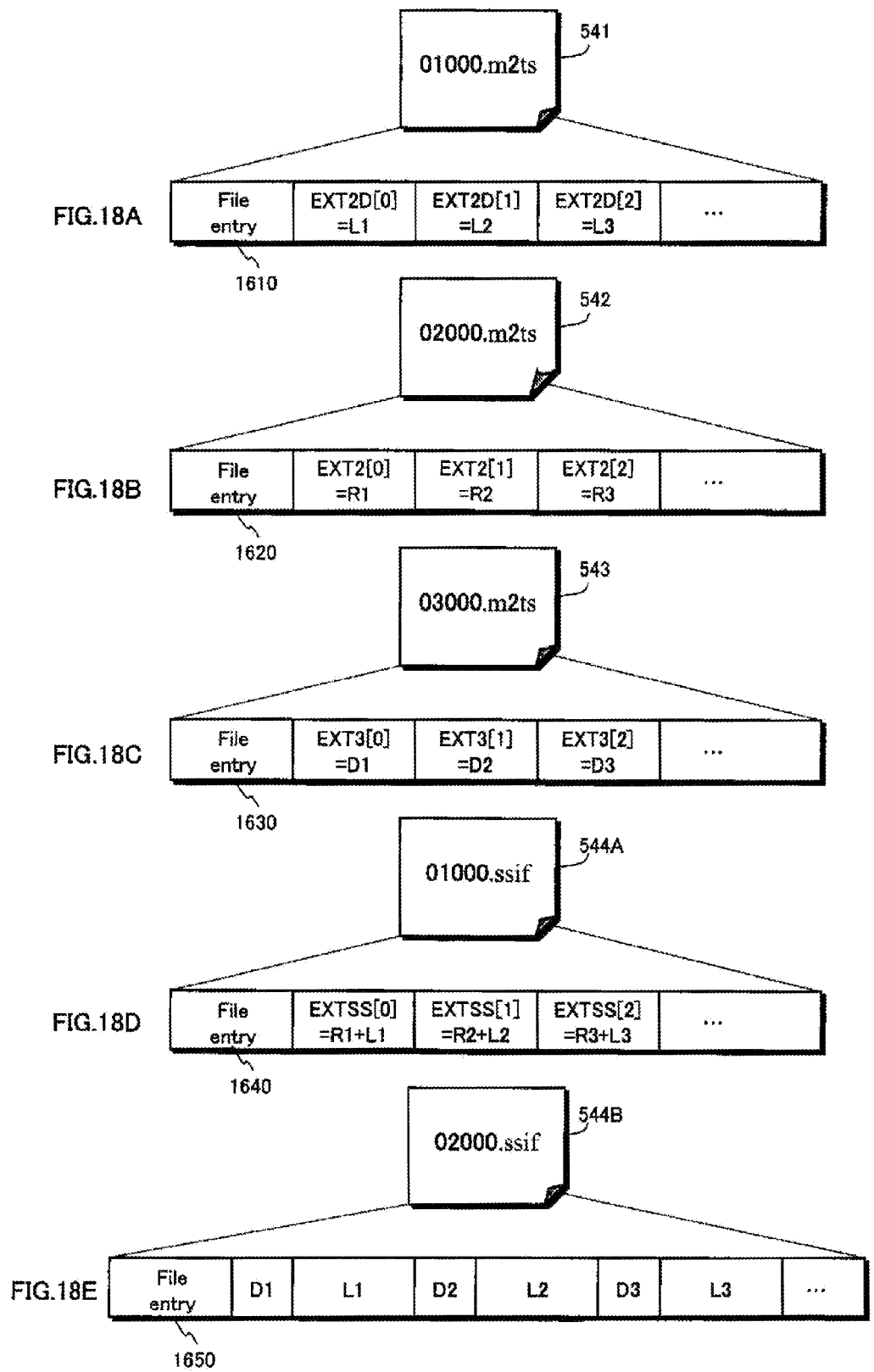

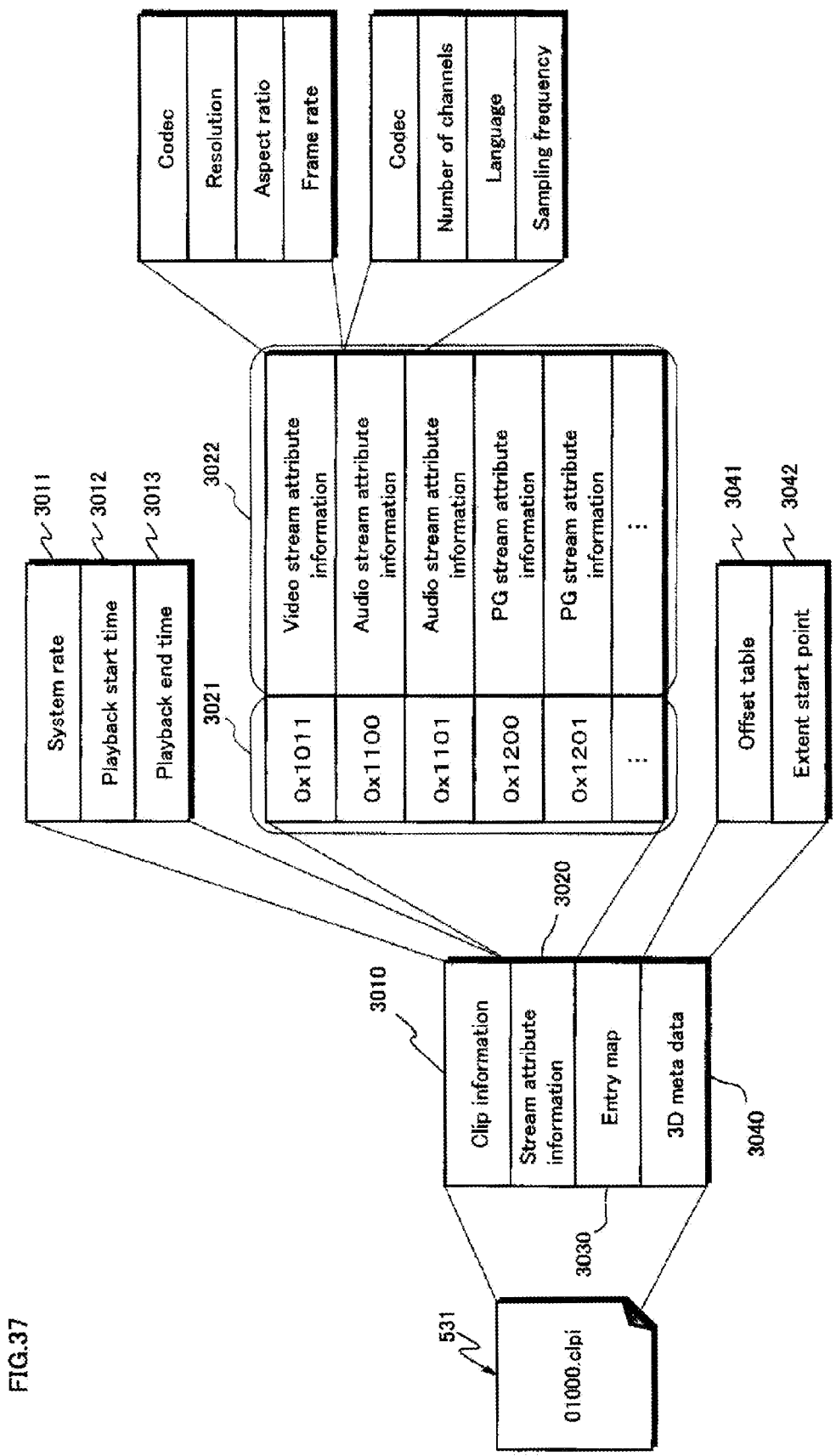

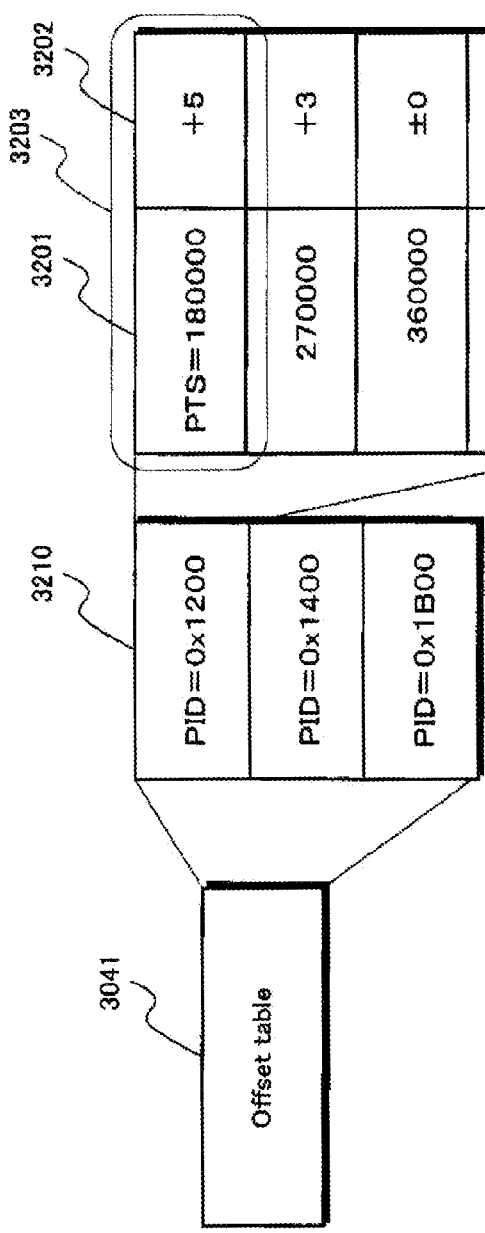
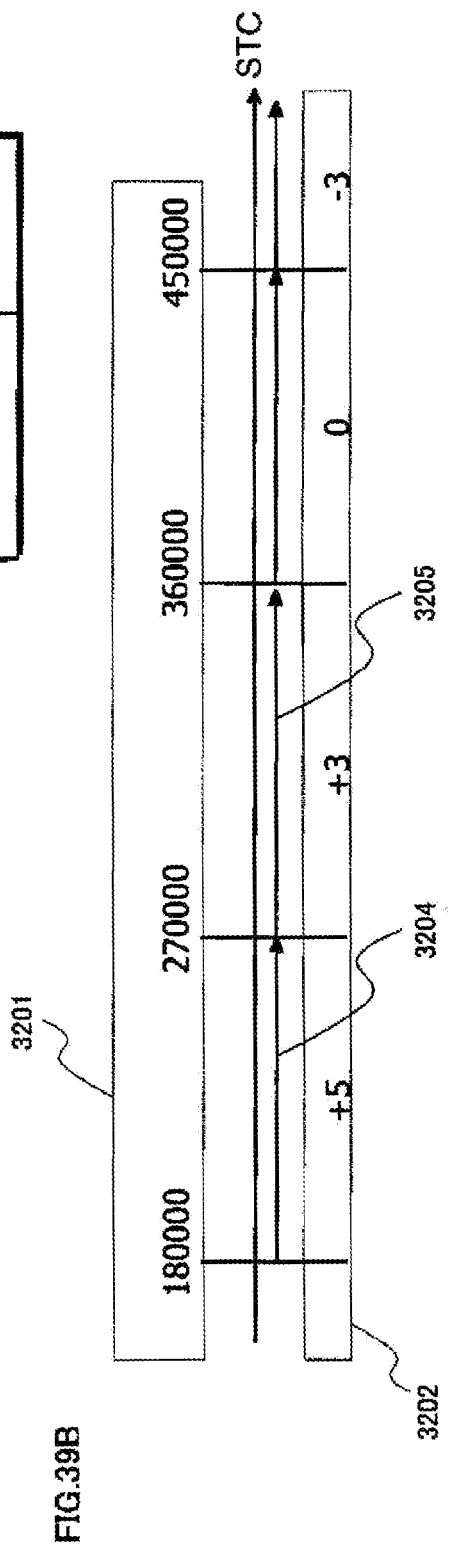
FIG.39A
FIG.39B

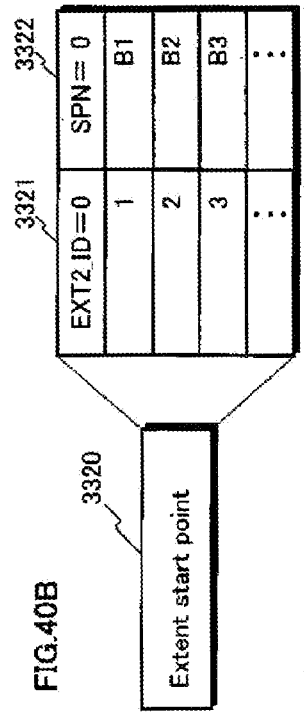
FIG.40A
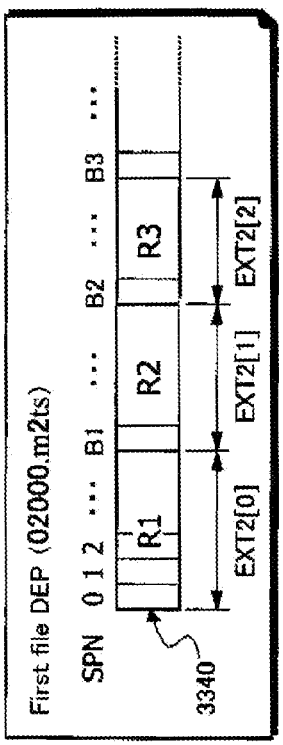
FIG.40B
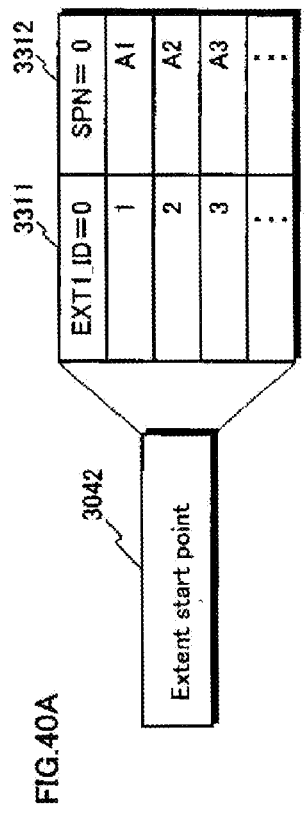
FIG.40C
FIG.40D
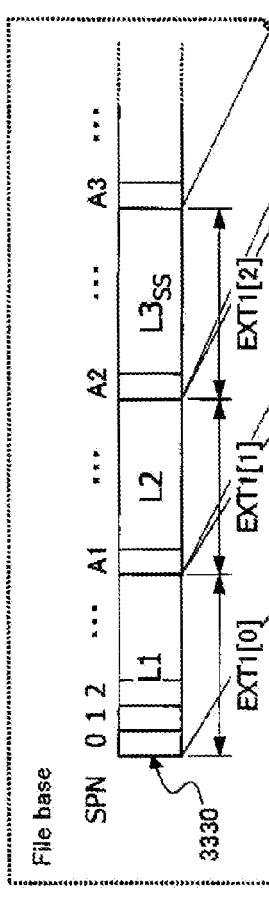
FIG.40E

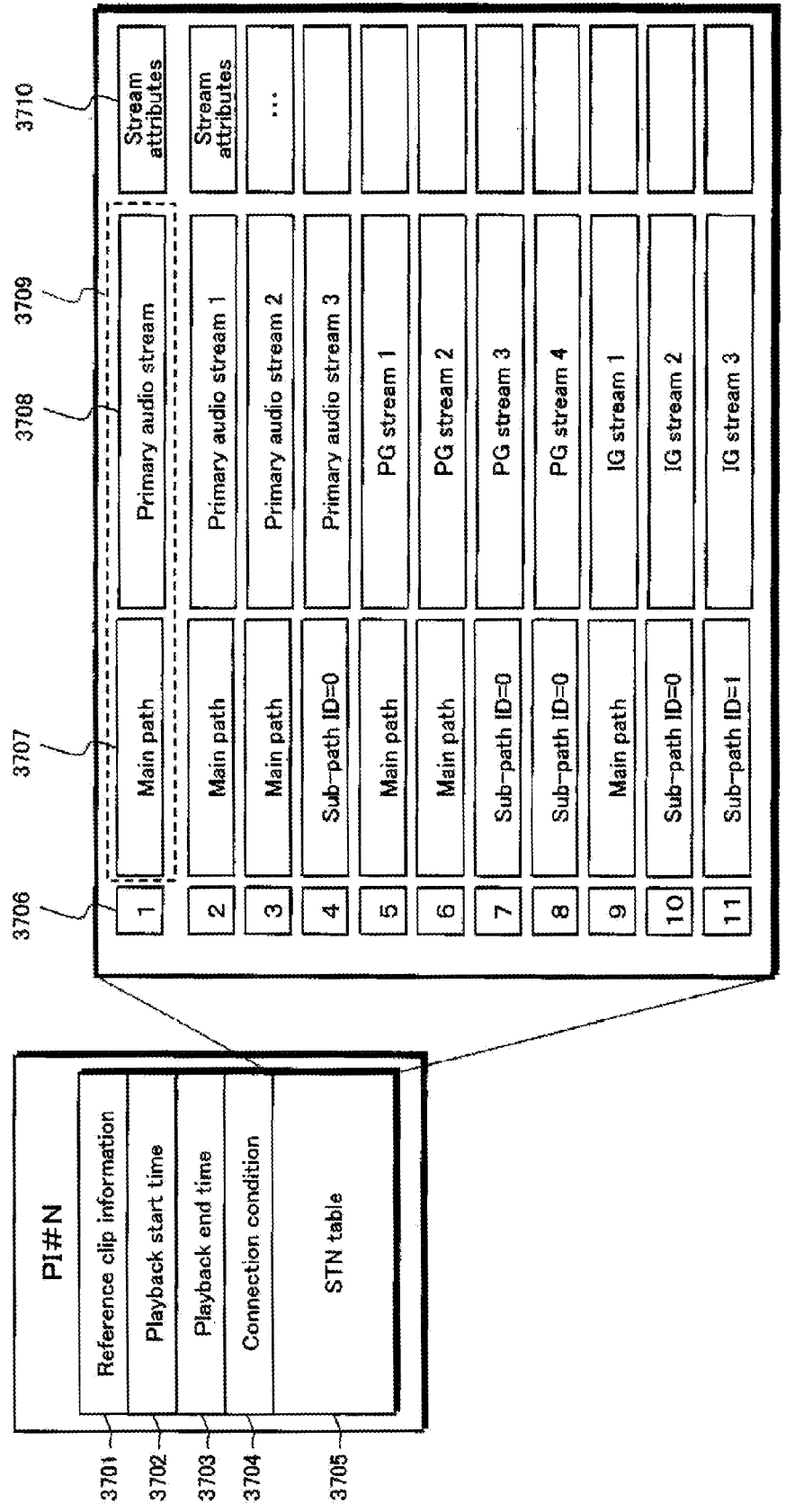

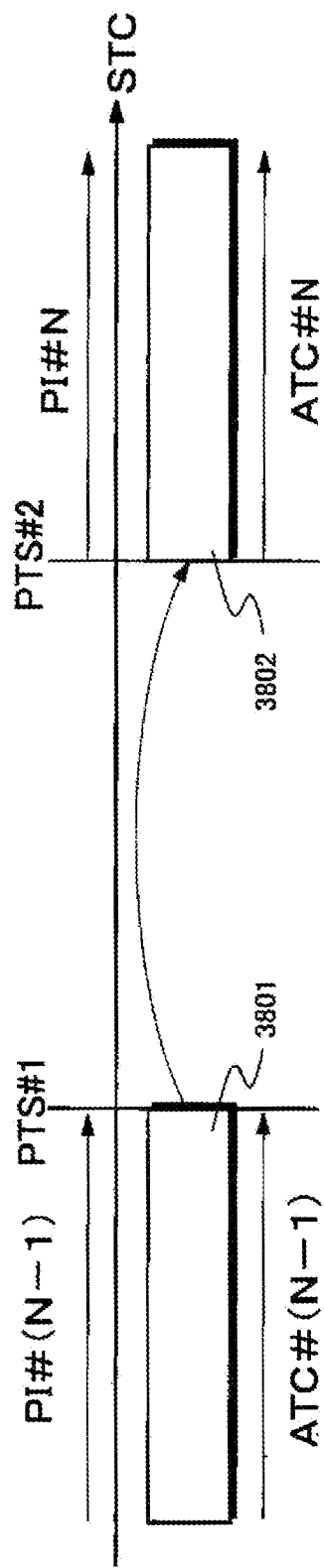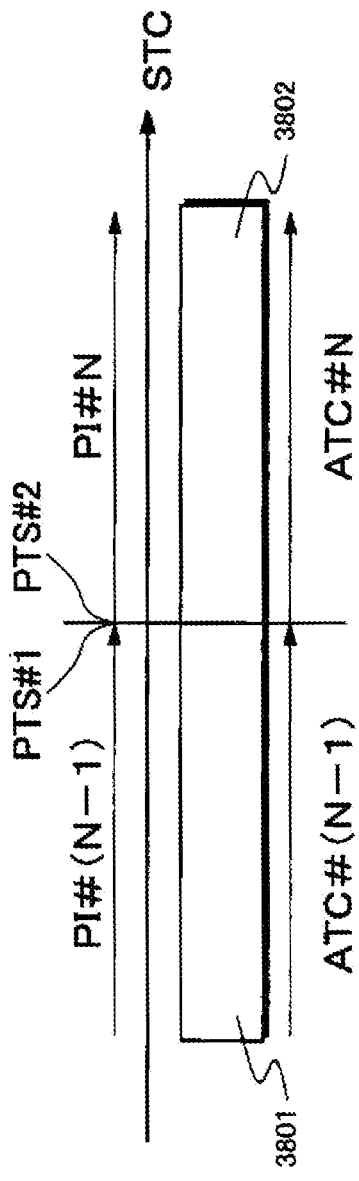

| 4701 | 4702 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 4701 | 4702 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 4701 | 4702 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| 31 | reserved |
| 32 | reserved |

FIG.64

| SJUMP (sectors) | 0 | 1 - 10000 | 10001 - 20000 | 20001 - 40000 | 40000 - 1/10 stroke | 1/10 stroke or greater |
|---|---|---|---|---|---|---|
| TJUMP (ms) | 50(=Tjump0) | 250 | 300 | 350 | 700 | 1400 |

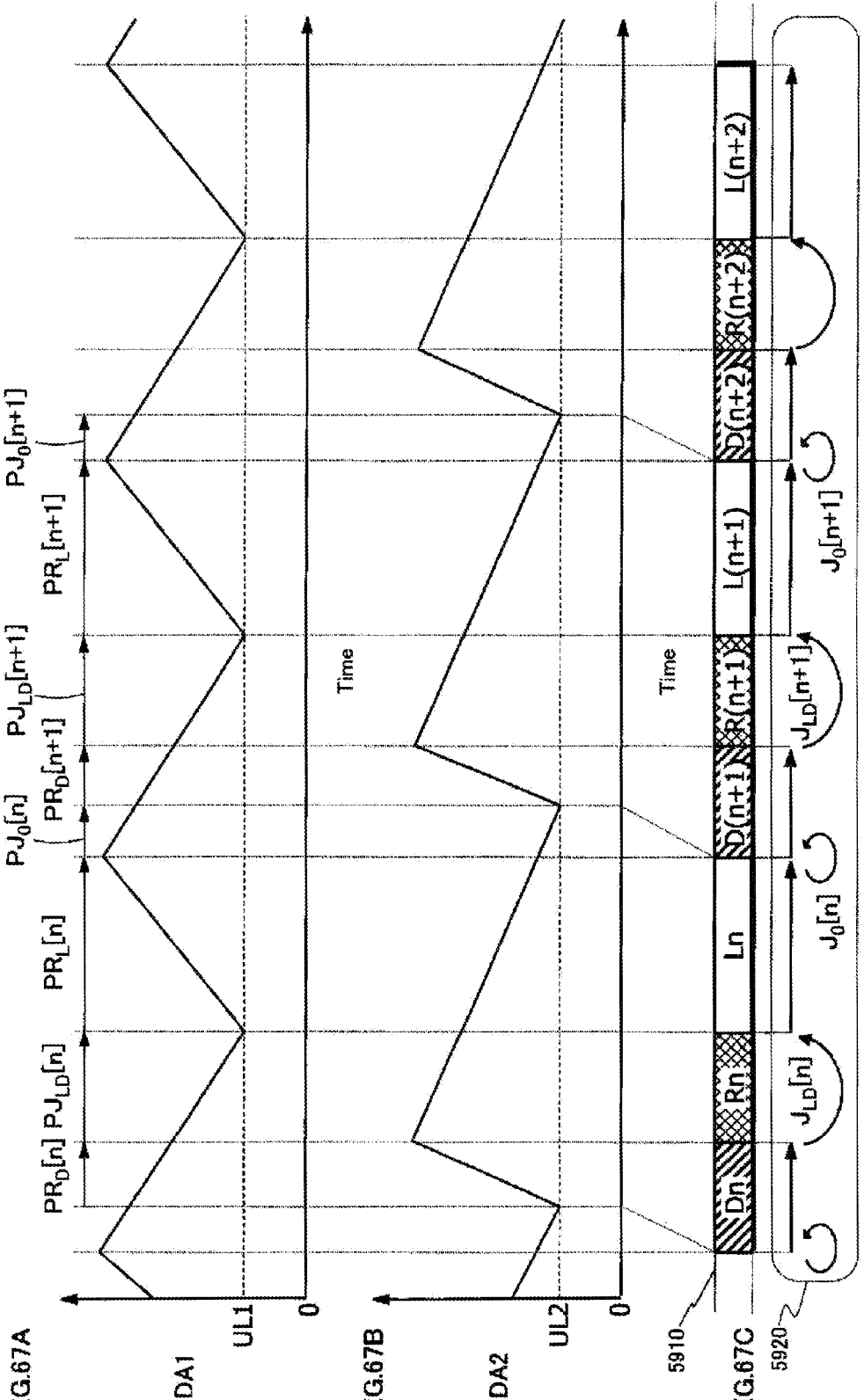

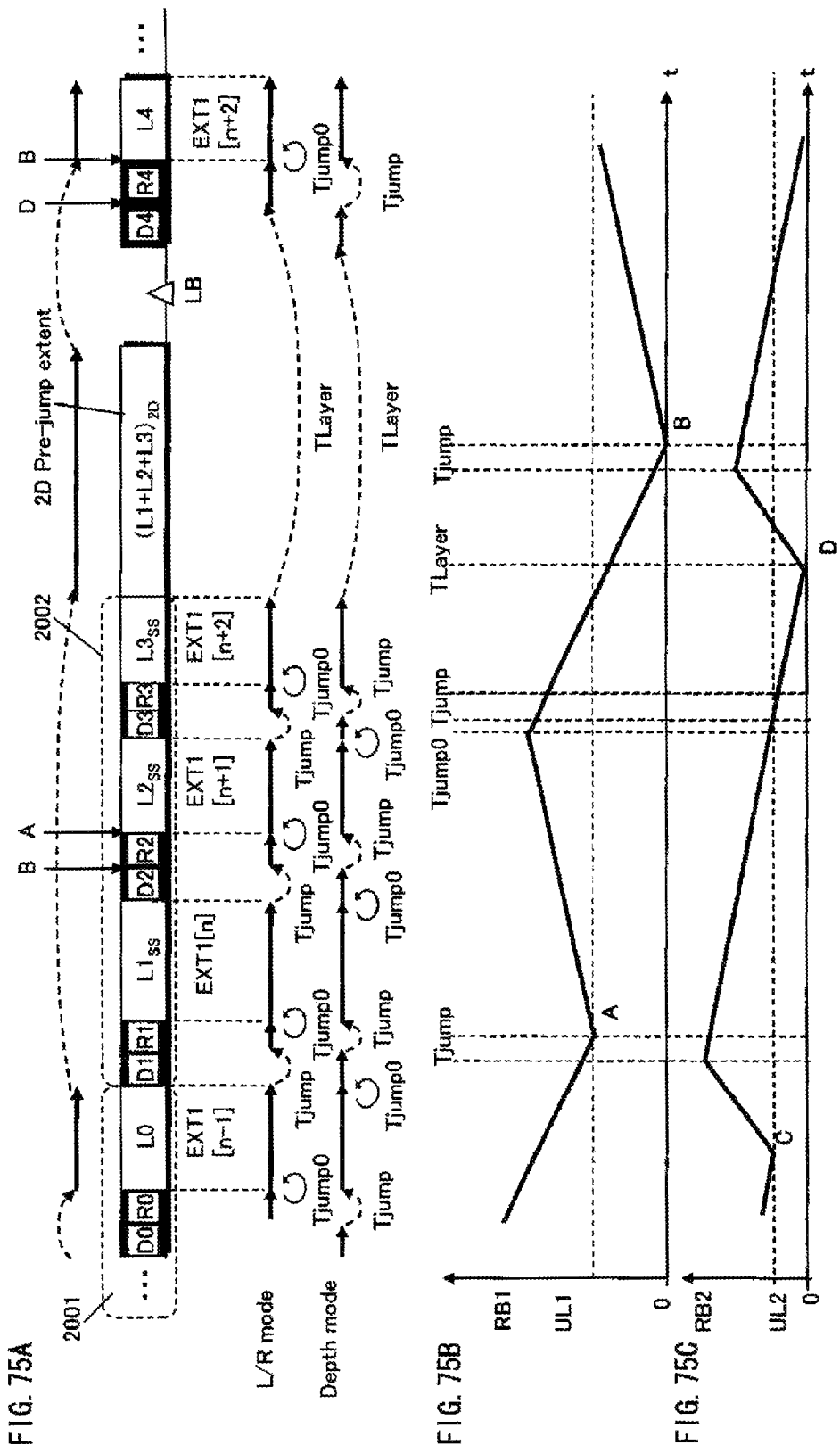

FIG. 80

- Method for calculating UL1
  - Decreased amount of data from A: (TJUMP + TLAYER + SEXT2/Rud_3D) * RMAX1
    = (TJUMP0 + TJUMP + SEXT2/Rud_3D)*RMAX1 + (TJUMPLAYER −TJUMP0 ) * RMAX1
  - Increased amount of data from A: SEXT1/Rud_3D* (R72−RMAX1)
  - UL1 = (TJUMP0 + TJUMP + SEXT2/Rud_3D)*RMAX1 + (TLAYER −TJUMP0 ) * RMAX1
    − SEXT1/Rud_3D* (Rud_3D−RMAX1)
    = (TLAYER − TJUMP0) * RMAX1

- Method for calculating UL2
  - Decreased amount of data from C: (TJUMP + TLAYER + 2*SEXT1/Rud_3D) * RMAX2
    = (TJUMP0 + TJUMP + SEXT1/Rud_3D)*RMAX2 + (TLAYER −TJUMP ) * RMAX2
  - Increased amount of data from C: SEXT2/Rud_3D* (Rud_3D−RMAX2)
  - UL2 = (TJUMP0 + TJUMP + SEXT1/Rud_3D)*RMAX2 + (TLAYER −TJUMP0 ) * RMAX2
    − SEXT2/Rud_3D* (Rud_3D−RMAX2)
    = (TLAYER − TJUMP0) * RMAX2

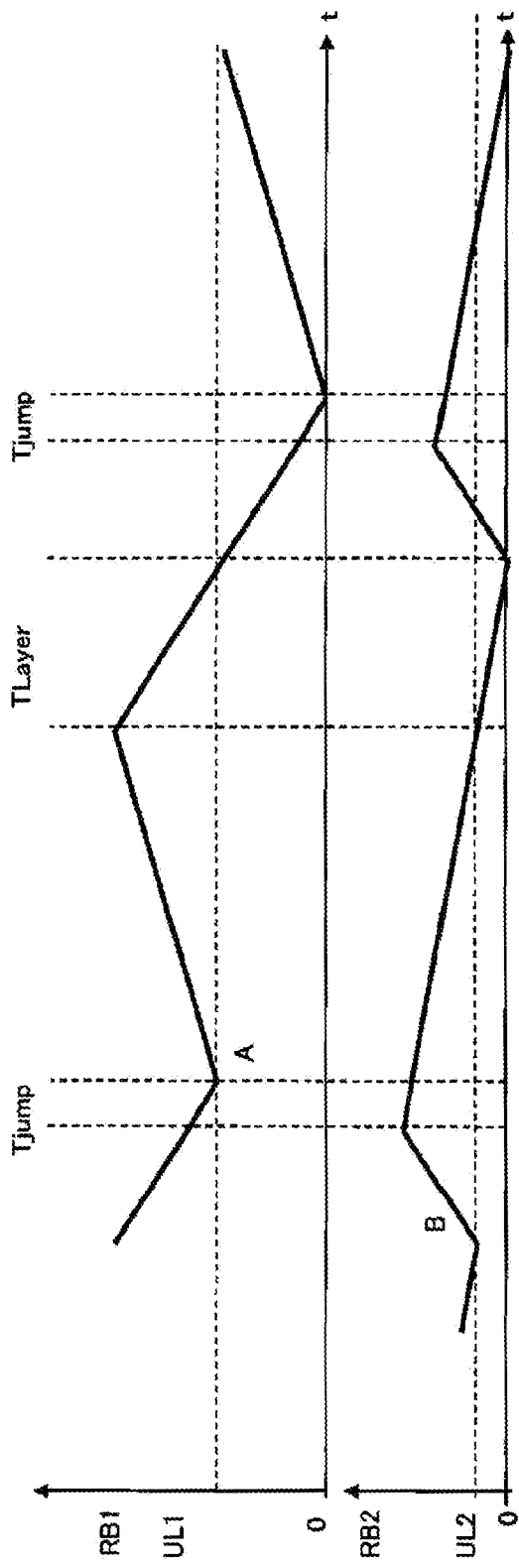

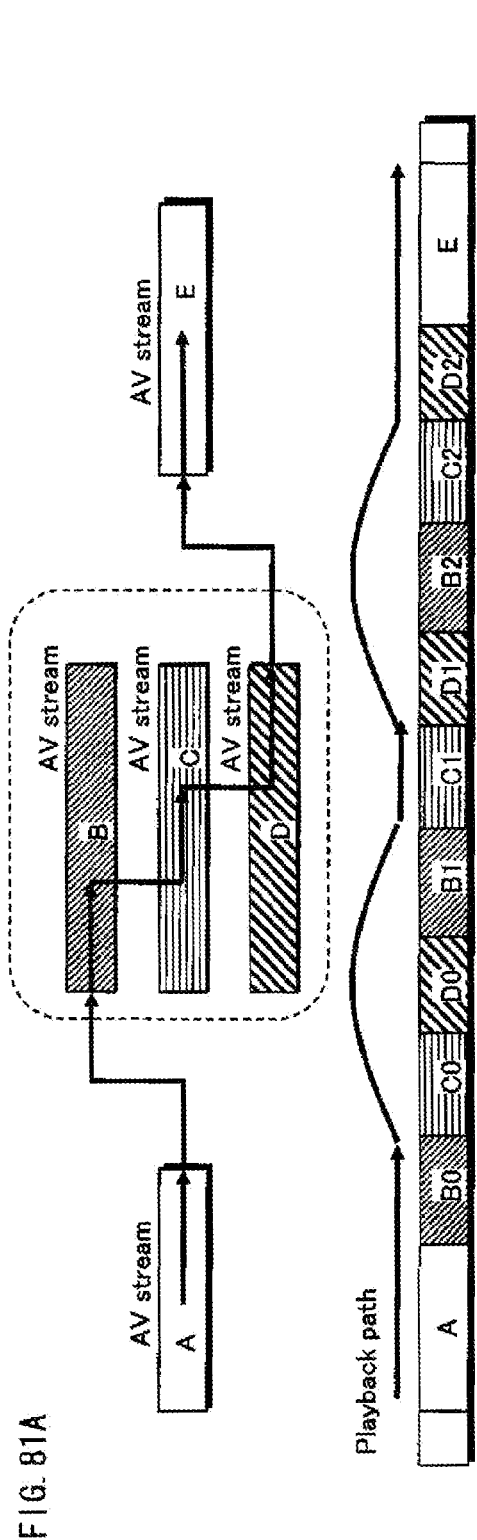
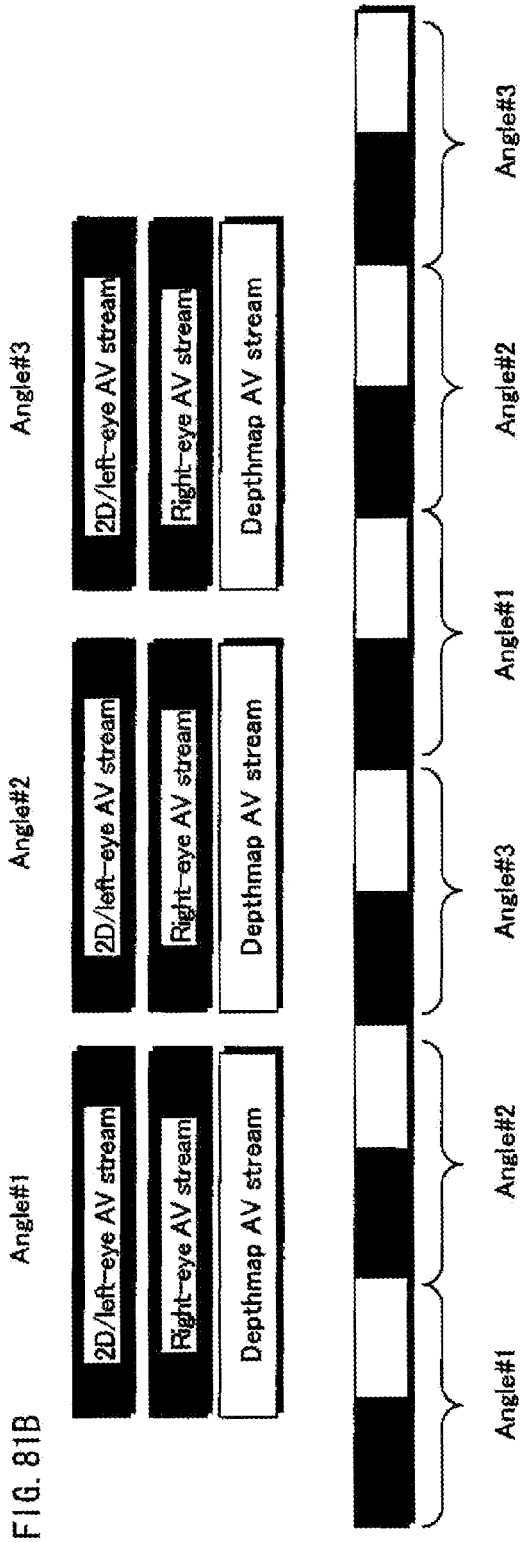
FIG. 81A
FIG. 81B

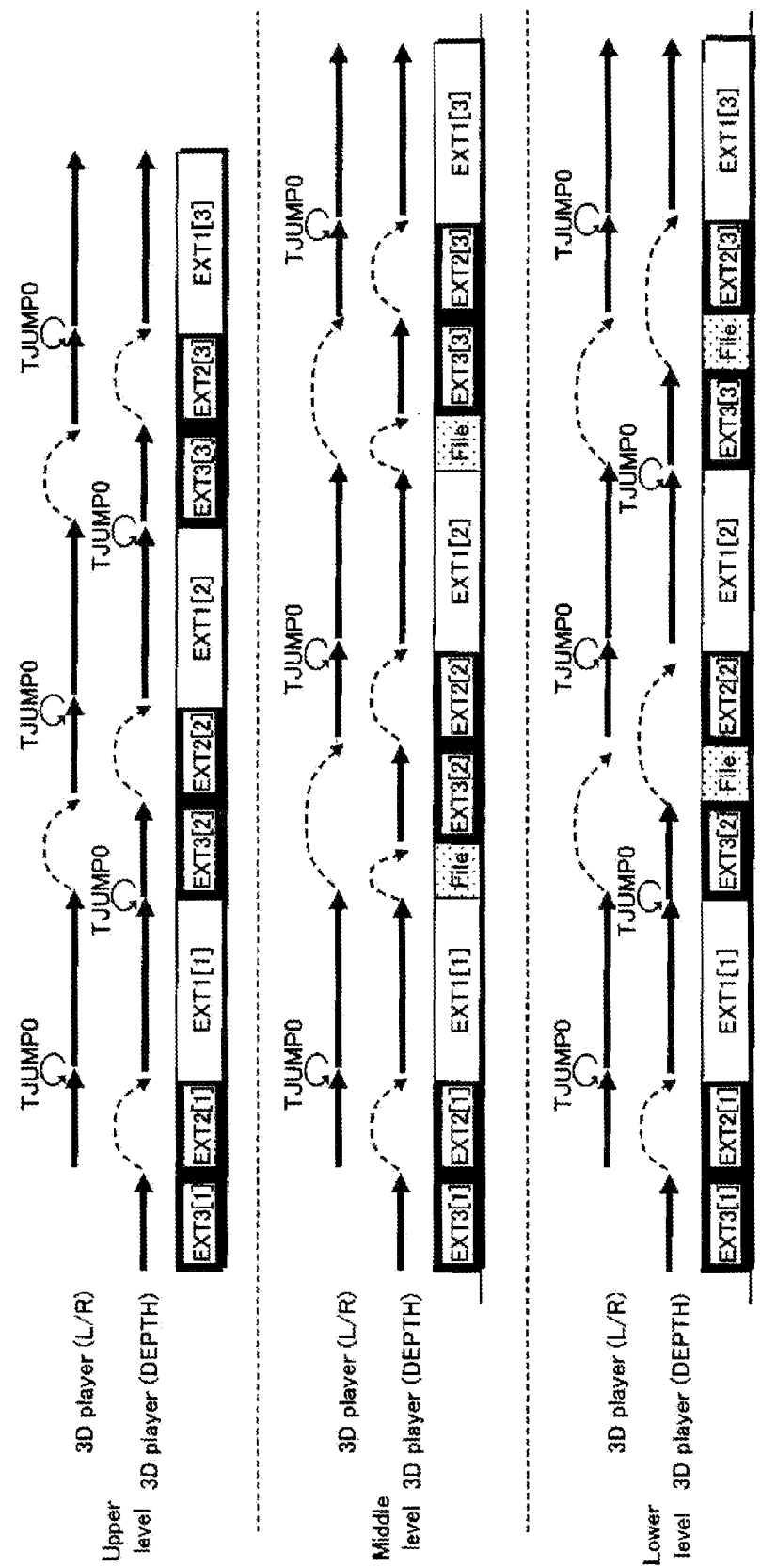

RECORDING MEDIUM, PLAYBACK DEVICE, AND INTEGRATED CIRCUIT

This application is a divisional of application Ser. No. 12/708,616, filed Feb. 19, 2010 now U.S. Pat. No. 8,139,925, which claims benefit of Provisional Application No. 61/154,001 filed Feb. 20, 2009.

BACKGROUND OF THE INVENTION (1) Field of the Invention

The present invention belongs to a technical field of a playback technology for 3D video and 2D video.

The present invention relates a playback technology for stereoscopic video, and in particular, to the allocation of video data on a recording medium.

(2) Description of the Related Art

In recent years, along with an increase in the number of 3D movie works, there is an increasing demand for storing 3D video in optical discs while maintaining the 3D video at high image quality, in order to supply these movie works for home use.

When storing 3D video on an optical disc, the disc requires playback compatibility with a playback device that can playback only an optical disc having stored 2D video (hereinafter, referred to as "2D playback device"). If the 2D playback device cannot play back the 3D video stored on the optical disc, as 2D video, the same contents need to be manufactured in two types of discs, i.e. 3D discs and 2D discs, leading to a cost increase. Accordingly, it is preferable that the optical disc having stored the 3D video can be played back as 2D video by a 2D playback device and as 3D video by a playback device that can playback both 2D video and 3D video (hereinafter, "2D/3D playback device"). Also, with use of an optical disc having the playback compatibility, it is possible to enjoy both 3D video and 2D video with a 2D/3D playback device.

FIG. 104 is a schematic diagram illustrating the technology for ensuring the compatibility of an optical disc storing 3D video content with 2D playback devices (see Patent Literature 1). An optical disc 6701 stores two types of video stream files. One is a 2D/left-view video stream file, and the other is a right-view video stream file. A "2D/left-view video stream" represents a 2D video image to be shown to the left eye of a viewer during 3D playback, i.e. a "left-view". During 2D playback, this stream constitutes the 2D video image. A "right-view video stream" represents a 2D video image to be shown to the right eye of a viewer during 3D playback, i.e. a "right-view". The left and right video streams have the same frame rate but different presentation times shifted from each other by half a frame period. For example, when the frame rate of each video stream is 24 frames per second, the frames of the 2/D left-view video stream and the right-view video stream are alternately displayed every ¼₈ seconds.

As shown in FIG. 104, the left-view and right-view video streams are divided into a plurality of extents 6702A-C and 6703A-C respectively on the optical disc 6701. Each extent contains at least one group of pictures (GOP), GOPs being read together from the optical disc. Hereinafter, the extents belonging to the 2D/left-view video stream are referred to as "2D/left-view extents", and the extents belonging to the right-view video stream are referred to as "right-view extents". The 2D/left-view extents 6702A-C and the right-view extents 6703A-C are alternately arranged on a track 6701A of the optical disc 6701. Each two adjacent extents 6702A-6703A, 6702B-6703B, and 6702C-6703C have the same length of playback time. Such an arrangement of extents is referred to as an interleaved arrangement. A group of extents recorded in an interleaved arrangement on a recording medium is used both in 3D video playback and 2D video image playback, as described below.

From among the extents recorded on the optical disc 6701, a 2D playback device 6704 causes an optical disc drive 6704A to read only the 2D/left-view extents 6702A-C sequentially from the start, skipping the reading of right-view extents 6703A-C. Furthermore, an image decoder 6704B sequentially decodes the extents read by the optical disc drive 6704A into a video frame 6706L. In this way, a display device 6707 only displays left-views, and viewers can watch normal 2D video images.

A 3D playback device 6705 causes an optical disc drive 6705A to alternately read 2D/left-view extents and right-view extents from the optical disc 6701. When expressed as codes, the extents are read in the order 6702A, 6703A, 6702B, 6703B, 6702C, and 6703C. Furthermore, from among the read extents, those belonging to the 2D/left-view video stream are supplied to a left video decoder 6705L, whereas those belonging to the right-view video stream are supplied to a right-video decoder 6705R. The video decoders 6705L and 6705R alternately decode each video stream into video frames 6706L and 6706R, respectively. As a result, left-views and right-views are alternately displayed on a display device 6708. In synchronization with the switching of the views by the display device 6708, shutter glasses 6709 cause the left and right lenses to become opaque alternately. Therefore, a viewer wearing the shutter glasses 6709 sees the views displayed by the display device 6708 as 3D video images.

When 3D video content is stored on any recording medium, not only on an optical disc, the above-described interleaved arrangement of extents is used. In this way, the recording medium can be used both for playback of 2D video images and 3D video images.

REFERENCES

Patent Documents

[Patent Document 1]
Japanese Patent No. 3935507

SUMMARY OF THE INVENTION

Problems to be Solved by the Invention

Some optical discs include multiple recording layers, like so-called two-layer discs. On such optical discs, a sequence of stream data may in some cases be recorded across two layers. On the other hand, even on a single layer disc, a sequence of stream data may in some cases be recorded with other data inserted in-between. In these cases, while the pickup of an optical disc drive reads data from the optical disc, the pickup has to perform focus jumps caused by the switching of layers and track jumps caused by radial movement along the disc. These jumps are called "long jumps" since their seek time is generally long. In order to make playback of video images seamless despite the occurrence of long jumps, it is necessary to make the size of the extent read immediately before a long jump sufficiently large and make the extent satisfy certain conditions so that underflow does not occur in the buffer in the video decoder during the long jump.

For playback of both 2D video images and 3D video images in the interleaved arrangement of extents shown in FIG. 104 to satisfy the above-mentioned conditions, the 2D/left-view extent accessed immediately before a long jump needs to be sufficiently large. However, in this case, the right-view extent that has the same playback time as the 2D/left-view extent also needs to be enlarged. As a result, the buffer capacity that needs to be guaranteed in the right-video decoder 6705R is larger than the capacity sufficient to satisfy the above-mentioned conditions. This is not desirable, since it prevents both further reduction of the buffer capacities in the 3D playback device 6705 and further improvement of efficient memory use.

Accordingly, to keep the buffer capacity that should be guaranteed in the right-video decoder 6705R down to a minimum, one possibility is, for example, to separate the playback path for 2D video images from the playback path for 3D video images immediately before or after a long jump. A "playback path for video images" refers to the relationship between each part of a video stream representing video images and the playback order thereof. Furthermore, "separation of playback paths" refers to recording, on the recording medium, a section for playback of a video stream and duplicate data for the section, allocating a different playback path to each. When the playback path for 2D video images and the playback path for 3D video images are separated in the above-described way, the sizes of the 2D/left-view extents to be read immediately before a long jump during playback of 2D video images and during playback of 3D video images can be designed differently. Accordingly, while keeping the buffer capacity to be guaranteed in the right-video decoder 6705R down to a minimum, it is possible to prevent buffer underflow in the video decoders 6705L and 6705R during a long jump in both playback of 2D video images and playback of 3D video images. At the same time, however, a duplicate of the same section in the 2D/left-view video stream is stored in a different extent on the recording medium. In order to efficiently use the recording area of the recording medium, it is desirable to suppress an increase of such duplication.

It is an object of the present invention to provide a recording medium having recorded thereon stream files arranged in a manner which both reduces a buffer amount to be secured in the playback devices and suppresses an increase of the amount of duplicate data stored in different extents.

Means for Solving the Problems

In order to achieve the stated aim, the recording medium pertaining to the present invention is a recording medium having recorded thereon an interleaved stream including a plurality of data blocks, and management information, wherein the interleaved stream includes a main-view stream used for monoscopic video playback and a sub-view stream used for stereoscopic video playback in combination with the main-view stream, the plurality of data blocks include a plurality of main-view data blocks contained in the main-view stream, and a plurality of sub-view data blocks contained in the sub-view stream, the management information includes 2D management information that refers to the main-view data blocks in monoscopic video playback, and 3D management information that refers to the main-view data blocks in stereoscopic video playback, the plurality of data blocks are grouped into a common data block group, a 2D data block group, and a 3D data block group, the common data block group includes one or more of the main-view data blocks and one or more of the sub-view data blocks, the main-view data blocks included in the common data block group being referred to by both the 2D management information and the 3D management information, the 2D data block group includes one or more of the main-view data blocks, the main-view data blocks included in the 2D data block group not being referred to by the 3D management information and being referred to by the 2D management information, the 3D data block group includes one or more of the main-view data blocks and one or more of the sub-view data blocks, the main-view data blocks included in the 3D data block group not being referred to by the 2D management information and being referred to by the 3D management information, the 2D data block group is recorded on an area which is accessed immediately before a long jump that occurs in monoscopic video playback and whose logical address succeeds a logical address of an area on which the common data block group is recorded, and the 3D data block group is recorded on an area which is accessed immediately before a long jump that occurs in stereoscopic video playback and whose logical address succeeds a logical address of the area on which the 2D data block group is recorded, and the main-view data blocks included in the 2D data block group and the main-view data blocks included in the 3D data block group are identical in content.

Advantageous Effect of the Invention

According to the recording medium pertaining to the present invention, an area on which a data block group referred to immediately before a long jump is stored is different between a monoscopic playback file and a streoscopic playback file, and accordingly, a playback path is divided into a playback path of 2D video and a playback path of 3D video immediately before the long jump. Consequently, the size of an extent referred to immediately before the long jump can be designed independently for monoscopic playback and for stereoscopic playback, thereby allowing a reduction in a buffer amount to be secured during stereoscopic playback.

Furthermore, in the playback path of 2D video, because the 2D data block referred to immediately before the long jump succeeds the common data block group shared by two types of files, the common data block group can be used as a part of an extent of the monoscopic playback file referred to immediately before the long jump. On the other hand, among extents referred to immediately before the long jump in the monoscopic playback file, the above-described common data block group is also used as an extent of the stereoscopic playback file, and thus, an increase in the amount of duplicate data which is stored in different extents can be suppressed.

Also, because the contents which are identical between the monoscopic playback file and the stereoscopic playback file are arranged as a group, data for multiple connection such as 1 playback path connecting to n playback paths after a long jump can be generated.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1A through 1C show an embodiment of the usage act of a recording medium, a playback device, a display device, and glasses;

FIG. 2 shows the user's head on the left-hand side of the drawing and the images of a dinosaur skeleton seen respectively by the left eye and the right eye of the user on the right-hand side of the drawing;

FIG. 3 shows one example of internal structures of left-view and right-view video streams for stereoscopic viewing;

FIGS. 4A through 4D show one example of a depth method;

FIG. 8 show an internal structure of a recording medium of a first embodiment;

FIG. 16A is a schematic diagram showing the arrangement of the main TS 1701 and sub-TS 1702 recorded separately and consecutively on a BD-ROM disc, and FIG. 16B is a schematic diagram showing the interleaved arrangement of the base-view data blocks B[0], B[1], B[2], . . . and dependent-view data blocks D[0], D[1], D[2], . . . recorded on a recording medium according to the first embodiment of the present invention;

FIGS. 18A, 18B, 18C, 18D, and 18E are schematic diagrams respectively showing the data structure for file 2D (01000.m2ts), first file DEP (02000.m2ts), second file DEP (03000.m2ts), first file SS (01000.ssif), and second file SS (02000.ssif);

FIG. 37 is a schematic diagram showing the data structure of a 2D clip information file;

FIG. 39A is a schematic diagram showing the data structure of an offset table 3041, and FIG. 39B is a schematic diagram showing the valid section of an offset entry;

FIG. 40A is a schematic diagram showing the data structure of the extent start points 3042 shown in FIG. 30, FIG. 40B is a schematic diagram showing the data structure of extent start points 3320 included in the right-view clip information file, FIG. 40C is a schematic diagram representing the base-view data blocks L1, L2, . . . extracted from the first file SS (01000.ssif) by the playback device 200 in L/R mode, FIG. 40D is a schematic diagram representing the relationship between right-view extents EXT2[0], EXT2[1], . . . belonging to the first file DEP (02000.m2ts) and the SPNs 3322 shown by the extent start points 3320, and FIG. 40E is a schematic diagram showing an example of the relationship between 3D extents EXTSS[0], EXTSS[1], . . . belonging to the first file SS 544A and a data block group 3350 on the recording medium 100;

FIG. 45 is a schematic diagram showing the data structure of the PI#N shown in FIG. 44;

FIGS. 46A and 46B are schematic diagrams showing the relationship between playback sections 3801 and 3802 that are to be connected when the connection condition 3704 shown in FIG. 45 respectively indicates "5" and "6";

FIG. 55 is a list of system parameters in the player variable storage unit 4608 shown in FIG. 54;

FIG. 64 is an example of a correspondence table between jump distances $S_{jump}$ and maximum jump times $T_{jump}$ for a BD-ROM disc according to the first embodiment of the present invention.

FIGS. 67A and 67B are graphs showing the change in data amounts DA1 and DA2 stored in the read buffers 4921 and 4922 during playback processing of a 3D extent block in depth mode by the playback processing system shown in FIG. 65, and FIG. 67C is a schematic diagram showing the relationship between a 3D extent block 5910 and a playback path 5920 in depth mode;

FIG. 75A shows a long jump which occurs while the data of arrangement 2 is played back in L/R mode, and FIGS. 75B and 75C respectively show a transition of a data amount accumulated in the first read buffer 4921 and a transition of a data amount accumulated in the second read buffer 4922 when the data of arrangement 2 is played back in L/R mode;

FIG. 80 shows a method for calculating the buffer margin amounts UL1 and UL2 in L/R mode;

FIG. 81 shows a structure to realize a multi angle of a 3D image;

FIG. 86 shows an arrangement of extents preferable for inserting a file different from an AV stream between extents;

DESCRIPTION OF THE PREFERRED EMBODIMENTS

Figure 5:
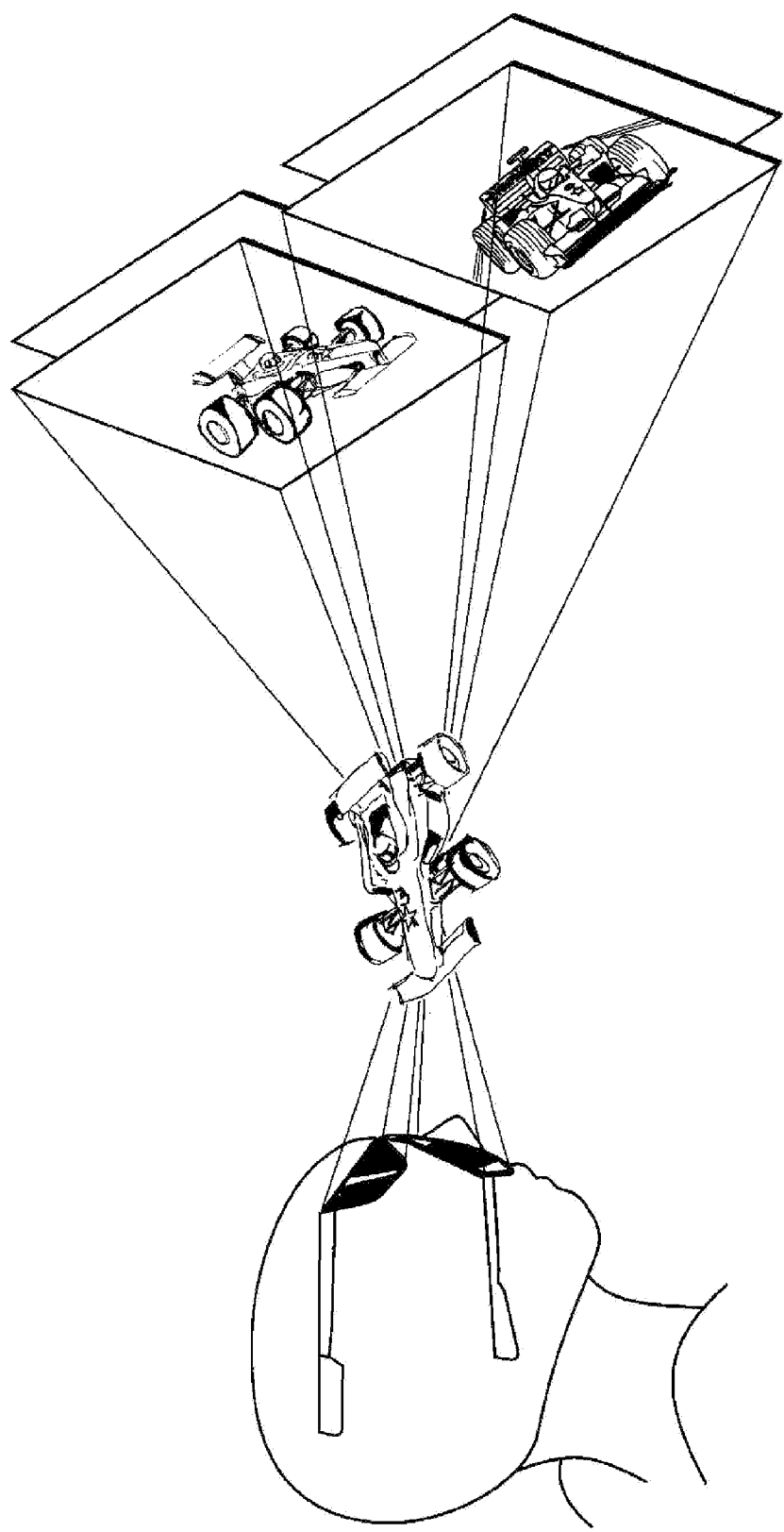
FIG. 5 shows a stereoscopic image generated in depth mode.

The following describes a recording medium and a playback device pertaining to a preferred embodiment of the present invention, with reference to the attached drawings.

First Embodiment

First, a brief description is given of the principle of the stereoscopic view.

In general, due to the difference in position between the right eye and the left eye, there is a little difference between an image seen by the right eye and an image seen by the left eye. It is this difference that enables the human beings to recognize the image they see in three dimensions. The stereoscopic display is realized by using the parallax of human beings, so that a monoscopic image looks as if it is three-dimensional.

More specifically, there is a difference between the image seen by the right eye and the image seen by the left eye, the difference corresponding to parallax of human beings. The stereoscopic display is realized by displaying the two types of images alternately at regular short time intervals.

The "short time interval" may be a time period that is short enough to provide human beings, by the alternate displays, an illusion that they are seeing a three-dimensional object. The methods for realizing the stereoscopic viewing include one using a holography technology and one using a parallax image.

The former method, the holography technology, is characterized in that it can reproduce an object three-dimensionally in the same manner as a human being recognizes the object normally, and that, in regards with video generation, although it has established a technological theory, it requires (i) a computer that can perform an enormous amount of calculations to generate the video for holography in real time, and (ii) a display device having a resolution in which several thousands of lines can be drawn in a length of 1 mm. It is extremely difficult for the current technology to realize such a product, and thus products for commercial use have hardly been developed.

On the other hand, the latter method using a parallax image has a merit that a stereoscopic viewing can be realized only by preparing images for viewing with the right eye and the left eye. Some technologies including the sequential segregation method have been developed for practical use from the viewpoint of how to cause each of the right eye and the left eye to view only the images associated therewith.

The sequential segregation method is a method in which images for the left eye and right eye are alternately displayed in a time axis direction such that left and right scenes are overlaid in the brain by the effect of residual images of eyes, and the overlaid image is recognized as a stereoscopic image.

In either method, stereoscopic video is composed of at least two view-point videos. View-point videos are videos with some kind of an angle, and one of the at least two view-point videos is called "main-view video", and a view-point video having an angle similar to the main-view video is called "sub-view". When the main view and the sub-view are supplied by video streams from a recording medium, a video stream which supplies the main view is called "main-view video stream", and a video stream which supplies the sub-view is called "sub-view video stream". Recording mediums which will be described hereinafter are for appropriately recording these main-view video and sub-view video streams.

The playback device described in the present application is a 2D/3D playback device (player) which, provided with the 2D playback mode and the 3D playback mode for playing back the above-described main view video stream and the sub-view video stream, can switch between these playback modes.

FIGS. 1A through 1C show the embodiment of the usage act of the recording medium, playback device, display device, and glasses. As shown in FIG. 1A, a recording medium 100 and a playback device 200, together with a television 300, 3D glasses 400, and a remote control 500, constitute a home theater system which is subject to the use by the user.

The recording medium 100 provides the home theater system with, for example, a movie work.

The playback device 200 is connected with the television 300 and plays back the recording medium 100.

The television 300 provides the user with an interactive operation environment by displaying a menu and the like as well as the movie work. The user needs to wear the 3D glasses 400 for the television 300 of the present embodiment to realize the stereoscopic viewing. Here, the 3D glasses 400 are not necessary when the television 300 displays images by the lenticular method. The television 300 for the lenticular method aligns pictures for the left and right eyes vertically in a screen at the same time. And a lenticular lens is provided on the surface of the display screen such that pixels constituting the picture for the left eye form an image only in the left eye and pixels constituting the picture for the right eye form an image only in the right eye. This enables the left and right eyes to see respectively pictures that have a parallax, thereby realizing a stereoscopic viewing.

The 3D glasses 400 are equipped with liquid-crystal shutters that enable the user to view a parallax image by the sequential segregation method or the polarization glasses method. Here, the parallax image is an image which is composed of a pair of (i) an image that enters only into the right eye and (ii) an image that enters only into the left eye, such that pictures respectively associated with the right and left eyes respectively enter the eyes of the user, thereby realizing the stereoscopic viewing. FIG. 1B shows the state of the 3D glasses 400 when the left-view image is displayed. At the instant when the left-view image is displayed on the screen, the liquid-crystal shutter for the left eye is in the light transmission state, and the liquid-crystal shutter for the right eye is in the light block state. FIG. 1C shows the state of the 3D glasses 400 when the right-view image is displayed. At the instant when the right-view image is displayed on the screen, the liquid-crystal shutter for the right eye is in the light transmission state, and the liquid-crystal shutter for the left eye is in the light block state.

The remote control 500 is a machine for receiving from the user operations for playing back AV. The remote control 500 is also a machine for receiving from the user operations onto the layered GUI. To receive the operations, the remote control 500 is equipped with a menu key, arrow keys, an enter key, a return key, and numeral keys, where the menu key is used to call a menu constituting the GUI, the arrow keys are used to move a focus among GUI components constituting the menu, the enter key is used to perform ENTER (determination) operation onto a GUI component constituting the menu, the return key is used to return to a higher layer in the layered menu.

In the home theater system shown in FIGS. 1A through 1C, an output mode of the playback device for causing the display device 300 to display images in the 3D playback mode is called "3D output mode", and an output mode of the playback device for causing the display device 300 to display images in the 2D playback mode is called "2D output mode".

This completes the description of the usage act of the recording medium and the playback device.

The present embodiment adopts a method in which parallax images to be used for the stereoscopic viewing are stored in an information recording medium.

The parallax image method is a method for realizing the stereoscopic viewing by preparing separately an image for the right eye and an image for the left eye, and causing the image for the right eye to enter only into the right eye and the image for the left eye enter only into the left eye. FIG. 2 shows the user's head on the left-hand side of the drawing and the images of a dinosaur skeleton seen respectively by the left eye and the right eye of the user on the right-hand side of the drawing. When the light transmission and block are repeated alternately for the right and left eyes, the left and right scenes are overlaid in the brain of the user by the effect of residual images of eyes, and the overlaid image is recognized as a stereoscopic image appearing in front of the user.

Among the parallax images, the image entering the left eye is called a left-eye image (L image), and the image entering the right eye is called a right-eye image (R image). A video composed of only L images is called a left-view video, and a video composed of only R images is called a right-view video. Also, the video streams which are obtained by digitizing and compress-encoding the left-view video and right-view video are called left-view video stream and right-view video stream, respectively.

These left-view and right-view video streams are compressed by the inter-picture prediction encoding using the correlated property between view points, as well as by the inter-picture prediction encoding using the correlated property in a time axis. The pictures constituting the right-view video stream are compressed by referring to the pictures constituting the left-view video stream having the same display times. One of the video compression methods using such a correlated property between view points is a corrected standard of MPEG-4 AVC/H.264 which is called Multi-view Video Coding (MVC). The Joint Video Team (JVT), which is a joint project of the ISO/IEC MPEG and the ITU-T VCEG, completed in July 2008 the formulation of the corrected standard of MPEG-4 AVC/H.264 called the Multi-view Video Coding (MVC). The MVC is a standard for encoding, in bulk, images for a plurality of view points. Due to the use, in the prediction encoding, of the similarity of images between view points as well as the similarity of images in a time axis, the MVC has improved the compression efficiency compared with methods for encoding independent images for a plurality of view points.

A video stream, among the left-view video stream and the right-view video stream having been compress-encoded by the MVC, that can be decoded independently is called "base-view video stream". A base-view indicator, which will be described later, indicates which of the left-view video stream and the right-view video stream is specified as the base-view video stream. Also, a video stream, among the left-view video stream and the right-view video stream, that has been compress-encoded based on the inter-frame correlated property with each picture data constituting the base-view video stream, and that can be decoded only after the base-view video stream is decoded, is called "dependent-view stream".

A video stream, among the left-view video stream and the right-view video stream having been compress-encoded with use of the correlated property between view points, that can be decoded independently is called "base-view video stream". A base-view indicator in the playitem information indicates which of the left-view video stream and the right-view video stream is specified as the base-view video stream.

Currently, the MVC method is considered to be the best method for encoding stereoscopic video. Accordingly, description hereinafter is given assuming that "main-view video stream" is "base-view video stream", and "sub-view video stream" is "dependent-view video stream".

The video stream in the MPEG4-AVC format, which forms the basis of the MVC video stream, is described in the following.

The MVC video stream has the GOP structure, and is composed of closed GOPs and open GOPs. The closed GOP is composed of an IDR picture, and B-pictures and P-pictures that follow the IDR picture. The open GOP is composed of a non-IDR I-picture, and B-pictures and P-pictures that follow the non-IDR I-picture. The non-IDR I-pictures, B-pictures, and P-pictures are compress-encoded based on the frame correlation with other pictures. The B-picture is a picture composed of slice data in the bidirectionally predictive (B) format, and the P-picture is a picture composed of slice data in the predictive (P) format. The B-picture is classified into reference B (Br) picture and non-reference B (B) picture.

In the closed GOP, the IDR picture is disposed at the top. In the display order, the IDR picture is not the top, but pictures (B-pictures and P-pictures) other than the IDR picture cannot have dependency relationship with pictures existing in a GOP that precedes the closed GOP. As understood from this, the closed GOP has a role to complete the dependency relationship.

Next, the internal structure of the GOP is described. Each piece of picture data in the open and closed GOPs has the video access unit structure of the H.264 encoding method. Each video access unit includes a video access unit delimiter, a sequence parameter set, a picture parameter set, and a view component.

The view component is picture data that has been compress-encoded based on the correlation between view points, while it has the access unit structure.

The video access unit delimiter is converted into a network abstraction unit, and then stored in the source packet. Reading from the source packet enables a random access inside the video stream.

The relationship between the video access unit and the picture is "1 video access unit=1 picture". In the BD-ROM, the relationship is restricted to "1 PES packet=1 frame". Therefore, when the video has the frame structure, "1 PES packet=1 picture", and when the video has the field structure, "1 PES packet=2 pictures". Taken these into account, the PES packet stores the picture in a one-to-one ratio.

FIG. 3 shows one example of the internal structures of the left-view and right-view video streams for the stereoscopic viewing.

In the second row of FIG. 3, the internal structure of the left-view video stream is shown. This stream includes picture data I1, P2, Br3, Br4, P5, Br6, Br7, and P9. These picture data are decoded according to the Decode Time Stamps (DTS). The first row shows the left-eye image. The left-eye image is played back by playing back the decoded picture data I1, P2, Br3, Br4, P5, Br6, Br7, and P9 according to the PTS, in the order of I1, Br3, Br4, P2, Br6, Br7, and P5.

In the fourth row of FIG. 3, the internal structure of the right-view video stream is shown. This stream includes picture data P1, P2, B3, B4, P5, B6, B7, and P8. These picture data are decoded according to the DTS. The third row shows the right-eye image. The right-eye image is played back by playing back the decoded picture data P1, P2, B3, B4, P5, B6, B7, and P8 according to the PTS, in the order of P1, B3, B4, P2, B6, B7, and P5.

A pair of pictures which respectively belong to these two video streams and represent the same frame or field of 3D video are assigned the same PTS and the same DTS.

The fifth row shows how the state of the 3D glasses 400 is changed. As shown in the fifth row, when the left-eye image is viewed, the shutter for the right eye is closed, and when the right-eye image is viewed, the shutter for the left eye is closed.

In FIG. 3, for example, the starting P-picture of the right-view video stream refers to the I-picture of the left-view video stream; the B-picture of the right-view video stream refers to the Br-picture of the left-view video stream; and the second P-picture of the right-view video stream refers to the P-picture of the left-view video stream. Here, a mode, in which video frames of the base-view video stream (B) and video frames of the dependent-view video stream (D) are alternately output at a display cycle of ⅟48 seconds like "B"-"D"-"B"-"D", is called a "B-D presentation mode".

Also, a mode, in which a same type of video frame is repeatedly output twice or more while the 3D mode is maintained as the playback mode, is called a "B-B presentation mode". In the "B-B presentation mode", video frames of an independently playable base-view video stream are repeatedly output like "B"-"B"-"B"-"B".

The B-D presentation mode further includes the 3D-depth method for realizing the stereoscopic effect by using 2D images and the depth information, as well as the 3D-LR method for realizing the stereoscopic effect by using the L images and R images.

The 3D-depth method is realized by incorporating a parallax image generator in the latter half of the video decoder, and in the 3D-depth method, the left-view picture data and the right-view picture data are generated from (i) each piece of picture data in the video stream and (ii) the depth information of each pixel that constitutes the picture data.

The depth information may be made of grayscale picture data (also referred to as depth information picture data) that represents the depth of pixels by a grayscale.

FIGS. 4A through 4D show one example of the depth method. FIG. 4A shows a 2D image, and FIG. 4B shows a grayscale generated for the 2D image shown in FIG. 4A. The grayscale is represented by pixels that are composed of only the brightness element. The brighter (whiter) the grayscale pixels are, the shallower they are; and the darker the grayscale pixels are, the deeper they are. FIGS. 4C and 4D show the left-eye image and the right-eye image that are generated with use of the grayscale, respectively. FIG. 5 shows a stereoscopic image generated in the 3D-depth mode. As shown in FIG. 5, by generating the left-eye image and the right-eye image for each frame of 2D images, the user can enjoy the stereoscopic viewing by seeing the left-eye image and the right-eye image through the goggle.

In the 3D-depth method, a video stream that can be played back as a 2D image becomes the base-view video stream; and a video stream that is composed of grayscale picture data becomes the dependent-view video stream.

The video streams obtained by digitizing and compress-encoding the grayscale picture data used in this 3D-Depth mode is called "depthmap stream". The depthmap stream is compressed by the inter-picture prediction encoding using the correlated property in a time axis direction, and is a video stream having no correlation between viewpoints. However, for this video stream, the same format as that of the dependent-view video stream used in the 3D-LR mode is used. For example, if the left-view video stream and the right-view video stream are encoded in the MVC format, the depth map stream is also encoded in the MVC format. With such a structure, switching between the 3D-LR mode and the 3D-Depth mode can be performed smoothly without changing configuration of the playback device.

Hereinafter, the B-D presentation mode using the 3D-LR is referred to as L/R mode, and the B-D presentation mode using the 3D-Depth mode is referred to as depth mode.

The base-view video stream can be shared by depth mode and L/R mode. It is therefore possible to generate images for depth mode and images for L/R mode by combining the base-view video stream and a video stream for depth mode or a video stream for L/R mode. The data management structure is structured to support these combinations so that the display method is switched in accordance with the properties of the player and the television connected thereto.

<Recording Medium 100>

The recording medium pertaining to the present invention can be produced as a BD-ROM disc that is a multi-layered optical disc, and a BD-RE disc, a BD-R disc, or an AVC-HD medium having compatibility with the BD-ROM disc.

Figure 6:
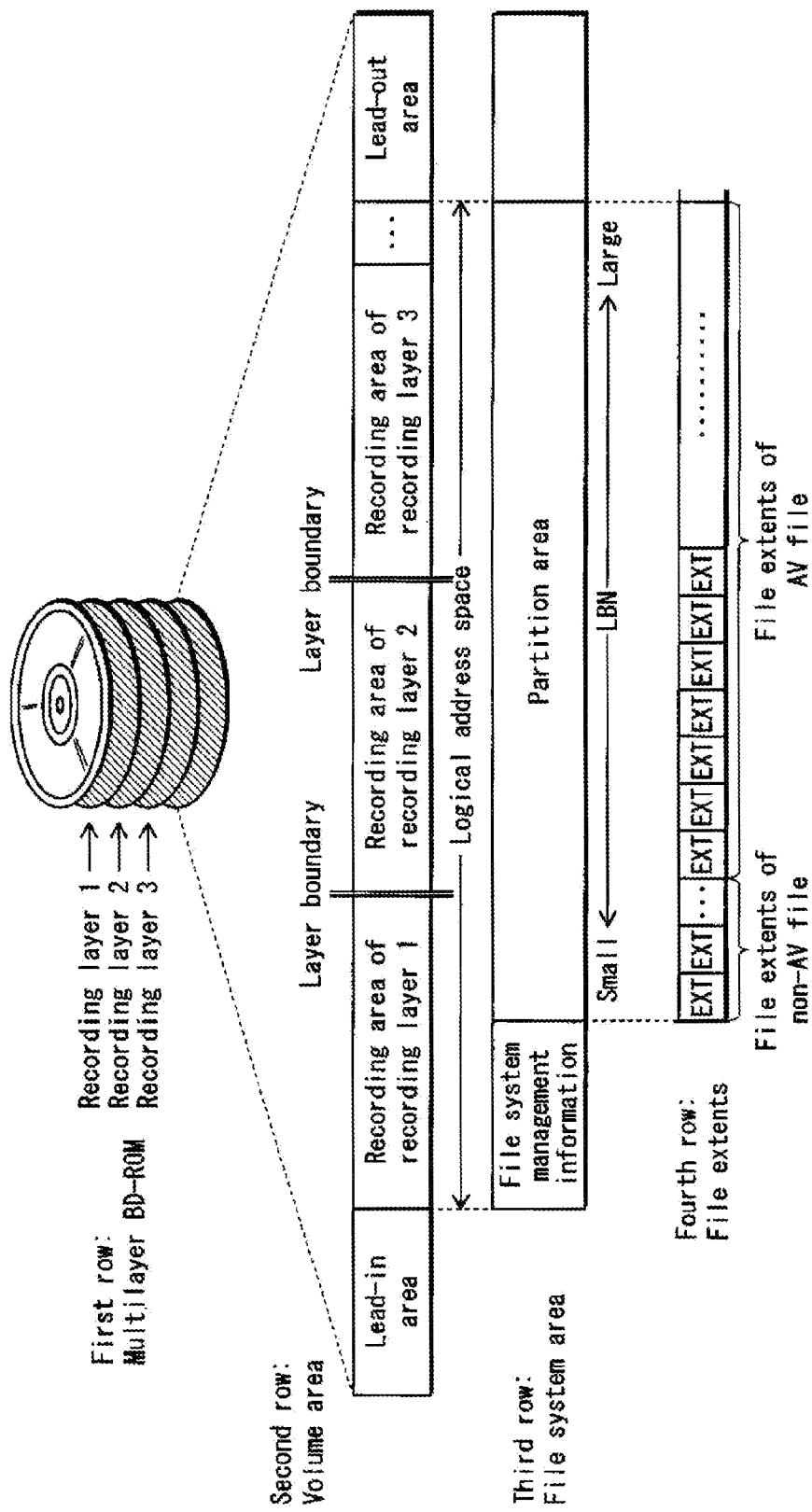
FIG. 6 shows an internal structure of a multi-layered optical disc.

FIG. 6 shows an internal structure of a multi-layered optical disc.

The first row of FIG. 6 shows a BD-ROM being a multi-layered optical disc. The second row shows tracks in the horizontally extended format though they are in reality formed spirally in the recording layers. These spiral tracks in the recording layers are treated as one continuous volume area. The volume area is composed of a lead-in area, recording layers of recording layers 1 through 3, and a lead-out area, where the lead-in area is located at the inner circumference, the lead-out area is located at the outer circumference, and the recording layers of recording layers 1 through 3 are located between the lead-in area and the lead-out area. The recording areas of recording layers 1 through 3 constitute one consecutive logical address space.

The volume area is sectioned into units in which the optical disc can be accessed, and serial numbers are assigned to the access units. The serial numbers are called logical addresses. A data reading from the optical disc is performed by specifying a logical address. Here, in the case of a read-only disc such as the BD-ROM, basically, sectors with consecutive logical addresses are also consecutive in the physical disposition on the optical disc. That is to say, data stored in the sectors with consecutive logical addresses can be read out without performing a seek operation. However, at the boundaries between recording layers, consecutive data reading is not possible even if the logical addresses are consecutive. It is thus presumed that the logical addresses of the boundaries between recording layers are registered in the recording device preliminarily.

In the volume area, file system management information is recorded immediately after the lead-in area. Following this, a partition area managed by the file system management information exists. The file system is a system that expresses data on the disc in units called directories and files. In the case of the BD-ROM, the file system is a UDF (Universal Disc Format). Even in the case of an everyday PC (personal computer), when data is recorded with a file system called FAT or NTFS, the data recorded on the hard disk under directories and files can be used on the computer, thus improving usability. The file system makes it possible to read logical data in the same manner as in an ordinary PC, using a directory and file structure.

The fourth row shows the contents recorded in a partition area managed by the file system. Extents constituting files exist in the partition area. The extents are formed on a plurality of sectors that are physically continuous in the partition area.

The partition area includes an "area in which file set descriptor is recorded", "area in which end descriptor is recorded", "ROOT directory area", "BDMV directory area", "JAR directory area", "BDJO directory area", "PLAYLIST directory area", "CLIPINF directory area", and "STREAM directory area". The following explains these areas.

The "file set descriptor" includes a logical block number (LBN) that indicates a sector in which the file entry of the ROOT directory is recorded, among directory areas. The "end descriptor" indicates an end of the file set descriptor.

Next is a detailed description of the directory areas. The above-described directory areas have an internal structure in common. That is to say, each of the "directory areas" is composed of a "file entry", "directory file", and "file recording area of lower file".

The "file entry" includes a "descriptor tag", "ICB tag", and "allocation descriptor".

The "descriptor tag" is a tag that indicates the entity having the descriptor tag is a file entry.

The "ICB tag" indicates attribute information concerning the file entry itself.

The "allocation descriptor" includes a logical block number (LBN) that indicates a recording position of the directory file. Up to now, the file entry has been described. Next is a detailed description of the directory file.

The "directory file" included in each directory area includes a "file identification descriptor of lower directory" and "file identification descriptor of lower file".

The "file identification descriptor of lower directory" is information that is referenced to access a lower directory that belongs to the directory file itself, and is composed of identification information of the lower directory, the length of the directory name of the lower directory, a file entry address that indicates the logical block number of the block in which the file entry of the lower directory is recorded, and the directory name of the lower directory.

The "file identification descriptor of lower file" is information that is referenced to access a file that belongs to the directory file itself, and is composed of identification information of the lower file, the length of the lower file name, a file entry address that indicates the logical block number of the block in which the file entry of the lower file is recorded, and the file name of the lower file.

As described above, the file identification descriptors of the directory files of the directories indicate the logical blocks in which the file entries of the lower directory and the lower file are recorded. By tracing the file identification descriptors, it is therefore possible to reach from the file entry of the ROOT directory to the file entry of the BDMV directory, and reach from the file entry of the BDMV directory to the file entry of the PLAYLIST directory. Similarly, it is possible to reach the file entries of the JAR directory, BDJO directory, CLIPINF directory, and STREAM directory. Up to now, the directory file has been described. Next is a detailed description of the file recording area of lower file.

The "file recording area of lower file" included in each directory area is an area in which the substance of the lower file that belongs to a directory is recorded. A "file entry" of the lower entry and one or more "extents" managed by the file entry are recorded in the "file recording area of lower file". When a plurality of lower files are included under a directory, a plurality of "file recording areas of lower file" exist in the directory area.

The "file entry" of the lower entry includes a "descriptor tag", an "ICB tag", and an "allocation descriptor".

The "descriptor tag" is a tag identifying, as a "file entry", the file entry which includes the descriptor tag itself. The descriptor tag is classified into a file entry descriptor tag, a space bit map descriptor tag, and so on. In the case of a file entry descriptor tag, "261", which indicates "file entry" is written therein.

The "ICB tag" indicates attribute information concerning the file entry itself.

The "allocation descriptor" includes a Logical Block Number (LBN) indicating a recording position of an extent constituting a low-order file under a directory. The allocation descriptor also includes data that indicates the length of the extent. The high-order two bits of the data that indicates the length of the extent are set as follows: "00" to indicate an allocated and recorded extent; "01" to indicate an allocated and not-recorded extent; and: "11" to indicate an extent that follows the allocation descriptor. When a low-order file under a directory is divided into a plurality of extents, the file entry should include a plurality of allocation descriptors in correspondence with the extents.

A file according to UDF are composed of a plurality of extents managed by file entries, and the logical addresses of the extents constituting the file are known by referring to allocation descriptors of the file entries.

For example, the stream file that constitutes the main feature of the present application is a file recording area that exists in the directory area of the directory to which the file belongs. It is possible to access the transport stream file by tracing the file identification descriptors of the directory files, and the allocation descriptors of the file entries.

Figure 7:
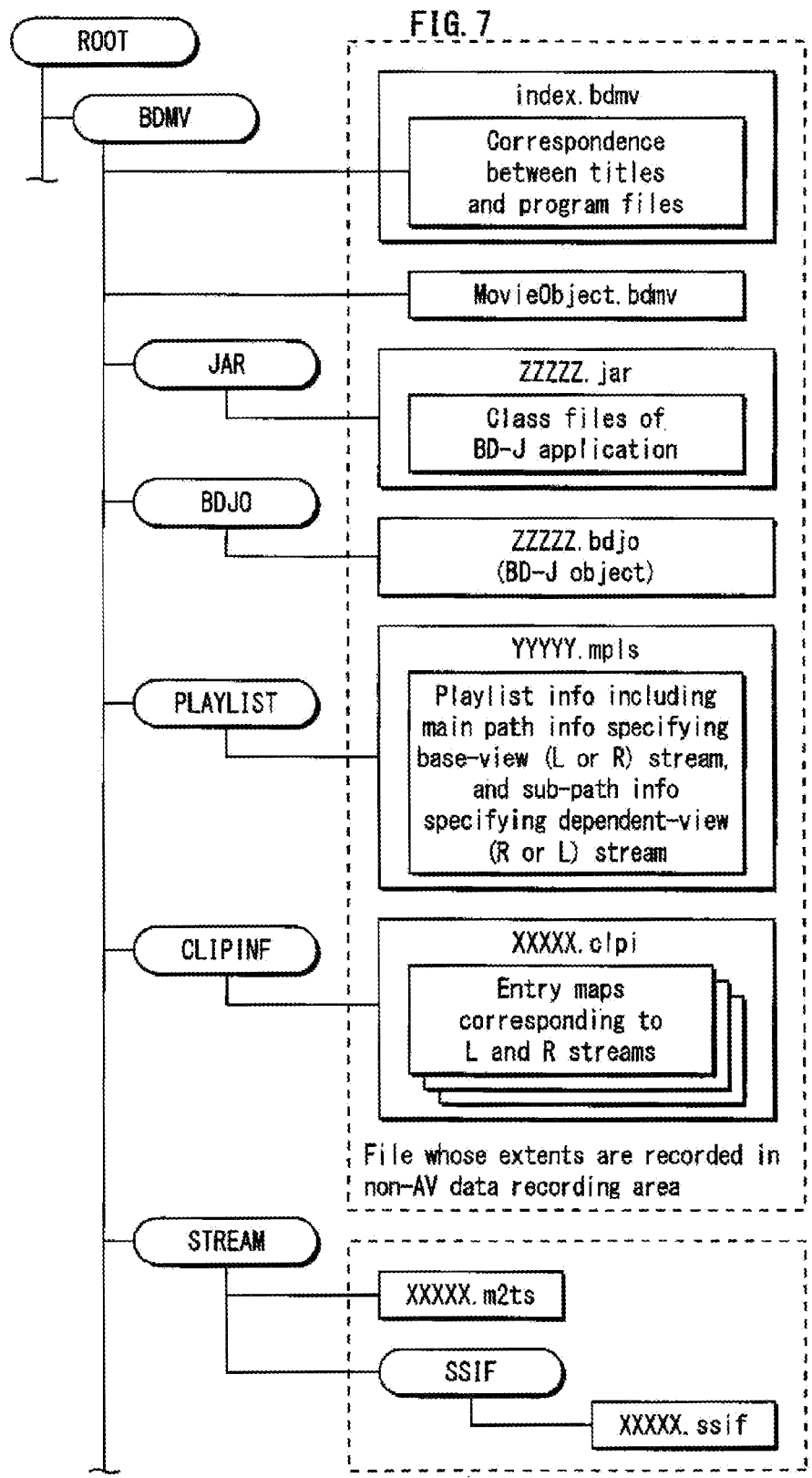
FIG. 7 shows an application format of the optical disc based on a file system.

FIG. 7 shows the application format of the recording medium 100 based on the file system.

The BDMV directory is a directory in which data such as AV content and management information used in the BD-ROM are recorded. Five sub-directories called "PLAYLIST directory," "CLIPINF directory," "STREAM directory," "BDJO directory," "JAR directory," and "META directory" exist below the BDMV directory. Also, two types of files (i.e. index.bdmv and MovieObject.bdmv) are arranged under the BDMV directory.

A file "index.bdmv" (the file name "index.bdmv" is fixed) is an index table file storing an index table showing correspondence between title numbers of a plurality of playback titles and program files that define individual titles, i.e. BD-J objects or Movie Objects.

The index table file is management information of the entire recording medium. The index table file is the first file to be read by a playback device after the recording medium is loaded into the playback device, so that the playback device is enabled to uniquely identify the disc. The index table file shows correspondence between each title constituting a title structure of an optical disc and an operation mode object that specifies the operation mode. Here, the title structure achieves the following: upon loading of an optical disc, playing back a title (FirstPlay title) for displaying a warning to the viewer, a logo of the content provider and so on; after the playback of the FirstPlay title, playing back a general title (which is identified by a serial number such as "1", "2", or "3") that constitutes a main story of the movie; and after the playback of the main-story title, playing back a title (menu title) and waiting for specification of a general title selected by the user. Here, one movie corresponds to a plurality of titles that are a plurality of versions of the movie. Accordingly, when a movie has only one version, the relationship is represented as "the movie=title". When a movie has a plurality of versions such as a theatrical version, a director's cut version, and a TV version, each of these versions is provided as one title. The playback device is provided with a title number register storing the title number of the current title. The title being played back currently is one of the plurality of titles whose title number is currently stored in the title number register. In optical discs, the above-mentioned FirstPlay title, general titles, and menu title are assigned with operation mode objects that define the operation modes of the respective titles, to define an operation mode in which each title operates. In this structure, the index table does not directly show the correspondence between the titles and the video streams, but show the correspondence between the titles and the operation mode objects so that the video streams are played back via the operation mode objects. This is because it is aimed to define titles that operate the operation mode objects, without playing back of AV.

A file "MovieObject.bdmv" (the file name "MovieObject.bdmv" is fixed) stores one or more movie objects. The movie object is a program file that defines a control procedure to be performed by the playback device in the operation mode (HDMV mode) in which the control subject is a command interpreter. The movie object includes one or more commands and a mask flag, where the mask flag defines whether or not to mask a menu call or a title call when the call is performed by the user onto the GUI.

A program file (XXXXX.bdjo - - - "XXXXX" is variable, and the extension "bdjo" is fixed) to which an extension "bdjo" is given exists in the BDJO directory. The program file stores a BD-J object that defines a control procedure to be performed by the playback device in the BD-J mode. The BD-J object includes an "application management table". The "application management table" in the BD-J object is a table that is used to cause the playback device to perform an application signaling, with the title being regarded as the life cycle. The application management table includes an "application identifier" and a "control code", where the "application identifier" indicates an application to be executed when a title corresponding to the BD-J object becomes a current title. BD-J applications whose life cycles are defined by the application management table are especially called "BD-J applications". The control code, when it is set to AutoRun, indicates that the application should be loaded onto the heap memory and be activated automatically; and when it is set to Present, indicates that the application should be loaded onto the heap memory and be activated after a call from another application is received. On the other hand, some BD-J applications do not end their operations even if the title is ended. Such BD-J applications are called "title unboundary applications".

A substance of such a Java™ application is a Java™ archive file (YYYYY.jar) stored in the JAR directory under the BDMV directory.

An application may be, for example, a Java™ application that is composed of one or more xlet programs having been loaded into a heap memory (also called work memory) of a virtual machine. The application is constituted from the xlet programs having been loaded into the work memory, and data.

The "STREAM directory" is a directory storing a transport stream file. In the "STREAM directory", a transport stream file ("xxxxx.m2ts" - - - "XXXXX" is variable, and the extension "m2ts" is fixed) to which an extension "m2ts" is given exists. A "stream file" in the present embodiment refers to a file, from among an actual video content recorded on a recording medium 100, that complies with the file format determined by the file system. Such an actual video content generally refers to stream data in which different types of stream data representing video, audio, subtitles, etc. have been multiplexed. This multiplexed stream data can be broadly divided into a main transport stream (TS) and a sub-TS depending on the type of the internal primary video stream. A "main TS" includes a base-view video stream as a primary video stream. A "base-view video stream" can be played back independently and represents 2D video images. A "sub-TS" includes a dependent-view video stream as a primary video stream. A "dependent-view video stream" requires a base-view video stream for playback and represents 3D video images by being combined with the base-view video stream. The types of dependent-view video streams are a right-view video stream, left-view video stream, and depth map stream. When the 2D video images represented by a base-view video stream are used as the left-view of 3D video images by a playback device in L/R mode, a "right-view video stream" is used as the video stream representing the right-view of the 3D video images. The reverse is true for a "left-view video stream". When the 2D video images represented by a base-view video stream are used to project 3D video images on a virtual 2D screen by a playback device in depth mode, a "depth map stream" is used as the video stream representing a depth map for the 3D video images.

Depending on the type of internal multiplexed stream data, an AV stream file can be divided into three types: file 2D, dependent file (hereinafter, abbreviated as "file DEP"), and interleaved file (hereinafter, abbreviated as "file SS"). A "file 2D" is a stream file for monoscopic playback used in playback of 2D video in 2D playback mode and includes a main TS. A "file DEP" includes a sub-TS. A "file SS" is a stream file for stereoscopic playback used in playback of 3D video in 3D playback mode and includes a main TS and a sub-TS representing the same 3D video images. In particular, an file SS shares its main TS with a certain file 2D and shares its sub-TS with a certain file DEP. In other words, in the file system on the recording medium 100, a main TS can be accessed by both an file SS and a file 2D, and a sub TS can be accessed by both an file SS and a file DEP. This setup, whereby a sequence of data recorded on the recording medium 100 is common to different files and can be accessed by all of the files, is referred to as "file cross-link". These files 2D and files DEP are assigned an extension "m2ts" and arranged directly under the STREAM directory while the files SS are assigned an extension "ssif" and arranged directly under the SSIF directory, which is a lower directory of the STREAM directory.

In the "PLAYLIST directory", a playlist information file ("xxxxx.mpls" - - - "XXXXX" is variable, and the extension "mpls" is fixed) to which an extension "mpls" is given exists. The playlist information file is a file storing information that is used to cause the playback device to play back a playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which TSs among a plurality of TSs should be played back. The playlist 1 information defines "patterns" of the playlists. The playback path defined by the playlist information is what is called "multi-path". The multi-path is composed of a "main path" and one or more "sub-paths". Playback sections included in the main path are called "playitems", and playback sections included in the sub-path are called "sub-playitems". The main path is defined for the main TS. The sub-paths are defined for subjectional streams. A plurality of sub-paths can be defined while one main path is defined. The plurality of sub-paths are identified by identifiers called sub-path IDs. Chapter positions are defined in the playback time axis of the multi-path. It is possible to realize a random access by the playback device to an arbitrary time point in the time axis of the multi-path by causing the playback device to refer to one of the chapter positions. In the BD-J mode, it is possible to start an AV playback by the multi-path by instructing a Java™ virtual machine to generate a JMF player instance for playing back the playlist information. The JMF (Java Media Frame work) player instance is data that is actually generated in the heap memory of the virtual machine based on a JMF player class. In the HDMV mode, it is possible to start an AV playback by the multi-path by causing the playback device to execute a navigation command instructing to perform a playback according to the playlist. The playback device is provided with a playlist number register storing the number of the current playlist information. The playlist information being played back currently is one of a plurality of pieces of playlist information whose number is currently stored in the playlist number register.

In the "CLIPINF directory", a clip information file ("xxxxx.clpi" - - - "XXXXX" is variable, and the extension "clpi" is fixed) to which an extension "clpi" is given exists. The clip information files are clip information files that are provided in a one-to-one correspondence with the files 2D and files DEP. The clip information file indicates: what ATC sequence is constituted form a sequence of source packets that exist in the stream file; what STC sequence is incorporated in the ATC sequence; and what TS is the ATC sequence.

The clip information file indicates the contents of the stream file. Therefore, when a TS in the stream file is to be played back, it is necessary to preliminarily read out, into the memory, a clip information file that corresponds to the stream file. That is to say, in the playback of a stream file, the "prestoring principle", in which the clip information file is preliminarily read out into the memory, is adopted. The reason that the prestoring principle is adopted is as follows. The data structure of the TS stored in the stream file has a compatibility with the European digital broadcast standard. So, the stream contains information such as PCR, PMT, and PAT that enable the stream to be treated as a broadcast program. However, it is unwise to extract such information each time a playback is performed. This is because it is necessary, each time a playback is performed, to access a low-speed recording medium to read out packets constituting the TS, and analyze the payloads of the TS packets. Therefore, the clip information files are provided in a one-to-one correspondence with the stream files storing TSs, and the clip information files are read out into the memory before the stream is played back, so that the information of the TSs can be grasped without analyzing the payloads of the TSs. In the present embodiment, among the clip information files, a clip information file associated with a file 2D is referred to as a "2D clip information file", and a clip information file associated with a file DEP is referred to as a "dependent-view clip information file". Furthermore, when a file DEP includes a right-view video stream, the corresponding dependent-view clip information file is referred to as a "right-view clip information file". When a file DEP includes a depth map stream, the corresponding dependent-view clip information file is referred to as a "depth map clip information file".

<Stream File>

The following is a detailed description of a stream file.

The stream file stores one or more sequences of source packets. The source packet is a TS packet that is attached with a 4-byte TP_Extra_Header. The TP_Extra_Header is composed of a 2-bit copy permission indicator and a 30-bit ATS (Arrival Time Stamp). The ATS included in the TP_Extra_Header indicates an arrival time in a real-time transfer in which the isochronicity is ensured.

Among such sequences of source packets, a sequence of source packets whose time stamps are continuous in the Arrival Time Clock (ATC) time axis is called an "ATC sequence". The ATC sequence is a sequence of source packets, where Arrival_Time_Clocks referred to by the Arrival_Time_Stamps included in the ATC sequence do not include "arrival time-base discontinuity". In other words, the ATC sequence is a sequence of source packets, where Arrival_Time_Clocks referred to by the Arrival_Time_Stamps included in the ATC sequence are continuous. This is why each source packet constituting the ATC sequence is subjected to continuous source packet depacketizing processes and continuous packet filtering processes while the clock counter is counting the arrival time clocks of the playback device.

While the ATC sequence is a sequence of source packets, a sequence of TS packets whose time stamps are continuous in the STC time axis is called an "STC sequence". The STC sequence is a sequence of TS packets which do not include "system time-base discontinuity", which is based on the STC (System Time Clock) that is a system standard time for TSs. The presence of the system time-base discontinuity is indicated by a "discontinuity_indicator" being ON, where the discontinuity_indicator is contained in a PCR packet carrying a PCR (Program Clock Reference) that is referred to by the decoder to obtain an STC. The STC sequence is a sequence of TS packets whose time stamps are continuous in the STC time axis. Therefore, each TS packet constituting the STC sequence is subjected to continuous decoding processes performed by the decoder provided in the playback device, while the clock counter is counting the system time clocks of the playback device.

Also, the packet sequence stored in the stream file contains packet management information (PCR, PMT, PAT) defined in the European digital broadcast standard, as information for managing and controlling a plurality of types of PES streams.

The PCR (Program Clock Reference) stores STC time information corresponding to an ATS that indicates the time when the PCR packet is transferred to a decoder, in order to achieve synchronization between an ATC (Arrival Time Clock) that is a time axis of ATSs, and an STC (System Time Clock) that is a time axis of PTSs and DTSs.

The PMT (Program Map Table) stores PIDs in the streams of video, audio, graphics and the like contained in the transport stream file, and attribute information of the streams corresponding to the PIDs. The PMT also has various descriptors relating to the TS. The descriptors have information such as copy control information showing whether copying of the AV clip is permitted or not.

The PAT (Program Association Table) shows a PID of a PMT used in the TS, and is registered by the PID arrangement of the PAT itself.

These PCR, PMT, and PAT, in the European digital broadcast standard, have a role of defining partial transport streams constituting one broadcast program (one program). This enables the playback device to cause the decoder to decode TSs as if it deals with the partial TSs constituting one broadcast program, conforming to the European digital broadcast standard. This structure is aimed to support compatibility between the recording medium playback devices and the terminal devices conforming to the European digital broadcast standard. Among the TSs, a TS that is the base axis of the multi-path is called "main TS"; and a TS that is the base axis of the sub-path is called "sub-TS".

FIG. 8A shows the internal structure of the main TS. FIG. 8B shows the internal structure of the sub-TS. As shown in FIG. 8A, the main TS includes one base-view video stream, 32 base-view PG streams, 32 base-view IG streams, and 32 audio streams. As shown in FIG. 8B, the sub-TS includes one dependent-view video stream, 32 dependent-view PG streams, and 32 dependent-view IG streams.

Next, the internal structure of TS will be described.

Figure 9A:
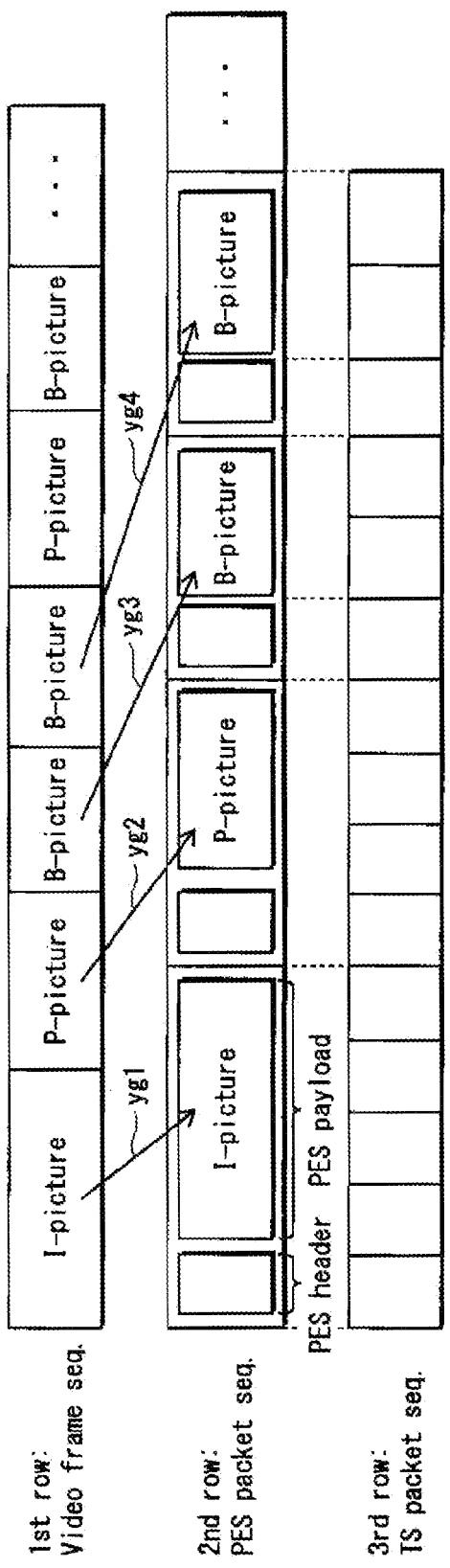
FIGS. 9A and 9B illustrate how a video stream is stored in PES packet sequences.
Figure 9B:
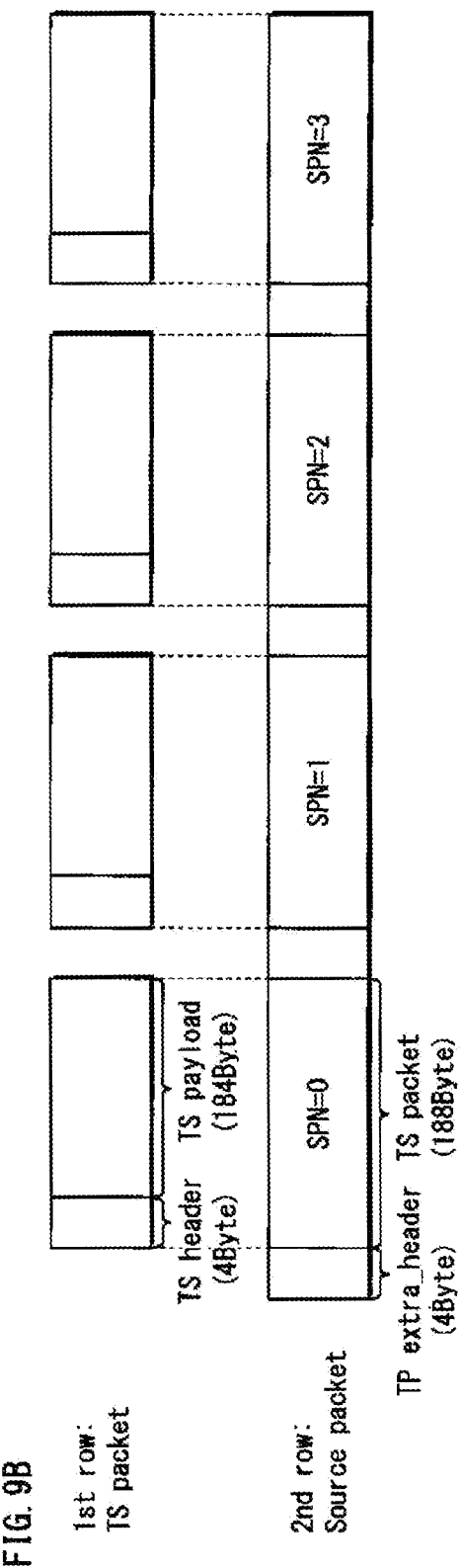

FIGS. 9A and 9B illustrate in more detail how the video stream is stored in the PES packet sequences. The first row in FIG. 9A shows a video frame sequence of the video stream. The second row shows a PES packet sequence. The third row shows a TS packet sequence obtained by converting the PES packet sequence. As shown by arrows yg1, yg2, yg3 and yg4, the video stream is composed of a plurality of video presentation units (I picture, B picture, P picture). The video stream is divided up into the individual pictures, and each picture is stored in the payload of a PES packet. Each PES packet has a PES header storing a PTS (Presentation Time-Stamp) that is a display time of the picture stored in the payload of the PES packet, and a DTS (Decoding Time-Stamp) that is a decoding time of the picture stored in the payload of the PES packet.

<TS Packet Sequence>

FIG. 9B shows the format of the TS packets. The first row shows a TS packet sequence. The second row shows a source packet sequence.

As shown in the first row of FIG. 9B, each TS packet is a fixed-length packet consisting of a 4-byte "TS header" carrying information such as a PID identifying the stream, and a 184-byte "TS payload" storing data. The PES packets are divided and stored in the TS payloads.

As shown in the second row, each TS packet is attached with a 4-byte TP_Extra_Header to be converted into a 192-byte source packet. Such 192-byte source packets constitute the TS. The TP_Extra_Header stores information such as an ATS (Arrival_Time_Stamp). The ATS shows a transfer start time at which the TS packet is to be transferred to a PID filter. The source packets are arranged in the TS as shown in the third row. The numbers incrementing from the head of the TS are called SPNs (source packet numbers).

<Multiplexing of AV Clips>

Figure 10:
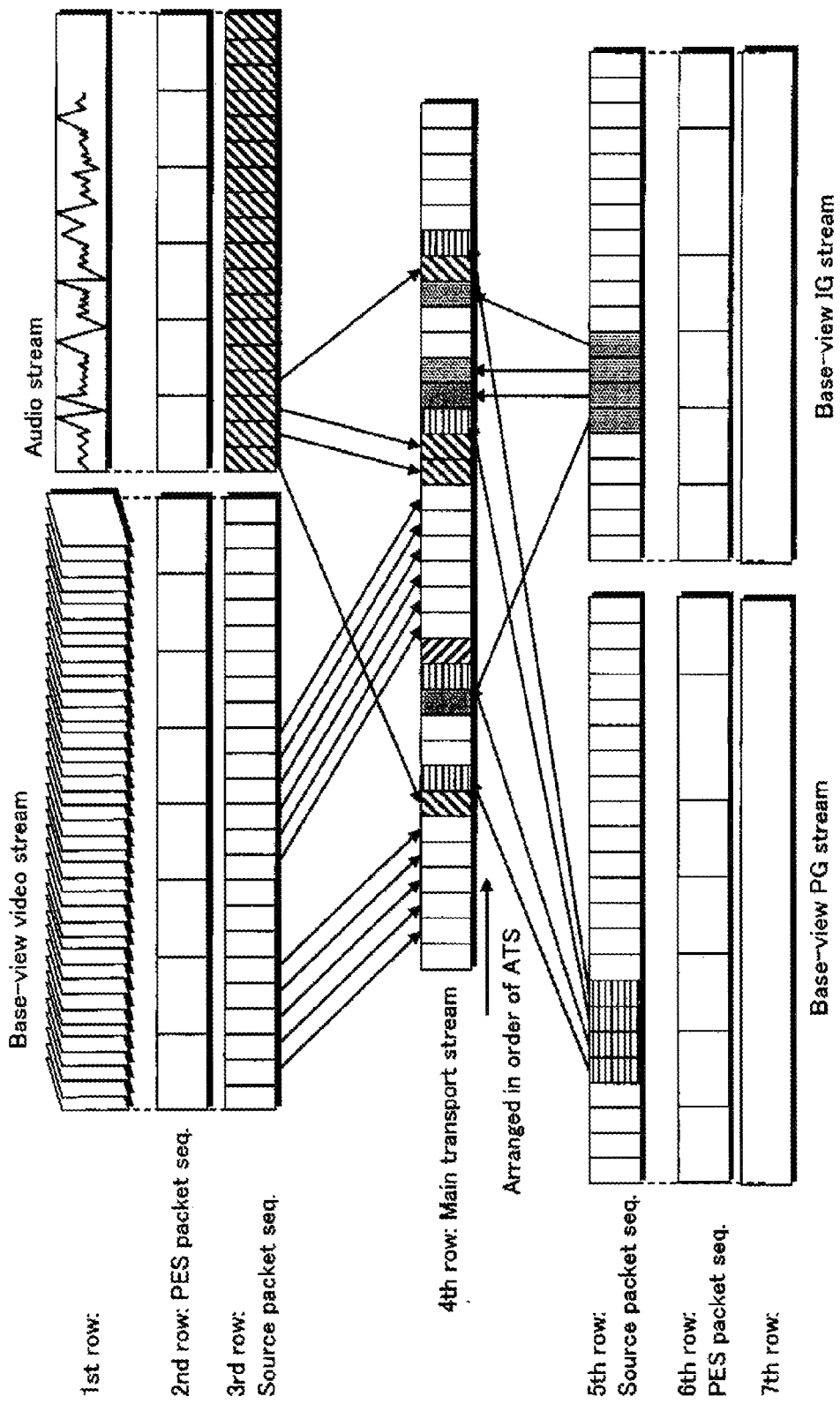
FIG. 10 schematically shows how a main TS is multiplexed.

FIG. 10 schematically shows how the main TS is multiplexed. First, the base-view video stream and an audio stream (First row) are respectively converted into PES packet sequences (Second row), and further converted into source packets sequences, respectively (Third row). Similarly, the left-view PG stream and the left-view interactive graphics stream (Seventh row) are converted into PES packet sequences, respectively (Sixth row), and further converted into source packet sequences, respectively (Fifth row). The video, audio, and graphics source packets obtained in this way are arranged in the order indicated by their ATSs. This is because the source packets should be read out into the read buffer according to their ATSs. The main TS is composed of these source packets having been arranged in this way.

Elementary Streams to be Multiplexed in TS

The elementary streams (ES) to be multiplexed in these TSs include the video stream, audio stream, presentation graphics stream, and interactive graphics stream.

Video Stream

The video stream specified as the base-view stream constitutes a primary video stream in a picture-in-picture application. The picture-in-picture application is composed of the primary video stream and a secondary video stream. The primary video stream is a video stream composed of picture data of the picture-in-picture application that represents a parent picture in the screen; and the secondary video stream is a video stream composed of picture data of the picture-in-picture application that represents a child picture that is fit in the parent picture.

The picture data constituting the primary video stream and the picture data constituting the secondary video stream are stored in different plane memories after being decoded. The plane memory that stores the picture data constituting the secondary video stream has, in the first half thereof, a structural element (Scaling & Positioning) that performs changing scaling of the picture data constituting the secondary video stream, and positioning display coordinates of the picture data constituting the secondary video stream.

Audio Stream

The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control. The audio stream is compress-encoded using a method such as Dolby AC3, Dolby digital Plus, MLP, DTS, DTS-HD, or Linear PCM.

Presentation Graphics (PG) Stream

The PG stream is a graphics stream that can be synchronized closely with the video, with the adoption of the pipeline in the decoder, and is suited for representing subtitles. The PG stream falls into two types: a 2D PG stream; and a stereoscopic PG stream. The stereoscopic PG stream further falls into two types: a left-view PG stream; and a right-view PG stream. One of the left-view PG stream and the right-view PG stream that is specified by the base-view indicator becomes the base-view PG stream, and the other that is not specified by the base-view indicator becomes the dependent-view PG stream.

The reason that the stereoscopic PG stream is provided as well as the 2D PG stream is as follows. For example, when the PG stream represents subtitle characters, the subtitle characters from an anterior view to be displayed in the 2D mode, and the subtitle characters for the left eye and the right eye to be displayed in the 3D-LR mode should be different from each other. For this reason, one graphics stream of an image from an anterior view is displayed in the 2D mode, and two graphics streams (left-view PG stream and right-view PG stream) are displayed in the 3D-LR mode. Similarly, in the 3D-depth mode, an image from an anterior view and a grayscale stream indicating the depth information are played back. The 2D+offset (2D compatible) stream and the 3D-LR stream should not be provided in mixture.

It is possible to define up to 32 2D PG streams, up to 32 base-view PG streams, and up to 32 dependent-view PG streams. These PG streams are attached with different packet identifiers. Thus, it is possible to cause a desired PG stream among these PG streams to be subjected to the playback, by specifying a packet identifier of the one to be played back to the demultiplexing unit.

The left-view PG stream and the right-view PG stream should have the same language attribute so that even if the user switches a display method, a subtitle having the same contents is displayed. It is thus presumed that the 2D subtitles and the 3D subtitles correspond to each other on a one-to-one basis, and that a 2D subtitle not having a corresponding 3D subtitle or a 3D subtitle not having a corresponding 2D subtitle should not be provided. This is to prevent the user from being confused when the display method is switched. With this structure, streams that respectively correspond to the 2D and 3D display modes are selected when one stream number is specified. In such a case, the one stream number should correspond to the same language attribute so that the contents of the subtitles for the 2D and LR are the same.

A close synchronization with video is achieved due to the decoding with the pipeline adopted therein. Thus the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

The PG stream is a stream that is not multiplexed into the transport stream but represents a subtitle. The text subtitle stream (also referred to as textST stream) is a stream of this kind, as well. The textST stream is a stream that represents the contents of subtitle by the character codes.

The PG stream and the text subtitle stream are registered as the same stream type in the same stream registration sequence, without distinction between them in type. And then during execution of a procedure for selecting a stream, a PG stream or a text subtitle stream to be played back is determined according to the order of streams registered in the stream registration sequence. In this way, the PG streams and text subtitle streams are subjected to the stream selection procedure without distinction between them in type. Therefore, they are treated as belonging to a same stream type called "PG_text subtitle stream".

The PG_text subtitle stream for 2D is played back in the "1 plane+offset" mode. Hereinafter, the 2D PG_text subtitle stream is referred to as a "1 plane+offset" PG_text subtitle stream.

Interactive Graphics (IG) Stream

The IG stream is a graphics stream which, having information for interactive operation, can display menus with the progress of playback of the video stream and display pop-up menus in accordance with user operations.

As is the case with the PG stream, the IG stream is classified into a 2D IG stream and a stereoscopic IG stream. The stereoscopic IG stream is classified into a left-view IG stream and a right-view IG stream. One of the left-view IG stream and the right-view IG stream that is specified by the base-view indicator becomes the base-view IG stream, and the other that is not specified by the base-view indicator becomes the dependent-view IG stream. It is possible to define up to 32 2D IG streams, up to 32 base-view IG streams, and up to 32 dependent-view IG streams. These IG streams are attached with different packet identifiers. Thus, it is possible to cause a desired IG stream among these IG streams to be subjected to the playback, by specifying a packet identifier of the one to be played back to the demultiplexing unit.

The IG stream control information (called "interactive control segment") includes information (user interface model) that defines the user interface model. The person in charge of authoring can specify either "always on" or "pop-up menu on" by setting the user interface model information, where with the "always on", menus are displayed with the progress of playback of the video stream, and with the "pop-up menu on", the pop-up menus are displayed in accordance with user operations.

The interactive operation information in the IG stream has the following meaning. When the Java virtual machine instructs the playback control engine, which is proactive in the playback control, to start playing back a playlist in accordance with a request from an application, the Java virtual machine, after instructing the playback control engine to start the playback, returns a response to the application to notify that the playback of the playlist has started. That is to say, while the playback of the playlist by the playback control engine continues, the Java virtual machine does not enter the state waiting for end of execution. This is because the Java virtual machine is what is called an "event-driven-type" performer, and can perform operation while the playback control engine is playing back the playlist.

On the other hand, when, in the HDMV mode, the command interpreter instructs the playback control engine to play back a playlist, it enters the wait state until the execution of playback of the playlist ends. Accordingly, the command execution unit cannot execute an interactive process while the playback of the playlist by the playback control engine continues. The graphics decoder performs an interactive operation in place of the command interpreter. Thus, to cause the graphics decoder to perform the interactive operation, the IG stream is embedded with control information defining interactive operations for which buttons are used.

Display Modes Allowed for Each Stream Type

Different 3D display modes are allowed for each stream type. In the primary video stream 3D display mode, two playback modes, namely the B-D presentation mode and the B-B presentation mode are allowed. The B-B presentation mode is allowed for the primary video stream only when the pop-up menu is on. The type of primary video stream when the playback is performed in the B-D presentation mode is called "stereoscopic B-D playback type". The type of primary video stream when the playback is performed in the B-B presentation mode is called "stereoscopic B-B playback type".

In the PG stream 3D display mode, three playback modes, namely the B-D presentation mode, "1 plane+offset" mode, and "1 plane+zero offset" mode are allowed. The "1 plane+zero offset" mode is allowed for the PG stream only when the pop-up menu is on. The type of PG stream when the playback is performed in the B-D presentation mode is called "stereoscopic playback type". The type of PG stream and PG_text subtitle stream when the playback is performed in the "1 plane+offset" mode is called "1 plane+offset type". The type of PG stream and PG_text subtitle stream when the playback is performed in the "1 plane+zero offset" mode is called "1 plane+zero offset type".

In the text subtitle stream 3D display mode, two playback modes, namely the "1 plane+offset" mode, and "1 plane+zero offset" mode are allowed. The "1 plane+zero offset" mode is allowed for the text subtitle stream only when the pop-up menu is on.

In the IG stream 3D display mode, three playback modes, namely the B-D presentation mode, "1 plane+offset" mode, and "1 plane+zero offset" mode are allowed. The "1 plane+zero offset" mode is allowed for the IG stream only when the pop-up menu is on. It is supposed in the following description, except where otherwise mentioned, that the picture-in-picture cannot be used during playback in the 3D playback mode. This is because each of the picture-in-picture and the 3D playback mode requires two video planes for storing non-compressed picture data. It is also supposed in the following description, except where otherwise mentioned, that the sound mixing cannot be used in the 3D playback mode.

Figure 11A:
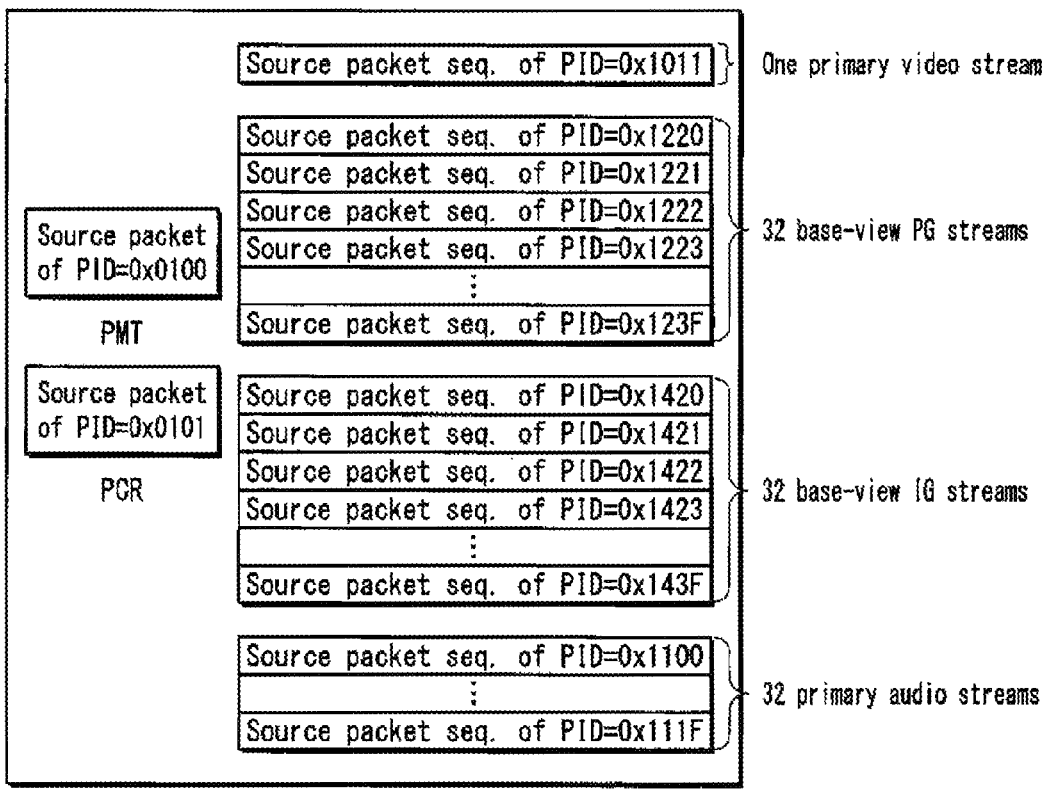
FIGS. 11A and 11B show internal structures of a main TS and a sub-TS.
Figure 11B:
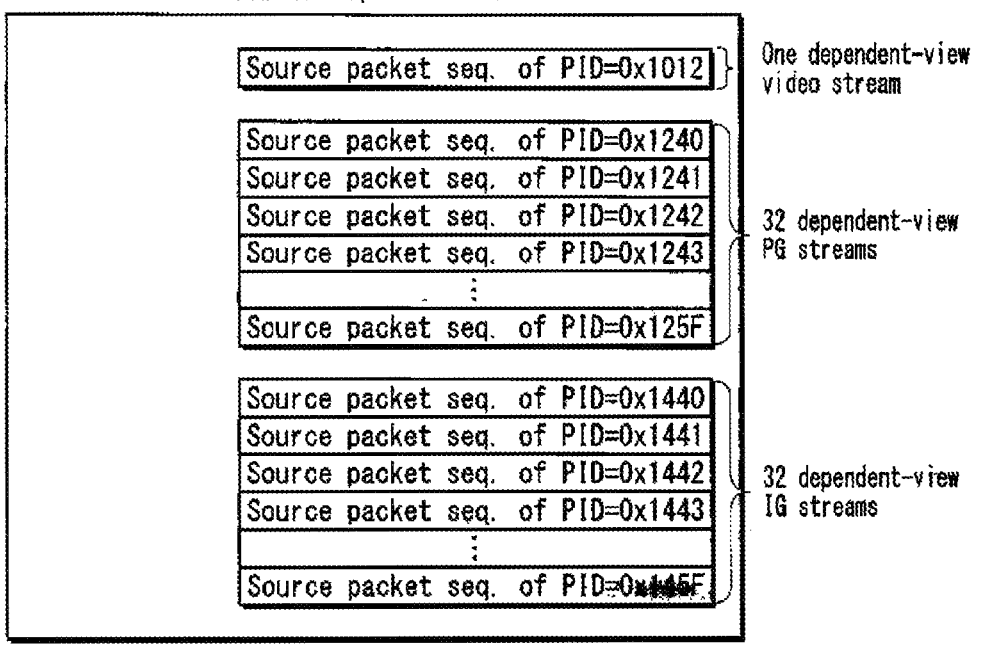

Next, the internal structures of the main TS and sub-TS will be described. FIGS. 11A and 11B show the internal structures of the main TS and sub-TS.

FIG. 11A shows the internal structure of the main TS. The main TS is composed of the following source packets.

A source packet having packet ID "0x0100" constitutes a program_map table (PMT). A source packet having packet ID "0x0101" constitutes a PCR.

A source packet sequence having packet ID "0x1011" constitutes the primary video stream.

Source packet sequences having packet IDs "0x1220" through "0x123F" constitute 32 base-view PG streams.

Source packet sequences having packet IDs "0x1420" through "0x143F" constitute 32 base-view IG streams.

Source packet sequences having packet IDs "0x1100" through "0x111F" constitute primary audio streams.

By specifying a packet identifiers of one of these source packets to the demultiplexing unit, it is possible to cause a desired elementary stream among a plurality of elementary streams multiplexed in the main transport streams to be demultiplexed and subjected to the decoder.

FIG. 11B shows the internal structure of the sub-TS. The sub-TS is composed of the following source packets.

A source packet sequence having packet ID "0x1012" constitutes the dependent-view video stream. Source packet sequences having packet IDs "0x1240" through "0x125F" constitute 32 dependent-view PG streams.

Source packet sequences having packet IDs "0x1440" through "0x145F" constitute 32 dependent-view IG streams.

This completes the description of the stream file. Next is a detailed explanation of the playlist information.

<Video Stream>

Figure 12:
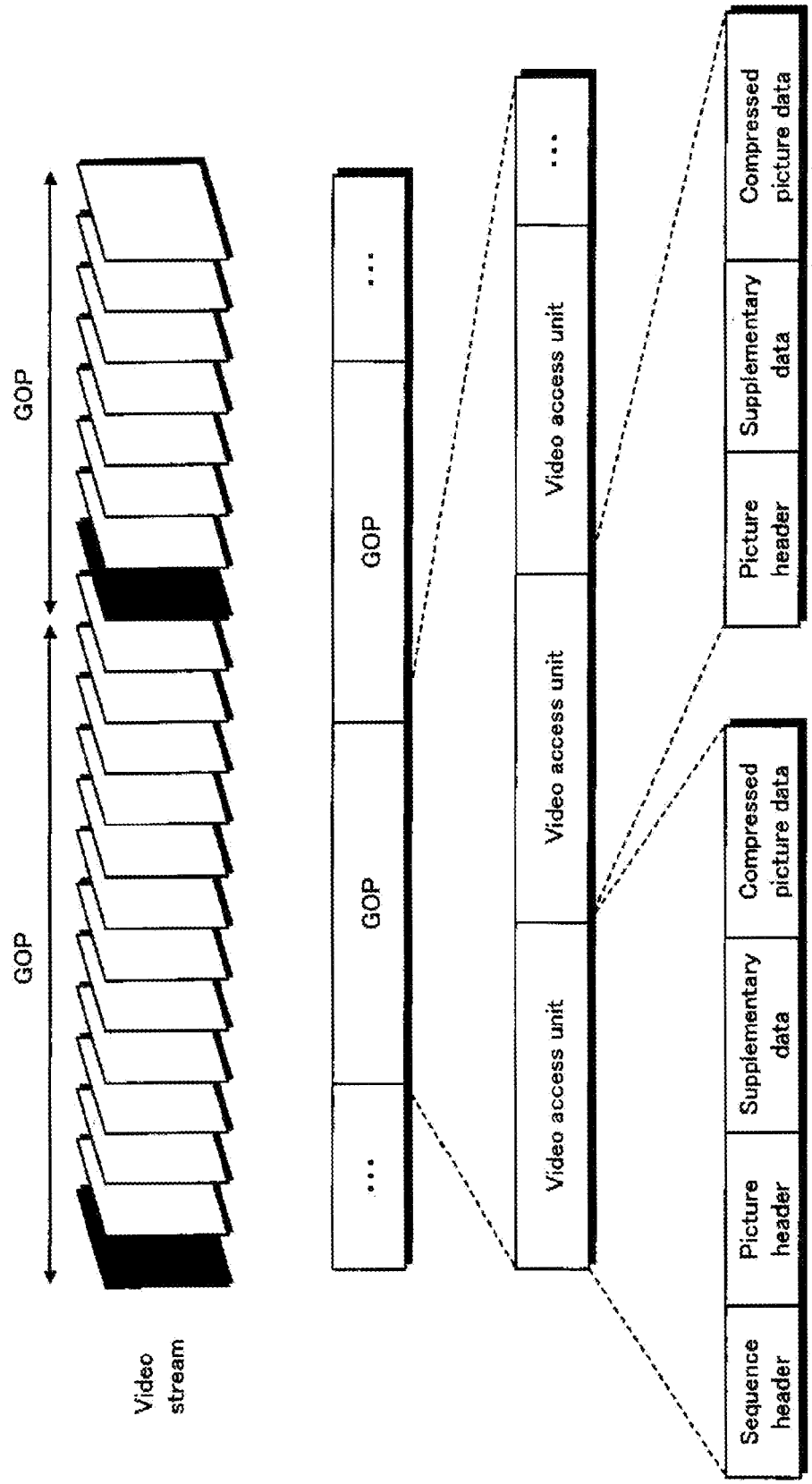
FIG. 12 schematically shows a data structure of a video stream.

FIG. 12 schematically shows a data structure of a video stream.

The video stream is composed of a plurality of GOPs. Random access and editing of moving images can be performed on the video stream when the GOPs are the basic units in the coding processing. Each GOP is composed of one or more video access units. The video access units are units in each of which encoded picture data is stored. In the frame structure, data of one frame is stored. In the field structure, data of one field is stored. Data of the I picture is stored in each of the video access units that compose a head of each GOP. Specifically, a sequence header, a picture header, supplementary data and compressed picture data are stored in each of the video access units that compose a head of each GOP. The sequence header is a header storing common information in each of the GOPs, and storing information on resolution, a frame rate, an aspect ratio, a bit rate and the like. The picture header is a header storing information necessary for encoding the pictures, such as, the method used in encoding all the pictures. The supplementary data is additional information which is not essential for decoding the compressed data. As examples of the supplementary data, there are closed-captioned character information to be displayed on TV in synchronization with video, and time code information. The compressed picture data is compressed and encoded picture data. In each access unit other than the head of each GOP, as is the case with each access unit composing the head of a GOP, with the exception of a sequence header not included, a picture header, supplementary data and compressed picture data are stored. Also, internal structures of the sequence header, the picture header, the supplementary data and the compressed picture data are different depending on the encoding method of the video. For example, in the case of the MPEG-4 AVC, the sequence header, a picture header and the supplemental header correspond to a SPS (sequence parameter set), a PPS (picture parameter set) and SEI (supplemental enhancement information), respectively.

Both the base-view video stream and the dependent-view video stream have the above-described GOP structure. The GOP top picture of the base-view video stream is an IDR picture or a Non-IDR I picture. When the dependent-view video stream is a right-view video stream, the GOP top picture of the dependent-view stream is a right-view picture that, together with the corresponding GOP top picture of the base-view video stream, represents the same frame or field of the 3D video, and that is a picture of the right-view video stream assigned the same PTS as that of the GOP top picture of the base-view video stream. When the dependent-view video stream is a depth map stream, the GOP top picture of the dependent-view video stream is a picture storing the depth map of the corresponding GOP top picture of the base-view video stream, and is a picture assigned the same PTS as that of the GOP top picture of the base-view video stream. A pair of VAUs that include pictures for which the PTS and DTS are the same between the base-view video stream and the dependent-view video stream is called a "3D VAU". The sequence headers in the pair of GOPs of the base-view video stream and the dependent-view video stream belonging to the same 3D VAU are assigned the same frame rate, the same resolution, and the same aspect ratio.

Figure 13:
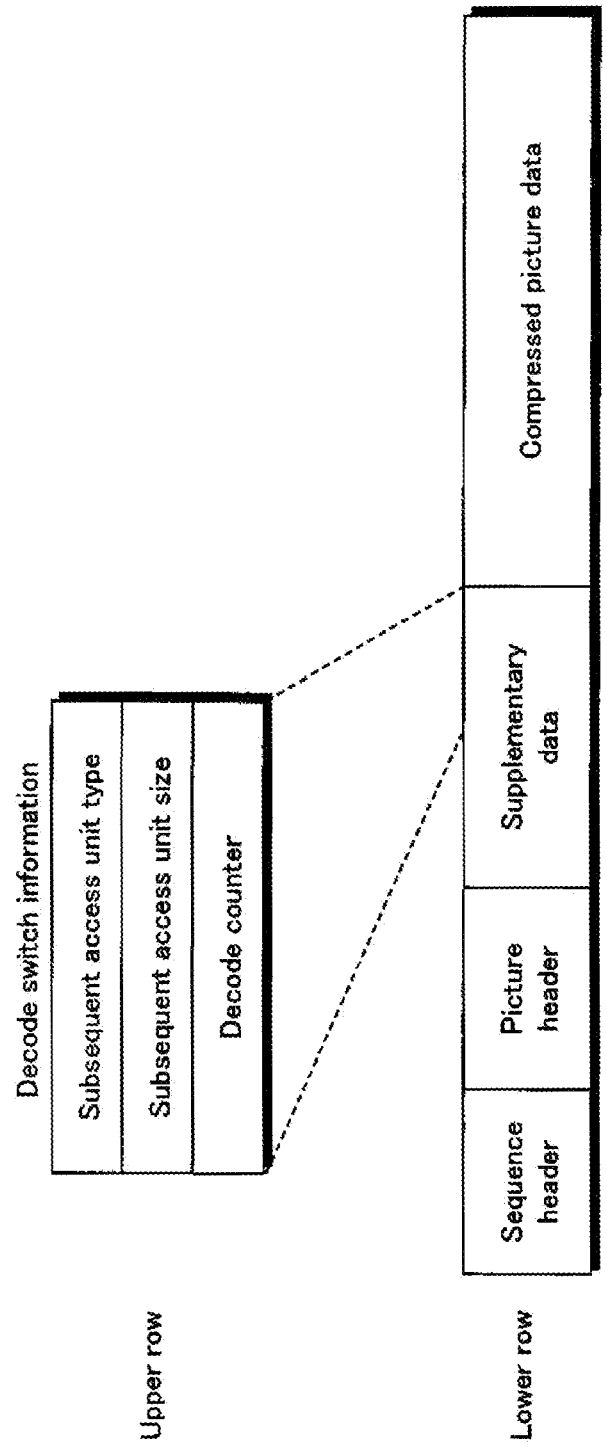
FIG. 13 shows a data structure of decode switch information stored in a supplementary data area in each video access unit.

FIG. 13 shows a data structure of decode switch information stored in a supplementary data area in each video access unit. The decoder switch information is information to cause the decoder in the playback device to easily specify the next video access unit to decode, and is included in each video access unit in both the base-view video stream and the dependent-view video stream. As described below, the decoder alternately decodes the base-view video stream and the dependent-view video stream in units of video access units. At that time, the decoder generally specifies the next video access unit to be decoded in alignment with the time shown by the DTS assigned to each video access unit. Many types of decoders, however, continue to decode video access units in order, ignoring the DTS. For such decoders, it is preferable for each video access unit to include decode switch information in addition to a DTS.

The upper row of FIG. 13 shows the structure of the decode switch information. The lower row of FIG. 13 shows a data structure of a video access unit. In each video access unit, the decode switch information is stored in a certain area within the supplementary data (when the video is encoded using MPEG-4 AVC, the decode switch information is stored in an SEI).

The decode switch information is composed of a subsequent access unit type, a subsequent access unit size, and a decode counter.

The subsequent access unit type is information showing whether the video access unit to be decoded next is of the base-view video stream or the dependent-view video stream. When the subsequent access unit type shows a value "1", it means the video access unit to be decoded next is of the base-view video stream. When the subsequent access unit type shows a value "2", the video access unit to be decoded next is of the dependent-view video stream. When the subsequent access unit type indicates a value "0", it means that the current video access unit is positioned at the end of the stream and there is no video access unit to be decoded next.

The subsequent access unit size is information showing a size of the video access unit to be decoded next. If the size of the video access unit to be decoded next is unknown, then it is required to identify the size of this video access unit by analyzing its structure when extracting this video access unit of an undecoded state from a corresponding buffer. However, with the aid of the subsequent access unit size, the video decoder can identify the size of the subsequent video access unit without analyzing its structure. This simplifies the processing for the decoder to extract an access unit including a picture of an undecoded state from a corresponding buffer.

Figure 14A:
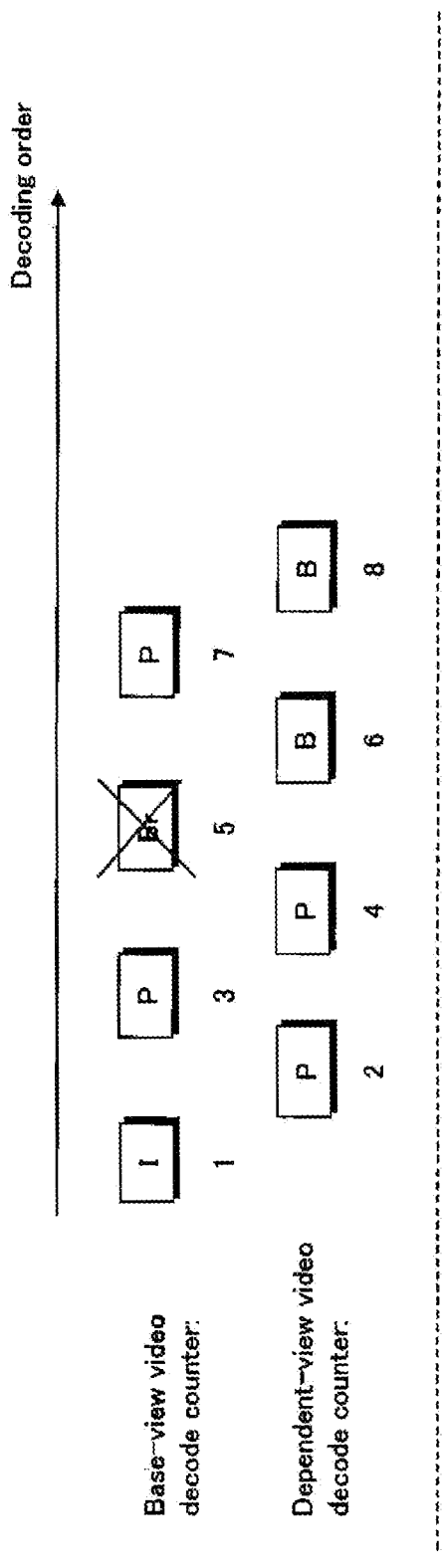
FIG. 14 shows a decode counter.

In a case where the first I-picture of a GOP in the base-view video stream is assigned a decode counter "0", the video access units of the base- and dependent-view video streams following this I-picture are assigned decode counters that are values successively incrementing in the order in which they are decoded, as shown in FIG. 14A.

Use of such information (the decode counters) makes it possible to perform proper processing to resolve an error that arises when a video access unit cannot be read for some reason. For example, assume a case where the third video access unit of the base-view video stream (Br-picture) cannot be read due to a reading error as shown in FIG. 14A. In this case, if the decode counters are not assigned to the video access units, the third access unit of the dependent-view video stream (B-picture) refers to the third video access unit of the base-view video stream. This may result in decoding of an image with noise (erroneous decoding). Contrarily, if the value of the decode counter assigned to the second video access unit of the dependent-view video stream (P-picture) has been stored, the value of the decode counter assigned to the subsequent video access unit can be predicted, with the result that the decoder can perform proper processing to resolve the error. In the example of FIG. 14A, the decode counter assigned to the second video access unit of the dependent-view video stream (P-picture) shows a value "4", and this decode counter "4" should be followed by a decode counter "5". However, the decode counter assigned to the next readable video access unit, namely the fourth video access unit of the base-view video stream (P-picture), shows a value "7". The video decoder can thereby judge that one video access unit has been skipped. Accordingly, upon judging that the third video access unit of the dependent-view video stream (B-picture) has no picture to refer to, the video decoder can, for example, skip the decoding of this video access unit.

Figure 14B:
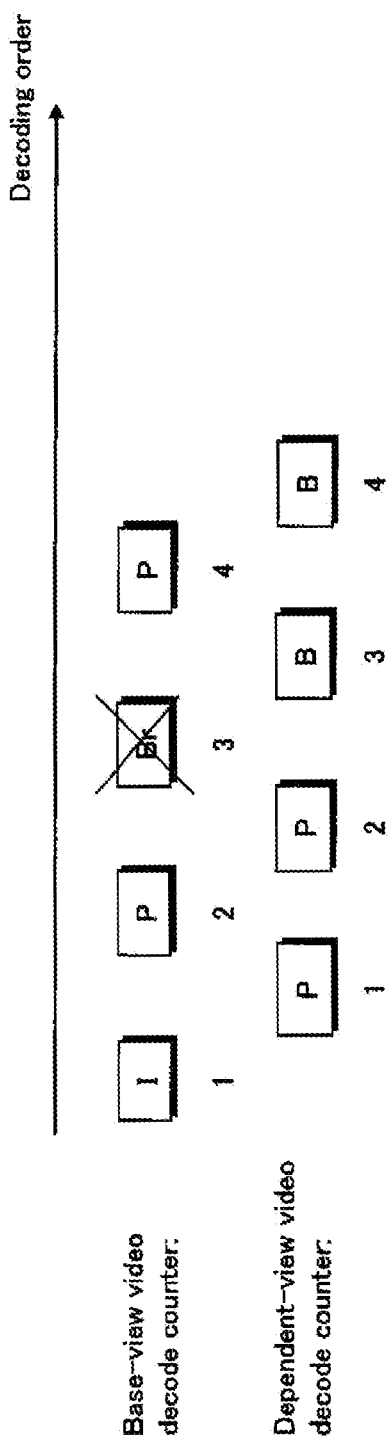

Alternatively, as shown in FIG. 14B, a sequence of decode counters may be self-contained on a per-stream basis. In this case too, when the video access unit that has been decoded most recently is of the base-view video stream, it is possible to predict that the decode counter assigned to the subsequent video access unit would be the same as the decode counter assigned to the video access unit that has been decoded most recently. On the other hand, when the video access unit that has been decoded most recently is of the dependent-view video stream, it is possible to predict that the decode counter assigned to the subsequent video access unit would be obtained by adding one to the decode counter assigned to the video access unit that has been decoded most recently. This also makes it possible to perform proper processing to resolve the error.

<Interleaved Arrangement of Multiplexed Stream Data>

For seamless playback of 3D video images, the physical arrangement of the base-view video stream and dependent-view video stream on the recording medium 100 is important. This "seamless playback" refers to playing back video and audio from multiplexed stream data without interruption.

Figure 15:
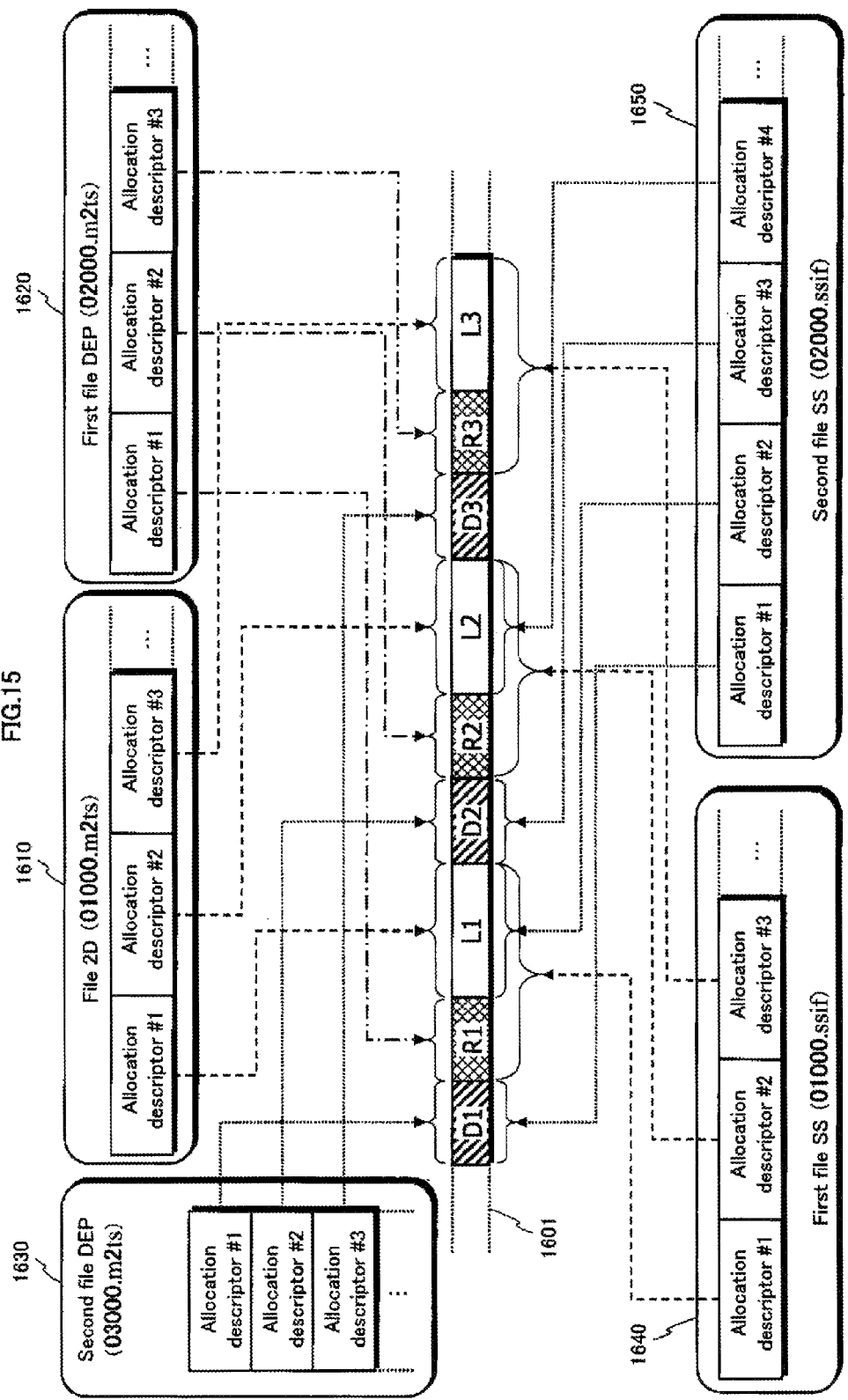
FIG. 15 is a schematic diagram showing a physical arrangement on the recording medium 100 of data block groups belonging to the main TS, first sub-TS, and second sub-TS.

FIG. 15 is a schematic diagram showing the physical arrangement on the recording medium 100 of a data block group belonging to the main TS, first sub-TS, and second sub-TS respectively. A "data block" refers to a sequence of data recorded on a contiguous area on the recording medium 100, i.e. a plurality of physically contiguous sectors. Since physical addresses and logical addresses on the recording medium 100 are substantially the same, the LBNs within each data block are also continuous. Accordingly, the BD-ROM drive of the playback device 200 can continuously read a data block without causing the optical pickup to perform a seek. Hereinafter, data blocks L1, L2, L3, . . . belonging to a main TS are referred to as "base-view data blocks", and data blocks R1, R2, R3, . . . , and D1, D2, D3, . . . belonging to a sub-TS are referred to as "dependent-view data blocks". In particular, the data blocks R1, R2, R3, . . . belonging to the first sub-TS are referred to as "right-view data blocks", and the data blocks D1, D2, D3, . . . belonging to the second sub-TS are referred to as "depth map data blocks". As shown in FIG. 15, a data block group is recorded continuously along track 1601 on the recording medium 100. Furthermore, the base-view data blocks L1, L2, L3, . . . , right-view data blocks R1, R2, R3, . . . , and depth map data blocks D1, D2, D3, . . . are arranged alternately one by one. This type of arrangement of data blocks is referred to as "interleaved arrangement".

In the interleaved arrangement according to the first embodiment of the present invention, the extent ATC time is the same between the three types of contiguous data blocks. For example, in FIG. 15, the top depth map data block D1, top right-view data block R1, and top base-view data block L1 are contiguous. The extent ATC time is the same between these data blocks D1, R1, and L1. In this context, an "Arrival Time Clock (ATC)" refers to a clock that acts as a standard for an ATS. Also, the "extent ATC time" is defined by the value of the ATC and represents the range of the ATS assigned to source packets in an extent, i.e. the time interval from the ATS of the source packet at the top of the extent to the ATS of the source packet at the top of the next extent. In other words, the extent ATC time is the same as the time required to transfer all of the source packets in the extent from the read buffer in the playback device 102 to the system target decoder. The "read buffer" is a buffer memory in the playback device 200 where data blocks read from the recording medium 100 are temporarily stored before being transmitted to the system target decoder.

Between the three types of contiguous data blocks whose extent ATC time is the same, the playback periods may match, and the playback times of the video streams may be the same. For example, in FIG. 15, between the three data blocks D1, R1, and L1, the playback periods match, and the playback times of the video streams are the same. Similarly, in subsequent data block groups, between the three types of contiguous data blocks data blocks D2, R2, and L2 whose extent ATC time is the same, the playback periods may match, and the playback times of the video streams may be the same.

Furthermore, in the interleaved arrangement according to the first embodiment of the present invention, the three contiguous data blocks with the same extent ATC time are arranged in the order of the depth map block, right-view data block, and base-view data block, that is, starting with the smallest amount of data. For example, in FIG. 15, the picture included in the top right-view data block R1 is compressed using the picture included in the top base-view data block L1 as a reference picture. Accordingly, the size Sext2[1] of the top right-view data block R1 is equal to or less than the size Sext1[1] of the top base-view data block L1: Sext2[1]Sext1[1]. On the other hand, the amount of data per pixel in the depth map, i.e. the number of bits of the depth value, is in general smaller than the amount of data per pixel of the picture included in the base-view video stream, i.e. the sum of the number of bits of the chromatic coordinate value and the a value. Furthermore, unlike the second sub-TS, the main TS includes other elementary streams, such as a primary audio stream, in addition to the primary video stream. Therefore, in FIG. 15 the size of the top depth map data block D1, Sext3[1], is less than or equal to the size of the top base-view data block L1, Sext1[1]: Sext3[1]Sext1[1]. Therefore, in FIG. 15, the top depth map data block D1, the top right-view data block R1, and the top base-view data block L1 are recorded in that order. The same is true for the next three consecutive extents, D2, R2, and L2.

The VAUs located at the top of data blocks with the same extent ATC time belong to the same 3D VAU, and in particular include the top picture of the GOP representing the same 3D video image. For example, in FIG. 15, among the three contiguous data blocks Dn, Rn, Ln (n=1, 2, 3, . . . ) with the same extent ATC time, the top of the depth map data block Dn includes an I picture for the depth map stream, the top of the right-view data block Rn includes a P picture for the right-view video stream, and the top of the base-view data block Ln includes an I picture for the base-view video stream. The I picture for the depth map stream represents a depth map for the 2D video image represented by the I picture for the base-view video stream. The P picture for the right-view video stream represents the right-view when the 2D video image represented by the I picture in the base-view video stream is used as the left-view. In particular, the P picture is compressed using the I picture for the base-view video stream as a reference picture. Accordingly, the playback device 200 in 3D playback mode can start playback of 3D video images from any set of data blocks Dn, Rn, and Ln.

<Significance of Dividing Multiplexed Stream Data into Data Blocks>

In order to play 3D video images back seamlessly from the recording medium 100, the playback device 200 has to process the main TS and sub-TS in parallel. The read buffer capacity usable in such processing, however, is generally limited. In particular, there is a limit to the amount of data that can be continuously read into the read buffer from the recording medium 100. Accordingly, the playback device 200 has to read sections of the main TS and sub-TS with the same extent ATC time by dividing the sections.

FIG. 16A is a schematic diagram showing the arrangement of the main TS 1701 and sub-TS 1702 recorded separately and consecutively on a BD-ROM disc. When the playback device 200 processes the main TS 1701 and sub-TS 1702 in parallel, as shown by the arrows (1)-(4) on the solid lines in FIG. 16A, the BD-ROM drive alternately reads sections of the main TS 1701 and the sub-TS 1702 that have the same extent ATC time. At this time, as shown by the arrows in the dashed lines in FIG. 16A, during read processing the BD-ROM drive 121 has to make a large change in the area to be read on the BD-ROM disc. For example, after the top section of the main TS 1701 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 1702 shown by arrow (2) is recorded to the position of the optical pickup. This operation to temporarily stop reading by the optical pickup and, while reading is stopped, position the optical pickup above the next area to be read is referred to as a "jump". The dashed lines with an arrow shown in FIG. 16A indicate the range of the jumps necessary during read processing. During each jump period, read processing by the optical pickup stops, and only decoding processing by the decoder progresses. As a result, it is difficult to cause read processing to keep up with decoding processing, and thus it is difficult to stably maintain seamless playback.

FIG. 16B is a schematic diagram showing the arrangement of base-view data blocks B[0], B[1], B[2], . . . and dependent-view data blocks D[0], D[1], D[2], recorded alternately on a recording medium 100 according to the first embodiment of the present invention. As shown in FIG. 16B, the main TS and sub-TS are divided into a plurality of data blocks and are arranged alternately. In this case, during playback of 3D video images, the playback device 200 reads data blocks B[0], D[0], B[1], D[1], . . . in order from the top, as shown by arrows (1)-(4) in FIG. 16B. By simply reading these data blocks in order, the playback device 200 can smoothly read the main TS and sub-TS alternately. In particular, since no jump occurs during read processing, seamless playback of 3D video images can be stably maintained.

<Significance of Providing Contiguous Data Blocks with the Same Extent ATC Time>

In the interleaved arrangement shown in FIG. 15, the three types of contiguous data blocks Dn, Rn, and Ln all have the same extent ATC time. In other words, between these extents, the difference between ATSs from the source packet at the top of each extent to the source packet at the top of the next extent is the same (however, in calculating the difference, the occurrence of wrap-around in the ATS is taken into consideration). In this case, the system target decoder in the playback device 200 reads all of the TS packets included in the base-view data block Ln and the dependent-view data block Dn or Rn within the same length of time measured by the ATC. Accordingly, the system target decoder can easily synchronize decoding processing of TS packets between the base-view stream and the dependent-view stream, particularly during interrupt playback.

<Significance of Adjacent Data Blocks Having Equivalent Playback Times>

Figure 17A:
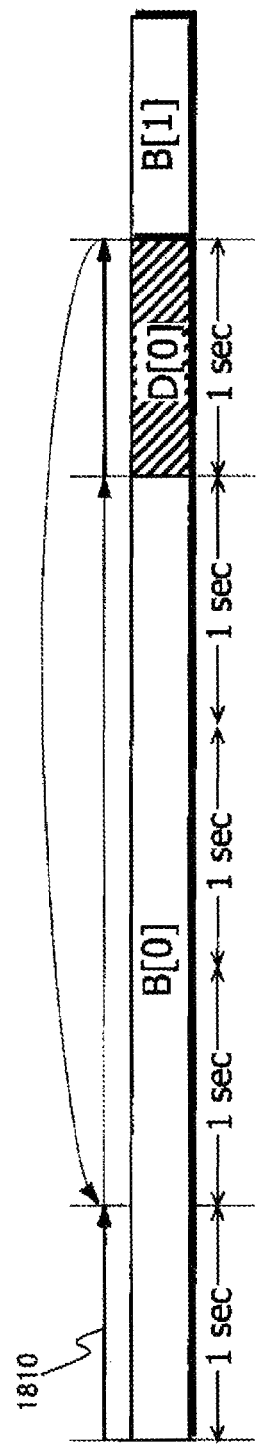
FIG. 17A is a schematic diagram showing the playback path when the playback times of the video stream differ between base-view data blocks and dependent-view data blocks that are adjacent on a BD-ROM disc.

FIG. 17A is a schematic diagram showing the playback path when the extent ATC times and the playback times of the video stream differ between base-view data blocks and dependent-view data blocks that are adjacent. In the example shown in FIG. 17, the playback time of the top base-view data block B[0] is four seconds, and the playback time of the top dependent-view data block D[0] is one second. In this case, the section of the base-view video stream that is necessary for decoding of the dependent-view data block D[0] has the same playback time as the dependent-view data block D[0]. Accordingly, to save read buffer capacity in the playback device 200, it is preferable, as shown by the arrow 1810 in FIG. 17A, to alternately read the base-view data block B[0] and the dependent-view data block D[0] into the buffer by the same amount of playback time, for example one second at a time. In that case, however, as shown by the dashed lines in FIG. 17A, jumps occur during read processing. As a result, it is difficult to cause read processing to keep up with decoding processing, and thus it is difficult to stably maintain seamless playback.

Figure 17B:
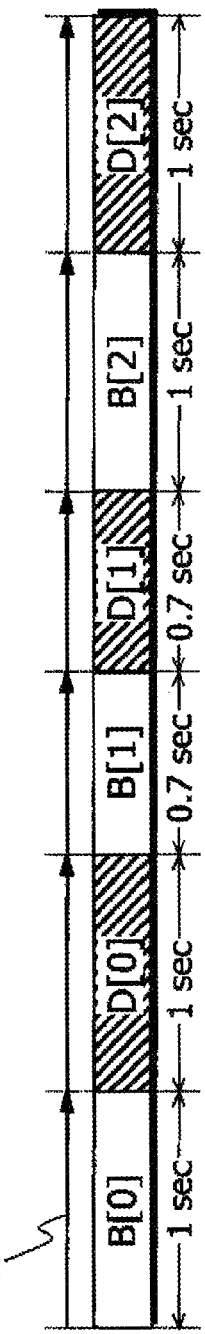
FIG. 17B is a schematic diagram showing the playback path when the playback times of the video stream are the same between base-view data blocks and dependent-view data blocks that are adjacent on a recording medium 100 according to the first embodiment of the present invention.

FIG. 17B is a schematic diagram showing the playback path when the playback times of the video stream are the same between base-view data blocks and dependent-view data blocks that are adjacent. On a recording medium 100 according to the first embodiment of the present invention, as shown in FIG. 17B, the playback time of the video stream between a pair of adjacent data blocks is the same. For example, for the pair of the top base-view data block B[0] and dependent-view data block D[0], the playback times of the video stream are both equal to one second, and the playback times of the video stream for the second pair of data blocks B[1] and D[1] are both equal to 0.7 seconds. In this case, during playback of 3D video images, the playback device 200 reads data blocks B[0], D[0], B[1], D[1] in order from the top, as shown by arrow 1820 in FIG. 17B. Simply in this way, the playback device 200 can smoothly read the main TS and sub-TS alternately. In particular, since no jump occurs during read processing, seamless playback of 3D video images can be stably maintained.

Note that if the extent ATC time is the same between a base-view data block and a dependent-view data block that are contiguous, the playback period between these data blocks may not match, and furthermore the playback time of the video streams may not be the same. Even in this case, the playback device 200 can smoothly read the main TS and sub-TS alternately by simply reading the data block groups in order from the top, in the same way as in FIG. 17B. In particular, since jumps do not occur during such read processing, seamless playback of 3D video images can be stably maintained.

Figure 17C:
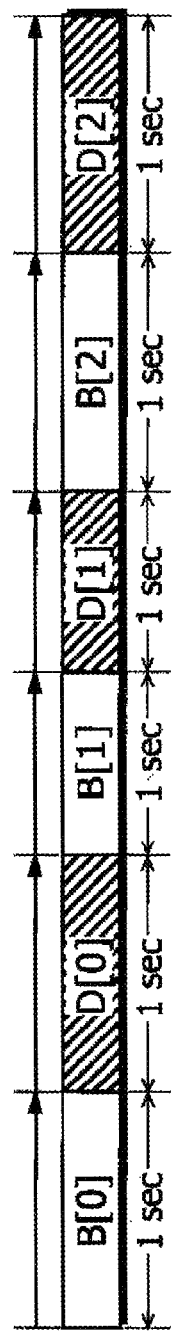
FIG. 17C is a schematic diagram showing the playback path when the playback times of the video stream are the same between all base-view data blocks and dependent-view data blocks on a recording medium 100 according to the first embodiment of the present invention.

Alternatively, as shown in FIG. 17C, the extent ATC time is the same among all extents of the base-view data blocks and dependent-view data blocks may be set to be the same. With this structure, the extent size of the multiplexed stream can be determined more easily than the method shown in FIG. 17B, thereby data creation. Additionally, if the extent ATC time which is constant is set to be the extent ATC time of the minimum extent size (to be described later), the size of a read buffer required for a 2D/3D playback device can be also reduced.

<Cross-Linking of AV Stream Files to Data Blocks>

In the file system for the recording medium 100, each data block belonging to multiplexed stream data can be accessed as a single extent in either a file 2D or a file DEP. In other words, the logical address for each data block can be known from the allocation descriptor recorded in the file entry of a file 2D or file DEP. In the examples shown in FIG. 15, the allocation descriptors #1, #2, #3, . . . included in the file entry 1610 in the file 2D (01000.m2ts) indicate the sizes of the base-view data blocks L1, L2, L3, . . . and the LBNs of their tops. The allocation descriptors #1, #2, #3, . . . included in the file entry 1620 in the first file DEP (02000.m2ts) indicate the sizes of the right-view data blocks R1, R2, R3, . . . and the LBNs of their tops. The allocation descriptors #1, #2, #3, . . . included in the file entry 1630 in the second file DEP (03000.m2ts) indicate the sizes of the depth map data blocks D1, D2, D3, . . . and the LBNs of their tops.

FIG. 18A is a schematic diagram showing the data structure of the file 2D (01000.m2ts) 541. As shown in FIG. 15, the allocation descriptors #1, #2, #3, . . . in the file entry 1610 refer to the base-view data blocks L1, L2, L3, . . . . Accordingly, as shown in FIG. 18A, the base-view data blocks L1, L2, L3, . . . can be accessed as extents EXT2D[0], EXT2D[1], EXT2D[2], . . . in the file 2D 541. Hereinafter, the extents EXT2D[0], EXT2D[1], EXT2D[2], . . . belonging to the file 2D are referred to as "2D extents".

FIG. 18B is a schematic diagram showing the data structure of the first file DEP (02000.m2ts). As shown in FIG. 15, the allocation descriptors #1, #2, #3, . . . in the file entry 1620 refer to the right-view data blocks R1, R2, R3, . . . . Accordingly, as shown in FIG. 18B, the right-view data blocks R1, R2, R3, . . . can be accessed as extents EXT2[0], EXT2[1], EXT2[2], . . . in the first file DEP 542. Hereinafter, the extents EXT2[0], EXT2[1], EXT2[2], . . . belonging to the right-view stream file are referred to as "right-view extents".

FIG. 18C is a schematic diagram showing the data structure of a second file DEP (03000.m2ts). As shown in FIG. 15, the allocation descriptors #1, #2, #3, . . . in the file entry 1630 refer to the depth map data blocks D1, D2, D3, . . . . Accordingly, as shown in FIG. 18C, the depth map data blocks D1, D2, D3, . . . can be accessed as extents EXT3[0], EXT3[1], EXT3[2], . . . in the second file DEP. Hereinafter, the extents EXT3[0], EXT3[1], EXT3[2], . . . belonging to the depth map stream file are referred to as "depth map extents". Furthermore, extents that belong to a file DEP, such as right-view extents and depth map extents, are collectively referred to as "dependent-view extents".

For the data block group shown in FIG. 15, the AV stream files are cross-linked as follows. The allocation descriptors #1, #2, #3, . . . included in the file entry 1640 in the first file SS (01000.ssif) consider pairs of adjacent right-view data blocks and base-view data blocks R1+L1, R2+L2, R3+L3, . . . to each be one extent, indicating the size of each and the LBN of the top thereof. The allocation descriptors #1, #2, #3, . . . included in the file entry 1650 in the second file SS (02000.ssif) alternately indicate, for depth map data blocks D1, D2, D3, . . . and base-view data blocks L1, L2, L3, . . . , the size of each block and the LBN of the top of the block.

FIG. 18D is a schematic diagram showing the data structure of the first file SS (01000.ssif). As shown in FIG. 15, the allocation descriptors #1, #2, #3, . . . in the file entry 1640 refer to pairs of adjacent right-view data blocks and base-view data blocks, R1+L1, R2+L2, R3+L3, . . . . Accordingly, as shown in FIG. 18D, the pairs of adjacent data blocks R1+L1, R2+L2, R3+L3, . . . can be accessed as extents EXTSS[0], EXTSS[1], EXTSS[2], . . . in the first file SS. Hereinafter, the extents EXTSS[0], EXTSS[1], EXTSS[2], . . . belonging to the file SS are referred to as "3D extents". The 3D extents EXTSS[n] (n=0, 1, 2, . . . ) have base-view data blocks Ln in common with the file 2D and right-view data blocks Rn in common with the first file DEP.

FIG. 18E is a schematic diagram showing the data structure of the second file SS (02000.ssif). As shown in FIG. 15, the allocation descriptors #1, #2, #3, . . . in the file entry 1650 alternately refer to depth map data blocks D1, D2, D3, . . . , and to base-view data blocks L1, L2, L3, . . . . Accordingly, as shown in FIG. 18E, the data blocks D1, L1, D2, L2 can be accessed as extents EXTSS[0], EXTSS[1], EXTSS[2], EXTSS[3], . . . in the second file SS 544B. The extents in the second file SS have base-view data blocks Ln in common with the file 2D and depth map data blocks Dn in common with the second file DEP.

<Playback Path for a Data Block Group in an Interleaved Arrangement>

Figure 19:
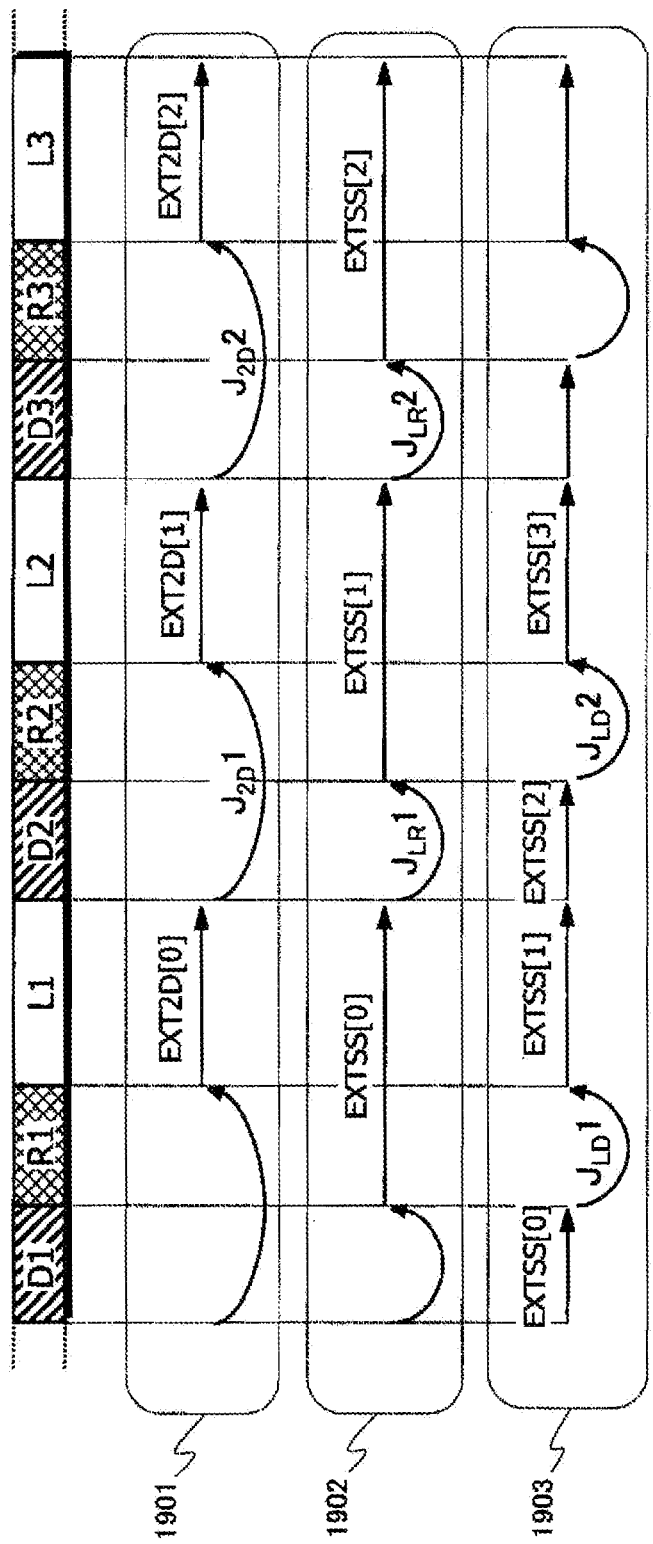
FIG. 19 is a schematic diagram showing the playback path 1901 in 2D playback mode, playback path 1902 in L/R mode, and the playback path 1903 in depth mode for the data block groups shown in FIG. 15.

FIG. 19 is a schematic diagram showing the playback path 1901 in 2D playback mode, playback path 1902 in L/R mode, and playback path 1903 in depth mode for the data block groups shown in FIG. 15.

In 2D playback mode, the playback device 200 plays back the file 2D. Accordingly, as the playback path 1901 for 2D playback mode shows, the base-view data blocks L1, L2, and L3 are read in order as 2D extents EXT2D[0], EXT2D[1], and EXT2D[2]. That is, the top base-view data block L1 is first read, then reading of the immediately subsequent depth map data block D2 and right-view data block R2 is skipped by a first jump J2D1. Next, the second base-view data block L2 is read, and then reading of the immediately subsequent depth map data block D3 and right-view data block R3 is skipped by a second jump J2D2. Subsequently, the third base-view data block L3 is read.

In L/R mode, the playback device 200 plays back the first file SS. Accordingly, as the playback path 1902 for L/R playback mode shows, pairs of adjacent right-view data blocks and base-view data blocks R1+L1, R2+L2, and R3+L3 are read in order as 3D extents EXTSS[0], EXTSS[1], and EXTSS[2]. That is, the top right-view data block R1 and the immediately subsequent base-view data block L1 are first continuously read, then reading of the immediately subsequent depth map data block D2 is skipped by a first jump JLR1. Next, the second right-view data block R2 and the immediately subsequent base-view data block L2 are continuously read, and then reading of the immediately subsequent depth map data block D3 is skipped by a second jump JLR2. Subsequently, the third right-view data block R3 and base-view data block L3 are continuously read.

In depth mode, the playback device 200 plays back the second file SS. Accordingly, as the playback path 1903 for depth mode shows, depth map data blocks D1, D2, and D3 and base-view data blocks L1 and L2 are alternately read as extents EXTSS[0], EXTSS[1], EXTSS[2], and EXTSS[3] in the second file SS. That is, the top depth map data block D1 is first read, then reading of the immediately subsequent right-view data block R1 is skipped by a first jump JLD1. Next, the top base-view data block L1 and the immediately subsequent depth map extent D2 are continuously read. Furthermore, reading of the immediately subsequent right-view extent R2 is skipped by a second jump JLD2, and the second base-view data block L2 is read.

As shown by the playback paths 1901-1903 in FIG. 19, in the area in which a data block group is recorded in an interleaved arrangement, the playback device 200 can substantially read the data block groups in order from the top. In this case, jumps occur during read processing. The distance of the jumps, however, differs from the jumps shown in FIG. 16A and is sufficiently shorter than the entire length of either the main TS or the sub-TS. Also, unlike the jumps shown in FIG. 17A, none of the jumps occur during reading of a single data block. Furthermore, for each pair of a base-view data block and dependent-view data block with the same extent ATC time, the dependent-view data block, which is comparatively small in size, is read first. Therefore, the read buffer capacity of the playback device 200 can be reduced more than if the data blocks were read in opposite order.

In L/R mode, the playback device 200 reads a data block group as an extent group in the first file SS. That is, the playback device 200 reads the LBN of the top of the 3D extents EXTSS[0], EXTSS[1], . . . , as well as the size thereof, from the allocation descriptors #1, #2, . . . in the file entry 1640 in the first file SS and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP and the file 2D for the following reasons (A) and (B): (A) the playback device 200 may refer in order to extents using a file entry in one location, and (B) since the total number of extents to be read substantially halves, the total number of pairs of an LBN and a size that need to be output to the BD-ROM drive halves. Advantage (A) is also true for processing to read the data block group as extents in the second file SS in depth mode. However, after the playback device 200 has read the 3D extents EXTSS[0], EXTSS[1], . . . , it needs to separate each into a right-view data block and a base-view data block and output them to the decoder. The clip information file is used for this separation processing. Details are provided below.

<Long Jump>

In general, when an optical disc is adopted as the recording medium, an operation for suspending a reading operation of the optical pickup, and, during the suspension, positioning the optical pickup onto the next reading-target area is called "jump".

The jump is classified into: a jump that increases or decreases the rotation speed of the optical disc; a track jump; and a focus jump. The track jump is an operation of moving the optical pickup in the radius direction of the disc. The focus jump is available when the optical disc is a multi-layer disc, and is an operation of moving the focus of the optical pickup from one recording layer to another recording layer. These jumps are called "long jumps" since they generally require a long seek time, and a large number of sectors are skipped in reading due to the jumps. During a jump, the reading operation by the optical pickup is suspended.

The length of the portion for which the reading operation is skipped during a jump is called "jump distance". The jump distance is typically represented by the number of sectors included in the portion. The above-mentioned long jump is specifically defined as a jump whose jump distance exceeds a predetermined threshold value. The threshold value is, for example, 40000 sectors in the BD-ROM standard, in accordance with the disc type and the performance concerning the process of reading the drive.

Typically, a long jump is caused to occur at a position where the main TS and the sub-TS are recorded across a boundary between recording layers, where data other than the main TS and sub-TS are recorded in-between, and where one playitem is connected with n playitems, namely, a multi-connection is performed.

<Arrangement of Multiplexed Stream Data Before and after a Long Jump>

On the recording medium 100, when a sequence of a main TS and a sub-TS are divided, being located on either side of a position requiring a long jump, then the respective data block groups are recorded in one of the following six types of arrangements, 1-6. Furthermore, cross-links in AV stream files are used when accessing these data block groups. In this way, as described below, the playback device 200 can easily perform seamless playback of video images during a long jump while keeping the read buffer capacity to the minimum necessary.

The following explains a data structure of a data arrangement in which data block groups are divided, being located on either side of a position requiring a long jump. In the following case, a boundary of recording layers is explained as an example of the position requiring a long jump.

[Arrangement 1]

Figure 20:
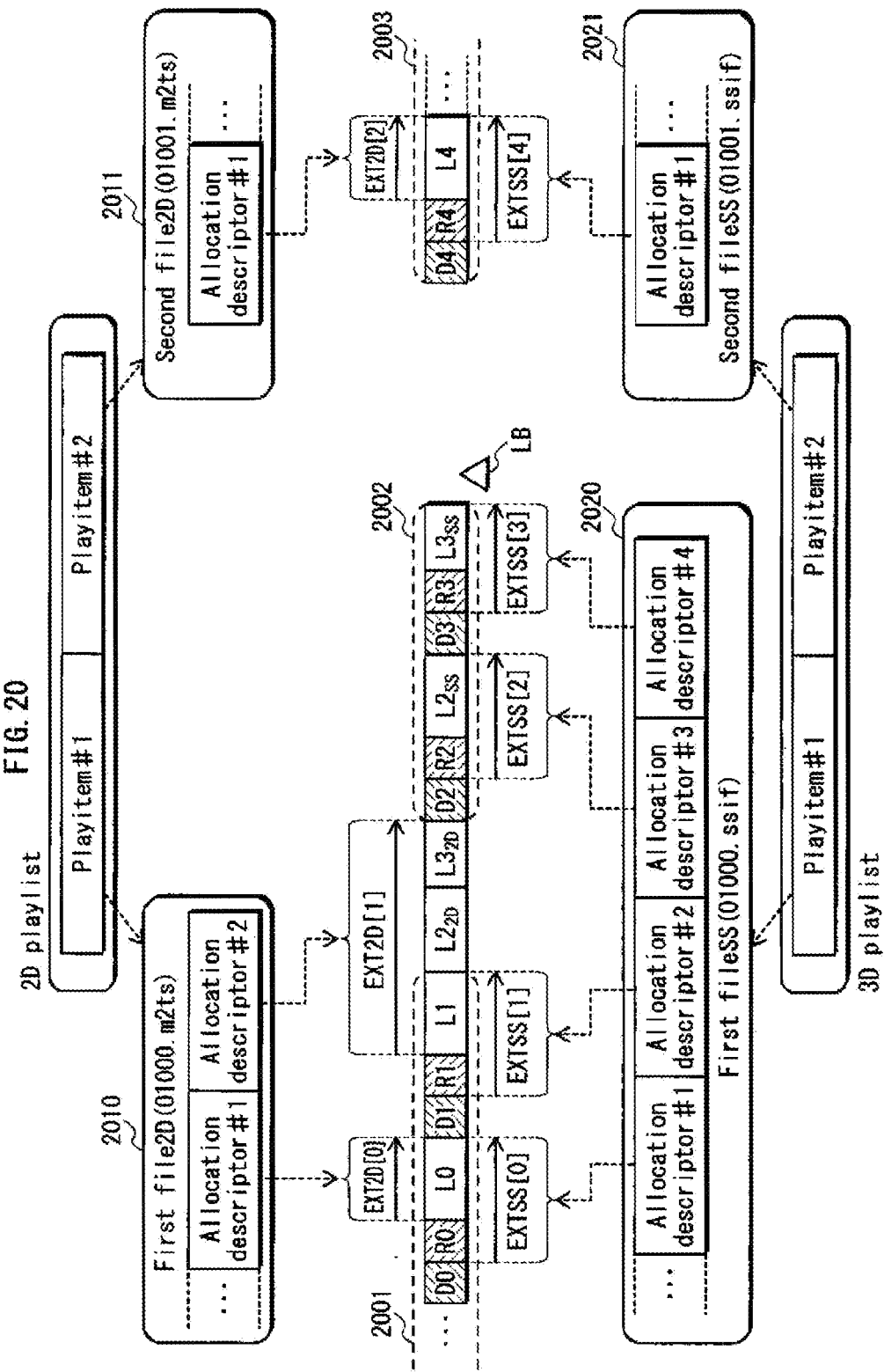
FIG. 20 is a schematic diagram showing a first example of a physical arrangement of the data block groups recorded before and after a layer boundary in a recording medium 100.

FIG. 20 is a schematic diagram showing a first example of a physical arrangement of the data block groups recorded before and after a layer boundary in a BD-ROM disc 100. The data arrangement shown in FIG. 20 is advantageous in a case where playitems of the main TS and the sub-TS divided on either side of a position requiring a long jump are seamlessly connected.

These data block groups in FIG. 20 belong to the main TS that includes the left-view video stream, sub-TS that includes the right-view video stream, and sub-TS that includes the depthmap stream. As shown in FIG. 20, on the first recording layer located before the layer boundary LB, the depth map data block group . . . , D0, D1, the right-view data block group . . . , R0, R1, and the base-view data block group . . . , L0, L1 are recorded in an interleaved arrangement. Hereinafter, these data block groups are referred to as a "first 3D extent block" 2001. Furthermore, base-view data blocks $L2_{2D}$ and $L3_{2D}$ are placed contiguously following the end L1 of the first 3D extent block 2001. Furthermore, between the base-view data block $L3_{2D}$ and the layer boundary LB, the depth map data block group . . . , D2, D3, the right-view data block group . . . , R2, R3, and the base-view data block group . . . , $L2_{SS}$, $L3_{SS}$ are recorded in an interleaved arrangement. Hereinafter, these data block groups are referred to as a "second 3D extent block" 2002.

On the other hand, on the second recording layer located after the layer boundary LB, the depth map data block group D4, . . . , the right-view data block group R4, . . . , and the base-view data block group L4, . . . are recorded in an interleaved arrangement. Hereinafter, these data block groups are referred to as the "third 3D extent block" 2003.

The interleaved arrangement for 3D extent blocks 2001, 2002, and 2003 is the same as the one shown in FIG. 15. In other words, a depth map data block, right-view data block, and base-view data block are alternately arranged in that order. Furthermore, between three consecutive data blocks Dn, Rn, Ln (n= . . . , 1, 2, 3, 4, . . . ), the extent ATC time is the same. The content of each piece of stream data is continuous between the three data blocks D1, R1, and L1 located at the end of the first 3D extent block 2001 and the three data blocks D2, R2, $L2_{SS}$ located at the top of the second 3D extent block 2002.

The base-view data block $L2_{2D}$ located between the first 3D extent block 2001 and the second 3D extent block 2002 matches bit-for-bit with the base-view data block $L2_{SS}$ at the top of the second 3D extent block 2002. Similarly, the base-view data block $L3_{2D}$ matches bit-for-bit with the base-view data block $L3_{SS}$ at the top of the second 3D extent block 2002. In other words, the data blocks $L2_{2D}$ and $L2_{SS}$ are duplicate data, and $L3_{2D}$ and $L3_{SS}$ are duplicate data. Hereinafter, $L2_{2D}$ and $L3_{2D}$ are each referred to as a "block exclusively for 2D playback", and $L2_{SS}$ and $L3_{SS}$ are each referred to as a "block exclusively for 3D playback".

The data blocks shown in FIG. 20 can be accessed as an extent in either 2D file or DEP file, with the exception of the blocks exclusively for 3D playback $L2_{SS}$ and $L3_{SS}$. For example, in the file entry 2010 in the first 2D file (01000.m2ts), the allocation descriptor #1 indicates the size and the LBN of the top of the base-view data block L0, which is second from the end of the first 3D extent block 2001. Accordingly, the base-view data block L0 can be accessed as one 2D extent EXT2D[0] in the first 2D file. The allocation descriptor #2 considers a group of the base-view data blocks $L1+L2_{2D}+L3_{2D}$, i.e. the base-view data block L1, the last in the first 3D extent block 2001, and the immediately subsequent contiguous blocks exclusively for 3D playback $L2_{2D}$ and $L3_{2D}$, to be a single extent and indicates the size and the LBN of the top thereof. Accordingly, the group of base-view data blocks $L1+L2_{2D}+L3_{2D}$ can be accessed as one 2D extent EXT2D[1] in the first 2D file. The base-view data blocks L1, $L2_{2D}$, and $L3_{2D}$ in these files 2D constitute an extent having a long contiguous length (big extent) immediately before the position where a long jump occurs. Because the files 2D can form a big extent immediately before a long jump, underflow of the read buffers is not expected to occur even when performing playback in 2D playback mode. The 2D extent EXT2D[1] which is an extent accessed immediately before a long jump across the layer boundary LB is hereinafter referred to as "pre-jump 2D extent".

In the file entry 2011 in the 2D file (01001.m2ts), the allocation descriptor #1 indicates the size and the LBN of the top of the base-view data block L4 of the third 3D extent block 2003. Accordingly, the base-view data block L4 can be accessed as one 2D extent EXT2D[2] in the second 2D file.

Cross-linking of the AV stream files is performed the same way as in FIG. 15 for the data block groups shown in FIG. 20. In particular, in the file entry 2020 in the first file SS (01000.ssif), the allocation descriptors #1, #2, #3, and #4 consider adjacent pairs of right-view data blocks and base-view data blocks R0+L0, R1+L1, R2+L2$_{SS}$, and R3+L3$_{SS}$ to each be one extent and indicate the size and the LBN of the top thereof. Accordingly, each pair of adjacent data blocks R0+L0, R1+L1, R2+L2$_{SS}$, and R3+L3$_{SS}$ can be accessed respectively as a 3D extent EXTSS[0], EXTSS[1], EXTSS[2], and EXTSS[3] in the first file SS. Among these extents, EXTSS[2] and EXTSS[3] are extent groups constituting the second 3D extent block 2002 which is accessed immediately before a long jump across the layer boundary LB in playback of the file SS, and hereinafter, are referred to as a "pre-jump 3D extent block 2002". In the file entry 2021 of the second file SS (01001.ssif), the allocation descriptor #1 considers an adjacent pair R4+L4 of the right-view data block R4 and the base-view data block of L4 to be a single extent, and indicates the size and the LBN of the top thereof. Accordingly, the adjacent pair of data blocks R4+L4 can be accessed as the 3D extent EXTSS[4] of the second file SS.

In this case, with the exception of the 3D extents EXTSS[2] and EXTSS[3] located between the block exclusively for 2D playback L3$_{2D}$ and the layer boundary LB, the 3D extents EXTSS[0], EXTSS[1], and EXTSS[4] respectively share base-view data blocks L0, L1, and L4 with the 2D file. On the other hand, the blocks exclusively for 2D playback L2$_{2D}$ and L3$_{2D}$ are base-view data blocks unique to the file 2D and can only be accessed as part of the extent EXT2D[1] in the 2D file, the extent EXT2D[1] being located immediately before the layer boundary LB. Furthermore, the blocks exclusively for 3D playback L2$_{SS}$ and L3$_{SS}$ are base-view data blocks unique to the file SS and can only be accessed as part of the extent EXTSS[2], located immediately after the layer boundary LB.

In FIG. 20, the 2D playlist and the 3D playlist both include playitems #1 and #2 which are seamlessly connected together. Here, of the playitems seamlessly connected together, the preceding playitem is denoted as a "preceding playitem" and a playitem that follows the preceding playitem is denoted as a "succeeding playitem".

First, description is given on data referred to by the preceding playitems in the 2D playlist and the 3D playlist.

The preceding playitem in the 2D PlayList refers to the first file 2D. The preceding playitem in the 3D PlayList refers to the first file SS, and the sub-playitem played back in synchronization with the preceding playitem refers to the file DEP. As described above, the content of the base-view data blocks referred to by the 2D extents EXT2D[0] and EXT2D[1] is the same as the content of the base-view data blocks referred to by the 3D extents EXTSS[0], EXTSS[1], EXTSS[2], and EXTSS[3]. Accordingly, in 2D playlist playback, the base-view data blocks L1, L2$_{2D}$, and L3$_{2D}$ are played back at a position where playitems are seamlessly connected, while in 3D playlist playback, L1, L2$_{SS}$, and L3$_{SS}$, which have the same content as L1, L2$_{2D}$, and L3$_{2D}$, are played back at a position where playitems are seamlessly connected. Thus, although the playback paths (the logical addresses to be played back) are different between the 2D playback based on the 2D playlist and the 3D playback based on the 3D playlist, the playback devices can play back the same left-view video frame.

Next, description is given on data referred to by succeeding playitems. The succeeding playitem in the 2D PlayList refers to the second file 2D. The succeeding playitem in the 3D PlayList refers to the second file SS, and the sub-playitem played back in synchronization with the succeeding playitem of the 2D PlayList refers to the file DEP. As shown in the figure, the second file 2D and the second file SS use the same data, i.e. the base-view data block L4.

Here, the distance from the end of the pre-jump 2D extent EXT2D[1] referred to by the preceding playitem of the 2D PlayList to the head of the 2D extent EXT2D[2] referred to by the succeeding playitem is set to a value no greater than the maximum jump distance determined by a given specification based on the jump performance of the 2D playback device. The jump distance between the pre-jump 3D extent block 2002 referred to by the preceding playitem of the 3D PlayList and the 3D extent block 2003 referred to by the succeeding playitem of the 3D PlayList is set to a value no greater than the maximum distance determined by a given specification based on the jump performance of the 2D/3D playback device.

Figure 21:
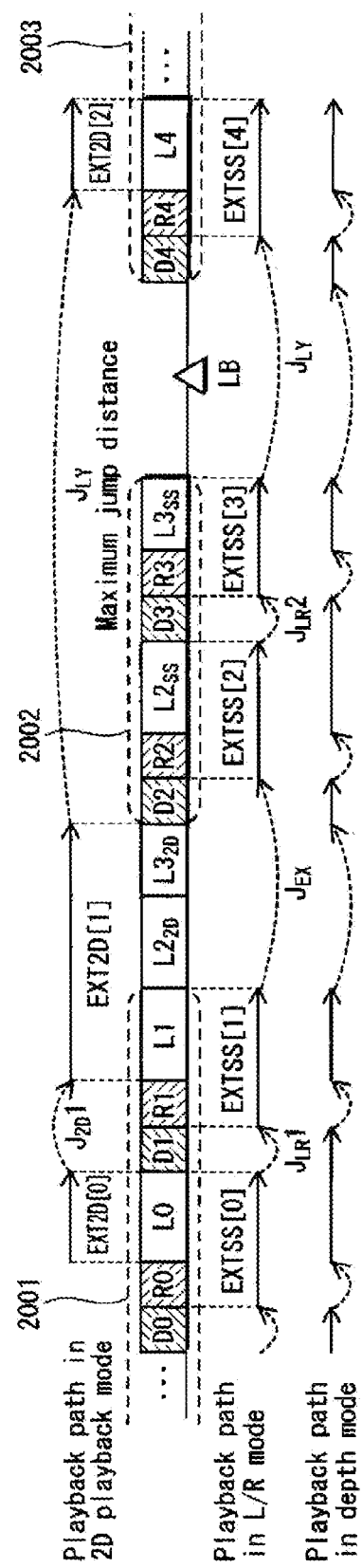
FIG. 21 is a schematic diagram showing the playback path in 2D playback mode and the playback path in L/R mode for the data block groups shown in FIG. 20.

FIG. 21 is a schematic diagram showing a playback path in 2D playback mode, a playback path in L/R mode, and a playback path in depth mode for the data block groups shown in FIG. 20.

In 2D playback mode, the playback device 200 plays back the 2D file. Accordingly, the base-view data block L0 is read as the first 2D extent EXT2D[0], and then the base-view data block L1 and the immediately subsequent blocks exclusively for 2D playback L2$_{2D}$ and L3$_{2D}$ are continuously read as the second 2D extent EXT2D[1], and after a long jump, the base-view data block L4 is read as the third 2D extent EXT2D[2].

In L/R mode, the playback device 200 plays back the first file SS. Accordingly, as shown by the playback path in L/R mode, a pair R0+L0 of the right-view data block R0 and the immediately subsequent base-view data block L0 is read as the first 3D extent EXTSS[0], the right-view data block R1 and the immediately subsequent base-view data block L1 are read as the second 3D extent EXTSS[1], the right-view data block R2 and the immediately subsequent block exclusively for 3D playback L2$_{SS}$ are read as the third 3D extent EXTSS[2], the right-view data block R3 and the immediately subsequent block exclusively for 3D playback L3$_{SS}$ are read as the fourth 3D extent EXTSS[3], and after a long jump, the right-view data block R4 and the immediately subsequent base-view data block L4 are read as the fifth 3D extent EXTSS[4].

As shown in FIG. 21, in 2D playback mode, the blocks exclusively for 2D playback L2$_{2D}$ and L3$_{2D}$ are read, while reading of the blocks exclusively for 3D playback L2$_{SS}$ and L3$_{SS}$ is skipped. Conversely, in L/R mode, reading of the blocks exclusively for 2D playback L2$_{2D}$ and L3$_{2D}$ is skipped, while the blocks exclusively for 3D playback L2$_{SS}$ and L3$_{SS}$ are read. However, since the data blocks L2$_{2D}$ and L2$_{SS}$ match bit-for-bit, and the data blocks L3$_{2D}$ and L3$_{SS}$ also match bit-for-bit, the left-view video frame that is played back is the same in both playback modes. In arrangement 1, the playback path in 2D playback mode and the playback path in L/R mode are divided before a long jump J$_{LY}$ in this way. The same is also true for depth mode.

[Advantages of Arrangement 1]

Figure 22:
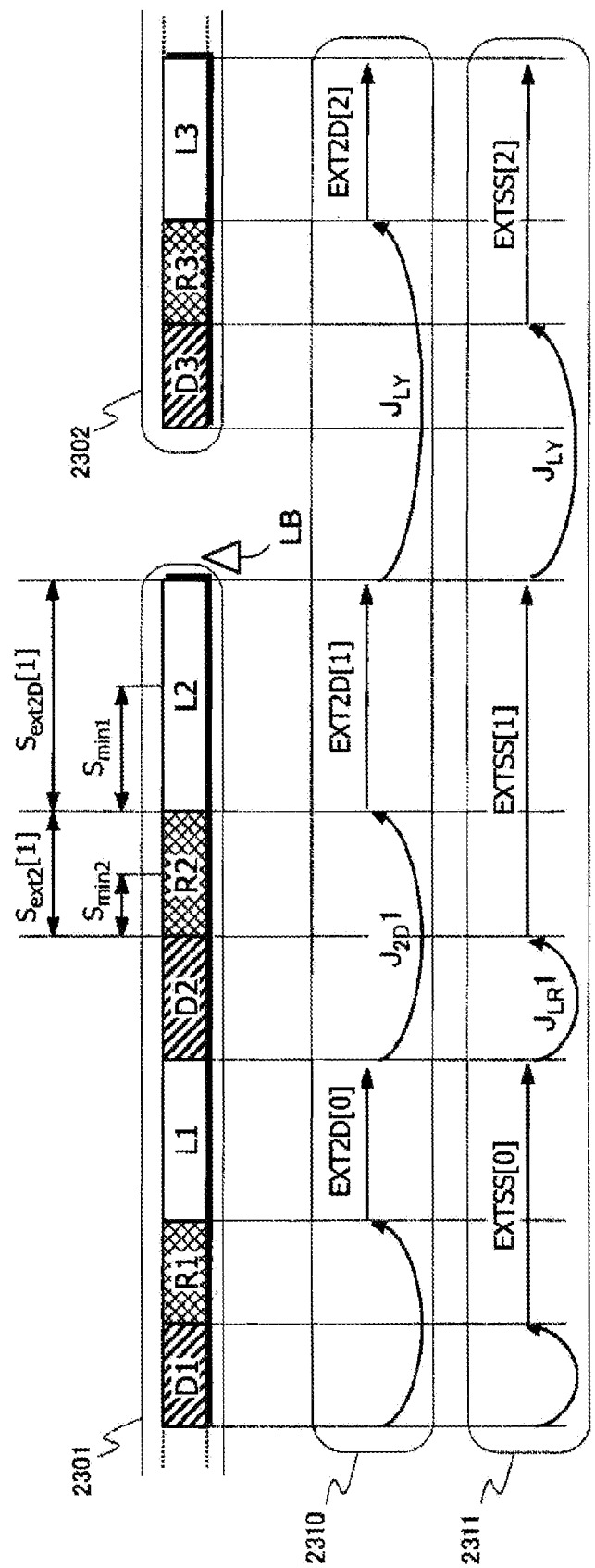
FIG. 22 is a schematic diagram showing data block groups recorded in an interleaved arrangement before and after a layer boundary in a BD-ROM disc and the corresponding playback path in each playback mode.

FIG. 22 is a schematic diagram showing data block groups recorded in an interleaved arrangement before and after a layer boundary in a BD-ROM disc and the corresponding playback path in each playback mode. As shown in FIG. 22, in the same way as the arrangement shown in FIG. 20, on the first recording layer, the depth map data block group . . . , D1, D2, the right-view data block group . . . , R1, R2, and the base-view data block group . . . , L1, L2 are recorded in an interleaved arrangement to constitute the first 3D extent block 2301. On the other hand, on the second recording layer, the depth map data block group D3, . . . , the right-view data block group R3, . . . , and the base-view data block group L3, . . . are recorded in an interleaved arrangement to constitute the second 3D extent block 2302. The interleaved arrangement of the 3D extent blocks 2301 and 2302 is the same as 2001 and 2002 shown in FIG. 20. Furthermore, the content of each piece of stream data is continuous between the three data blocks D2, R2, and L2 located at the end of the first 3D extent block 2301 and the three data blocks D3, R3, L3 located at the top of the second 3D extent block 2302.

Unlike those shown in FIG. 20, the data block groups shown in FIG. 22 do not include a pair of a block exclusively for 2D playback $Ln_{2D}$ and a block exclusively for 3D playback $Ln_{SS}$ before and after the layer boundary LB. Accordingly, as shown below, the playback path 2310 in 2D playback mode and the playback path 2311 in L/R mode are not divided immediately before the long jump $J_{LY}$, and both playback paths traverse the same base-view data block L2.

The base-view data blocks L1-L3 shown in FIG. 22 can each be accessed as one extent EXT2D[0]-EXT2D[2] in the file 2D. On the other hand, each pair of adjacent right-view data blocks and base-view data blocks, R1+L1, R2+L2, and R3+L3, can be accessed as 3D extents EXTSS[0], EXTSS[1], and EXTSS[2] in the file SS. All of the 3D extents EXTSS[0], EXTSS[1], and EXTSS[2] respectively share base-view data blocks L1, L2, and L3 with the file 2D.

The playback device 200 in 2D playback mode plays back the file 2D. Accordingly, as shown by the playback path 2310 in 2D playback mode, the base-view data block L1, which is second from the end of the first 3D extent block 2301, is read as the first 2D extent EXT2D[0], and reading of the immediately subsequent depth map data block D2 and right-view data block R2 is skipped by the first jump $J_{2D}1$. Next, the base-view data block L2, located last in the first 3D extent block 2301, is read as the second 2D extent EXT2D[1]. The long jump $J_{LY}$ occurs at the immediately subsequent layer boundary LB, and along with performance of a focus jump, reading of the two data blocks D3, and R3, located at the top of the second 3D extent block 2302, is skipped. Next, the top base-view data block L3 in the second 3D extent block 2302 is read as the third 2D extent EXT2D[2].

The playback device 200 in L/R mode plays back the file SS. Accordingly, as shown by the playback path 2311 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by the first jump $J_{LR}1$. Next, the second right-view data block R2 and the immediately subsequent base-view data block L2 are read continuously as the second 3D extent EXTSS[1]. The long jump $J_{LY}$ occurs immediately thereafter, and along with performance of a focus jump, reading of the top depth map data block D3 in the second 3D extent block 2302 is skipped. Next, the top right-view data block R3 in the second 3D extent block 2302 and the immediately subsequent base-view data block L3 are read continuously as the third 3D extent EXTSS[2].

As described above, in the data block groups shown in FIG. 22, the playback path 2310 in 2D playback mode and the playback path 2311 in L/R mode both traverse the same base-view data block L2 immediately before the long jump $J_{LY}$, unlike the data block groups shown in FIG. 20. During the long jump $J_{LY}$, the BD-ROM drive 121 stops read processing, but the system target decoder continues to decode stream data accumulated in the read buffer. Accordingly, to cause the playback device 200 to seamlessly play back video images before and after the long jump $J_{LY}$, it is necessary to prevent buffer underflow during the long jump $J_{LY}$.

In L/R mode, while the first 3D extent block 2301 is being decoded, a constant amount of data accumulates in the read buffer. This constant amount of data is referred to as the "buffer margin amount" (details provided below). During the long jump $J_{LY}$, the 3D extent EXTSS[1] read immediately before, i.e. data for the right-view data block R2 and the base-view data block L2, as well as the buffer margin amount, is decoded. Accordingly, in order to prevent buffer underflow in L/R mode, the buffer margin amount should be set sufficiently large. On the other hand, it suffices for the size of the data blocks R2 and L2, Smin2 and Smin1, to be values for which the buffer margin amount can be maintained until immediately before the long jump $J_{LY}$.

However, to prevent buffer underflow in 2D playback mode, the 2D extent EXT2D[1], i.e. the size $S_{ext2D}[1]$ of the base-view data block L2, has to satisfy the following requirement: "equal to or greater than the data amount transmitted from the read buffer to the system target decoder between the start of reading of the 2D extent EXT2D[1] and the completion of the long jump $J_{LY}$". The size $S_{ext2D}[1]$ that satisfies this requirement is generally larger than the size Smin1, the minimum necessary for seamless playback in L/R mode, as shown in FIG. 22. Accordingly, the capacity of the read buffer that should be guaranteed in the playback device 200 in L/R mode has to be larger than the minimum value for seamless playback in L/R mode. Furthermore, the extent ATC times for the right-view data block R2 and the base-view data block L2 have to be the same. Accordingly, the size $S_{ext2}[1]$ of the right-view data block R2 is generally larger than the size Smin2, the minimum necessary for seamless playback in L/R mode. Therefore, the capacity of the read buffer that should be guaranteed in the playback device 200 in L/R mode has to be even larger than the minimum value for seamless playback in L/R mode. As a result of these facts, in the arrangement shown in FIG. 23, it is difficult to further decrease the capacity of the read buffer that should be guaranteed in the playback device 200 in L/R mode.

Conversely, as described above, in arrangement 1 shown in FIG. 21, the playback path in 2D playback mode and the playback path in L/R mode are divided before the long jump $J_{LY}$. Accordingly, unlike the arrangement shown in FIG. 22, the size $S_{ext2D}[1]$ of the pre-jump 2D extent EXT2D[1] located before the layer boundary LB and the size $S_{ext2}[1]$ of the immediately preceding right-view data block R1 can be determined separately as below.

First, the size $S_{ext2D}[1]$ of the pre-jump 2D extent EXT2D [1] is the same as the sum $S_{ext1}[1]+S_{2D}[2]+S_{2D}[3]$ of the size $S_{ext1}[1]$ of the base-view data block L1, the size $S_{2D}[2]$ of the block exclusively for 2D playback $L2_{2D}$, and the size $S_{2D}[3]$ of the block exclusively for 2D playback $L3_{2D}$. Accordingly, for seamless playback in 2D playback mode, this sum $S_{ext1}[1]+S_{2D}[2]+S_{2D}[3]$ should be greater than or equal to the data amount that is transmitted from the read buffer to the system target decoder between the start of reading of the 2D extent EXT2D[1] and the completion of the long jump $J_{LY}$. In this case, within the 2D extent EXT2D[1], only the base-view data block L1 located at the head of the extent is shared with the 3D extent EXTSS[1]. Accordingly, by appropriately enlarging the size $S_{2D}[2]$ of the block exclusively for 2D playback $L2_{2D}$ and the size $S_{2D}[3]$ of the block exclusively for 2D playback $L3_{2D}$, the size $S_{ext1}[1]$ of the base-view data block L1 can be further limited while keeping the size $S_{ext2D}[1]=S_{ext1}[1]+S_{2D}[2]+S_{2D}[3]$ of the pre-jump 2D extent EXT2D[1] constant. Correspondingly, the size $S_{ext2}[1]$ of the right-view data block R1, which has the same ATC time as the base-view data block L1, can also be further limited.

On the other hand, the sizes $S_{ext2}[2]$, $S_{ext2}[3]$, $S_{ext2}[2]$, and $S_{ext1}[3]$ of the right-view data blocks R2 and R3 and the base-view data blocks L2 and L3 belonging to the pre-jump 3D extent block 2002 located immediately before the layer boundary LB should be values such that the buffer margin amount can be maintained until immediately before the long jump $J_{LY}$. Since the block exclusively for 3D playback $L2_{SS}$ and the block exclusively for 2D playback $L2_{2D}$ are duplicate data, and the block exclusively for 3D playback $L3_{SS}$ and the block exclusively for 2D playback $L3_{2D}$ are duplicate data, enlarging the size $S_{2D}$ of the block exclusively for 2D playback $L3_{2D}$ enlarges the size of the right-view data block R3 located immediately before the block exclusively for 3D playback $L3_{SS}$. However, this size can be made sufficiently smaller than the size of the right-view data block R3 located immediately before the layer boundary LB shown in FIG. 22. In this way, the read buffer capacity to be guaranteed in the playback device 200 in L/R mode can be brought even closer to the minimum necessary for seamless playback in L/R mode.

It is possible to thus set each data block in arrangement 1 to be a size at which seamless playback of video images during a long jump is possible in both 2D playback mode and L/R mode while keeping the read buffer amount that is to be guaranteed in the playback device 200 to the minimum necessary.

In arrangement 1, the playback path in 2D playback mode and the playback path in L/R mode are divided before a position where a long jump occurs, in this way. Accordingly, the size of EXT1[3] at the end of the pre-jump 3D extent block does not satisfy the condition for preventing buffer underflow in 2D playback mode.

Figure 23:
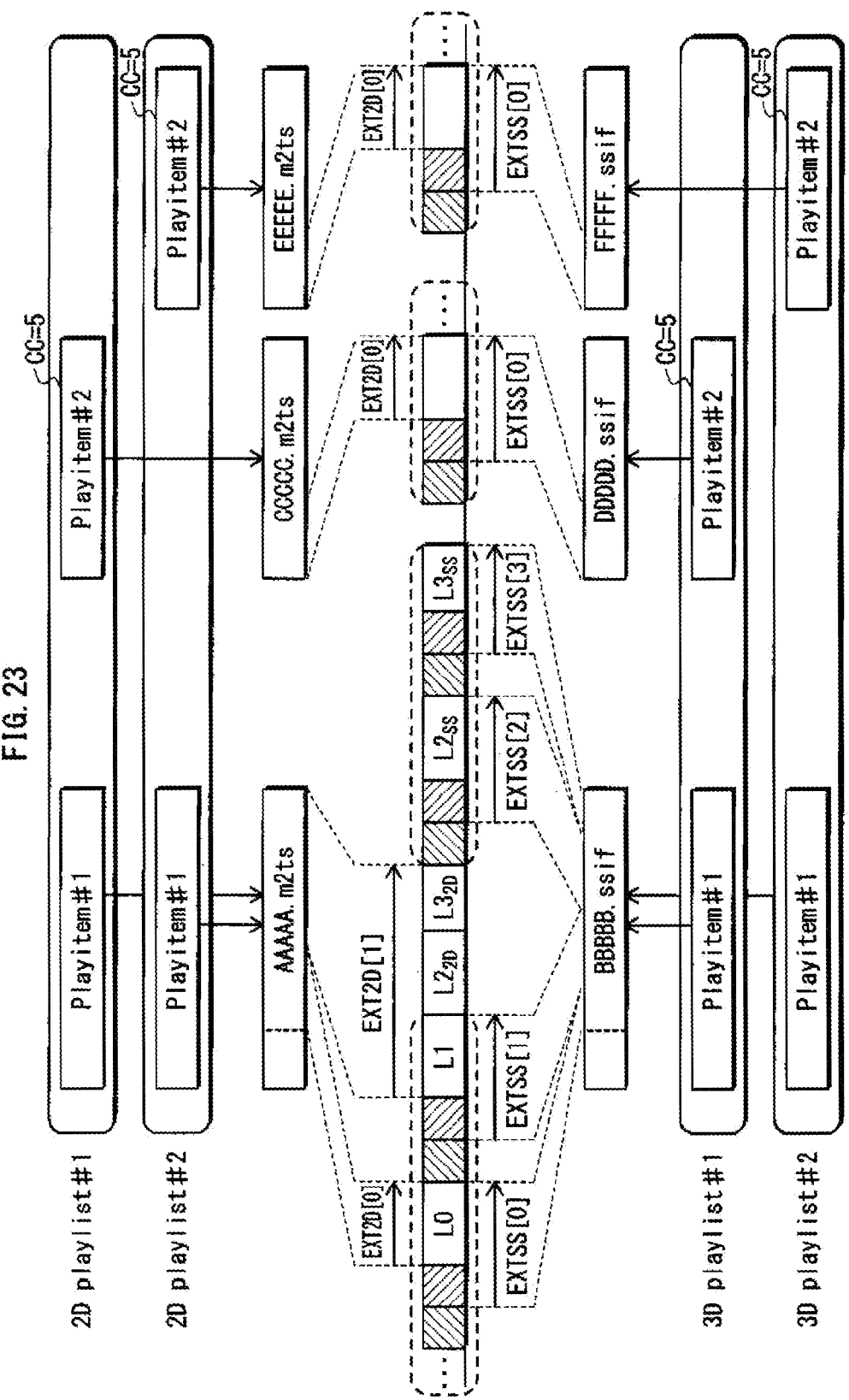
FIG. 23 shows an example case where a preceding playitem is seamlessly connected to a plurality of succeeding playitems, with use of arrangement 1.

In the explanation of FIG. 20, a layer boundary has been described as an example of a position requiring a long jump. However, a long jump may occur when a one-to-n multi-connection of playitems is performed. Here, when a one-to-n multi-connection of playitems is performed, the first TS among "n" pieces of TSs constituting "n" pieces of playitems can be disposed at a position immediately after a TS that constitutes the playitem that precedes the "n" playitems. However, any of the second TS and onwards cannot be disposed at the position immediately after the TS that constitutes the playitem preceding the "n" playitems. When, at a one-to-n multi-connection, a jump is made from the one playitem to any of the second playitem and onwards in the "n" playitems, the reading needs to skip one or more recording areas of TSs. Therefore, a long jump occurs at a position where a one-to-n multi-connection exists. Arrangement 1 can also be applied to a long jump that occurs in such a one-to-n multi-connection of playitems. Specifically, as shown in FIG. 23, for both of the 2D playlist and the 3D playlist, all pieces of data to be referred to by playitem #1, i.e. a preceding playitem, are collectively arranged, and subsequently, n pieces of data referred to by n pieces of succeeding playitems are arranged. In this case, like the arrangement shown in FIG. 20, data for the preceding playitem are divided for the playback path of the 2D playlist and the playback path of the 3D playlist. Consequently, the end of the pre-jump 3D extent block EXT1[3] does not need to satisfy the condition for preventing buffer underflow in 2D playback mode.

Use of arrangement 1 allows creation of data for a multi-connection where a preceding playitem seamlessly connects to a plurality of playitems.

[Arrangement 2]

Figure 24:
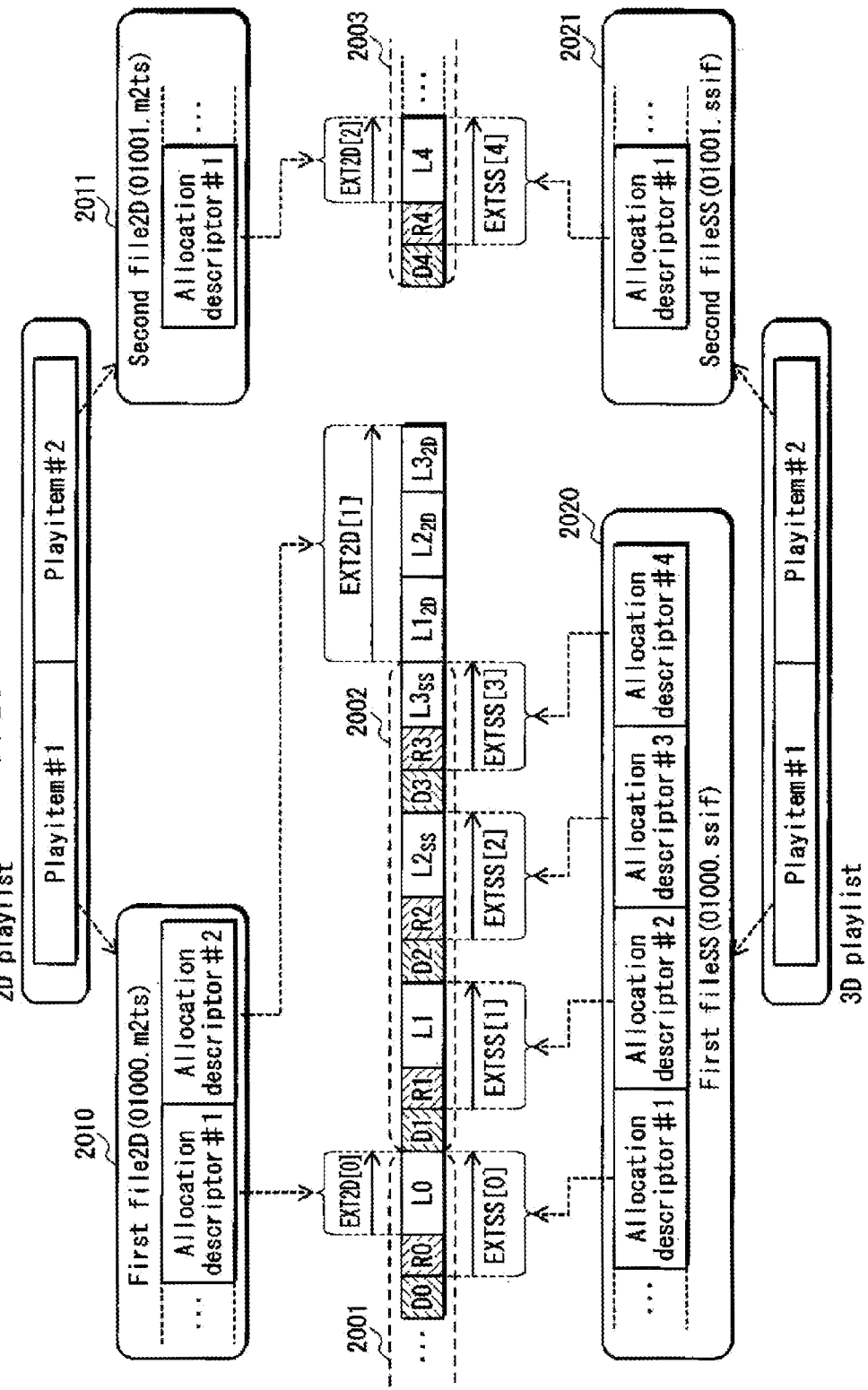
FIG. 24 is a schematic diagram showing a second example of a physical arrangement of the data block groups recorded before and after a layer boundary in a recording medium 100.

FIG. 24 is a schematic diagram showing a second example of a physical arrangement of the data block groups recorded before and after a layer boundary in a BD-ROM disc 100.

These data block groups in FIG. 24 belong to the main TS that includes the left-view video stream, sub-TS that includes the right-view video stream, and sub-TS that includes the depthmap stream. Hereinafter, this arrangement is referred to as "arrangement 2". As seen by comparing FIG. 24 with FIG. 20, arrangement 2 differs from arrangement 1 in that the second 3D extent block 2002 succeeds the first 2D extent block 2001, and the blocks exclusively for 2D playback $L1_{2D}$, $L2_{2D}$, and $L3_{2D}$ immediately succeed the end $L3_{SS}$ of the 3D extent block 2002 and can be accessed as a single 2D extent EXT2D[1]. As other characteristics of arrangement 2 are the same as arrangement 1, the description for arrangement 1 is referred to for a detailed description of such characteristics.

The blocks exclusively for 2D playback $L1_{2D}$, $L2_{2D}$, and $L3_{2D}$ located immediately before the layer boundary LB match bit-for-bit with the blocks exclusively for 3D playback $L1_{SS}$, $L2_{SS}$, and $L3_{SS}$ in the second 3D extent block 2002 match. In other words, the blocks exclusively for 2D playback $L1_{2D}$, $L2_{2D}$, and $L3_{2D}$ are duplicate data.

The data blocks shown in FIG. 24 can be accessed as an extent in either 2D file or DEP file, with the exception of the blocks exclusively for 3D playback $L1_{SS}$, $L2_{SS}$ and $L3_{SS}$. For example, in the file entry 2010 in the 2D file, the allocation descriptor #1 indicates the size and the LBN of the top of the base-view data block L0, the last in the first 3D extent block 2001. Accordingly, the base-view data block L0 can be accessed as one 2D extent EXT2D[0]. The allocation descriptor #2 considers a group of the base-view data blocks $L1_{2D}$+$L2_{2D}$+$L3_3D$. i.e. the blocks exclusively for 2D playback $L1_{2D}$, $L2_{2D}$, and $L3_3D$, to be a single extent and indicates the total size and the LBN of the top thereof. Accordingly, the group of the blocks exclusively for 2D playback $L1_{2D}$, $L2_{2D}$, and $L3_3D$ can be accessed as the next 2D extent EXT2D[1]. The base-view data blocks L1, $L2_{2D}$, and $L3_3D$ in the file 2D constitute an extent having a long contiguous length immediately before the position where a long jump occurs. Because the files 2D can form a big extent immediately before a long jump, underflow of the read buffers is not expected to occur even when performing playback in 2D playback mode. In the file entry 2011 in the 2D file, the allocation descriptor #1 indicates the size and the LBN of the top of the base-view data block L4, the first in the third 3D extent block 2003. Accordingly, the base-view data block L4 can be accessed as one 2D extent EXT2D[2] in the second 2D file.

In the file entry 2020 in the first file SS, the allocation descriptors #1, #2, #3, and #4 consider adjacent pairs of right-view data blocks and base-view data blocks R0+L0, R1+$L1_{SS}$, R2+$L2_{SS}$, and R3+$L3_{SS}$ to each be one extent and indicate the size and the LBN of the top thereof. Accordingly, each pair of adjacent data blocks R0+L0, . . . , R3+$L3_{SS}$ can be accessed respectively as a 3D extent EXTSS[0], EXTSS[1], EXTSS[2], and EXTSS[3] in the first file SS. In the file entry 2021 in the second file SS, the allocation descriptor #1 considers an adjacent pair R4+L4 of the right-view data block and the base-view data block to be a single extent and indicates the size and the LBN thereof. Accordingly, the adjacent pair of data blocks R4+L4 can be accessed as one 3D extent EXTSS[4] in the second file SS.

In this case, the blocks exclusively for 2D playback $L1_{2D}$, $L2_{2D}$, and $L3_{2D}$ are base-view data blocks unique to the file 2D and can only be accessed as part of the extent EXT2D[1] in the 2D file, the extent EXT2D[1] being located immediately before the layer boundary LB. Furthermore, the blocks exclusively for 3D playback $L1_{SS}$, $L2_{SS}$ and $L3_{SS}$ are base-view data blocks unique to the file SS and can only be accessed as part of the extents EXTSS[1], EXTSS[2], and EXTSS[3].

In FIG. 24, the 2D playlist and the 3D playlist both include playitems #1 and #2 which are seamlessly connected together.

First, description is given on data referred to by the preceding playitems in the 2D playlist and the 3D playlist.

The preceding playitem in the 2D PlayList refers to the first file 2D. The preceding playitem in the 3D PlayList refers to the first file SS, and the sub-playitem played back in synchronization with the preceding playitem refers to the file DEP. As described above, the content of the 2D extents EXT2D[0] and EXT2D[1] is the same as the content of the 3D extents EXTSS[0], EXTSS[1], EXTSS[2], and EXTSS[3]. Accordingly, in 2D playlist playback, the base-view data blocks $L1_{2D}$, $L2_{2D}$, and $L3_{2D}$ are played back at a position where playitems are seamlessly connected, while in 3D playlist playback, $L1_{SS}$, $L2_{SS}$, and $L3_{SS}$, which have the same content as L1, $L2_{2D}$, and $L3_{2D}$, are played back at a position where playitems are seamlessly connected. Thus, although the playback paths are different between the 2D playback based on the 2D playlist and the 3D playback based on the 3D playlist, the playback devices can play back the same data.

Next, description is given on data referred to by succeeding playitems. The succeeding playitem in the 2D PlayList refers to the second file 2D. The succeeding playitem in the 3D PlayList refers to the second file SS, and the sub-playitem played back in synchronization with the succeeding playitem of the 2D PlayList refers to the file DEP. As shown in the figure, the second file 2D and the second file SS use the same data, i.e. the base-view data block L4.

Here, the distance from the end of the pre-jump 2D extent EXT2D[0] referred to by the preceding playitem of the 2D PlayList to the head of the 2D extent EXT2D[1] referred to by the succeeding playitem, and the distance from the end of the pre-jump 2D extent EXT2D[1] referred to by the preceding playitem of the 2D PlayList to the head of the 2D extent EXT2D[2] referred to by the succeeding playitem are set to a value no greater than the maximum jump distance determined by a given specification based on the jump performance of the 2D playback device. In this case, the jump distance between the pre-jump 3D extent block 2002 referred to by the preceding playitem of the 3D PlayList and the 3D extent block 2003 referred to by the succeeding playitem of the 3D PlayList is set to a value no greater than the maximum distance determined by a given specification based on the jump performance of the 2D/3D playback device.

Figure 25:
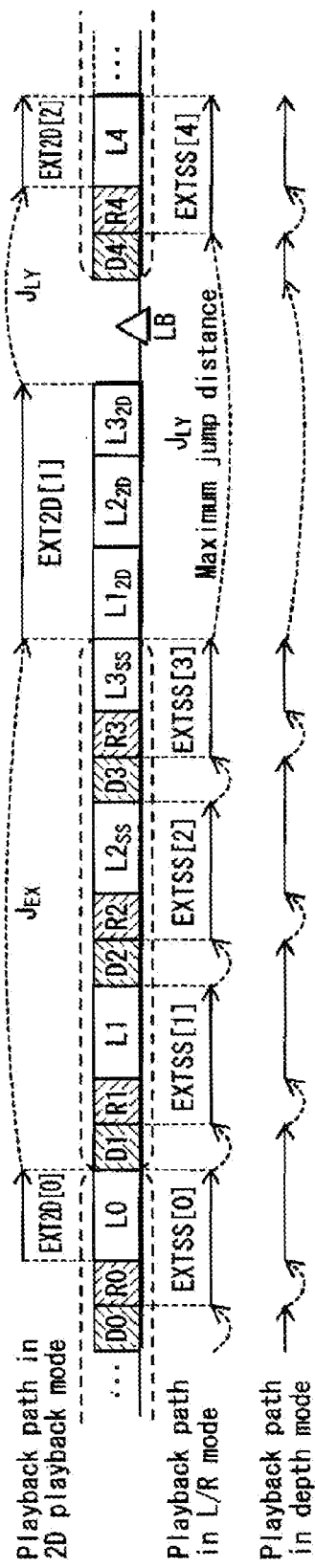
FIG. 25 is a schematic diagram showing the playback path in 2D playback mode and the playback path in L/R mode for the data block groups shown in FIG. 24.

FIG. 25 is a schematic diagram showing a playback path in 2D playback mode, a playback path in L/R mode, and a playback path in depth mode for the data block groups shown in FIG. 24.

In 2D playback mode, the playback device 200 plays back the 2D file. Accordingly, the base-view data block L0 is read as the first 2D extent EXT2D[0], the immediately subsequent blocks exclusively for 2D playback $L1_{2D}$, $L2_{2D}$ and $L3_{2D}$ are continuously read as the second 2D extent EXT2D[1], and after a long jump, the base-view data block L4 is read as the third 2D extent EXT2D[2].

In L/R mode, the playback device 200 plays back the first file SS. Accordingly, as shown by the playback path in L/R mode, a pair R0+L0 of the right-view data block R0 and the immediately subsequent base-view data block L0 is read as the first 3D extent EXTSS[0], the right-view data block R1 and the immediately subsequent block exclusively for 3D playback $L1_{SS}$ are read as the second 3D extent EXTSS[1], the right-view data block R2 and the immediately subsequent block exclusively for 3D playback $L2_{SS}$ are read as the third 3D extent EXTSS[2], the right-view data block R3 and the immediately subsequent block exclusively for 3D playback $L3_{SS}$ are read as the fourth 3D extent EXTSS[3], and after a long jump, the right-view data block R4 and the immediately subsequent block exclusively for 3D playback $L4_{SS}$ are read as the fifth 3D extent EXTSS[4].

As shown in FIG. 24, in 2D playback mode, the blocks exclusively for 2D playback $L1_{2D}$, $L2_{2D}$, and $L3_{2D}$ are read, while reading of the blocks exclusively for 3D playback $L1_{SS}$, $L2_{SS}$, and $L3_{SS}$ is skipped. Conversely, in L/R mode, reading of the blocks exclusively for 2D playback $L1_{2D}$, $L2_{2D}$, and $L3_{2D}$ is skipped, while the blocks exclusively for 3D playback $L1_{SS}$, $L2_{SS}$, and $L3_{SS}$ are read. However, since the data blocks $L1_{2D}$, $L2_{2D}$, and $L3_{2D}$ match bit-for-bit with $L1_{SS}$, $L2_{SS}$, and $L3_{SS}$, the left-view video frame that is played back is the same in both playback modes. In arrangement 2, the playback path in 2D playback mode and the playback path in L/R mode are divided before a long jump $J_{LY}$ in this way. The same is also true for depth mode.

First, the size $S_{ext2D}[1]$ of the pre-jump 2D extent EXT2D[1] is the same as the sum $S_{2D}[1]+S_{2D}[2]+S_2D[3]$ of the size $S_{2D}[1]$ of the block exclusively for 2D playback $L1_{2D}$, the size $S_2D[2]$ of the block exclusively for 2D playback $L2_{2D}$, and the size $S_2D[3]$ of the block exclusively for 2D playback $L3_{2D}$. Accordingly, for seamless playback in 2D playback mode, this sum $S_{2D}[1]+S_{2D}[2]+S_{2D}[3]$ should be greater than or equal to the data amount that is transmitted from the read buffer to the system target decoder between the start of reading of the 2D extent EXT2D[1] and the completion of the long jump $J_{LY}$. On the other hand, the sizes $S_{ext2}[1]$ $S_{ext2}[2]$, $S_{ext2}[3]$, $S_{ext2}[1]$ $S_{ext1}[2]$, and $S_{ext1}[3]$ of the right-view data blocks R1, R2, and R3 and the base-view data blocks L1, L2, and L3 belonging to the pre-jump 3D extent block 2002 located immediately before the block exclusively for 2D playback $L1_{2D}$ should be values such that the buffer margin amount can be maintained until immediately before the long jump $J_{LY}$. Since the block exclusively for 3D playback $L1_{SS}$ and the block exclusively for 2D playback $L1_{2D}$ are duplicate data, the block exclusively for 3D playback $L2_{SS}$ and the block exclusively for 2D playback $L2_{2D}$ are duplicate data, and the block exclusively for 3D playback $L3_{SS}$ and the block exclusively for 2D playback $L3_{2D}$ are duplicate data, enlarging the total size $S_{2D}[1]+S_{2D}[2]+S_{2D}[3]$ of the blocks exclusively for 2D playback $L1_{2D}$, $L2_{2D}$, and $L3_{2D}$ enlarges the size of the right-view data blocks R1, R2, and R3 located immediately before the blocks exclusively for 3D playback $L1_{SS}$, $L2_{SS}$, and $L3_{SS}$. However, because the blocks exclusively for 3D playback are divided into three blocks, i.e. $L1_{SS}$, $L2_{SS}$, and $L3_{SS}$, and constitute pairs with the right view data blocks, the sizes of the right-view data blocks R1, R2, and R3 can be made sufficiently smaller than the size of the right-view data block R2 located immediately before the layer boundary LB shown in FIG. 22. In this way, the read buffer capacity to be guaranteed in the playback device 200 in L/R mode can be reduced to the minimum necessary for seamless playback in L/R mode.

It is possible to thus set each data block in arrangement 2 to be a size at which seamless playback of video images during a long jump is possible in both 2D playback mode and L/R mode while keeping the read buffer amount that is to be guaranteed in the playback device 200 to the minimum necessary.

In arrangement 2, the playback path in 2D playback mode and the playback path in L/R mode are divided before a position where a long jump occurs, in this way. Accordingly, the size of EXT1[3] at the end of the pre-jump 3D extent block does not need to satisfy the condition for preventing buffer underflow in 2D playback mode.

In the explanation of FIG. 24, a layer boundary has been described as an example of a position requiring a long jump. However, arrangement 2 can also be applied to a long jump that occurs in a one-to-n multi-connection of playitems. Specifically, for a preceding playitem, as is the allocation shown in FIG. 24, data are divided for the playback path of the 2D playlist and the playback path of the 3D playlist, and subsequently, n pieces of data referred to by a succeeding playitem are arranged. This allocation allows creation of data for a multi-connection where a preceding playitem seamlessly connects to a plurality of playitems.

[Arrangement 3]

Figure 26:
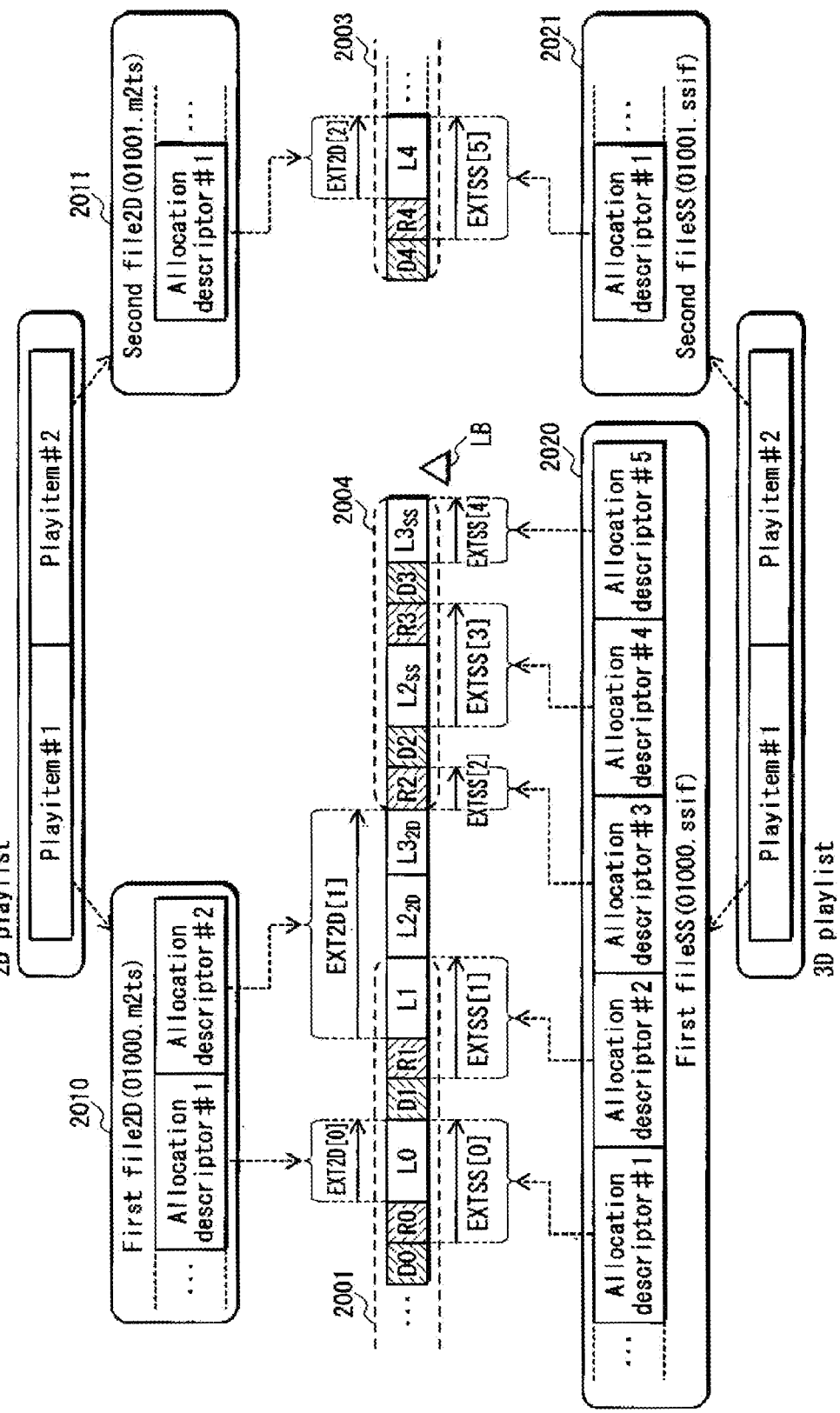
FIG. 26 is a schematic diagram showing a third example of a physical arrangement of the data block groups recorded before and after a layer boundary in a recording medium 100.

FIG. 26 is a schematic diagram showing a third example of a physical arrangement of the data block groups recorded before and after a layer boundary in a recording medium 100.

These data block groups in FIG. 26 belong to the main TS that includes the left-view video stream, sub-TS that includes the right-view video stream, and sub-TS that includes the depth map stream. Hereinafter, this arrangement is referred to as "arrangement 3". As seen by comparing FIG. 26 with FIG. 20, arrangement 3 differs from arrangement 1 only in that the pre-jump 3D extent block 2004 replaces the pre-jump 3D extent block 2002. As other characteristics of arrangement 3 are the same as arrangement 1, the description for arrangement 1 is referred to for a detailed description of such characteristics.

The interleaved arrangement of the pre-jump 3D extent block 2004 differs from interleaved arrangements of other 3D extent blocks in that the arranging order of the depth map data block and the right-view data block are opposite, that is to say, the right-view data block, the depth map data block, and the left-view data block are alternately recorded in that order. As is the case with arrangement 1, the blocks exclusively for 3D playback $L2_{SS}$ and $L3_{SS}$ included in the pre-jump 3D extent block 2004 match bit-for-bit with the blocks exclusively for 2D playback $L2_{2D}$ and $L3_{2D}$.

Figure 27:
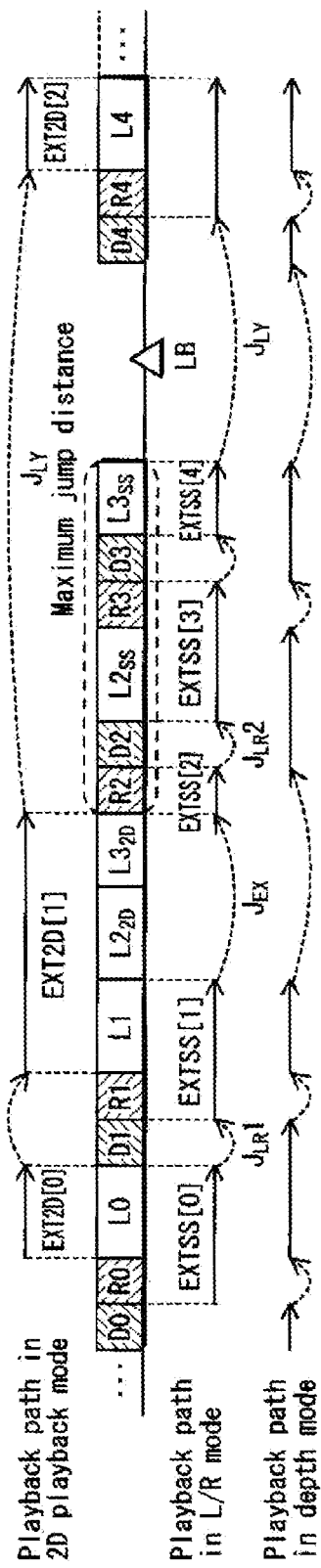
FIG. 27 is a schematic diagram showing the playback path in 2D playback mode and the playback path in L/R mode for the data block groups shown in FIG. 26.

In the playback path in L/R mode in arrangement 3, as shown in FIG. 27, data blocks are accessed in the following order: the 3D extent EXTSS[0] constituted from a pair of the right-view data block R0 and the left-view data block L0; the 3D extent EXTSS[1] constituted from a pair of the right-view data block R1 and the left-view data block L1; the 3D extent EXTSS[2] constituted only from the right-view data block R2; the 3D extent EXTSS[3] constituted from a pair of the left-view data block $L2_{SS}$ and the right-view data block R3; and the 3D extent EXTSS[4] constituted only from the left-view data block $L3_{SS}$.

With this arrangement, in arrangement 3, as is the case with arrangement 1, the playback path in 2D playback mode and the playback path in L/R mode are divided before a position where a long jump occurs. Accordingly, the size of EXT1[3] at the end of the pre-jump 3D extent block does not need to satisfy the condition for preventing buffer underflow in 2D playback mode. Also, as is the case with arrangement 1, arrangement 3 can also be applied to a long jump that occurs in a one-to-n multi-connection of playitems, allowing creation of data for a multi-connection where a preceding playitem seamlessly connects to a plurality of playitems.

In addition to these, in arrangement 3, a buffer margin amount required for seamless connection when playing back 3D images in both depth and L/R modes can be suppressed. Consequently, the size of a read buffer required for the 2D/3D playback device to play back 3D images in both depth and L/R modes can be reduced compared to when playing back the data of arrangement 1. Specific amounts of reduction of the buffer amount margin will be described later.

It should be noted that in FIG. 26, the right-view data block, the depth map data block, and the left-view data block are alternately recorded in that order in the pre-jump 3D extent block 2004, while the depth map data block, the right-view data block, and the left-view data block are alternately recorded in that order. Arrangement 3, however, is characterized in that the depth map data block and the right-view data block in the interleaved arrangement of the pre-jump 3D extent block are arranged opposite to those in other 3D extent blocks. Accordingly, for example, in a case where the right-view data block, the depth map data block, and the left-view data block are alternately arranged in the interleaved arrangement in that order, it is preferable that the data blocks be arranged in the alternate order of the depth map data block, the right-view data block, and the left-view data block in the pre-jump 3D extent block.

[Arrangement 4]

Figure 28:
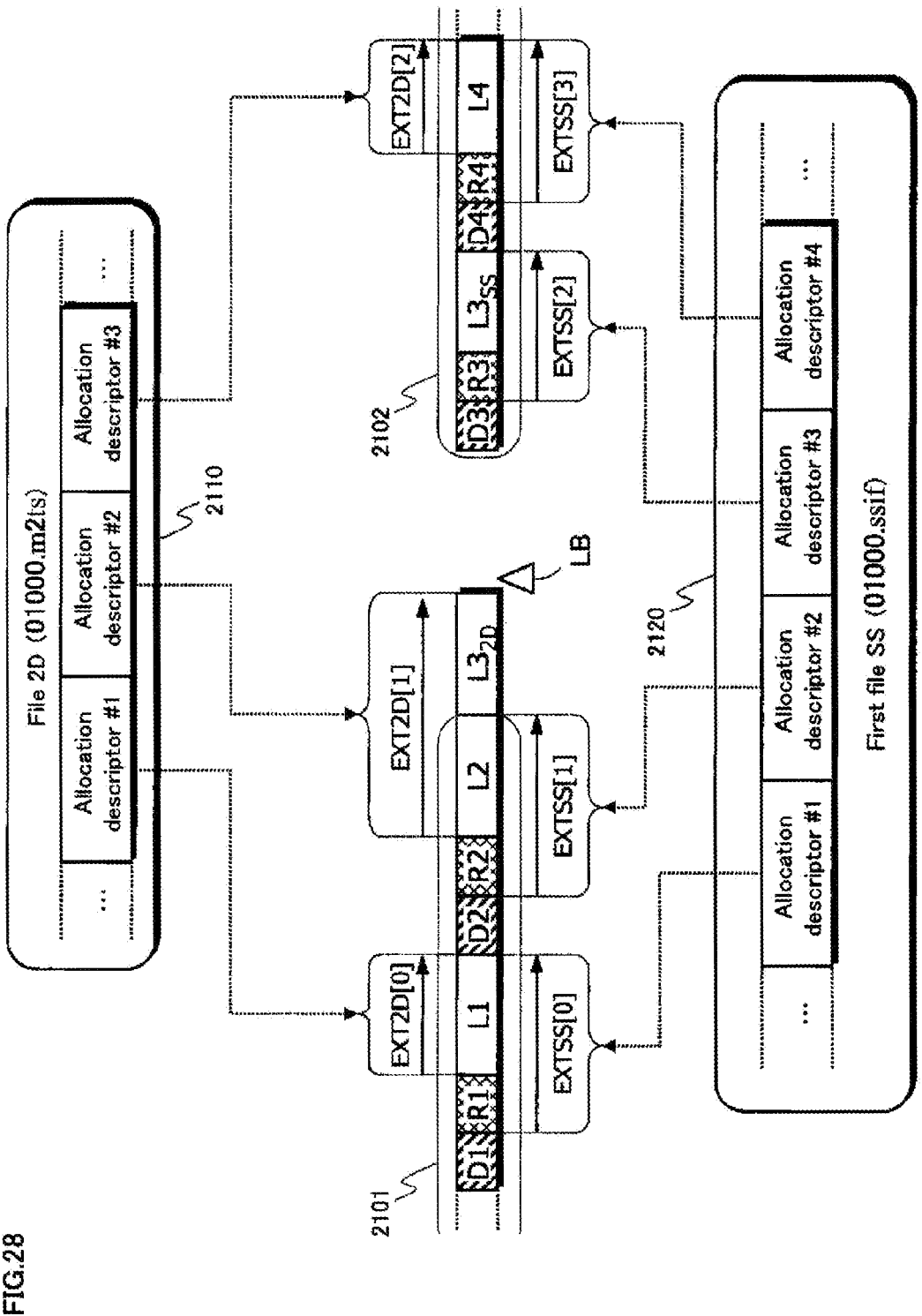
FIG. 28 is a schematic diagram showing a fourth example of a physical arrangement of the data block groups recorded before and after a layer boundary in a recording medium 100.

FIG. 28 is a schematic diagram showing a fourth example of a physical arrangement of the data block groups recorded before and after a layer boundary in a recording medium 100. These data block groups belong to the main TS that includes the left-view video stream, first sub-TS that includes the right-view video stream, and second sub-TS that includes the depthmap stream. Hereinafter, this arrangement is referred to as "arrangement 4". As shown in FIG. 28, on the first recording layer located before the layer boundary LB, the depth map data block group . . . , D1, D2, the right-view data block group . . . , R1, R2, and the base-view data block group . . . , L1, L2 are recorded in an interleaved arrangement. Hereinafter, these data block groups are referred to as the "first 3D extent block" 2001. Furthermore, one base-view data block $L3_{2D}$ is placed between the end L2 of the first 3D extent block 2001 and the layer boundary LB. On the other hand, on the second recording layer located after the layer boundary LB, the depth map data block group D3, D4, . . . , the right-view data block group R3, R4, . . . , and the base-view data block group $L3_{SS}$, L4, . . . are recorded in an interleaved arrangement. Hereinafter, these data block groups are referred to as the "second 3D extent block" 2102.

The interleaved arrangement for 3D extent blocks 2001 and 2102 is the same as the one shown in FIG. 15. In other words, a depth map data block, right-view data block, and base-view data block are alternately arranged in that order. Furthermore, between three consecutive data blocks Dn, Rn, Ln (n= . . . , 1, 2, 3, 4, the extent ATC time is the same. The content of each piece of stream data is continuous between the three data blocks D2, R2, and L2 located at the end of the first 3D extent block 2001 and the three data blocks D3, R3, $L3_{SS}$ located at the top of the second 3D extent block 2102.

The base-view data block $L3_{2D}$ located immediately before the layer boundary LB matches bit-for-bit with the base-view data block $L3_{SS}$ at the top of the second 3D extent block 2102. In other words, the data blocks $L3_{2D}$ and $L3_{SS}$ are duplicate data. Hereinafter, $L3_{2D}$ is referred to as a "block exclusively for 2D playback", and $L3_{SS}$ is referred to as a "block exclusively for 3D playback".

The data blocks shown in FIG. 28 can be accessed as an extent in either 2D file or DEP file, with the exception of the block exclusively for 3D playback $L3_{SS}$. For example, in the file entry 2110 in the 2D file (01000.m2ts), the allocation descriptor #1 indicates the size and the LBN of the top of the base-view data block L1, which is second from the end of the first 3D extent block 2001. Accordingly, the base-view data block L1 can be accessed as one 2D extent EXT2D[0] in the 2D file. The allocation descriptor #2 considers the pair L2+$L3_{2D}$, i.e. the base-view data block L2, the last in the first 3D extent block 2001, and the immediately subsequent block exclusively for 2D playback $L3_{2D}$, to be a single extent and indicates the size and the LBN of the top thereof. Accordingly, the pair of base-view data blocks L2+$L3_{2D}$ can be accessed as one 2D extent EXT2D[1] in the 2D file. Furthermore, the allocation descriptor #3 indicates the size and the LBN of the top of the second base-view data block L4 in the second 3D extent block 2102. Accordingly, the base-view data block L4 can be accessed as a different 2D extent EXT2D [2].

Cross-linking of the AV stream files is performed the same way as in FIG. 15 for the data block groups shown in FIG. 21. In particular, in the file entry 2120 in the first file SS, the allocation descriptors #1, #2, #3, and #4 consider adjacent pairs of right-view data blocks and base-view data blocks R1+L1, R2+L2, R3+L3$_{SS}$, and R4+L4 to each be one extent and indicate the size and the LBN of the top thereof. Accordingly, each pair of adjacent data blocks R1+L1, R2+L2, R3+L3$_{SS}$, and R4+L4 can be accessed respectively as a 3D extent EXTSS[0], EXTSS[1], EXTSS[2], and EXTSS[3] in the first file SS. In this case, with the exception of the 3D extent EXTSS[2] immediately after the layer boundary LB, the 3D extents EXTSS[0], EXTSS[1], and EXTSS[3] respectively share base-view data blocks L1, L2, and L4 with the 2D file. On the other hand, the block exclusively for 2D playback L3$_{2D}$ can only be accessed as part of the extent EXT2D[1] in the 2D file, the extent EXT2D[1] being located immediately before the layer boundary LB. Furthermore, the block exclusively for 3D playback L3$_{SS}$ can only be accessed as part of the extent EXTSS[2], located immediately after the layer boundary LB.

Figure 29:
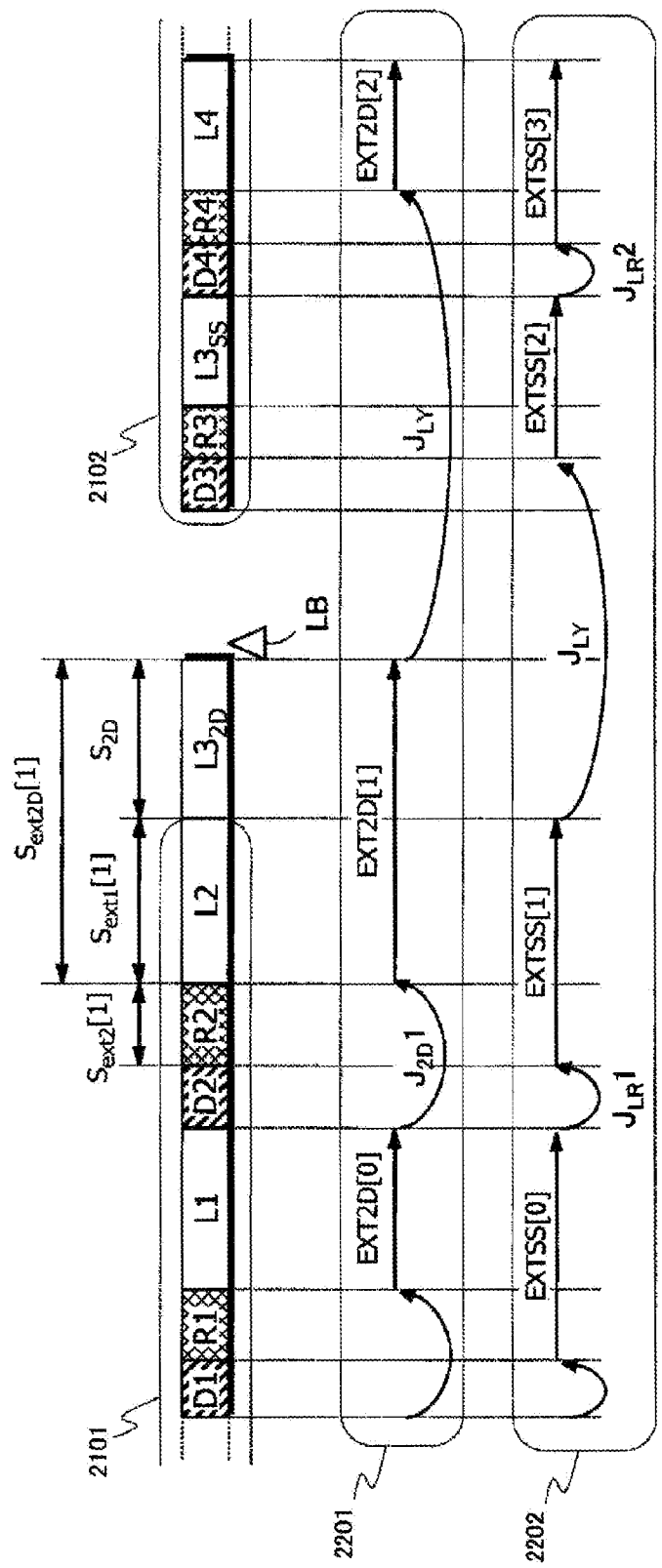
FIG. 29 is a schematic diagram showing the playback path in 2D playback mode and the playback path in L/R mode for the data block groups shown in FIG. 28.

FIG. 29 is a schematic diagram showing the playback path 2201 in 2D playback mode and the playback path 2202 in L/R mode for the data block groups shown in FIG. 28. Note that a person of ordinary skill in the art can easily infer by analogy the playback path in depth mode from the arrangement shown in FIG. 15.

In 2D playback mode, the playback device 200 plays back the 2D file. Accordingly, as shown by the playback path 2201 in 2D playback mode, first the base-view data block L1, which is second from the end of the first 3D extent block 2001, is read as the first 2D extent EXT2D[0], and reading of the immediately subsequent depth map data block D2 and right-view data block R2 is skipped by a first jump $J_{2D}1$. Next, a pair L2+L3$_{2D}$ of the base-view data block L2, located last in the first 3D extent block 2001, and the immediately subsequent block exclusively for 2D playback L3$_{2D}$ is continuously read as the second 2D extent EXT2D[1]. A long jump $J_{LY}$ occurs at the immediately subsequent layer boundary LB, and along with performance of a focus jump, reading of the five data blocks D3, R3, L3$_{SS}$, D4, and R4, located at the top of the second 3D extent block 2102, is skipped. Next, the second base-view data block L4 in the second 3D extent block 2102 is read as the third 2D extent EXT2D[2].

In L/R mode, the playback device 200 plays back the first file SS. Accordingly, as shown by the playback path 2202 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump $J_{LR}1$. Next, the second right-view data block R2 and the immediately subsequent base-view data block L2 are read continuously as the second 3D extent EXTSS[1]. A long jump $J_{LY}$ occurs immediately thereafter, and along with performance of a focus jump, reading of the block exclusively for 2D playback L3$_{2D}$ and the top depth map data block D3 in the second 3D extent block 2102 is skipped. Next, the top right-view data block R3 in the second 3D extent block 2102 and the immediately subsequent block exclusively for 3D playback L3$_{SS}$ are read continuously as the third 3D extent EXTSS[2], and reading of the immediately subsequent depth map data block D4 is skipped by a second jump $J_{LR}2$. Furthermore, the next right-view data block R4 and the immediately subsequent base-view data block L4 are read continuously as the fourth 3D extent EXTSS[3].

As shown in FIG. 29, in 2D playback mode, the block exclusively for 2D playback L3$_{2D}$ is read, while reading of the block exclusively for 3D playback L3$_{SS}$ is skipped. Conversely, in L/R mode, reading of the block exclusively for 2D playback L3$_{2D}$ is skipped, while the block exclusively for 3D playback L3$_{SS}$ is read. However, since the data blocks L3$_{2D}$ and L3$_{SS}$ match bit-for-bit, the left-view video frame that is played back is the same in both playback modes. In arrangement 4, the playback path 2201 in 2D playback mode and the playback path 2202 in L/R mode are divided before and after a long jump $J_{LY}$ in this way. The same is also true for depth mode.

In arrangement 4 shown in FIG. 29, the playback path 2201 in 2D playback mode and the playback path 2202 in L/R mode are divided before and after the long jump $J_{LY}$ in this way. Accordingly, unlike the arrangement shown in FIG. 22, the size $S_{ext2D}[1]$ of the 2D extent EXT2D[1] located immediately before the layer boundary LB and the size $S_{ext2}[1]$ of the immediately preceding right-view data block R2 can be determined separately as below.

First, the size $S_{ext2D}[1]$ of the 2D extent EXT2D[1] is the same as the sum $S_{ext1}[1]+S_{2D}$ of the size $S_{ext1}[1]$ of the base-view data block L2 and the size $S_{2D}$ of the block exclusively for 2D playback L3$_{2D}$. Accordingly, for seamless playback in 2D playback mode, this sum $S_{ext1}[1]+S_{2D}$ should be greater than or equal to the data amount that is transmitted from the read buffer to the system target decoder between the start of reading of the 2D extent EXT2D[1] and the completion of the long jump $J_{LY}$. On the other hand, the sizes $S_{ext2}[1]$ and $S_{ext1}[1]$ of the right-view data block R2 and the base-view data block L2 belonging to the 3D extent EXTSS[1] located immediately before the layer boundary LB should be values such that the buffer margin amount can be maintained until immediately before the long jump $J_{LY}$. In this case, within the 2D extent EXT2D[1], only the base-view data block L2 located earlier in the extent is shared with the 3D extent EXTSS[1]. Accordingly, by appropriately enlarging the size $S_{2D}$ of the block exclusively for 2D playback L3$_{2D}$, the size $S_{ext1}[1]$ of the base-view data block L2 can be further limited while keeping the size $S_{ext2D}[1]=S_{ext1}[1]+S_{2D}$ of the 2D extent EXT2D[1] constant. Correspondingly, the size $S_{ext2}[1]$ of the right-view data block R2 can also be further limited.

In this case, since the block exclusively for 3D playback L3$_{SS}$ and the block exclusively for 2D playback L3$_{2D}$ are duplicate data, enlarging the size $S_{2D}$ of the block exclusively for 2D playback L3$_{2D}$ enlarges the size of the right-view data block R3 located immediately before the block exclusively for 3D playback L3$_{SS}$. However, the size thereof can be made sufficiently smaller than the size of the right-view data block R3 located immediately before the layer boundary LB shown in FIG. 22. In this way, the read buffer amount to be guaranteed in the playback device 200 in L/R mode can be further reduced to the minimum necessary for seamless playback in L/R mode.

It is possible to thus set each data block in arrangement 4 to be a size at which seamless playback of video images during the long jump is possible in both 2D playback mode and L/R mode while keeping the buffer amount that is to be guaranteed in the read buffer in the playback device 200 to the minimum necessary. Furthermore, changing the data block that is to be read in 2D playback mode and L/R mode, in particular switching between a block exclusively for 2D playback L3$_{2D}$ and blocks exclusively for 3D playback L3$_{SS}$, is possible simply by switching the AV stream file for playback between the file 2D and the file SS.

[Arrangement 5]

Figure 30:
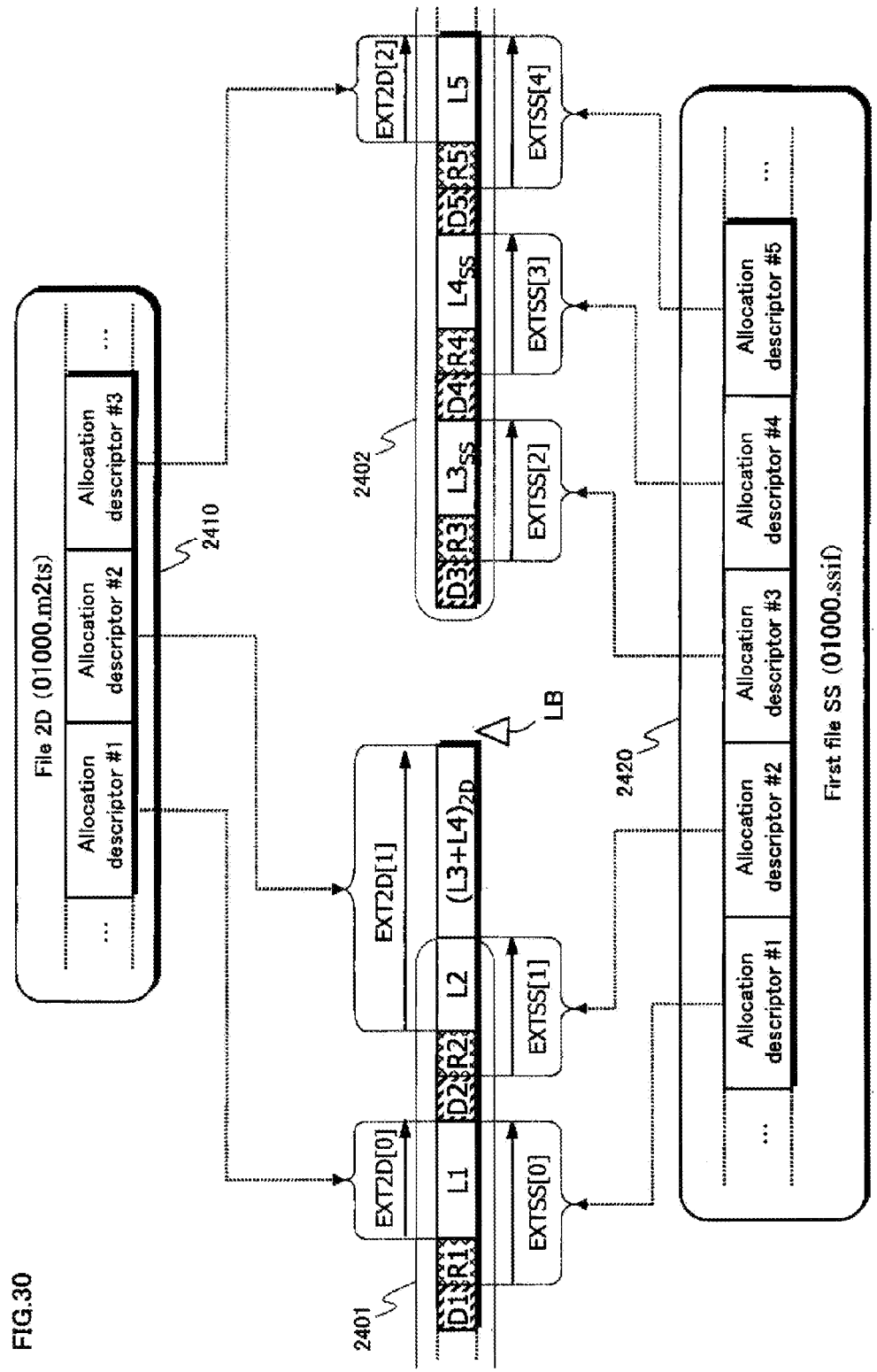
FIG. 30 is a schematic diagram showing a fifth example of a physical arrangement of the data block groups recorded before and after a layer boundary in a recording medium 100.

FIG. 30 is a schematic diagram showing a fifth example of a physical arrangement of the data block groups recorded before and after a layer boundary in a recording medium 100.

These data block groups belong to the main TS that includes the left-view video stream, first sub-TS that includes the right-view video stream, and second sub-TS that includes the depth map stream. Hereinafter, this arrangement is referred to as "arrangement 5". As seen by comparing FIG. 30 with FIG. 28, arrangement 5 differs from arrangement 4 only in that two blocks exclusively for 3D playback $L3_{SS}$ and $L4_{SS}$ are provided at the top of the second 3D extent block 2402. As other characteristics of arrangement 5 are the same as arrangement 4, the description for arrangement 1 is referred to for a detailed description of such characteristics.

The block exclusively for 2D playback $(L3+L4)_{2D}$ located immediately before the layer boundary LB matches bit-for-bit with the pair of blocks exclusively for 3D playback $L3_{SS}$ and $L4_{SS}$ in the 3D extent block 2402. In other words, the block exclusively for 2D playback $(L3+L4)_{2D}$ and the blocks exclusively for 3D playback $L3_{SS}$ and $L4_{SS}$ are duplicate data.

The data blocks shown in FIG. 30 can be accessed as an extent in either a file 2D or a file DEP, with the exception of the blocks exclusively for 3D playback $L3_{SS}$ and $L4_{SS}$. For example, in the file entry 2410 in the file 2D, the allocation descriptor #1 indicates the size and the LBN of the top of the base-view data block L1, which is second from the end of the first 3D extent block 2401. Accordingly, the base-view data block L1 can be accessed as one 2D extent EXT2D[0] in the file 2D. The allocation descriptor #2 considers the pair L2+$(L3+L4)_{2D}$, i.e. the base-view data block L2, the last in the first 3D extent block 2401, and the immediately subsequent block exclusively for 2D playback $(L3+L4)_{2D}$, to be a single extent and indicates the size and the LBN of the top thereof. Accordingly, the pair of base-view data blocks L2+$(L3+L4)_{2D}$ can be accessed as one 2D extent EXT2D[1] in the file 2D. Furthermore, the allocation descriptor #3 indicates the size and the LBN of the top of the third base-view data block L5 in the second 3D extent block 2402. Accordingly, the base-view data block L5 can be accessed as a different 2D extent EXT2D[2].

In the file entry 2420 in the first file SS, the allocation descriptors #1, #2, #3, #4, and #5 consider adjacent pairs of right-view data blocks and base-view data blocks R1+L1, R2+L2, R3+$L3_{SS}$, R4+$L4_{SS}$, and R5+L5 to each be one extent and indicate the size and the LBN of the top thereof. Accordingly, each pair of adjacent data blocks R1+L1, . . . , R5+L5 can be accessed respectively as a 3D extent EXTSS[0], EXTSS[1], EXTSS[2], EXTSS[3], and EXTSS[4] in the first file SS. The block exclusively for 2D playback $(L3+L4)_{2D}$ can only be accessed as part of the extent EXT2D[1] in the file 2D, and the blocks exclusively for 3D playback $L3_{SS}$ and $L4_{SS}$ can only be accessed as part of the 3D extents EXTSS[2] and EXTSS[3].

Figure 31:
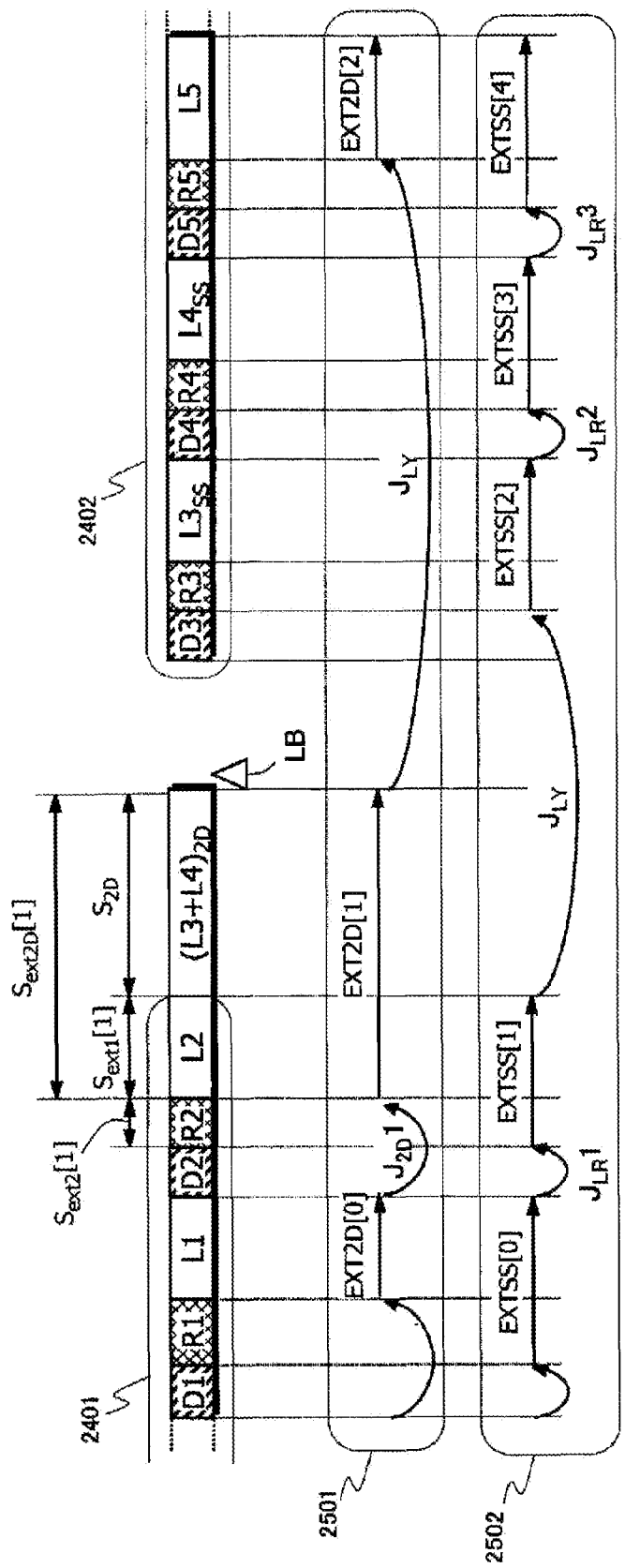
FIG. 31 is a schematic diagram showing the playback path in 2D playback mode and the playback path in L/R mode for the data block groups shown in FIG. 30.

FIG. 31 is a schematic diagram showing the playback path 2501 in 2D playback mode and the playback path 2502 in L/R mode for the data block group shown in FIG. 30. Note that a person of ordinary skill in the art can easily infer by analogy the playback path in depth mode from the arrangement shown in FIG. 15.

In 2D playback mode, the playback device 200 plays back the file 2D. Accordingly, as shown by the playback path 2501 in 2D playback mode, first the base-view data block L1, which is second from the end of the first 3D extent block 2401, is read as the first 2D extent EXT2D[0], and reading of the immediately subsequent depth map data block D2 and right-view data block R2 is skipped by the first jump $J_{2D}1$. Next, a pair L2+$(L3+L4)_{2D}$ of the base-view data block L2, located last in the first 3D extent block 2401, and the immediately subsequent block exclusively for 2D playback $(L3+L4)_{2D}$ is continuously read as the second 2D extent EXT2D[1]. The long jump $J_{LY}$ occurs at the immediately subsequent layer boundary LB, and along with performance of a focus jump, reading of the eight data blocks D3, R3, $L3_{SS}$, D4, R4, $L4_{SS}$, D5, and R5, located at the top of the second 3D extent block 2402, is skipped. Next, the third base-view data block L5 in the second 3D extent block 2402 is read as the third 2D extent EXT2D[2].

In L/R mode, the playback device 200 plays back the first file SS. Accordingly, as shown by the playback path 2502 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by the first jump $J_{LR}1$. Next, the second right-view data block R2 and the immediately subsequent base-view data block L2 are read continuously as the second 3D extent EXTSS[1]. The long jump $J_{LY}$ occurs immediately thereafter, and along with performance of a focus jump, reading of the block exclusively for 2D playback $(L3+L4)_{2D}$ and the top depth map data block D3 in the second 3D extent block 2402 is skipped. Next, the top right-view data block R3 in the second 3D extent block 2402 and the immediately subsequent block exclusively for 3D playback $L3_{SS}$ are read continuously as the third 3D extent EXTSS[2], and reading of the immediately subsequent depth map data block D4 is skipped by a second jump $J_{LR}2$. Similarly, the next right-view data block R4 and the immediately subsequent block exclusively for 3D playback $L4_{SS}$ are read continuously as the fourth 3D extent EXTSS[3], and reading of the immediately subsequent depth map data block D5 is skipped by a third jump $J_{LR}3$. Furthermore, the next right-view data block R5 and the immediately subsequent base-view data block L5 are read continuously as the fifth 3D extent EXTSS[4].

As shown in FIG. 31, in 2D playback mode, the block exclusively for 2D playback $(L3+L4)_{2D}$ is read, while reading of the blocks exclusively for 3D playback $L3_{SS}$ and $L4_{SS}$ is skipped. Conversely, in L/R mode, reading of the block exclusively for 2D playback $(L3+L4)_{2D}$ is skipped, while the blocks exclusively for 3D playback $L3_{SS}$ and $L4_{SS}$ are read. However, since the block exclusively for 2D playback $(L3+L4)_{2D}$ and the blocks exclusively for 3D playback $L3_{SS}$ and $L4_{SS}$ match bit-for-bit, the left-view video frames that are played back are the same in both playback modes. In arrangement 5, the playback path 2501 in 2D playback mode and the playback path 2502 in L/R mode are divided before and after the long jump $J_{LY}$ in this way. Accordingly, the size $S_{ext2D}[1]$ of the 2D extent EXT2D[1] located immediately before the layer boundary LB and the size $S_{ext2}[1]$ of the immediately preceding right-view data block R2 can be determined separately as below. Note that the same is also true for depth mode.

First, the size $S_{ext2D}[1]$ of the 2D extent EXT2D[1] is the same as the sum $S_{ext1}[1]+S_{2D}$ of the size $S_{ext1}[1]$ of the base-view data block L2 and the size $S_{2D}$ of the block exclusively for 2D playback $(L3+L4)_{2D}$. Accordingly, for seamless playback in 2D playback mode, this sum $S_{ext1}[1]+S_{2D}$ should be greater than or equal to the data amount that is transmitted from the read buffer to the system target decoder between the start of reading of the 2D extent EXT2D[1] and the completion of the long jump $J_{LY}$. On the other hand, the sizes $S_{ext2}[1]$ and $S_{ext1}[1]$ of the right-view data block R2 and the base-view data block L2 belonging to the 3D extent EXTSS[1] located immediately before the layer boundary LB should be values such that the buffer margin amount can be maintained until immediately before the long jump $J_{LY}$. By appropriately enlarging the size $S_{2D}$ of the block exclusively for 2D playback $(L3+L4)_{2D}$, the size $S_{ext1}[1]$ of the base-view data block L2 can be further limited while keeping the size $S_{ext2D}[1]=$ $S_{ext1}[1]+S_{2D}$ of the 2D extent EXT2D[1] constant. Correspondingly, the size $S_{ext2}[1]$ of the right-view data block R2 can also be further limited.

In this case, since the blocks exclusively for 3D playback $L3_{SS}$ and $L4_{SS}$ and the block exclusively for 2D playback $(L3+L4)_{2D}$ are duplicate data, enlarging the size $S_{2D}$ of the block exclusively for 2D playback $(L3+L4)_{2D}$ enlarges the size of the right-view data blocks R3 and R4 located immediately before the blocks exclusively for 3D playback $L3_{SS}$ and $L4_{SS}$. However, as compared to one block exclusively for 2D playback $(L3+L4)_{2D}$, since the block exclusively for 3D playback is divided into two blocks, $L3_{SS}$ and $L4_{SS}$, the size of each can be made sufficiently smaller than the size of the right-view data block R3 located immediately before the layer boundary LB shown in FIG. 22. In this way, the read buffer amount to be guaranteed in the playback device 200 in L/R mode can be further reduced to the minimum necessary for seamless playback in L/R mode.

It is possible to thus set each data block in arrangement 5 to be a size at which seamless playback of video images during the long jump is possible in both 2D playback mode and L/R mode while keeping the buffer amount that is to be guaranteed in the decoder in the playback device 200 to the minimum necessary. Furthermore, changing the data block that is to be read in 2D playback mode and L/R mode, in particular switching between a block exclusively for 2D playback $(L3+L4)_{2D}$ and blocks exclusively for 3D playback $L3_{SS}$ and $L4_{SS}$, is possible simply by switching the AV stream file for playback between the file 2D and the file SS. Note that the same is also true for depth mode.

In arrangement 5, the duplicate data for the block exclusively for 2D playback $(L3+L4)_{2D}$ is set as two blocks exclusively for 3D playback $L3_{SS}$ and $L4_{SS}$. Alternatively, the duplicate data can be set as three or more blocks exclusively for 3D playback.

[Arrangement 6]

Figure 32:
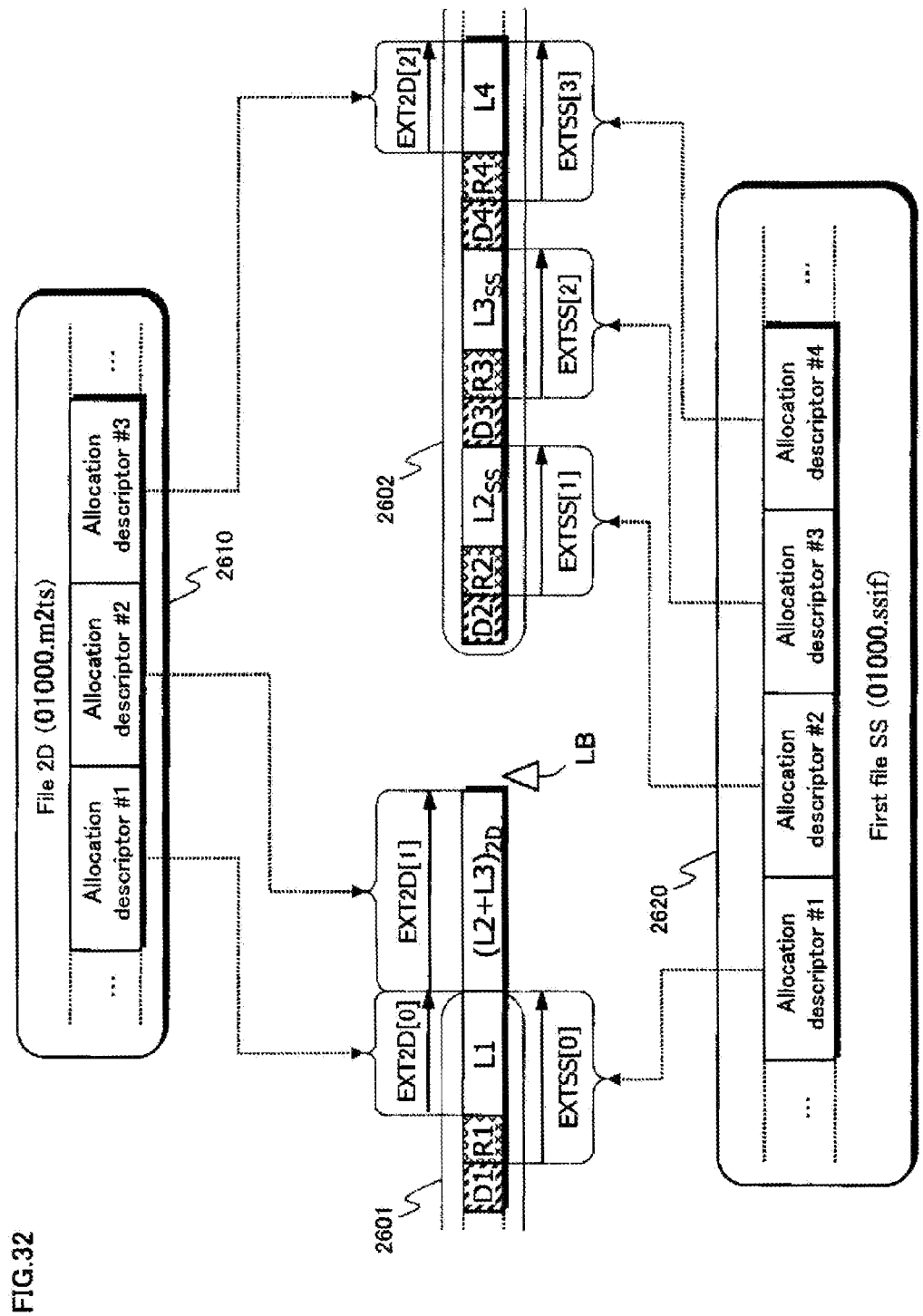
FIG. 32 is a schematic diagram showing a sixth example of a physical arrangement of the data block groups recorded before and after a layer boundary in a recording medium 100.

FIG. 32 is a schematic diagram showing a sixth example of a physical arrangement of the data block groups recorded before and after a layer boundary in the recording medium 100. These data block groups belong to the main TS that includes the left-view video stream, first sub-TS that includes the right-view video stream, and second sub-TS that includes the depthmap stream. Hereinafter, this arrangement is referred to as "arrangement 6". As seen by comparing FIG. 32 and FIG. 30, arrangement 6 differs from arrangement 5 in that the block exclusively for 2D playback $(L2+L3)_{2D}$ can be accessed as a single 2D extent EXT2D[1]. Since other characteristics of arrangement 6 are the same as arrangement 5, the description for arrangement 5 is referred to for a detailed description of such characteristics.

The block exclusively for 2D playback $(L2+L3)_{2D}$ located immediately before the layer boundary LB matches bit-for-bit with the pair of blocks exclusively for 3D playback $L2_{SS}$ and $L3_{SS}$ in the 3D extent block 2602. In other words, the block exclusively for 2D playback $(L2+L3)_{2D}$ and the blocks exclusively for 3D playback $L2_{SS}$ and $L3_{SS}$ are duplicate data.

The data blocks shown in FIG. 32 can be accessed as an extent in either a file 2D or a file DEP, with the exception of the two blocks exclusively for 3D playback $L2_{SS}$ and $L3_{SS}$. For example, in the file entry 2610 in the file 2D, the allocation descriptor #1 indicates the size and the LBN of the top of the base-view data block L1, the last data block in the first 3D extent block 2601. Accordingly, the base-view data block L1 can be accessed as one 2D extent EXT2D[0]. The allocation descriptor #2 considers the block exclusively for 2D playback $(L2+L3)_{2D}$ to be a single extent and indicates the size and the LBN of the top thereof. Accordingly, the block exclusively for 2D playback $(L2+L3)_{2D}$ can be accessed as the next 2D extent EXT2D[1]. The allocation descriptor #3 indicates the size and the LBN of the top of the third base-view data block L4 in the second 3D extent block 2602. Accordingly, the base-view data block L4 can be accessed as the third 2D extent EXT2D[2].

In the file entry 2620 in the first file SS, the allocation descriptors #1, #2, #3, and #4 consider adjacent pairs of right-view data blocks and base-view data blocks R1+L1, $R2+L2_{SS}$, $R3+L3_{SS}$, and R4+L4 to each be one extent and indicate the size and the LBN of the top thereof. Accordingly, each pair of adjacent data blocks R1+L1, . . . , R4+L4 can be accessed respectively as a 3D extent EXTSS[0], EXTSS[1], EXTSS[2], and EXTSS[3] in the first file SS. The block exclusively for 2D playback $(L2+L3)_{2D}$ can only be accessed as part of the extent EXT2D[1] in the file 2D, and the blocks exclusively for 3D playback $L2_{SS}$ and $L3_{SS}$ can only be accessed as part of the extents EXTSS[1] and EXTSS[2].

Figure 33:
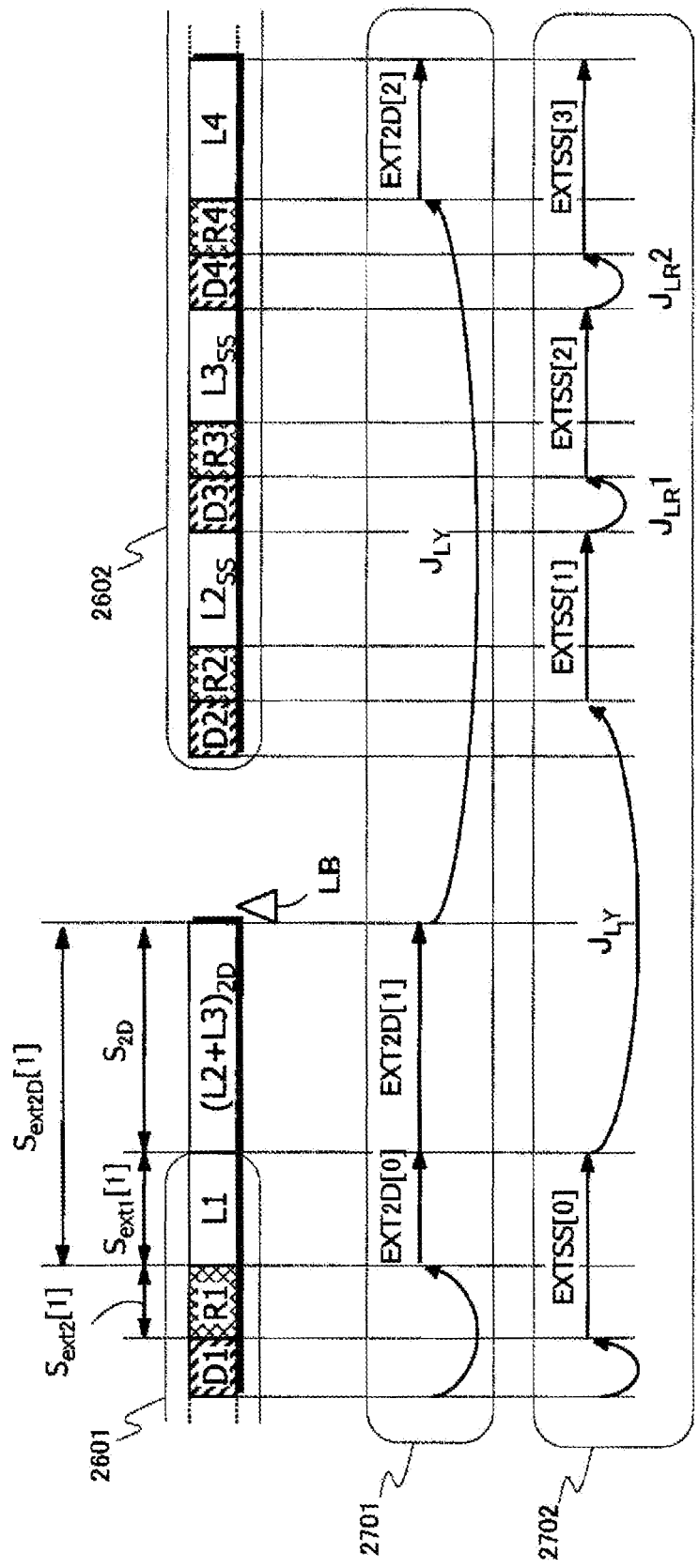
FIG. 33 is a schematic diagram showing the playback path in 2D playback mode and the playback path in L/R mode for the data block groups shown in FIG. 32.

FIG. 33 is a schematic diagram showing the playback path 2701 in 2D playback mode and the playback path 2702 in L/R mode for the data block group shown in FIG. 32. Note that a person of ordinary skill in the art can easily infer by analogy the playback path in depth mode from the arrangement shown in FIG. 15.

In 2D playback mode, the playback device 200 plays back the file 2D. Accordingly, as shown by the playback path 2701 in 2D playback mode, first the base-view data block L1, which is the last data block in the first 3D extent block 2601, is read as the first 2D extent EXT2D[0]. Next, the immediately subsequent block exclusively for 2D playback $(L2+L3)_{2D}$ is continuously read as the second 2D extent EXT2D[1]. The long jump $J_{LY}$ occurs at the immediately subsequent layer boundary LB, and along with performance of a focus jump, reading of the eight data blocks D2, R2, $L2_{SS}$, D3, R3, $L3_{SS}$, D4, and R4, located at the top of the second 3D extent block 2602 is skipped. Next, the third base-view data block L4 in the second 3D extent block 2602 is read as the third 2D extent EXT2D[2].

In L/R mode, the playback device 200 plays back the first file SS. Accordingly, as shown by the playback path 2702 in L/R mode, first a pair R1+L1 of the top right-view data block R1 and the immediately subsequent base-view data block L1 is read continuously as the first 3D extent EXTSS[0]. The long jump $J_{LY}$ occurs immediately thereafter, and along with performance of a focus jump, reading of the block exclusively for 2D playback $(L2+L3)_{2D}$ and the top depth map data block D3 in the second 3D extent block 2602 is skipped. Next, the top right-view data block R2 in the second 3D extent block 2602 and the immediately subsequent block exclusively for 3D playback $L2_{SS}$ are read continuously as the second 3D extent EXTSS[1], and reading of the immediately subsequent depth map data block D3 is skipped by the first jump $J_{LR}1$. Similarly, the next right-view data block R3 and the immediately subsequent block exclusively for 3D playback $L3_{SS}$ are read continuously as the third 3D extent EXTSS[2], and reading of the immediately subsequent depth map data block D4 is skipped by a second jump $J_{LR}2$. Furthermore, the next right-view data block R4 and the immediately subsequent base-view data block L4 are read continuously as the fourth 3D extent EXTSS[3].

As shown in FIG. 33, in 2D playback mode, the block exclusively for 2D playback $(L2+L3)_{2D}$ is read, while reading of the blocks exclusively for 3D playback $L2_{SS}$ and $L3_{SS}$ is skipped. Conversely, in L/R mode, reading of the block exclusively for 2D playback $(L2+L3)_{2D}$ is skipped, while the blocks exclusively for 3D playback $L2_{SS}$ and $L3_{SS}$ are read. However, since the block exclusively for 2D playback (L2+

L3$)_{2D}$ and the blocks exclusively for 3D playback L2$_{SS}$ and L3$_{SS}$ match bit-for-bit, the left-view video frame that is played back is the same in both playback modes. In arrangement 6, the playback path 2701 in 2D playback mode and the playback path 2702 in L/R mode are divided before and after the long jump $J_{LY}$ in this way. Accordingly, the size S$_{ext2D}$[1] of the 2D extent EXT2D[1] located immediately before the layer boundary LB and the size S$_{ext2}$[1] of the immediately preceding right-view data block R1 can be determined separately as below. Note that the same is also true for depth mode.

First, the sum S$_{ext2D}$[0]+S$_{ext2D}$[1] of the sizes of the two 2D extents EXT2D[0] and EXT2D[1] which are contiguous immediately before the layer boundary LB is the same as the sum S$_{ext1}$[1]+S$_{2D}$ of the size S$_{ext1}$[1] of the base-view data block L1 and the size S$_{2D}$ of the block exclusively for 2D playback (L2+L3)$_{2D}$. Accordingly, for seamless playback in 2D playback mode, this sum S$_{ext1}$[1]+S$_{2D}$ should be greater than or equal to the data amount that is transmitted from the read buffer to the system target decoder between the start of reading of the 2D extent EXT2D[1] and the completion of the long jump $J_{LY}$. On the other hand, the sizes S$_{ext2}$[0] and S$_{ext2D}$[0] of the right-view data block R1 and the base-view data block L1 belonging to the 3D extent EXTSS[0] located immediately before the layer boundary LB should be values such that the buffer margin amount can be maintained until immediately before the long jump $J_{LY}$. By appropriately enlarging the size S$_{2D}$ of the block exclusively for 2D playback (L2+L3)$_{2D}$, the size S$_{ext1}$[1] of the base-view data block L1 can be further limited while keeping the sum S$_{ext2D}$[0]+S$_{ext2D}$[1] of the sizes of the pair of 2D extents EXT2D[0] and EXT2D[1] constant. Correspondingly, the size S$_{ext2}$[0] of the right-view data block R1 can also be further limited.

In this case, since the blocks exclusively for 3D playback L2$_{SS}$ and L3$_{SS}$ and the block exclusively for 2D playback (L2+L3)$_{2D}$ are duplicate data, enlarging the size S$_{2D}$ of the block exclusively for 2D playback (L2+L3)$_{2D}$ enlarges the size of the right-view data blocks R2 and R3 located immediately before the blocks exclusively for 3D playback L2$_{SS}$ and L3$_{SS}$. However, as compared to one block exclusively for 2D playback (L2+L3)$_{2D}$, since the block exclusively for 3D playback is divided into two blocks, L2$_{SS}$ and L3$_{SS}$, the size of each can be made sufficiently smaller than the size of the right-view data block R3 located immediately before the layer boundary LB shown in FIG. 22. In this way, the read buffer amount to be guaranteed in the playback device 200 in L/R mode can be further reduced to the minimum necessary for seamless playback in L/R mode.

It is possible to thus set each data block in arrangement 6 to be a size at which seamless playback of video images during a long jump is possible in both 2D playback mode and L/R mode while keeping the read buffer amount that is to be guaranteed in the playback device 200 to the minimum necessary. Furthermore, changing the data block that is to be read in 2D playback mode and L/R mode, in particular switching between a block exclusively for 2D playback (L2+L3)$_{2D}$ and blocks exclusively for 3D playback L2$_{SS}$ and L3$_{SS}$, is possible simply by switching the AV stream file for playback between the file 2D and the file SS. Note that the same is also true for depth mode.

In arrangement 6, the duplicate data for the block exclusively for 2D playback (L2+L3)$_{2D}$ is set as two blocks exclusively for 3D playback L2$_{SS}$ and L3$_{SS}$. Alternatively, the duplicate data can be set as one block exclusively for 3D playback as in FIG. 1, or as three or more blocks exclusively for 3D playback.

Note that, unlike arrangements 1-5, the block exclusively for 2D playback may be accessible as two or more extents in the file 2D. Furthermore, each data block may be accessible as an extent in two or more types of files 2D or files SS.

<Arrangement of Multiplexed Stream Data for L/R Mode Only>

Figure 34A:
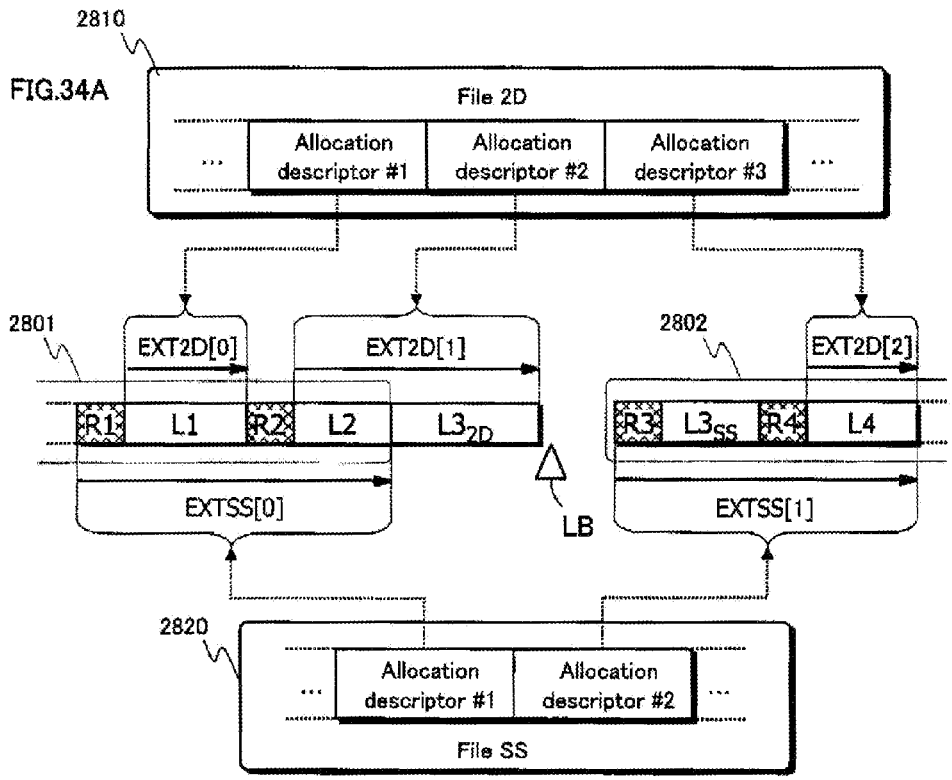
FIG. 34A is a schematic diagram showing the first arrangement example in FIG. 28 with the depth map data blocks removed.

When 3D video images are played back only in L/R mode, the depth map data blocks may be removed from arrangements 1-6. FIG. 34A is a schematic diagram showing arrangement 4 in FIG. 28 with the depth map data blocks removed. These data block groups belong to the main TS which includes the right-view data stream and sub-TS which includes the left-view data stream. As shown in FIG. 34A, in the first 3D extent block 2801 located before the layer boundary LB, the right-view data block group . . . , R1, R2 and the base-view data block group . . . , L1, L2 are recorded in an interleaved arrangement. On the other hand, in the second 3D extent block 2802 located after the layer boundary LB, the right-view data block group R3, R4, . . . and the base-view data block group L3$_{SS}$, L4, . . . are recorded in an interleaved arrangement. Furthermore, a block exclusively for 2D playback L3$_{2D}$ is placed between L2, the last data block in the first 3D extent block 2801, and the layer boundary LB. Also, a block exclusively for 3D playback L3$_{SS}$ is placed at the top of the second 3D extent block 2802. These data blocks L3$_{2D}$ and L3$_{SS}$ are duplicate data and match bit-for-bit.

In the interleaved arrangement in the 3D extent blocks 2801 and 2802, right-view data blocks and base-view data blocks are alternately arranged in that order. Furthermore, between two contiguous data blocks Rn, Ln (n= . . . , 1, 2, 3, 4, . . . ), the extent ATC time is the same. The content of each piece of stream data is continuous between the two data blocks R2 and L2 located at the end of the first 3D extent block 2801 and the two data blocks R3 and L3$_{SS}$ located at the top of the second 3D extent block 2802.

The data blocks shown in FIG. 34A can be accessed as an extent in either a file 2D or a file DEP, with the exception of the block exclusively for 3D playback L3$_{SS}$. For example, in the file entry 2810 in the file 2D, the allocation descriptor #1 indicates the size and the LBN of the top of the base-view data block L1, which is second from the end of the first 3D extent block 3401. Accordingly, the base-view data block L1 can be accessed as one 2D extent EXT2D[0]. The allocation descriptor #2 considers the pair of base-view data blocks L2+L3$_{2D}$ to be a single extent and indicates the size and the LBN of the top thereof. Accordingly, the pair of base-view data blocks L2+L3$_{2D}$ can be accessed as the second 2D extent EXT2D[1]. The allocation descriptor #3 indicates the size and the LBN of the top of the second base-view data block L4 in the second 3D extent block 3402. Accordingly, the base-view data block L4 can be accessed as the third 2D extent EXT2D[2].

Cross-linking of AV stream files is performed the same way as in FIG. 15 for the data block groups shown in FIG. 34A. In particular, since the depth map data blocks are removed from the 3D extent blocks 2801 and 2802, two or more pairs of right-view data blocks and base-view data blocks having the same extent ATC time may be arranged contiguously. In this case, these two or more pairs may be accessed as one 3D extent. As shown in FIG. 34A, in the file entry 2820 in the file SS, within the first 3D extent block 2801, the allocation descriptor #1 considers four contiguous right-view data blocks and base-view data blocks R1, L1, R2, and L2 to be one extent, indicating the size and the LBN of the top thereof. Accordingly, these data blocks R1, L1, R2, and L2 can be accessed as one 3D extent EXTSS[0]. Within the second 3D extent block 2802, the allocation descriptor #2 considers four contiguous right-view data blocks and base-view data blocks R3, L3$_{SS}$, R4, and L4 to be one extent, indicating the size and the LBN of the top thereof. Accordingly, these data blocks R3, $L3_{SS}$, R4, and L4 can be accessed as one 3D extent EXTSS[1]. In this case, the 3D extents EXTSS[0] and EXTSS[1] respectively share base-view data blocks L1, L2, and L4 with the 2D extents EXT2D[0], EXT2D[1], and EXT2D[2]. On the other hand, the block exclusively for 2D playback $L3_{2D}$ can only be accessed as part of the extent EXT2D[1] located immediately before the layer boundary LB. Furthermore, the block exclusively for 3D playback $L3_{SS}$ can only be accessed as part of the extent EXTSS[1] located immediately after the layer boundary LB.

Figure 34B:
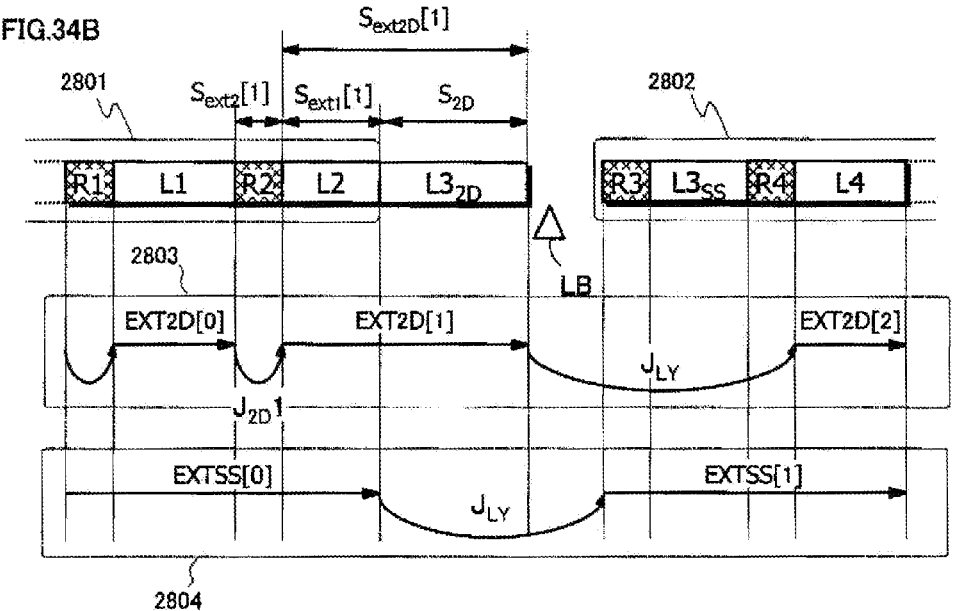
FIG. 34B is a schematic diagram showing the playback path in 2D playback mode and the playback path in L/R mode for the data block groups shown in FIG. 34A.

FIG. 34B is a schematic diagram showing the playback path 2803 in 2D playback mode and the playback path 2804 in L/R mode for the data block groups shown in FIG. 34A.

In 2D playback mode, the playback device 200 plays back the file 2D. Accordingly, as shown by the playback path 2803 in 2D playback mode, first the base-view data block L1, which is second from the end of the first 3D extent block 2801, is read as the first 2D extent EXT2D[0], and reading of the immediately subsequent right-view data block R2 is skipped by the first jump $J_{2D}1$. Next, a pair $L2+L3_{2D}$ of the base-view data block L2, located last in the first 3D extent block 2801, and the immediately subsequent block exclusively for 2D playback $L3_{2D}$ is continuously read as the second 2D extent EXT2D[1]. The long jump $J_{LY}$ occurs at the immediately subsequent layer boundary LB, and along with performance of a focus jump, reading of the three data blocks R3, $L3_{SS}$, and R4, located at the top of the second 3D extent block 2802, is skipped. Next, the second base-view data block L4 in the second 3D extent block 2802 is read as the third 2D extent EXT2D[2].

In L/R mode, the playback device 200 plays back the file SS. Accordingly, as shown by the playback path 2804 in L/R mode, first the data block group R1, L1, R2, and L2 in the first 3D extent block 2801 is read continuously as the first 3D extent EXTSS[0]. The long jump $J_{LY}$ occurs immediately thereafter, and along with performance of a focus jump, reading of the block exclusively for 2D playback $L3_{2D}$ is skipped. Next, the data block group R3, $L3_{SS}$, R4, and L4 in the second 3D extent block 2802 is read continuously as the next 3D extent EXTSS[1].

As shown in FIG. 34B, in 2D playback mode, the block exclusively for 2D playback $L3_{2D}$ is read, while reading of the block exclusively for 3D playback $L3_{SS}$ is skipped. Conversely, in L/R mode, reading of the block exclusively for 2D playback $L3_{2D}$ is skipped, while the block exclusively for 3D playback $L3_{SS}$ is read. However, since the data blocks $L3_{2D}$ and $L3_{SS}$ match bit-for-bit, the left-view video frame that is played back is the same in both playback modes. In arrangement 4, even when only L/R mode is supported, the playback path 2803 in 2D playback mode and the playback path 2804 in L/R mode are divided before and after the long jump $J_{LY}$ in this way. Accordingly, by appropriately enlarging the size $S_{2D}$ of the block exclusively for 2D playback $L3_{2D}$, the size $S_{ext1}[1]$ of the base-view data block L2 can be further limited while keeping the size $S_{ext2D}[1]=S_{ext1}[1]+S_{2D}$ of the 2D extent EXT2D[1] constant. Correspondingly, the size $S_{ext2}[1]$ of the right-view data block R2 can also be further limited. As a result, the read buffer capacity to be guaranteed in the playback device 200 in L/R mode can be brought even closer to the minimum necessary for seamless playback in L/R mode.

Next, description is given on an example case of arrangement 1 with the depth map data blocks removed.

Figure 35:
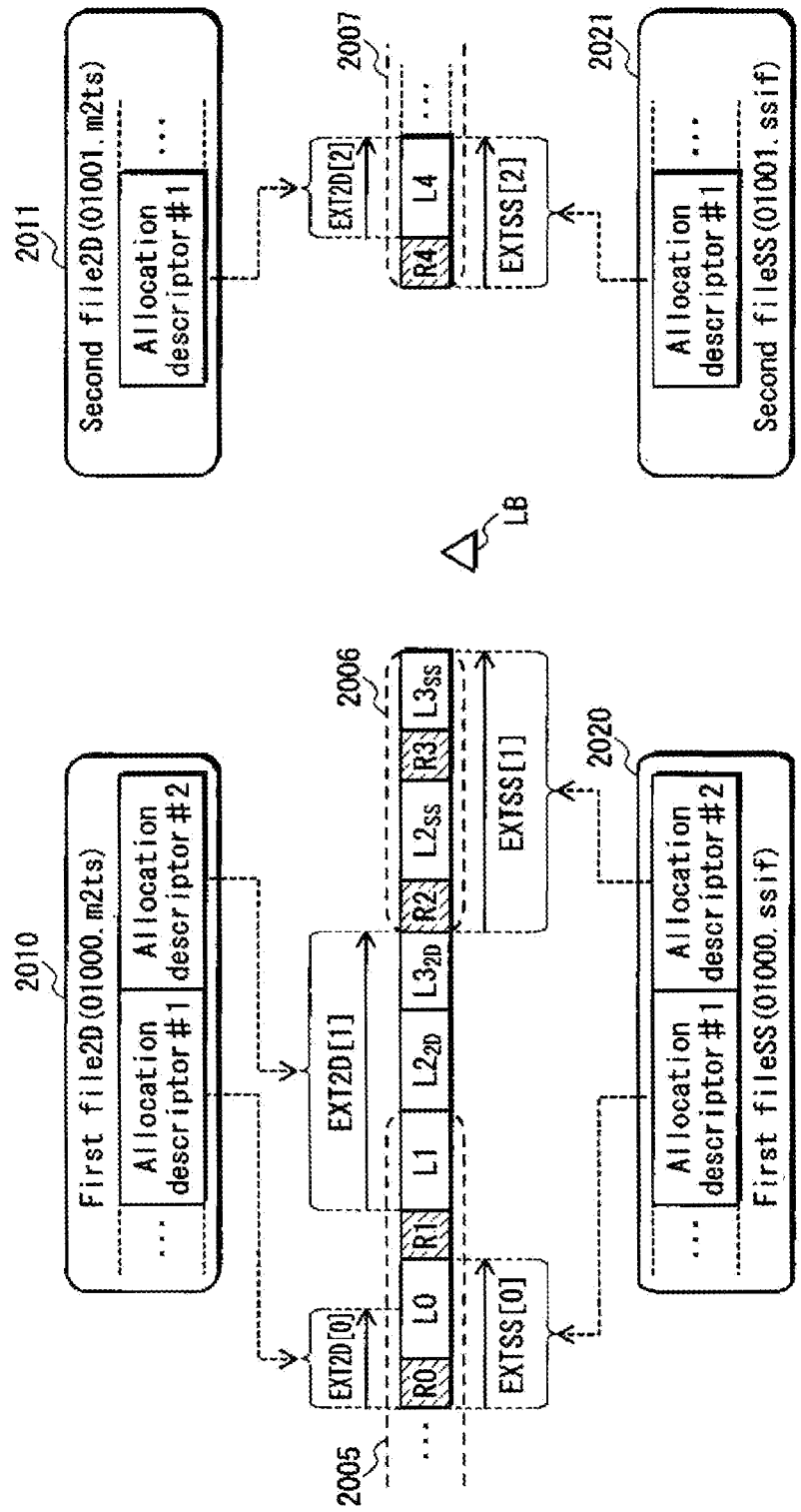
FIG. 35 is a schematic diagram showing the first arrangement example in FIG. 20 with the depth map data blocks removed.

FIG. 35 is a schematic diagram showing arrangement 1 in FIG. 20 with the depth map data blocks removed. These data block groups belong to the main TS which includes the right-view data stream and sub-TS which includes the left-view data stream. As shown in FIG. 35, on the first recording layer located before the layer boundary LB, the first 3D extent block 2005 that includes the right-view data block group . . . , R0, R1 and the base-view data block group . . . , L0, L1 in an interleaved arrangement is recorded. The blocks exclusively for 2D playback $L2_{2D}$ and $L3_{2D}$ are placed contiguously following the end L1 of the first 3D extent block 2005. Furthermore, between the block exclusively for 2D playback $L3_{2D}$ and the layer boundary LB, the second 3D extent block 2006 that includes the right-view data block group . . . , R2, R3, and the blocks exclusively for 3D playback . . . , $L2_{SS}$, $L3_{SS}$ in an interleaved arrangement is recorded.

The blocks exclusively for 2D playback $L2_{2D}$ and $L3_{2D}$, and the blocks exclusively for 3D playback $L2_{SS}$ and $L3_{SS}$ are duplicate data, and match bit-for-bit. On the other hand, on the second recording layer located after the layer boundary LB, the third 3D extent block 2007 that includes the right-view data block group R4, . . . , and the base-view data block group L4 in an interleaved arrangement is recorded.

In the interleaved arrangements of the 3D extent blocks 2005, 2006, and 2007, a right-view data block and a base-view data block are alternately arranged in that order. Furthermore, between two consecutive data blocks Rn, Ln (n= . . . , 1, 2, 3, 4, . . . ), the extent ATC time is the same. The content of each piece of stream data is continuous between the two data blocks R1 and L1 located at the end of the first 3D extent block 2005 and the two data blocks R2 and $L2_{SS}$ located at the top of the second 3D extent block 2006, while the content of each piece of stream data is continuous between the two data blocks R3 and $L3_{SS}$ located at the end of the second 3D extent block 2006 and the two data blocks R4 and L4 located at the top of the third 3D extent block 2007.

The data blocks shown in FIG. 35 can be accessed as an extent in either 2D file or DEP file, with the exception of the blocks exclusively for 3D playback $L2_{SS}$ and $L3_{SS}$. For example, in the file entry 2010 in the first 2D file, the allocation descriptor #1 indicates the size and the LBN of the top of the base-view data block L0, which is second from the end of the first 3D extent block 2005. Accordingly, the base-view data block L0 can be accessed as one 2D extent EXT2D[0] in the first 2D file. The allocation descriptor #2 considers a group of the base-view data blocks $L1+L2_{2D}+L3_3D$, i.e. the base-view data block L1, the last in the first 3D extent block 2005, and the immediately subsequent contiguous blocks exclusively for 2D playback $L2_{2D}$ and $L3_{2D}$, to be a single extent and indicates the size and the LBN of the top thereof. Accordingly, the group of base-view data blocks $L1+L2_{2D}+L3_3D$ can be accessed as one 2D extent EXT2D[1] in the first 2D file. The base-view data blocks L1, $L2_{2D}$, and $L3_3D$ in these files 2D constitute an extent having a long contiguous length immediately before the position where a long jump occurs. Because the files 2D can form a big extent immediately before a long jump, underflow of the read buffers is not expected to occur even when performing playback in 2D playback mode. In the file entry 2011 in the second 2D file, the allocation descriptor #1 indicates the size and the LBN of the top of the base-view data block L4 of the third 3D extent block 2007. Accordingly, the base-view data block L4 can be accessed as one 2D extent EXT2D[2] in the second 2D file.

Cross-linking of the AV stream files is performed the same way as in FIG. 15 for the data block groups shown in FIG. 35. In particular, since the depth map data blocks are removed from the 3D extent blocks 2005, 2006, and 2007, two or more pairs of right-view data blocks and base-view data blocks having the same extent ATC time may be arranged contiguously. In this case, these two or more pairs may be accessed as one 3D extent. As shown in FIG. 35, in the file entry 2020 in the file SS, within the first 3D extent block 2005, the allocation descriptor #1 considers four contiguous right-view data blocks and base-view data blocks R0, L0, R1, and L1 to be one extent, indicating the size and the LBN of the top thereof. Accordingly, these data blocks R0, L0, R1, and L1 can be accessed as one 3D extent EXTSS[0]. Within the second 3D extent block 2006, the allocation descriptor #2 considers four contiguous right-view data blocks and base-view data blocks R2, L2$_{SS}$, R3, and L3$_{SS}$ to be one extent, indicating the size and the LBN of the top thereof. Accordingly, these data blocks R2, L2$_{SS}$, R3, and L3$_{SS}$ can be accessed as one 3D extent EXTSS[1]. In the file entry 2021 in the file SS, the allocation descriptor #1 considers the adjacent pair of the right-view data block and the base-view data block R4+L4 to be one extent, indicating the size and the LBN of the top thereof. Accordingly, the adjacent pair of data blocks R4+L4 can be accessed as one 3D extent EXTSS[4].

In this case, the 3D extents EXTSS[0] and EXTSS[1] respectively share base-view data blocks L1, L2, and L4 with the 2D extents EXT2D[0], EXT2D[1], and EXT2D[2]. On the other hand, the blocks exclusively for 2D playback L2$_{2D}$ and L3$_{2D}$ can only be accessed as part of the extent EXT2D[1] located immediately before the layer boundary LB. Furthermore, the blocks exclusively for 3D playback L2$_{SS}$ and L3$_{SS}$ can only be accessed as part of the extent EXTSS[1] located immediately after the layer boundary LB.

In FIG. 35, the 2D playlist and the 3D playlist both include playitems #1 and #2 which are seamlessly connected together.

The preceding playitem in the 2D PlayList refers to the first file 2D. The preceding playitem in the 3D PlayList refers to the first file SS, and the sub-playitem played back in synchronization with the preceding playitem refers to the file DEP. As described above, the content of the base-view data blocks referred to by the 2D extents EXT2D[0] and EXT2D[1] is the same as the content of the base-view data blocks referred to by the 3D extents EXTSS[0] and EXTSS[1]. Accordingly, in 2D playlist playback, the base-view data blocks L1, L2$_{2D}$, and L3$_{2D}$ are played back at a position where playitems are seamlessly connected, while in 3D playlist playback, L1, L2$_{SS}$, and L3$_{SS}$, which have the same content as L1, L2$_{2D}$, and L3$_{2D}$, are played back at a position where playitems are seamlessly connected. Thus, although the playback paths are different between the 2D playback based on the 2D playlist and the 3D playback based on the 3D playlist, the playback devices can play back the same left-view video frame.

Next, description is given on data referred to by succeeding playitems. The succeeding playitem in the 2D PlayList refers to the second file 2D. The succeeding playitem in the 3D PlayList refers to the second file SS, and the sub-playitem played back in synchronization with the succeeding playitem of the 2D PlayList refers to the file DEP. As shown in the figure, the second file 2D and the second file SS use the same data, i.e. the base-view data block L4.

Here, the distance from the end of the pre-jump 2D extent EXT2D[1] referred to by the preceding playitem of the 2D PlayList to the head of the 2D extent EXT2D[2] referred to by the succeeding playitem is set to a value no greater than the maximum jump distance determined by a given specification based on the jump performance of the 2D playback device. The jump distance between the pre-jump 3D extent block 2006 referred to by the preceding playitem of the 3D PlayList and the 3D extent block 2007 referred to by the succeeding playitem of the 3D PlayList is set to a value no greater than the maximum distance determined by a given specification based on the jump performance of the 2D/3D playback device.

In 2D playback mode, the playback device 200 plays back the 2D file. Accordingly, the base-view data block L0 is read as the first 2D extent EXT2D[0], and then the base-view data block L1 and the immediately subsequent blocks exclusively for 2D playback L2$_{2D}$ and L3$_{2D}$ are continuously read as the second 2D extent EXT2D[1], and after a long jump, the base-view data block L4 is read as the first 2D extent EXT2D[2] of the second file 2D.

In L/R mode, the playback device 200 plays back the first file SS. Accordingly, the data block group R0, L0, R1, and L1 within the first 3D extent block 2005 are consecutively read as the first 3D extent EXTSS[0], the data block group R2, L2$_{SS}$, R3, and L3$_{SS}$ within the second 3D extent block 2006 are consecutively read as the second 3D extent EXTSS[1], and after a long jump, the right-view data block R4 and the immediately subsequent base-view data block L4 are read as the first 3D extent EXTSS[4] of the second file SS.

As described above, in 2D playback mode, the blocks exclusively for 2D playback L2$_{2D}$ and L3$_{2D}$ are read, while reading of the blocks exclusively for 3D playback L2$_{SS}$ and L3$_{SS}$ is skipped. Conversely, in L/R mode, reading of the blocks exclusively for 2D playback L2$_{2D}$ and L3$_{2D}$ is skipped, while the blocks exclusively for 3D playback L2$_{SS}$ and L3$_{SS}$ are read. However, since the data blocks L2$_{2D}$ and L2$_{SS}$ match bit-for-bit, and the data blocks L3$_{2D}$ and L3$_{SS}$ also match bit-for-bit, the left-view video frame that is played back is the same in both playback modes. In arrangement 1, even when only L/R mode is supported for 3D playback, the playback path in 2D playback mode and the playback path in L/R mode are divided before a long jump in this way.

Accordingly, by appropriately enlarging the size S$_2$D[2] and S$_2$D[3] of the block exclusively for 2D playback and L2$_{2D}$ and L3$_{2D}$, the size S$_{ext2}$[1] of the base-view data block L1 can be further limited while keeping the size S$_{ext2D}$[1]= S$_{ext1}$[1]+S$_{2D}$[2]+S$_{2D}$[3] of the 2D extent EXT2D[1] constant. Correspondingly, the size S$_{ext2}$[1] of the right-view data block R2 can also be further limited. As a result, the read buffer capacity to be guaranteed in the playback device 200 in L/R mode can be brought even closer to the minimum necessary for seamless playback in L/R mode. The same is true for arrangements 2, 3, 5, and 6.

Thus, even when only L/R mode is supported in arrangements 1-6, it is possible to set each data block to be a size at which seamless playback of video images during a long jump is possible in both 2D playback mode and L/R mode while keeping the read buffer amount that is to be guaranteed in the playback device 200 to the minimum necessary.

<Other TS Packets Included in the AV Stream File>

The types of the TS packets contained in the AV stream file include not only those that are converted from the elementary streams shown in FIGS. 10 and 11, but also a program association table (PAT), program map table (PMT), and program clock reference (PCR). The PCR, PMT, and PAT are specified by the European Digital Broadcasting Standard and are intended to regulate the partial transport stream constituting a single program. By using PCR, PMT, and PAT, the AV stream file can be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS in a decoder. The decoder uses the PCR to synchronize the STC with the ATC.

Figure 36:
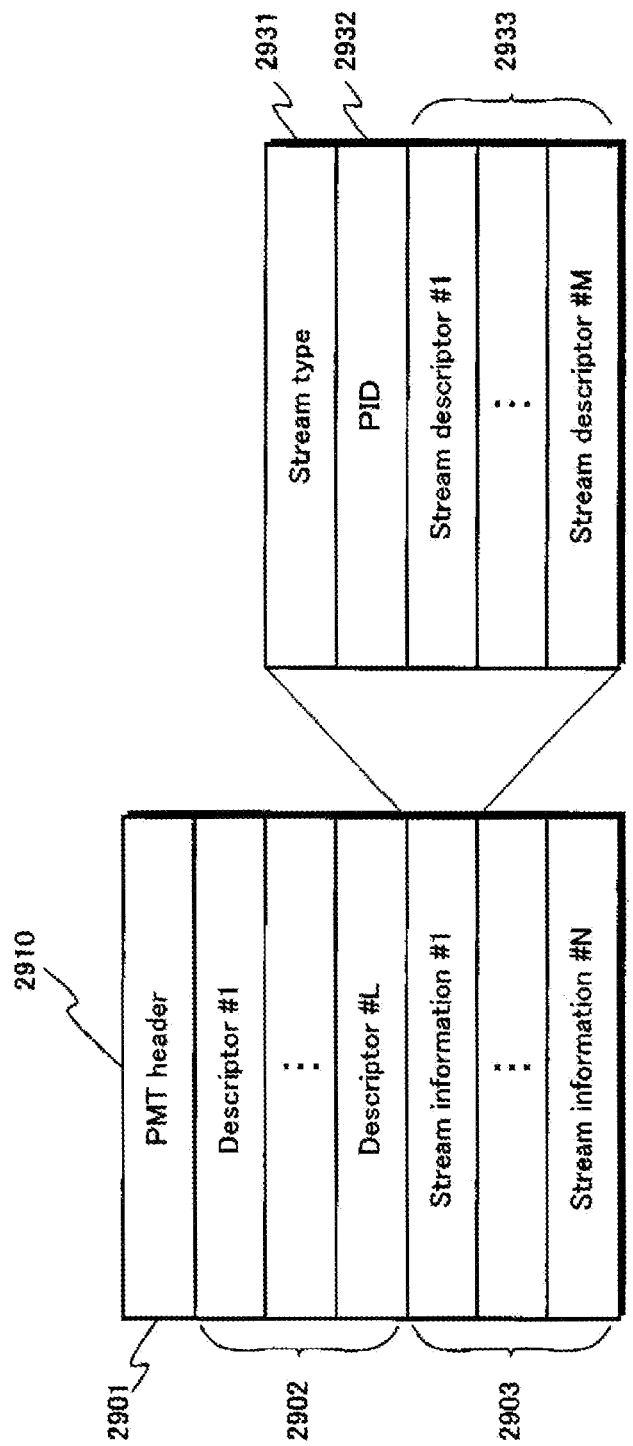
FIG. 36 is a schematic diagram showing the data structure of a PMT.

FIG. 36 is a schematic diagram showing the data structure of a PMT 2910. The PMT 2910 includes a PMT header 2901, a plurality of descriptors 2902, and a plurality of pieces of stream information 2903. The PMT header 2901 indicates the length of data, etc. stored in the PMT 2910. Each descriptor 2902 relates to the entire AV stream file that includes the PMT 2910. The copy control information is included in one of the descriptors 2902. Each piece of stream information 2903 relates to one of the elementary streams included in the AV stream file and is assigned to a different elementary stream. Each piece of stream information 2903 includes a stream type 2931, a PID 2932, and a stream descriptor 2933. The stream type 2931 includes identification information for the codec used for compressing the elementary stream. The PID 2932 indicates the PID of the elementary stream. The stream descriptor 2933 includes attribute information of the elementary stream, such as a frame rate and an aspect ratio.

By using PCR, PMT, and PAT, the decoder in the playback device can be made to process the AV stream file in the same way as the partial transport stream in the European Digital Broadcasting Standard. In this way, it is possible to ensure compatibility between a playback device for the recording medium 100 and a terminal device conforming to the European Digital Broadcasting Standard.

Up to now, the stream file has been described in detail.
<Clip Information File>

Next is a detailed description of the directory file. FIG. 37 is a schematic diagram showing the data structure of the 2D clip information file 531. The dependent-view clip information files have the same data structure. Below, the data structure common to all clip information files is first described, using the data structure of the 2D clip information file 531 as an example. Afterwards, the differences in data structure between a 2D clip information file and a dependent-view clip information file are described.

As shown in FIG. 37, the 2D clip information file 531 includes clip information 3010, stream attribute information 3020, an entry map 3030, and 3D meta data 3040. The 3D meta data 3040 includes an offset table 3041 and an extent start point 3042.

As shown in FIG. 37, the clip information 3010 includes a system rate 3011, a playback start time 3012, and a playback end time 3013. The system rate 3011 indicates the maximum value of the transfer speed at which "TS packets" belonging to the corresponding file 2D are transferred from the read buffer in the playback device 200 to the system target decoder. The interval between the ATSs of the source packets in the file 2D is set so that the transfer speed of the TS packets is limited to the system rate or lower. The playback start time 3012 indicates the PTS of the VAU located at the top of the file 2D, e.g. the PTS of the top video frame. The playback end time 3012 indicates the value of the STC delayed a predetermined time from the PTS of the VAU located at the end of the file 2D, e.g. the sum of the PTS of the last video frame and the playback time of one frame.

As shown in FIG. 37, the stream attribute information 3020 is a correspondence table between the PID 3021 for each elementary stream included in the file 2D with pieces of attribute information 3022. Each piece of attribute information 3022 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1101 for the primary audio stream includes a codec type used for compressing the audio stream, number of channels included in the audio stream, language, and sampling frequency. The playback device 200 uses this attribute information 3022 to initialize the decoder.

[Entry Map]

Figure 38A:
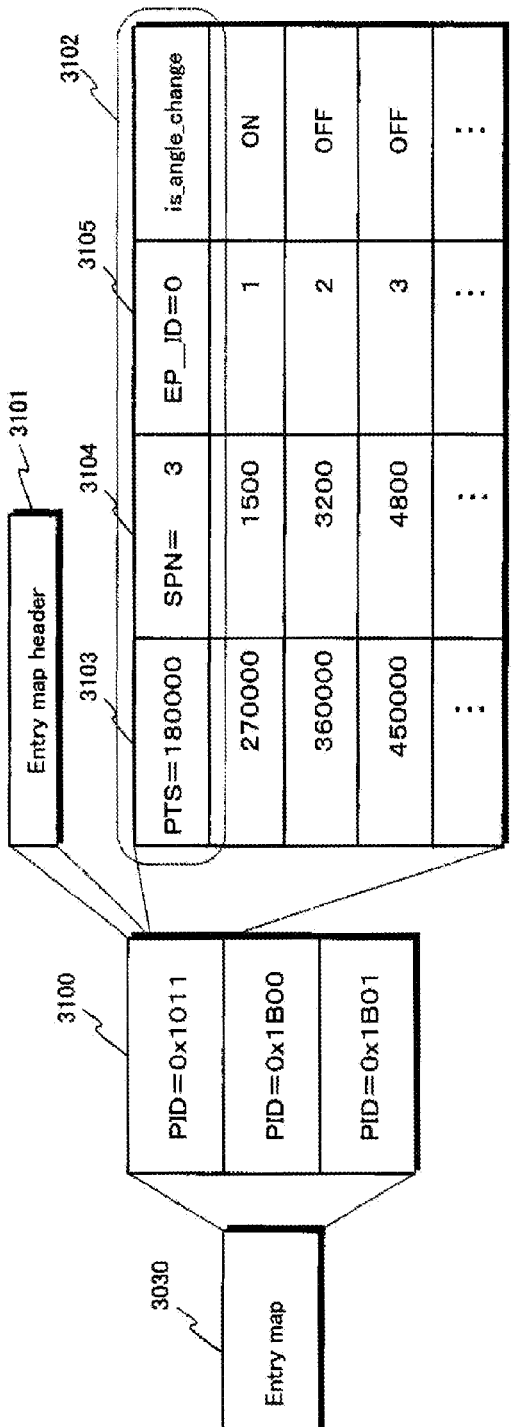
FIG. 38A is a schematic diagram showing the data structure of the entry map 3030 shown in FIG. 37.

FIG. 38A is a schematic diagram showing the data structure of an entry map 3030. As shown in FIG. 38A, the entry map 3030 includes tables 3100. There is the same number of tables 3100 as there are video streams multiplexed in the main TS, and tables are assigned one-by-one to each video stream. In FIG. 38A, each table 3100 is distinguished by the PID of the video stream to which it is assigned. Each table 3100 includes an entry map header 3101 and an entry point 3102. The entry map header 3101 includes the PID corresponding to the table 3100 and the total number of entry points 3102 included in the table 3100. The entry point 3102 associates a pair of a PTS 3103 and source packet number (SPN) 3104 with one of individually differing entry points ID (EP_ID) 3105.

Furthermore, the entry point 3102 has a flag (is_angle_change flag) indicating whether angle switching to this feature point is possible. Angle switching is possible for a source packet located at a head of an interleaved unit constituting a multi angle section. Accordingly, the is_angle_change flage of the entry point specifying the source packet at the head of the interleaved unit is always set to be ON. And, the entry point specifying the source packet at the head of the interleaved unit is associated with In_Time in the playitem information by the entry point.

The PTS 3103 is equivalent to the PTS for one of the I pictures included in the video stream for the PID indicated by the entry map header 3101. The SPN 3104 is equivalent to the SPN for the top of the source packet group stored in the corresponding I picture. An "SPN" refers to the number assigned consecutively from the top to a source packet group belonging to one AV stream file. The SPN is used as the address for each source packet in the AV stream file. In the entry map 3030 in the 2D clip information file 531, the SPN refers to the number assigned to the source packet group belonging to the file 2D, i.e. the source packet group constituting the main TS. Accordingly, the entry point 3102 expresses the relationship between the PTS and the address, i.e. the SPN, of each I picture included in the file 2D.

An entry point 3102 does not need to be set for all of the I pictures in the file 2D 541. However, when an I picture is located at the top of a GOP, and the TS packet that includes the top of that I picture is located at the top of a 2D extent, an entry point 3102 has to be set for that I picture.

Figure 38B:
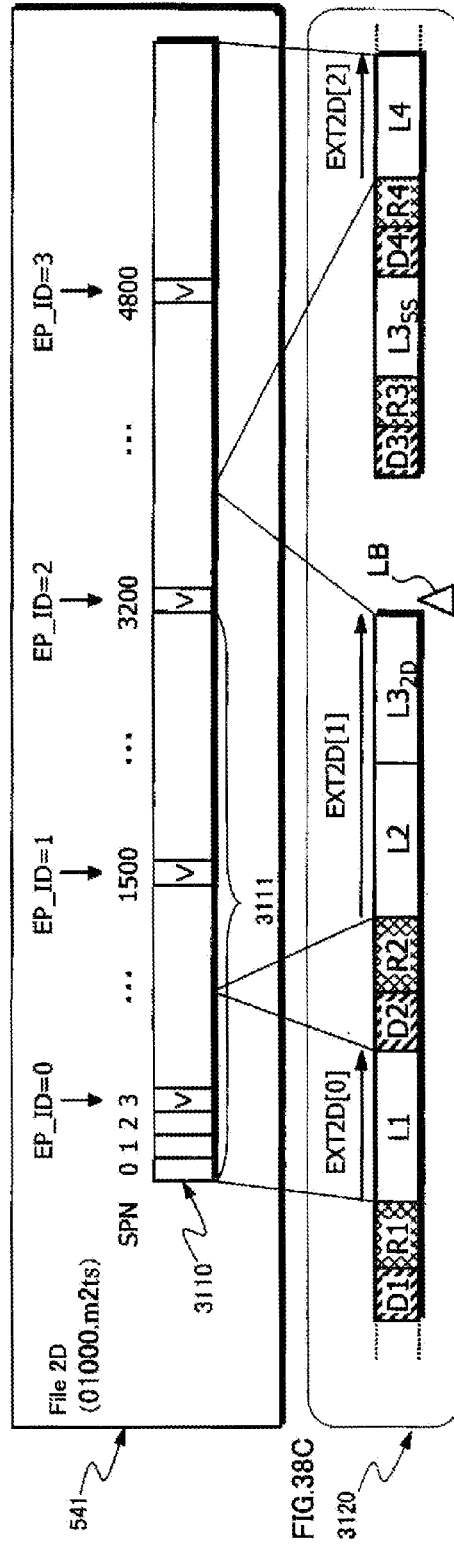
FIG. 38B is a schematic diagram showing source packets in the source packet group 3110 belonging to file 2D that are associated with each EP_ID 3105 by the entry map 3030.
Figure 38C:
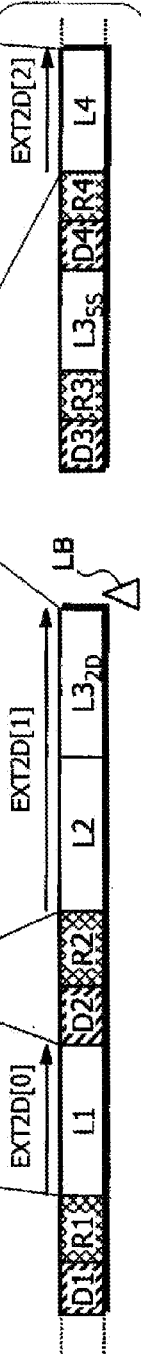
FIG. 38C is a schematic diagram showing the relationships between the source packet group 3110 and the data block group 3120 on the BD-ROM disc.

FIG. 38B is a schematic diagram showing source packets in the source packet group 3110 belonging to the file 2D 541 that are associated with each EP_ID 3105 by the entry map 3030. FIG. 38C is a schematic diagram showing the relationships between the source packet group 3110 and the data block group 3120 on the recording medium 100. When the playback device 200 plays back 2D video images from the file 2D 541, it refers to the entry map 3030 to specify the SPN for the source packet that includes a frame representing an arbitrary scene from the PTS for that frame. Specifically, when for example a PTS=360,000 is indicated as the PTS for a specific entry point for the position to start playback, the playback device 200 first retrieves the SPN=3200 allocated to this PTS in the entry map 3030. Next, the playback device 200 seeks the quotient SPN×192/2,048, i.e. the value of the SPN multiplied by 192 bytes, the data amount per source packet, and divided by 2,048 bytes, the data amount per sector. This value is the same as the total number of sectors recorded in the main TS prior to the aligned unit that includes the source packet to which the SPN is assigned. In the example shown in FIG. 38B, this value is 3,200×192/2,048=300, and is equal to the total number of sectors on which source packet groups 3111 are recorded from SPN 0 through 3199. Next, the playback device 200 refers to the allocation descriptor in the file entry in the file 2D 541 and specifies the LBN of the (total number+1)$^{th}$ sector, counting from the top of the sector groups in which 2D extent groups are recorded. In the example shown in FIG. 38C, within the sector groups in which the base-view data blocks L1, L2+L3$_{2D}$, L4, . . . which can be accessed as 2D extents EXT2D[0], EXT2D[1], EXT2D[2], . . . are recorded, the LBN of the 301$^{st}$ sector counting from the top is specified. The playback device 200 indicates this LBN to the BD-ROM drive. In this way, base-view data block groups are read as aligned units in order from the sector for this LBN. Furthermore, from the first aligned unit that is read in, the playback device 200 selects the source packet indicated by the entry point for the position to start playback and decodes an I picture. From then on, subsequent pictures are decoded in order referring to already decoded pictures. In this way, the playback device 200 can play back 2D video images from the file 2D 541 from a specified PTS onwards.

Furthermore, the entry map 3030 is useful for efficient processing during trickplay such as fast forward, reverse, etc. For example, the playback device 200 in 2D playback mode first refers to the entry map 3030 to read SPNs starting at the position to start playback, e.g. to read SPN=3200, 4800, . . . in order from the entry points EP_ID=2, 3, . . . that include PTSs starting at PTS=360,000. Next, the playback device 200 refers to the file entry in the file 2D 541 to specify the LBN of the sectors corresponding to each SPN. The playback device 200 then indicates each LBN to the BD-ROM drive. Aligned units are thus read from the sector for each LBN. Furthermore, from each aligned unit, the playback device 200 selects the source packet indicated by each entry point and decodes an I picture. The playback device 200 can thus selectively play back an I picture from the file 2D 541 without analyzing the 2D extent group EXT2D[n] itself.

[Offset Table]

FIG. 39A is a schematic diagram showing the data structure of an offset table 3041. The offset table 3041 is information used for cropping processing by the playback device 200 in 3D playback mode. "Cropping processing" refers to processing to generate, from a table representing a 2D video image, a pair of pieces of plane data that represent a left-view and a right-view. Apiece of "plane data" refers to a two-dimensional array of pixel data. The size of the array is the same as the resolution of a video frame. Apiece of pixel data consists of a chromatic coordinate value and an a value (opaqueness). The chromatic coordinate value is expressed as an RGB value or a YCrCb value. The target of cropping processing includes the pieces of plane data generated from the PG streams, IG streams, and secondary video streams in the main TS, as well as the pieces of image plane data generated in accordance with a BD-J object. Cropping processing changes the horizontal position of each piece of pixel data in a piece of plane data. Accordingly, in the pair of pieces of plane data obtained via cropping processing, the presentation positions in the left-view and right-view are shifted to the left and right from the original presentation position in the 2D video image. A viewer is made to perceive a pair of a left-view and a right-view as a single 3D video image due to the binocular parallax produced by these shifts.

As shown in FIG. 39A, the offset table 3041 includes a table 3210 for each PID in PG streams, IG streams, and secondary video streams. Each table 3210 is a correspondence table between PTSs 3201 and offset values 3202. The PTS 3201 represents each piece of plane data generated from PG streams, IG streams, and secondary video streams. The offset value 3202 represents the signed number of pixels by which each piece of pixel data is shifted horizontally by cropping processing. For example, a positive sign represents a shift to the right, and a negative sign a shift to the left. The sign of the offset value 3202 is determined by whether the 3D video image is deeper than the screen or closer to the viewer. Hereinafter, a pair 3203 of a PTS 3201 and an offset value 3202 is referred to as an "offset entry".

FIG. 39B is a schematic diagram showing the valid section of an offset entry. The valid section of an offset entry is, within the time measured by an STC, the interval from the time indicated by the PTS of the offset entry until the time indicated by the PTS of the next offset entry. When the PTS for a piece of plane data belongs to a valid section of a certain offset entry, then during cropping processing, the presentation position of the pixel data in that piece of plane data shifts by the offset value in the offset entry. In the example shown in FIG. 39A, the PTS of offset entry #1 is 180,000, the PTS of offset entry #2 is 270,000, and the PTS of offset entry #3 is 360,000. In this case, as shown in FIG. 39B, an offset value of "+5" in the offset entry #1 is valid in an STC range 3204 from 180,000 to 270,000, and an offset value of "+3" in the offset entry #2 is valid in an STC range 3205 from 270,000 to 360,000.

[Extent Start Point]

FIG. 40A is a schematic diagram showing the data structure of extent start points 3042. As shown in FIG. 40A, the "extent start point" 3042 includes a base-view extent ID (EXT1_ID) 3311 and an SPN 3312. The EXT1_ID 3311 is a serial number assigned consecutively from the top to the base-view data blocks belonging to the first file SS (01000.ssif) 544A. One SPN 3312 is assigned to each EXT1_ID 3311 and is the same as the SPN for the source packet located at the top of the base-view data block identified by the EXT1_ID 3311. This SPN is a serial number assigned from the top to the source packets included in the base-view data block group belonging to the first file SS 544A.

In the data block group in an interleaved arrangement shown in FIG. 15, the file 2D and the corresponding first file SS share the base-view data blocks in common. However, in arrangements 1-5 shown in FIGS. 20, 24, 26, 28, 30, and 32, the blocks exclusively for 2D playback belong only to the file 2D, and the blocks exclusively for 3D playback belong only to the first file SS. Accordingly, the SPN 3312 that indicates the extent start point 3042 generally differs from the SPN for the source packet located at the top of the 2D extent belonging to the file 2D.

FIG. 40B is a schematic diagram showing the data structure of extent start points 3320 included in the right-view clip information file. As shown in FIG. 40B, the extent start point 3320 includes right-view extent IDs (EXT2_ID) 3321 and SPNs 3322. The EXT2_IDs 3321 are serial numbers assigned from the top to the right-view data blocks belonging to the first file SS 544A. One SPN 3322 is assigned to each EXT2_ID 3321 and is the same as the SPN for the source packet located at the top of the right-view data block identified by the EXT2_ID 3321. This SPN is a serial number assigned in order from the top to the source packets included in the right-view data block group belonging to the first file SS 544A.

FIG. 40D is a schematic diagram representing the relationship between right-view extents EXT2[0], EXT2[1], . . . belonging to the first file DEP (02000.m2ts) and the SPNs 3322 shown by the extent start points 3320. In all of the data structures shown in FIGS. 15, 20, 24, 26, 28, 30, and 32, the first file DEP and the first file SS share right-view data blocks in common. Accordingly, as shown in FIG. 40D, each SPN 3322 shown by the extent start point 3320 is the same as the SPN for the source packet located at the top of each right-view extent EXT2[0], EXT2[1], . . . .

As described below, the extent start point 3042 in the 2D clip information file and the extent start point 3320 in the right-view clip information file are used to detect the boundary of data blocks included in each 3D extent when playing back 3D video images from the first file SS 544A.

FIG. 40E is a schematic diagram showing an example of the relationship between 3D extents EXTSS[0], EXTSS[1], . . . belonging to the first file SS 544A and a data block group 3350 on the recording medium 100. As shown in FIG. 40E, the data block group 3350 is arranged the same way as arrangement 6 shown in FIG. 26. Note that the following description holds for an interleaved arrangement and any of arrangements 1-5. In the data block 3350, the pairs of contiguous right-view data blocks and base-view data blocks R1+L1, R2+L2, R3+L3$_{SS}$, and R4+L4 can respectively be accessed as 3D extents EXTSS[0], EXTSS[1], EXTSS[2], and EXTSS[3]. Furthermore, in the n$^{th}$ 3D extent EXTSS[n] (n=0, 1, 2, . . . ), the number of source packets included in the base-view data block L (n+1) is, in the extent start point 3042, the same as the difference A(n+1)−An between SPNs corresponding to EXT1_ID=n+1 and n (here, A0=0). On the other hand, the number of source packets included in the right-view data block R(n+1) is, in the extent start point 3320, the same as the difference B(n+1)−Bn between SPNs corresponding to EXT2_ID=n+1 and n (here, B0=0).

When the playback device 200 in L/R mode plays back 3D video images from the first file SS 544A, in addition to the entry maps in the clip information files, it also refers to the extent start points 3042 and 3320 to specify, from the PTS for a frame representing the right-view of an arbitrary scene, the LBN for the sector on which a right-view data block that includes the frame is recorded. Specifically, the playback device 200 for example first retrieves the SPN associated with the PTS from the entry map in the right-view clip information file 532. Suppose the source packet indicated by the SPN is included in the third right-view extent EXT2 [2] in the first file DEP, i.e. the right-view data block R3. Next, the playback device 200 retrieves "B2", the largest SPN before the target SPN, from among the SPNs 3322 shown by the extent start points 3320 in the right-view clip information file. The playback device 200 also retrieves the corresponding EXT2_ID "2". Then the playback device 200 retrieves the value "A2" for the SPN 3312 corresponding to the EXT1_ID which is the same as the EXT2_ID "2". The playback device 200 further seeks the sum B2+A2 of the retrieved SPNs 3322 and 3312. As can be seen from FIG. 40E, this sum B2+A2 is the same as the total number of source packets included in the data blocks located before the third right-view data block R3 among the data blocks included in the 3D extent group EXTSS[0], EXTSS[1], . . . . Accordingly, this sum. B2+A2 multiplied by 192 bytes, the data amount per source packet, and divided by 2,048 bytes, the data amount per sector, i.e. (B2+A2)×192/2, 048, is the same as the number of sectors from the top of the 3D extent group until immediately before the third right-view data block R3. Using this quotient, the LBN for the sector on which the top of the right-view data block R3 is recorded can be specified by tracing the allocation descriptors in the file entry for the first file SS 544A.

After specifying the LBN via the above-described procedure, the playback device 200 indicates the LBN to the BD-ROM drive. In this way, the 3D extent group recorded starting with the sector for this LBN, i.e. the 3D extent group starting with the third right-view data block R3, is read as aligned units.

The playback device 200 further refers to the extent start points 3042 and 3320 to extract dependent-view data blocks and base-view data blocks alternately from the read 3D extents. For example, assume that the 3D extent group EXTSS[n] (n=0, 1, 2, . . . ) is read in order from the data block group 3350 shown in FIG. 40E. The playback device 200 first extracts B1 source packets from the top of the 3D extent EXTSS[0] as the dependent-view data block R1. Next, the playback device 200 extracts the B1$^{th}$ source packet and the subsequent (A1-1) source packets, a total of A1 source packets, as the first base-view data block L1. The playback device 200 then extracts the (B1+A1)$^{th}$ source packet and the subsequent (B2−B1-1) source packets, a total of (B2−B1) source packets, as the second dependent-view data block R2. The playback device 200 further extracts the (A1+B2)$^{th}$ source packet and the subsequent (A2−A1-1) source packets, a total of (A2−A1) source packets, as the second base-view data block L2. Thereafter, the playback device 200 thus continues to detect the boundary between data blocks in each 3D extent based on the number of read source packets, thereby alternately extracting dependent-view and base-view data blocks. The extracted base-view and right-view data blocks are transmitted to the system target decoder to be decoded in parallel.

In this way, the playback device 200 in L/R mode can play back 3D video images from the first file SS 544A starting at a specific PTS. As a result, the playback device 200 can in fact benefit from the above-described advantages (A) and (B) regarding control of the BD-ROM drive.

<File Base>

FIG. 40C is a schematic diagram representing the base-view data blocks L1, L2, . . . extracted from the first file SS 544A by the playback device 200 in L/R mode. The data block group 3350 shown in FIG. 40C includes both a block exclusively for 2D playback L3$_{2D}$ and a block exclusively for 3D playback L3$_{SS}$. Unlike the 2D extent group in the file 2D, the base-view data block group shown in FIG. 40C includes a block exclusively for 3D playback L3$_{SS}$ in addition to a block exclusively for 2D playback L3$_{2D}$. Accordingly, the SPNs 3312 shown by the extent start points 3042 are the same as the SPNs for the source packets located at the tops of base-view data blocks. The base-view data block group extracted from a single file SS by referring to extent start points, like the base-view data block group shown in FIG. 40C, is referred to as a "file base". Furthermore, the base-view data blocks included in a file base are referred to as "base-view extents". Each base-view extent, as shown in FIG. 40C, is referred to by an extent start point in a 2D clip information file.

With the exception of a block exclusively for 2D playback and a block exclusively for 3D playback, a base-view extent shares the same data, i.e. base-view data block, with a 2D extent. Furthermore, blocks exclusively for 2D playback and blocks exclusively for 3D playback match bit-for-bit. Accordingly, the file base includes the same main TS as the file 2D. Unlike 2D extents, however, base-view extents are not referred to by allocation descriptors in a file entry in any file. As described above, base-view extents refer to extent start points in a clip information file to extract 3D extents from the file SS. The file base thus differs from a conventional file shown in FIG. 7 by not including a file entry and by needing an extent start point as a reference for a base-view extent. In this sense, the file base is a "virtual file". In particular, the file base is not recognized by the file system and does not appear in the directory/file structure shown in FIG. 7.

Figure 41:
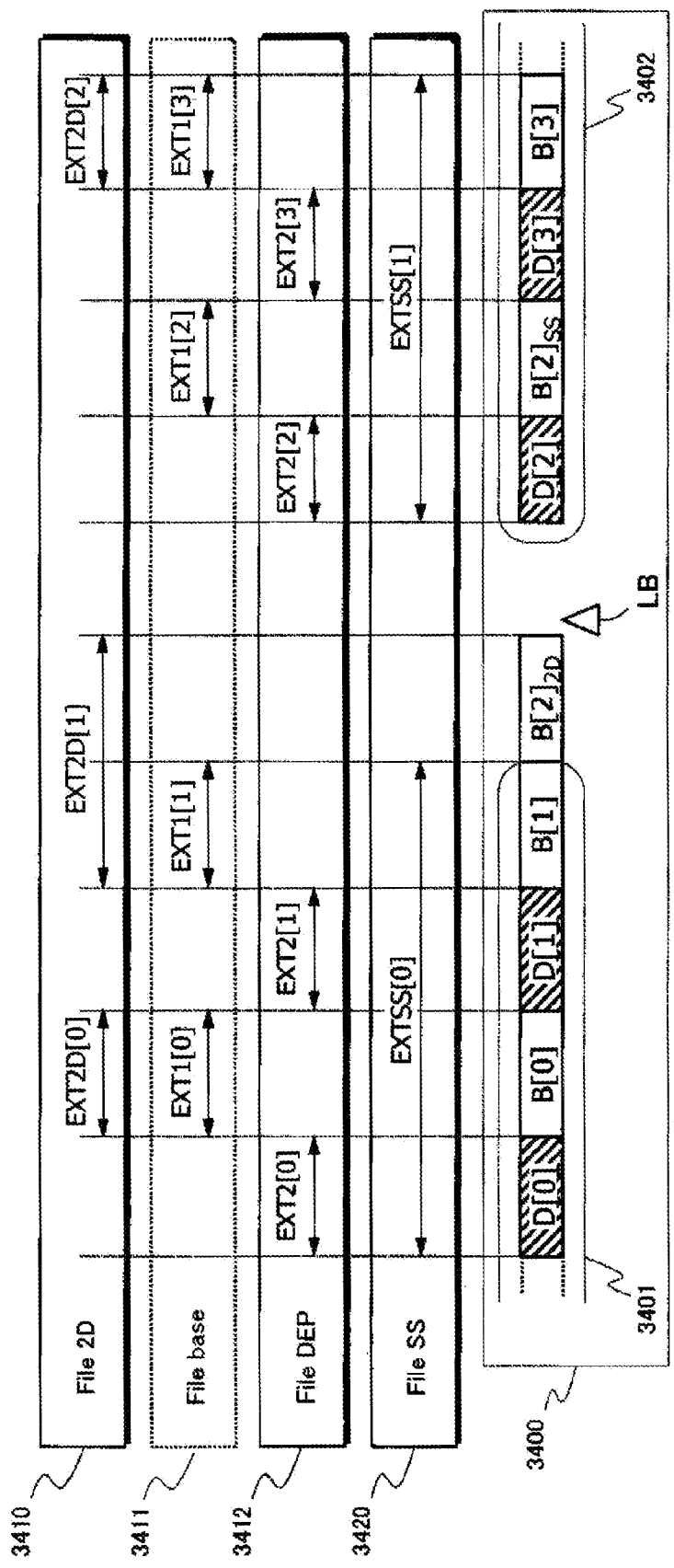
FIG. 41 is a schematic diagram showing an example of an arrangement of data blocks, which include 3D video content, that are recorded on a recording medium 100 according to the first embodiment of the present invention.

The 3D video content recorded on the recording medium 100 may have only one type of sub-TS corresponding to the main TS. FIG. 41 is a schematic diagram showing an example of an arrangement of data blocks that include such content. As shown in FIG. 41, the data block group 3400 alternately includes dependent-view data blocks D[n] (n= . . . , 0, 1, 2, 3, . . . ) and base-view data blocks B[n]. Before the layer boundary LB, the dependent-view data block group . . . , D[0], D[1] and the base-view data block group . . . , B[0], B[1] are recorded in an interleaved arrangement to constitute the first 3D extent block 3401. A block exclusively for 2D playback B[2]$_{2D}$ is placed between the last data block in the first 3D extent block 3401, B[1], and the layer boundary LB. On the other hand, after the layer boundary LB, the dependent-view data block group D[2], D[3], . . . and the base-view data block group B[2]$_{SS}$, B[3], . . . are recorded in an interleaved arrangement to constitute the second 3D extent block 3402. The base-view data block B[2]$_{SS}$ at the top of the second 3D extent block 3402 is a block exclusively for 3D playback and matches bit-for-bit with the block exclusively for 2D playback B[2]$_{2D}$.

FIG. 41 also shows the correspondence between the data block group 3400 and the extent group in the file 2D 3410. The base-view data blocks . . . , B[0], B[1] in the first 3D extent block 3401, with the exception of the last data block B[1], belong to the file 2D 3410 as independent, single 2D extents . . . , EXT2D[0]. A pair of the last base-view data block B[1] in the first 3D extent block 3401 and the immediately subsequent block exclusively for 2D playback B[2]$_{2D}$ belong to the file 2D 3410 as a single 2D extent EXT2D[1]. The base-view data blocks B[3], . . . in the second 3D extent block 3402, with the exception of the block exclusively for 3D playback B[2]$_{SS}$, belong to the file 2D 3410 as 2D extents EXT2D[2], . . . . The 2D extents can be accessed by referring to the allocation descriptors in the file entry of the file 2D 3410.

FIG. 41 also shows the correspondence between the data block group 3400 and the extent group in the file DEP 3412. The dependent-view data blocks . . . , D[0], D[1] in the first 3D extent block 3401 and the dependent-view data blocks D[2], D[3], . . . in the second 3D extent block 3402 belong to the file DEP 3412 as dependent-view extents . . . , EXT2[0], EXT2 [1], EXT2[2], . . . . The dependent-view extents can be accessed by referring to the allocation descriptors in the file entry of the file DEP 3412.

FIG. 41 also shows the correspondence between the data block group 3400 and the extent group in the file SS 3420. Unlike the data block group shown in FIG. 15, the data block group 3400 does not include depth map data blocks. Accordingly, in any interleaved arrangement within the 3D extent blocks 3401 and 3402, the dependent-view data blocks . . . , D[0], D[1], D[2], D[3], . . . and the base-view data blocks . . . , B[0], B[1], B[2]$_{SS}$, B[3], . . . alternate. In this case, the file SS 3420 may include a section with two or more contiguous pairs of dependent-view data blocks and base-view data blocks having the same extent ATC time as one 3D extent. In FIG. 41, two contiguous dependent-view data blocks and base-view data blocks in the first 3D extent block 3401, the pairs D [0]+B[0] and D[1]+B[1], belong to the file SS 3420 as one 3D extent EXTSS[0]. Furthermore, two contiguous dependent-view data blocks and base-view data blocks in the second 3D extent block 3402, the pairs D[2]+B [2]$_{SS}$ and D[3]+B[3], belong to the file SS 3420 as one 3D extent EXTSS[1]. The 3D extents EXTSS[0] and EXTSS[1] share the base-view data blocks B[0], B[1], B[2]$_{SS}$, and B[3] with the 2D extents EXT2D[0], EXT2D[1], EXT2D[2], and EXT2D[3] and share the dependent-view data blocks D[0], D[1], D[2], and D[3] with the dependent-view extents EXT2 [0], EXT2 [1], EXT2 [2], and EXT2 [3]. The 3D extents can be accessed by referring to the allocation descriptors in the file entry of the file SS 3420.

After the playback device 200 reads the 3D extents EXTSS [0] and EXTSS[1], it refers to the extent start points in the respective clip information files for the file 2D 3410 and the file DEP 3412 to extract base-view data blocks B[0], B[1], B[2]$_{SS}$, and B[3] from the 3D extents EXTSS[0] and EXTSS [1]. These base-view data blocks B[0], B[1], B[2]$_{SS}$, and B[3] belong to the file base 3411 as base-view extents EXT1[0], EXT1[1], EXT1[2], and EXT1[3]. Each of the base-view extents EXT1[0], EXT1[1], EXT1[2], and EXT1[3] is referred to by an extent start point in the 2D clip information file corresponding to the file 2D 3410.

Hereinafter, except when there is a need to distinguish, base-view data blocks are equated with base-view extents (with the exception of blocks exclusively for 2D playback), and dependent-view data blocks are equated with dependent-view extents.

<Dependent-View Clip Information File>

The dependent-view clip information file has the same data structure as the 2D clip information file shown in FIGS. 37-40. Accordingly, the following description covers the differences between the dependent-view clip information file and the 2D clip information file, citing the above description with regard to the similarities.

A dependent-view clip information file differs from a 2D clip information file in the following three points: (i) conditions are placed on the stream attribute information, (ii) conditions are placed on the entry points, and (iii) the 3D meta data does not include offset tables.

(i) When the base-view video stream and the dependent-view video stream are to be used for playback of 3D video images by a playback device 200 in L/R mode, the dependent-view video stream which is the right-view video stream is compressed using the base-view video stream. At this point, the video stream attributes of the dependent-view video stream become equivalent to the base-view video stream. The video stream attribute information for the base-view video stream is associated with PID=0x1011 in the stream attribute information 3020 in the 2D clip information file. The video stream attribute information for the dependent-view video stream is associated with PID=0x1012 or 0x1013 in the stream attribute information in the dependent-view clip information file. Accordingly, the items shown in FIG. 37, i.e. the codec, resolution, aspect ratio, and frame rate, have to match between these two pieces of video stream attribute information. If the codec type matches, then a reference relationship between pictures in the base-view video stream and the dependent-view video stream is established during coding, and thus each picture can be decoded. If the resolution, aspect ratio, and frame rate all match, then on-screen presentation of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 3100 shown in FIG. 38A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 42:
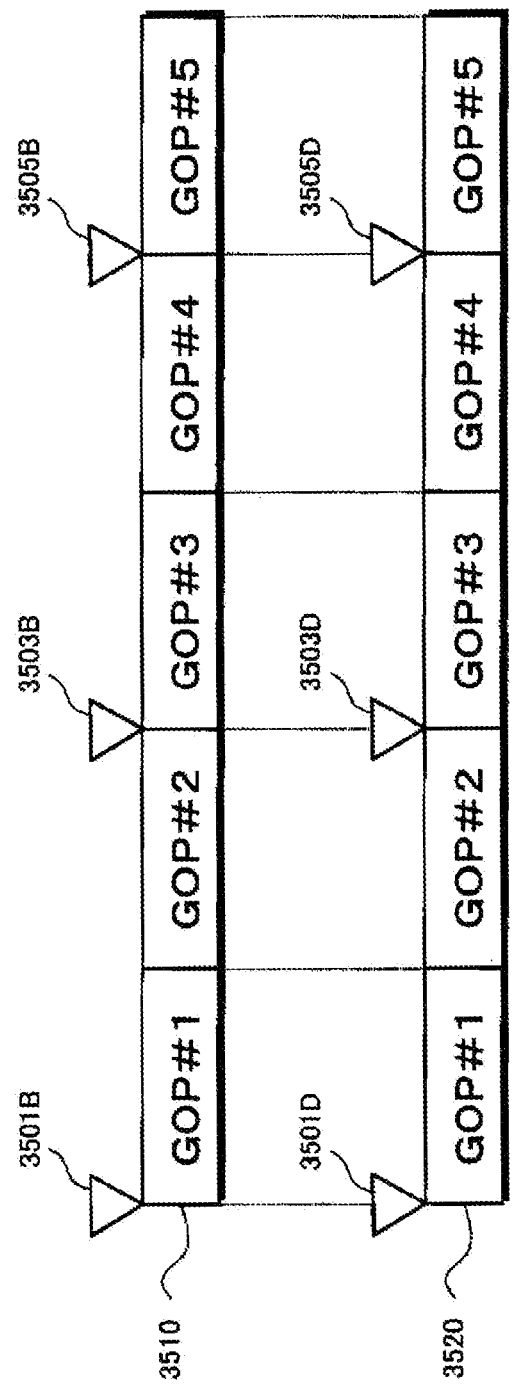
FIG. 42 is a schematic diagram showing an example of entry points set in a base-view video stream 3510 and a dependent-view video stream 3520 on a recording medium 100 according to the first embodiment of the present invention.

FIG. 42 is a schematic diagram showing an example of entry points set in a base-view video stream 3510 and a dependent-view video stream 3520. In the two video streams 3510 and 3520, GOPs that are the same number from the top represent video for the same playback period. As shown in FIG. 42, in the base-view video stream 3510, entry points 3501B, 3503B, and 3505B are set to the top of the odd-numbered GOPS as counted from the top, i.e. GOP #1, GOP #3, and GOP #5. Accordingly, in the dependent-view video stream 3520 as well, entry points 3501D, 3503D, and 3505D are set to the top of the odd-numbered GOPS as counted from the top, i.e. GOP #1, GOP #3, and GOP #5. In this case, when the 3D playback device 200 begins playback of 3D video images from GOP #3, for example, it can immediately calculate the address of the position to start playback in the file SS from the SPN of the corresponding entry points 3503B and 3503D. In particular, when both entry points 3503B and 3503D are set to the top of a data block, then as can be understood from FIG. 40E, the sum of the SPNs of the entry points 3503B and 3503D is the same as the number of source packets from the top of the file SS up to the position to start playback. As described with reference to FIG. 40E, from this number of source packets, it is possible to calculate the LBN of the sector on which the part of the file SS for the position to start playback is recorded. In this way, even during playback of 3D video images, it is possible to improve response speed for processing that requires random access to the video stream, such as interrupt playback or the like.

Figure 43:
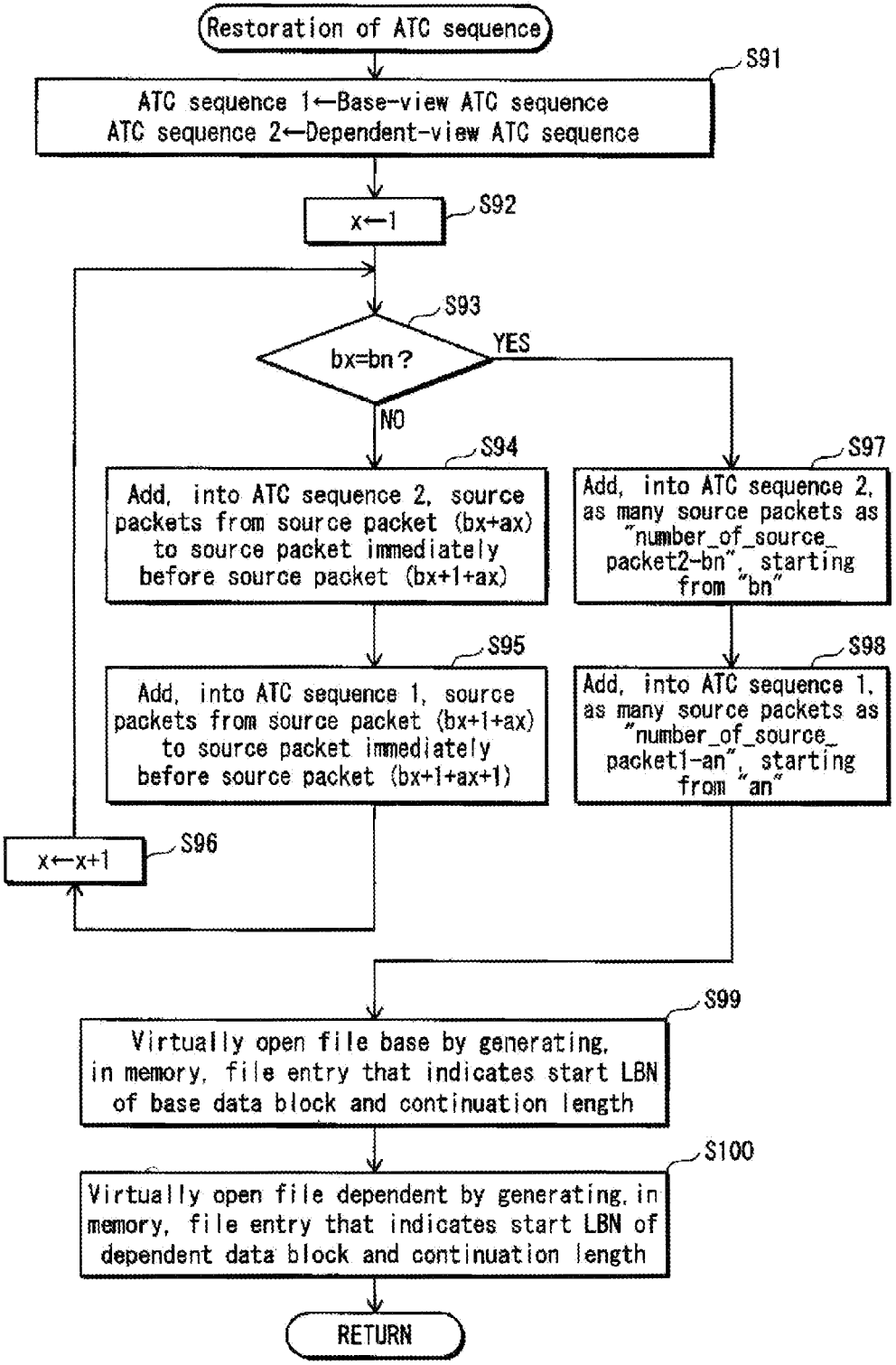
FIG. 43 shows how an ATC sequence is restored.

Described below is an operation for separating the ATC sequence constituting the base-view stream and the ATC sequence constituting the dependent-view stream, from the source packets in the interleaved stream file read from one recording medium, using extent start points. FIG. 43 shows the procedure for restoring the ATC sequence.

In step S91, the ATC sequence for base-view is set as the ATC sequence 1, and the ATC sequence for dependent-view is set as the ATC sequence 2. In step S92, the variable "x" is initialized to "1". The variable "x" specifies the index number of the base-view extent ID (EXT1_ID) and the right-view extent ID (EXT2_ID) indicated by the extent start points. After this, the control enters a loop in which steps S94 through S96 are repeatedly performed as follows.

It is judged whether or not a source packet number bx specified by the variable "x" is equal to a source packet number bn specified by the last numeral "n" of the base-view data block (step S93). When the result of the judgment is in the negative (No in step S93), the source packets from the source packet (bx+ax), which is specified by the source packet number "bx+ax", to the source packet immediately before the source packet ($b_{x+1}$+ax) specified by the source packet number "$b_{x+1}$+ax" are added into the ATC sequence 2 (step S94). Then, the source packets from the source packet (bx+1+ax) to the source packet immediately before the source packet (bx+1+ax+1) are added into the ATC sequence 1 (step S95). And then the variable "x" in incremented (step S96). These steps are repeated until it is judged Yes in step S93.

When it is judged Yes in step S93, as many source packets as the number specified by "number_of_source_packet2-bn" starting from the source packet number "bn" are added into the ATC sequence 2 (step S97). And as many source packets as the number specified by "number_of_source_packet1-bn" starting from the source packet number "an" are added into the ATC sequence 1 (step S98).

After the ATC sequences 1 and 2 are restored through the above-described steps, the file base is virtually opened by generating, in the memory, the file entry that indicates the start LBN of the base-view data block and the continuation length (step S99). Similarly, the file dependent is virtually opened by generating, in the memory, the file entry that indicates the start LBN of the dependent-view data block and the continuation length (step S100).

<Playlist Information File>

In the following, the playlist information file is described in detail.

<2D Playlist File>

Figure 44:
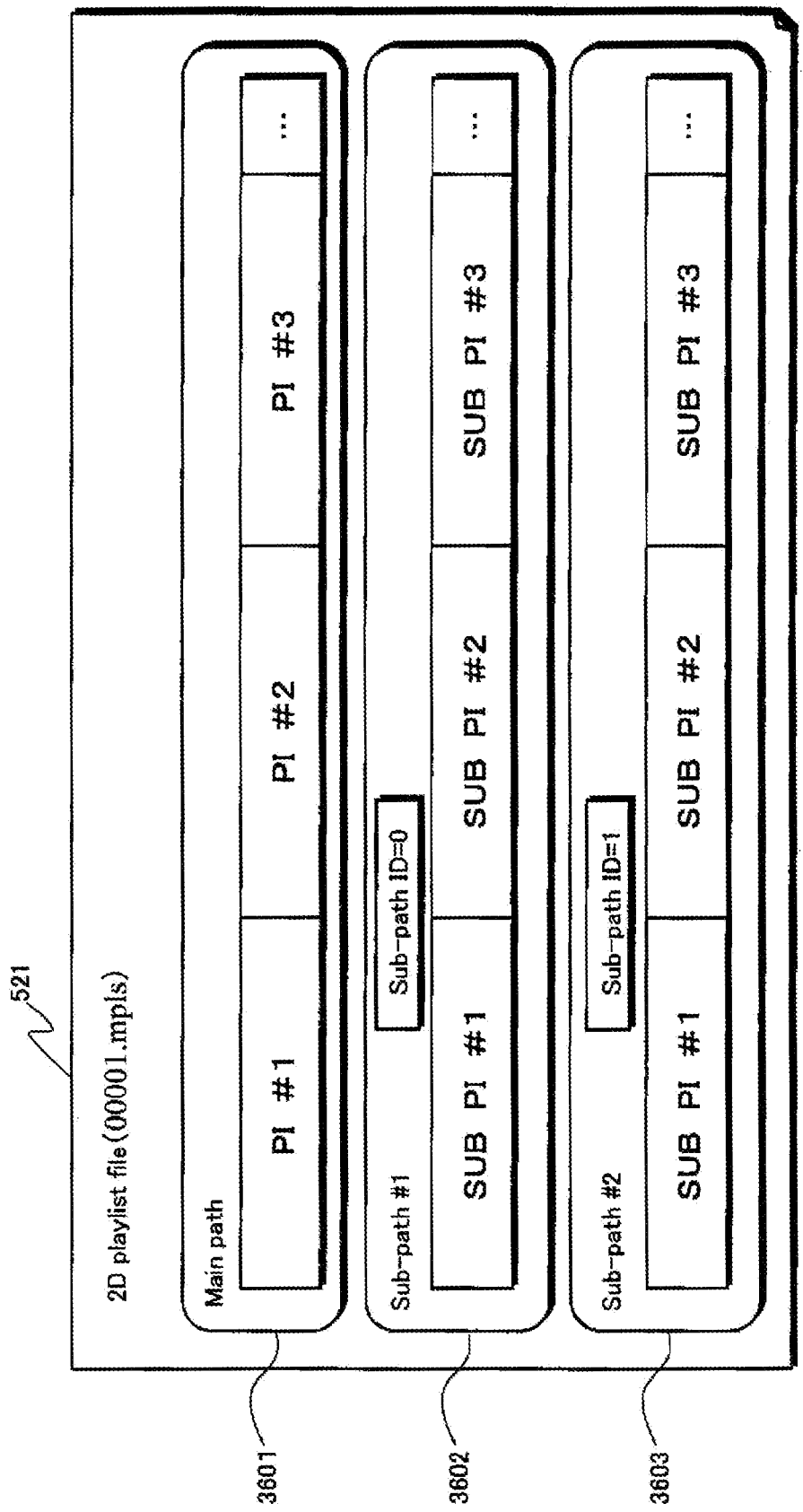
FIG. 44 is a schematic diagram showing the data structure of the 2D playlist file (00001.mpls)

FIG. 44 is a schematic diagram showing the data structure of a 2D playlist file. As shown in FIG. 44, the 2D playlist file 521 includes a main path 3601 and two sub-paths 3602 and 3603.

The main path 3601 is a sequence of playitem information pieces (PI) that defines the main playback path for the file 2D, i.e. the section for playback and the section's playback order. Each PI is identified with a unique playitem ID=#N (N=1, 2, 3, . . . ). Each PI#N defines a different playback section along the main playback path with a pair of PTSs. One of the PTSs in the pair represents the start time (In-Time) of the playback section, and the other represents the end time (Out-Time). Furthermore, the order of the PIs in the main path 3601 represents the order of corresponding playback sections in the playback path.

Each of the sub-paths 3602 and 3603 is a sequence of sub-playitem information pieces (SUB_PI) that defines a playback path that can be associated in parallel with the main playback path for the file 2D. Such a playback path is a different section of the file 2D than is represented by the main path 3601, or is a section of stream data multiplexed in another file 2D, along with the corresponding playback order. Such stream data represents other 2D video images to be played back simultaneously with 2D video images played back from the file 2D in accordance with the main path 3601. These other 2D video images include, for example, sub-video in a picture-in-picture format, a browser window, a pop-up menu, or subtitles. Serial numbers "0" and "1" are assigned to the sub-paths 3602 and 3603 in the order of registration in the 2D playlist file 521. These serial numbers are used as sub-path IDs to identify the sub-paths 3602 and 3603. In the sub-paths 3602 and 3603, each SUB_PI is identified by a unique sub-playitem ID=#M (M=1, 2, 3, . . . ). Each SUB_PI#M defines a different playback section along the playback path with a pair of PTSs. One of the PTSs in the pair represents the playback start time of the playback section, and the other represents the playback end time. Furthermore, the order of the SUB_PIs in the sub-paths 3602 and 3603 represents the order of corresponding playback sections in the playback path.

FIG. 45 is a schematic diagram showing the data structure of a PI#N. As shown in FIG. 45, a PI#N includes a piece of reference clip information 3701, a playback start time (In_Time) 3702, a playback end time (Out_Time) 3703, a connection condition 3704, and a stream selection table (hereinafter abbreviated as referred to as "STN table" (stream number table)) 3705. The reference clip information 3701 is information for identifying the 2D clip information file. The playback start time 3702 and playback end time 3703 respectively indicate PTSs for the beginning and the end of the section for playback of the file 2D. The connection condition 3704 specifies a condition for connecting video in the playback section specified by a playback start time 3702 and a playback end time 3703 to video in the playback section specified by the previous PI# (N−1). The STN table 3705 is a list of elementary streams that can be selected from the file 2D 541 by the decoder in the playback device 200 from the playback start time 3702 until the playback end time 3703.

The data structure of a SUB_PI is the same as the data structure of the PI shown in FIG. 45 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition 3704 has three possible values, "1", "5", and "6". When the connection condition 3704 is "1", the video to be played back from the section of the file 2D specified by the PI#N does not need to be seamlessly connected to the video played back from the section of the file 2D specified by the immediately preceding PI#N. On the other hand, when the connection condition 3704 indicates "5" or "6", both video images need to be seamlessly connected.

FIGS. 46A and 46B are schematic diagrams showing the relationship between playback sections 3801 and 3802 that are to be connected when the connection condition 3704 shown in FIG. 45 respectively indicates "5" and "6". In this case, the PI#N(N−1) specifies a first section 3801 in the file 2D, and the PI#N specifies a second section 3802 in the file 2D. As shown in FIG. 46A, when the connection condition 3704 indicates "5", the STCs of the PI# (N−1) and PI#N may be nonconsecutive. That is, the PTS#1 at the end of the first section 3801 and the PTS#2 at the top of the second section 3802 may be nonconsecutive. Several constraint conditions, however, need to be satisfied. For example, the first section 3801 and second section 3802 need to be created so that the decoder can smoothly continue to decode data even when the second section 3802 is supplied to the decoder consecutively after the first section 3801. Furthermore, the last frame of the audio stream contained in the first section 3801 needs to overlap the top frame of the audio stream contained in the second section 3802. On the other hand, as shown in FIG. 46B, when the connection condition 3704 indicates "6", the first section 3801 and the second section 3802 need to be able to be handled as successive sections for the decoder to duly decode. That is, STCs and ATCs need to be consecutive between the first section 3801 and the second section 3802. Similarly, when the SP connection condition is "5" or "6", STCs and ATCs need to be consecutive between sections of the file 2D specified by two consecutive SUB_PIs.

[STN Table]

Referring again to FIG. 45, the STN table 3705 is an array of stream registration information. "Stream registration information" is information individually listing the elementary streams that can be selected for playback from the main TS between the playback start time 3702 and playback end time 3703. The stream number (STN) 3706 is a serial number allocated individually to stream registration information and is used by the playback device 200 to identify each elementary stream. The STN 3706 further indicates priority for selection among elementary streams of the same type. The stream registration information includes a stream entry 3709 and stream attribute information 3710. The stream entry 3709 includes stream path information 3707 and stream identification information 3708. The stream path information 3707 is information indicating the file 2D to which the selected elementary stream belongs. For example, if the stream path information 3707 indicates "main path", the file 2D corresponds to the 2D clip information file indicated by reference clip information 3701. On the other hand, if the stream path information 3707 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 3702 until the playback end time 3703 specified by the PI included in the STN table 3705. The stream identification information 3708 indicates the PID for the elementary stream multiplexed in the file 2D specified by the stream path information 3707. The elementary stream indicated by this PID can be selected from the playback start time 3702 until the playback end time 3703. The stream attribute information 3710 indicates attribute information for each elementary stream. For example, the attribute information of an audio stream, a PG stream, and an IG stream indicates a language type of the stream.

[Playback of 2D Video Images in Accordance with a 2D Playlist File]

Figure 47:
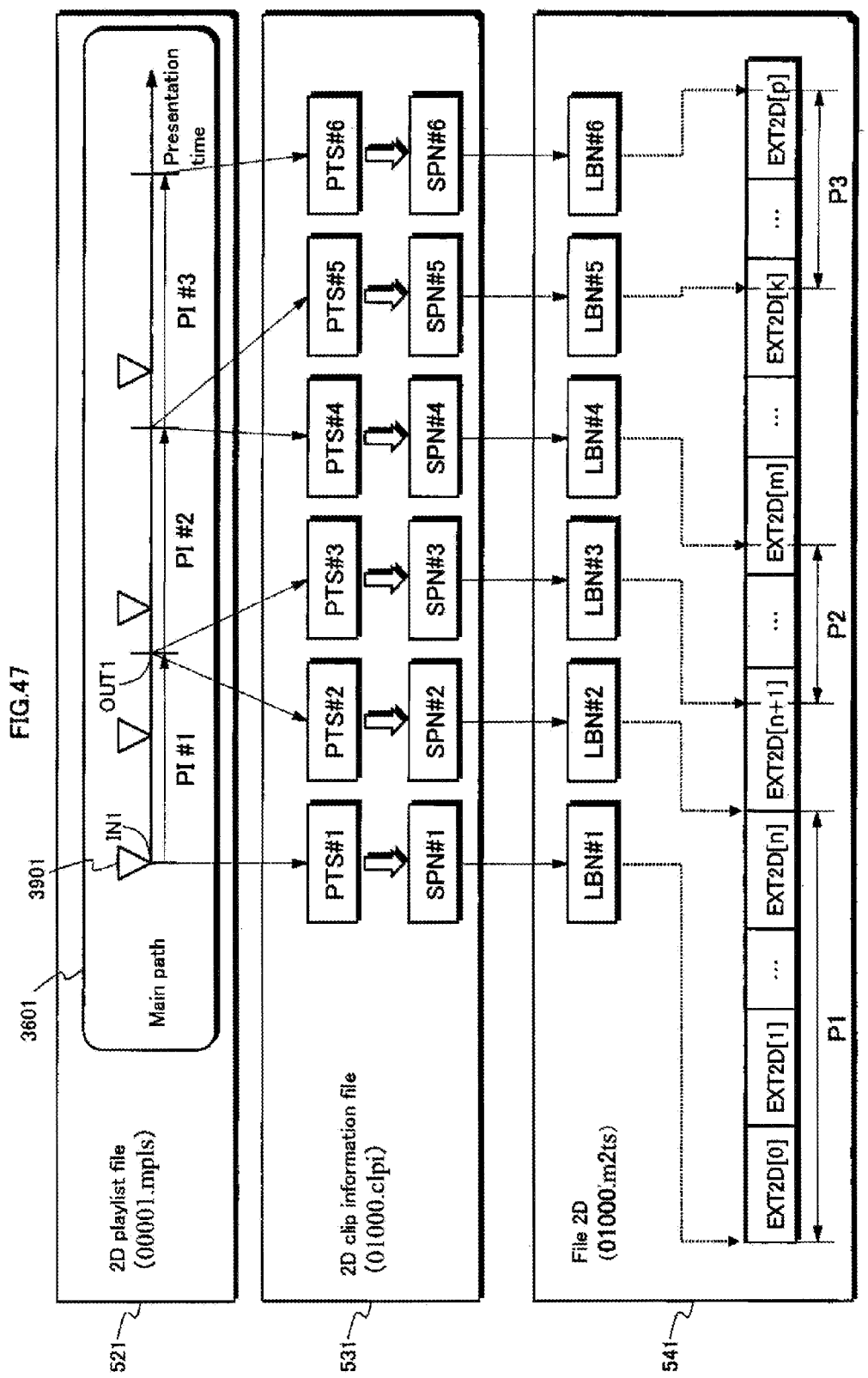
FIG. 47 is a schematic diagram showing the relationships between the PTSs indicated by the 2D playlist file (00001.mpls) 521 shown in FIG. 44 and the sections played back from the file 2D (01000.m2ts) 541.

FIG. 47 is a schematic diagram showing the relationships between the PTSs indicated by the 2D playlist file (00001.mpls) 521 and the sections played back from the file 2D (01000.m2ts) 541. As shown in FIG. 47, in the main path 3601 in the 2D playlist file 521, the PI#1 specifies a PTS#1, which indicates a playback start time IN1, and a PTS#2, which indicates a playback end time OUT1. The reference clip information 3701 for the PI#1 indicates the 2D clip information file (01000.clpi) 531. When playing back 2D video images in accordance with the 2D playlist file 521, the playback device 200 first reads the PTS#1 and PTS#2 from the PI#1. Next, the playback device 200 refers to the entry map in the 2D clip information file 531 to retrieve from the file 2D 541 the SPN#1 and SPN#2 that correspond to the PTS#1 and PTS#2. The playback device 200 then calculates the corresponding numbers of sectors from the SPN#1 and SPN#2. Furthermore, the playback device 200 refers to these numbers of sectors and the allocation descriptors in the file entry for the file 2D 541 to specify the LBN#1 and LBN#2 at the beginning and end, respectively, of the sector group P1 on which the 2D extent group EXT2D[0], . . . , EXT2D[n] to be played back is recorded. Calculation of the numbers of sectors and specification of the LBNs are as per the description of FIGS. 38B and 38C. Finally, the playback device 200 indicates the range from LBN#1 to LBN#2 to the BD-ROM drive. The source packet group belonging to the 2D extent group EXT2D[0], . . . , EXT2D[n] is thus read from the sector group P1 in this range. Similarly, the pair PTS#3 and PTS#4 indicated by the PI#2 are first converted into a pair of SPN#3 and SPN#4 by referring to the entry map in the 2D clip information file 531. Then, referring to the allocation descriptors in the file entry for the file 2D 541, the pair of SPN#3 and SPN#4 are converted into a pair of LBN#3 and LBN#4. Furthermore, a source packet group belonging to the 2D extent group is read from the sector group P2 in a range from the LBN#3 to the LBN#4. Conversion of a pair of PTS#5 and PTS#6 indicated by the PI#3 to a pair of SPN#5 and SPN#6, conversion of the pair of SPN#5 and SPN#6 to a pair of LBN#5 and LBN#6, and reading of a source packet group from the sector group P3 in a range from the LBN#5 to the LBN#6 are similarly performed. The playback device 200 thus plays back 2D video images from the file 2D 541 in accordance with the main path 3601 in the 2D playlist file 521.

The 2D playlist file 521 may include an entry mark 3901. The entry mark 3901 indicates a time point in the main path 3601 at which playback is actually to start. For example, as shown in FIG. 47, multiple entry marks 3901 can be set for the PI#1. The entry mark 3901 is particularly used for searching for a position to start playback during random access. For example, when the 2D playlist file 521 specifies a playback path for a movie title, the entry marks 3901 are assigned to the top of each chapter. Consequently, the playback device 200 can play back the movie title by chapters.

[3D Playlist File]

Figure 48:
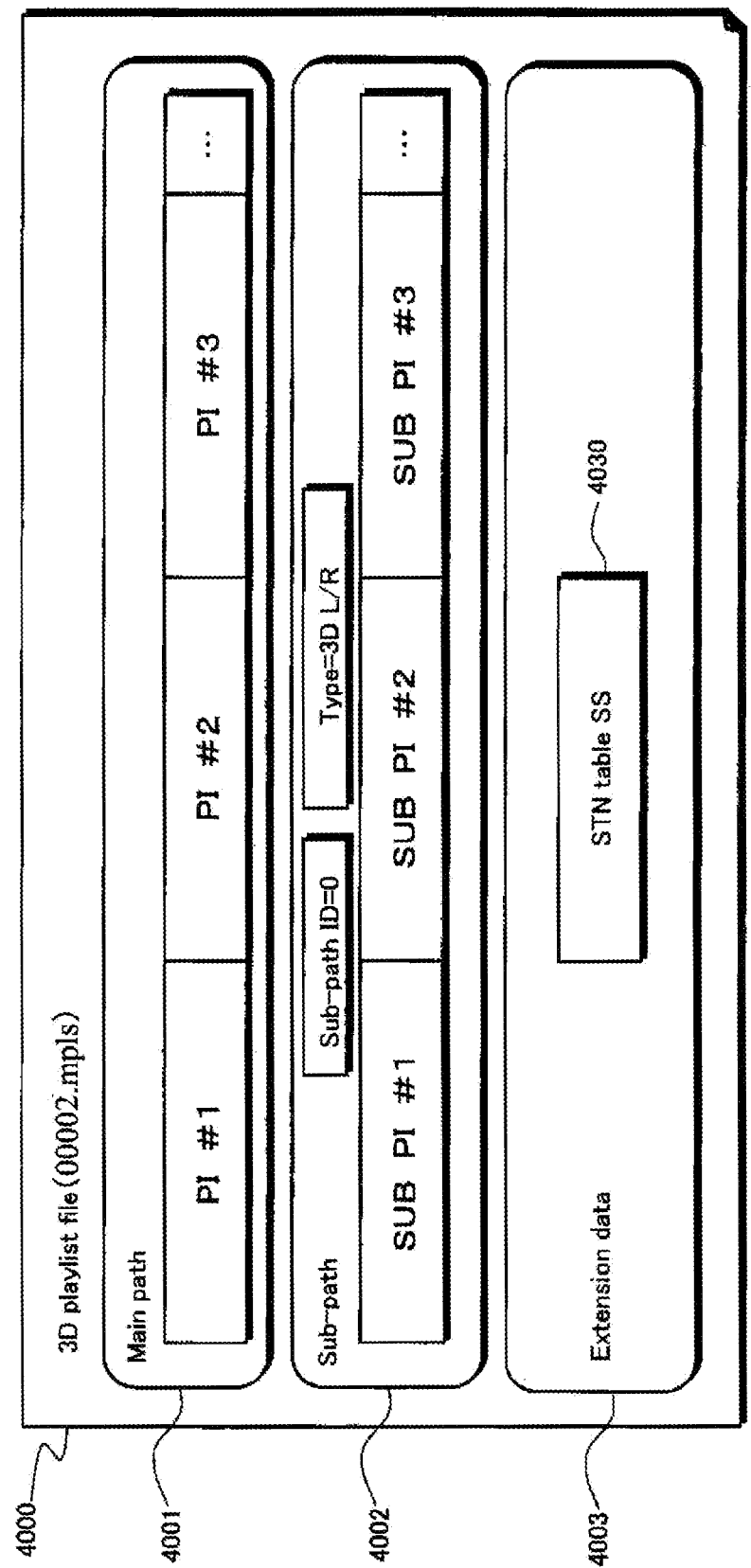
FIG. 48 is a schematic diagram showing the data structure of the 3D playlist file (00002.mpls)

FIG. 48 is a schematic diagram showing the data structure of the 3D playlist file 4000. The second playlist file (00002.mpls) 522 and second playlist file (00003.mpls) 523 shown in FIG. 5 both have the same data structure as this 3D playlist file. As shown in FIG. 48, the 3D playlist file 4000 includes a main path 4001, sub-path 4002, and extension data 4003.

The main path 4001 specifies the playback path of the main TS. Accordingly, the main path 4001 is the same as the main path 3601 for the 2D playlist file shown in FIG. 44. The playback device 200 in 2D playback mode can play back 2D video images from the file 2D in accordance with the main path 4001 in the 3D playlist file 4000.

The sub-path 4002 specifies the playback path for the sub-TSs, i.e. the playback path for the file DEP that includes the left-view video stream or the file DEP that includes the depth map stream. The data structure of the sub-path 4002 is the same as the data structure of the sub-paths 3602 and 3603 in the 2D playlist file shown in FIG. 44. Accordingly, the description of FIG. 44 is cited regarding details on this similar data structure, in particular regarding details on the data structure of the SUB_PI.

The SUB_PI#N (N=1, 2, 3, ... ) in the sub-path 4002 are in one-to-one correspondence with the PI#N in the main path 4001. Furthermore, the playback start time and playback end time specified by each SUB_PI#N is the same as the playback start time and playback end time specified by the corresponding PI#N. The sub-path 4002 additionally includes a sub-path type 4021. The "sub-path type" generally indicates whether playback processing should be synchronized between the main path and the sub-path. In the 3D playlist file 4000, the sub-path type 4021 in particular indicates the type of the 3D playback mode, i.e. the type of the dependent-view video stream to be played back in accordance with the sub-path 4002. In FIG. 48, the value of the sub-path type 4021 is "3D L/R", thus indicating that the 3D playback mode is L/R mode, i.e. that the right-view video stream is targeted for playback. On the other hand, a value of "3D depth" for the sub-path type 4021 indicates that the 3D playback mode is depth mode, i.e. that the depth map stream is targeted for playback. When the playback device 200 in 3D playback mode detects that the value of the sub-path type 4021 is "3D L/R" or "3D depth", the playback device 200 synchronizes playback processing in accordance with the main path 4001 with playback processing in accordance with the sub-path 4002.

Only the playback device 200 in 3D playback mode interprets the extension data 4003; the playback device 200 in 2D playback mode ignores the extension data 4003. In particular, the extension data 4003 includes an extension stream selection table 4030. The "extension stream selection table (STN_table_SS)" (hereinafter abbreviated as STN table SS) is an array of stream registration information to be added to the STN tables indicated by each PI in the main path 4001. This stream registration information indicates elementary streams that can be selected for playback from the main TS.

Figure 49:
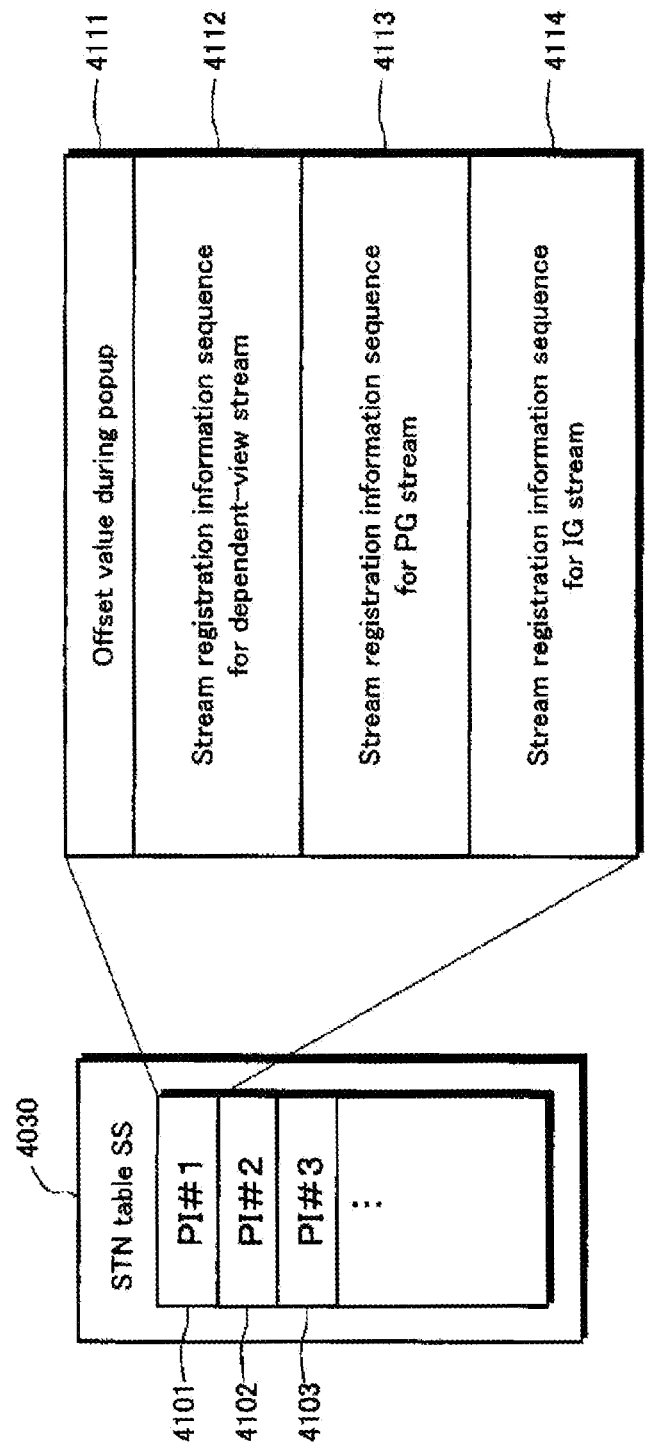
FIG. 49 is a schematic diagram showing the data structure of the STN table SS 4030 shown in FIG. 48.

FIG. 49 is a schematic diagram showing the data structure of an STN table SS 4030. As shown in FIG. 49, an STN table SS 4030 includes stream registration information sequences 4101, 4102, 4103, .... The stream registration information sequences 4101, 4102, 4103, ... individually correspond to the PI#1, PI#2, PI#3, ... in the main path 4001 and are used by the playback device 200 in 3D playback mode in combination with the stream registration information sequences included in the STN tables in the corresponding PIs. The stream registration information sequence 4101 corresponding to each PI includes an offset during popup (Fixed_offset_during_Popup) 4111, stream registration information sequence 4112 for the dependent-view video streams, stream registration information sequence 4113 for the PG stream, and stream registration information sequence 4114 for the IG stream.

The offset during popup 4111 indicates whether a popup menu is played back from the IG stream. The playback device 200 in 3D playback mode changes the presentation mode of the video plane and the PG plane in accordance with the value of the offset 4111. There are two types of presentation modes for the video plane: base-view (B)—dependent-view (D) presentation mode and B-B presentation mode. There are three types of presentation modes for the PG plane and IG plane: 2 plane mode, 1 plane+offset mode, and 1 plane+zero offset mode. For example, when the value of the offset during popup 4111 is "0", a popup menu is not played back from the IG stream. At this point, B-D presentation mode is selected as the video plane presentation mode, and 2 plane mode or 1 plane+offset mode is selected as the presentation mode for the PG plane. On the other hand, when the value of the offset during popup 4111 is "1", a popup menu is played back from the IG stream. At this point, B-B presentation mode is selected as the video plane presentation mode, and 1 plane+zero offset mode is selected as the presentation mode for the PG plane.

In "B-D presentation mode", the playback device 200 alternately outputs plane data decoded from the left-view and right-view video streams. Accordingly, since left-view and right-view video frames representing video planes are alternately displayed on the screen of the television 300, a viewer perceives these frames as 3D video images. In "B-B presentation mode", the playback device 200 outputs plane data decoded only from the base-view video stream twice for a frame while maintaining the operation mode in 3D playback mode (in particular, maintaining the frame rate at the value for 3D playback, e.g. 48 frames/second). Accordingly, only either the left-view or right-view frames are displayed on the screen of the playback device 103, and thus a viewer perceives these frames simply as 2D video images.

In "2 plane mode", when the sub-TS includes both left-view and right-view graphics streams, the playback device 200 decodes and alternately outputs left-view and right-view graphics plane data from the graphics streams. In "1 plane+offset mode", the playback device 200 generates a pair of left-view plane data and right-view plane data from the graphics stream in the main TS via cropping processing and alternately outputs these pieces of plane data. In both of these modes, left-view and right-view PG planes are alternately displayed on the screen of the television 300, and thus a viewer perceives these frames as 3D video images. In "1 plane+zero offset mode", the playback device 200 temporarily stops cropping processing and outputs plane data decoded from the graphics stream in the main TS twice for a frame while maintaining the operation mode in 3D playback mode. Accordingly, only either the left-view or right-view PG planes are displayed on the screen of the playback device 103, and thus a viewer perceives these planes simply as 2D video images.

The playback device 200 in 3D playback mode refers to the offset during popup 4111 for each PI and selects B-B presentation mode and 1 plane+zero offset mode when a popup menu is played back from an IG stream. While a pop-up menu is displayed, other 3D video images are thus temporarily changed to 2D video images. This improves the visibility and usability of the popup menu.

The stream registration information sequence 4112 for the dependent-view video stream, the stream registration information sequence 4113 for the PG streams, and the stream registration information sequence 4114 for the IG streams each include stream registration information indicating the dependent-view video streams, PG streams, and IG streams that can be selected for playback from the sub-TS. These stream registration information sequences 4112, 4113, and 4114 are each used in combination with stream registration information sequences, located in the STN table of the corresponding PI, that respectively indicate base-view streams, PG streams, and IG streams. When reading a piece of stream registration information from an STN table, the playback device 200 in 3D playback mode automatically also reads the stream registration information sequence, located in the STN table SS, that has been combined with the piece of stream registration information. When simply switching from 2D playback mode to 3D playback mode, the playback device 200 can thus maintain already recognized STNs and stream attributes such as language.

Figure 50:
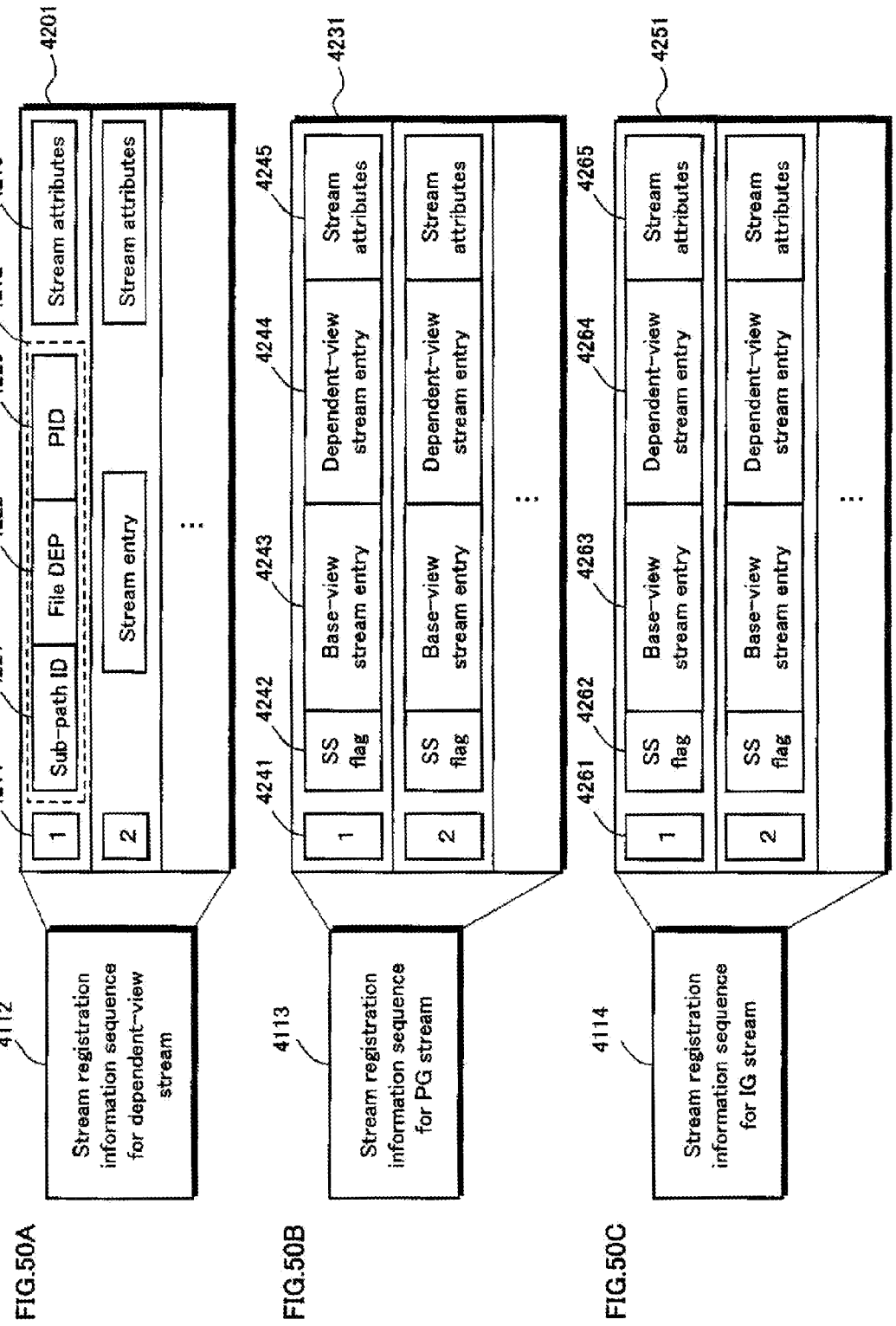
FIGS. 50A, 50B, and 50C are schematic diagrams respectively showing the data structures of a stream registration information sequence 4112 for dependent-view video streams, stream registration information sequence 4113 for PG streams, and stream registration information sequence 4114 for IG streams, which are shown in FIG. 49.

FIG. 50A is a schematic diagram showing the data structure of a stream registration information sequence 4112 for dependent-view video streams. As shown in FIG. 50A, this stream registration information sequence 4112 generally includes a plurality of pieces of stream registration information (SS_dependent_view_block) 4201. These are the same in number as the pieces of stream registration information in the corresponding PI that indicate the base-view video stream. Each piece of stream registration information 4201 includes an STN 4211, stream entry 4212, and stream attribute information 4213. The STN 4211 is a serial number assigned individually to pieces of stream registration information 4201 and is the same as the STN of the piece of stream registration information, located in the corresponding PI, with which each piece of stream registration information 4201 is combined. The stream entry 4212 includes sub-path ID reference information (ref_to_subpath_id) 4221, stream file reference information (ref_to_subclip_entry_id) 4222, and PID (ref_to_stream_PID_subclip) 4223. The sub-path ID reference information 4221 indicates the sub-path ID of the sub-path that specifies the playback path of the dependent-view video stream. The stream file reference information 4222 is information to identify the file DEP storing this dependent-view video stream. The PID 4223 is the PID for this dependent-view video stream. The stream attribute information 4213 includes attributes for this dependent-view video stream, such as frame rate, resolution, and video format. In particular, these attributes are the same as those for the base-view video stream shown by the piece of stream registration information, located in the corresponding PI, with which each piece of stream registration information 4201 is combined.

FIG. 50B is a schematic diagram showing the data structure of a stream registration information sequence 4113 for PG streams. As shown in FIG. 50B, this stream registration information sequence 4113 generally includes a plurality of pieces of stream registration information 4231. These are the same in number as the pieces of stream registration information in the corresponding PI that indicates the PG streams. Each piece of stream registration information 4231 includes an STN 4241, stereoscopic flag (is_SS_PG) 4242, base-view stream entry (stream_entry_for_base_view) 4243, dependent-view stream entry (stream_entry_for_dependent_view) 4244, and stream attribute information 4245. The STN 4241 is a serial number assigned individually to pieces of stream registration information 4231 and is the same as the STN of the piece of stream registration information, located in the corresponding PI, with which each piece of stream registration information 4231 is combined. The stereoscopic flag 4242 indicates whether both base-view and dependent-view, e.g. left-view and right-view, PG streams are included on a Recording medium 100. If the stereoscopic flag 4242 is on, both PG streams are included in the sub-TS. Accordingly, the playback device reads all of the fields in the base-view stream entry 4243, the dependent-view stream entry 4244, and the stream attribute information 4245. If the stereoscopic flag 4242 is off, the playback device ignores all of these fields 4243-4245. Both the base-view stream entry 4243 and the dependent-view stream entry 4244 include sub-path ID reference information, stream file reference information, and a PID. The sub-path ID reference information indicates the sub-path IDs of the sub-paths that specify the playback paths of the base-view and dependent-view PG streams. The stream file reference information is information to identify the file DEP storing the PG streams. The PIDs are the PIDs for the PG streams. The stream attribute information 4245 includes attributes for the PG streams, e.g. language type.

FIG. 50C is a schematic diagram showing the data structure of a stream registration information sequence 4114 for IG streams. As shown in FIG. 50C, this stream registration information sequence 4114 generally includes a plurality of pieces of stream registration information 4251. These are the same in number as the pieces of stream registration information in the corresponding PI that indicates the IG streams. Each piece of stream registration information 4251 includes an STN 4261, stereoscopic flag (is_SS_IG) 4262, base-view stream entry 4263, dependent-view stream entry 4264, and stream attribute information 4265. The STN 4261 is a serial number assigned individually to pieces of stream registration information 4251 and is the same as the STN of the piece of stream registration information, located in the corresponding PI, with which each piece of stream registration information 4251 is combined. The stereoscopic flag 4262 indicates whether both base-view and dependent-view, e.g. left-view and right-view, IG streams are included on a recording medium 100. If the stereoscopic flag 4262 is on, both IG streams are included in the sub-TS. Accordingly, the playback device reads all of the fields in the base-view stream entry 4263, the dependent-view stream entry 4264, and the stream attribute information 4265. If the stereoscopic flag 4262 is off, the playback device ignores all of these fields 4263-4265. Both the base-view stream entry 4263 and the dependent-view stream entry 4264 include sub-path ID reference information, stream file reference information, and a PID. The sub-path ID reference information indicates the sub-path IDs of the sub-paths that specify the playback paths of the base-view and dependent-view IG streams. The stream file reference information is information to identify the file DEP storing the IG streams. The PIDs are the PIDs for the IG streams. The stream attribute information 4265 includes attributes for the IG streams, e.g. language type.

[Playback of 3D Video Images in Accordance with a 3D Playlist File]

Figure 51:
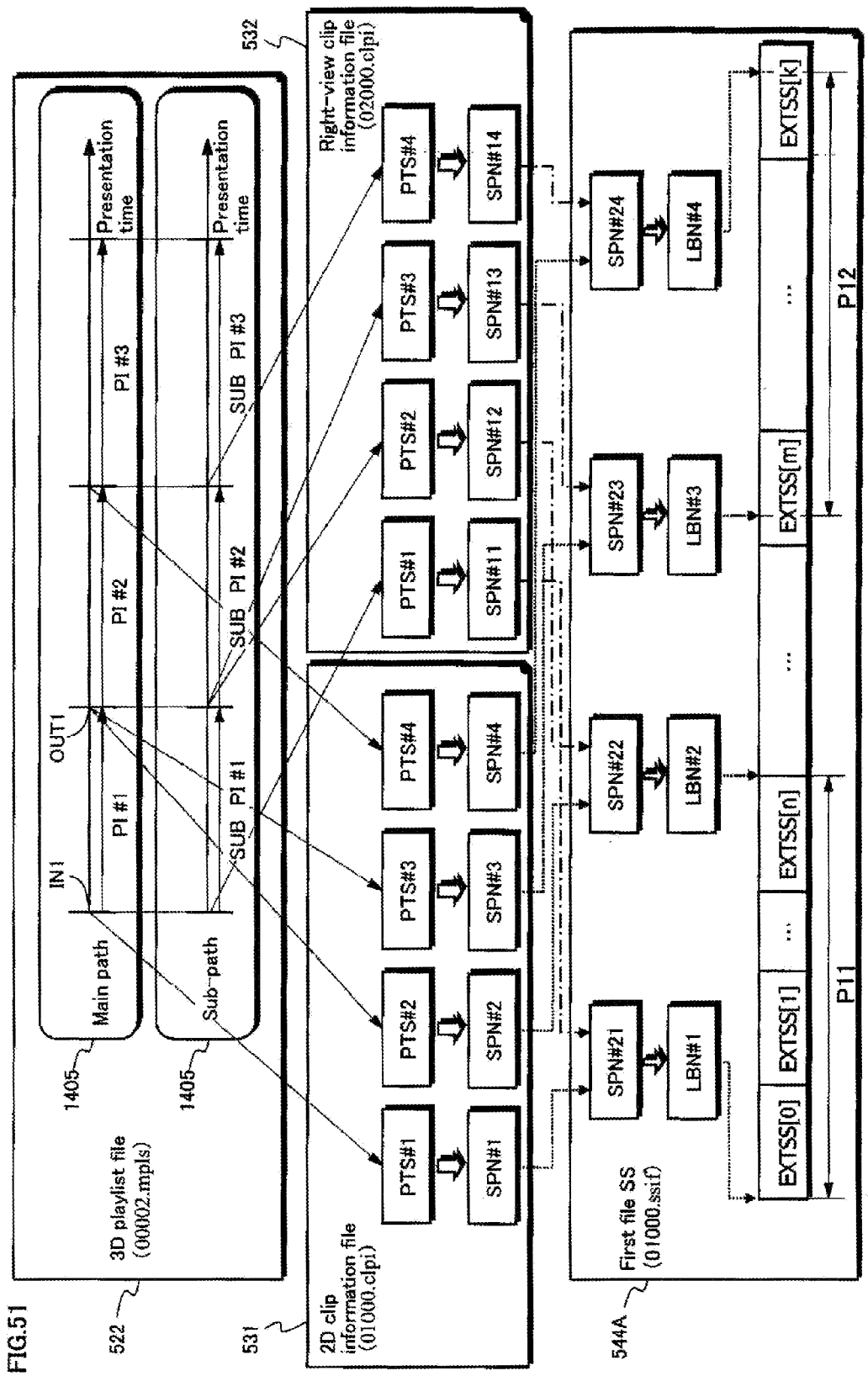
FIG. 51 is a schematic diagram showing the relationships between the PTSs indicated by the 3D playlist file (00002.mpls) 522 shown in FIG. 48 and the sections played back from the first file SS (01000.ssif)

FIG. 51 is a schematic diagram showing the relationships between the PTSs indicated by the 3D playlist file (00002.mpls) 522 and the sections played back from the file SS (01000.ssif) 544A. As shown in FIG. 51, in the main path 4301 of the 3D playlist file 522, the PI#1 specifies a PTS#1, which indicates a playback start time IN1, and a PTS#2, which indicates a playback end time OUT1. The reference clip information for the PI#1 indicates the 2D clip information file (01000.clpi) 531. In the sub-path 4302, which indicates that the sub-path type is "3D L/R", the SUB_PI#1 specifies the same PTS#1 and PTS#2 as the PI#1. The reference clip information for the SUB_PI#1 indicates the right-view clip information file (02000.clpi) 532.

When playing back 3D video images in accordance with the 3D playlist file 522, the playback device 200 first reads PTS#1 and PTS#2 from the PI#1 and SUB_PI#1. Next, the playback device 200 refers to the entry map in the 2D clip information file 531 to retrieve from the file 2D the SPN#1 and SPN#2 that correspond to the PTS#1 and PTS#2. In parallel, the playback device 200 refers to the entry map in the right-view clip information file 532 to retrieve from the file DEP the SPN#11 and SPN#12 that correspond to the PTS#1 and PTS#2. As described with reference to FIG. 40E, the playback device 200 then uses the extent start points 3042 and 3320 in the clip information files 531 and 532 to calculate, from SPN#1 and SPN#11, the number of source packets SPN#21 from the top of the first file SS 544A to the position to start playback. Similarly, the playback device 200 calculates, from SPN#2 and SPN#12, the number of source packets SPN#22 from the top of the file SS 544A to the position to start playback. The playback device 200 further calculates the numbers of sectors corresponding to the SPN#21 and SPN#22. Next, the playback device 200 refers to these numbers of sectors and the allocation descriptors in the file entry for the file SS 544A to specify the LBN#1 and LBN#2 at the beginning and end, respectively, of the sector group P11 on which the 3D extent group EXTSS[0], . . . , EXTSS[n] to be played back is recorded. Calculation of the numbers of sectors and specification of the LBNs are as per the description of FIG. 40E. Finally, the playback device 200 indicates the range from LBN#1 to LBN#2 to the BD-ROM drive. The source packet group belonging to the 3D extent group EXTSS[0], . . . , EXTSS[n] is thus read from the sector group P11 in this range. Similarly, the pair PTS#3 and PTS#4 indicated by the PI#2 and SUB_PI#2 are first converted into a pair of SPN#3 and SPN#4 and a pair of SPN#13 and SPN#14 by referring to the entry maps in the clip information files 531 and 532. Then, the number of source packets SPN#23 from the top of the file SS 544A to the position to start playback is calculated from SPN#3 and SPN#13, and the number of source packets SPN#24 from the top of the file SS 544A to the position to end playback is calculated from SPN#4 and SPN#14. Next, referring to the allocation descriptors in the file entry for the file SS 544A, the pair of SPN#23 and SPN#24 are converted into a pair of LBN#3 and LBN#4. Furthermore, a source packet group belonging to the 3D extent group is read from the sector group P12 in a range from the LBN#3 to the LBN#4.

In parallel with the above-described read processing, as described with reference to FIG. 40E, the playback device 200 refers to the extent start points 3042 and 3320 in the clip information files 531 and 532 to extract base-view extents from each 3D extent and decode the base-view extents in parallel with the remaining right-view extents. The playback device 200 can thus play back 3D video images from the first file SS 544A in accordance with the 3D playlist file 522.

Up to now, the playlist information file has been described in detail.

<Index Table>

Figure 52:
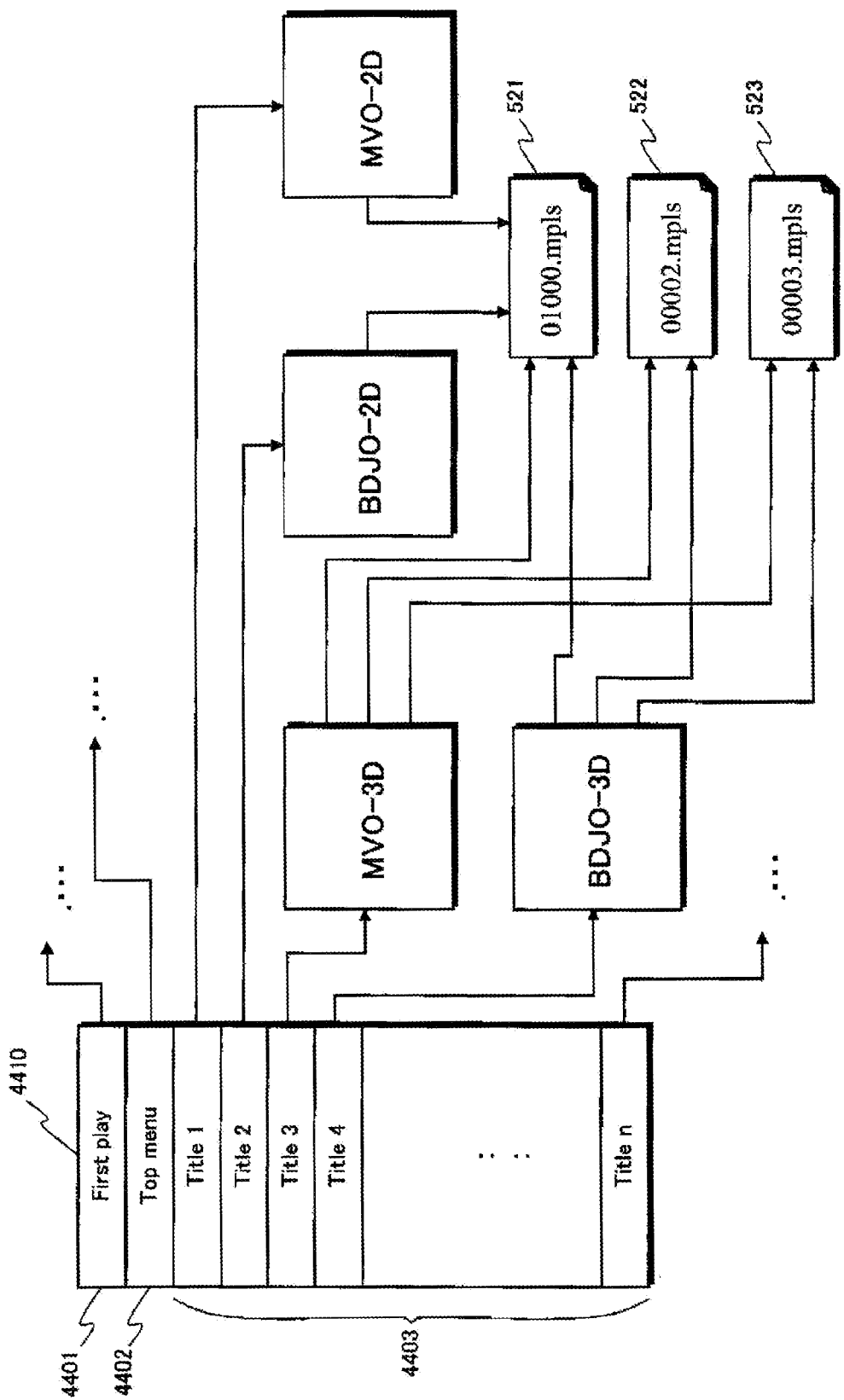
FIG. 52 is a schematic diagram showing an index table 4410 in the index file (index.bdmv) 511.

FIG. 52 is a schematic diagram showing an index table 4410 in the index file (index.bdmv) shown in FIG. 5. As shown in FIG. 52, the index table 4410 stores the items "first play" 4401, "top menu" 4402, and "title k" 4403 (k=1, 2, . . . , n; an integer n is equal to or greater than one). Each item is associated with either a movie object MVO-2D, MVO-3D, . . . , or with a BD-J object BDJO-2D, BDJO-3D, . . . . Each time a title or a menu is called in response to a user operation or an application program, a control unit in the playback device 200 refers to a corresponding item in the index table 4410. Furthermore, the control unit calls an object associated with the item from the Recording medium 100 and accordingly executes a variety of processes. Specifically, the "first play" 4401 specifies an object to be called when the recording medium 100 is loaded into the BD-ROM drive 121. The "top menu" 4402 specifies an object for displaying a menu on the television 300 when a command "go back to menu" is input, for example, by user operation. In the "title k" 4403, the titles that constitute the content on the recording medium 100 are individually allocated. For example, when a title for playback is specified by user operation, in the item "title k" in which the title is allocated, the object for playing back a video from the AV stream file corresponding to the title is specified.

In the example shown in FIG. 52, the items "title 1" and "title 2" are allocated to titles of 2D video images. The movie object associated with the item "title 1", MVO-2D, includes a group of commands related to playback processes for 2D video images using the 2D playlist file (00001.mpls) 521. When the playback device 200 refers to the item "title 1", then in accordance with the movie object MVO-2D, the 2D playlist file 521 is read from the recording medium 100, and playback processes for 2D video images are executed in accordance with the playback path specified therein. The BD-J object associated with the item "title 2", BDJO-2D, includes an application management table related to playback processes for 2D video images using the 2D playlist file 521. When the playback device 200 refers to the item "title 2", then in accordance with the application management table in the BD-J object BDJO-2D, a Java application program is called from the JAR file and executed. In this way, the 2D playlist file 521 is read from the recording medium 100, and playback processes for 2D video images are executed in accordance with the playback path specified therein.

Furthermore, in the example shown in FIG. 52, the items "title 3" and "title 4" are allocated to titles of 3D video images. The movie object associated with the item. "title 3", MVO-3D, includes, in addition to a group of commands related to playback processes for 2D video images using the 2D playlist file 521, a group of commands related to playback processes for 3D video images using either 3D playlist file (00002.mpls) 522 or (00003.mpls) 523. In the BD-J object associated with the item "title 4", BDJO-3D, the application management table specifies, in addition to a Java application program related to playback processes for 2D video images using the 2D playlist file 521, a Java application program related to playback processes for 3D video images using either 3D playlist file 522 or 523.

When the playback device 200 refers to item "title 3", the following four determination processes are performed in accordance with the movie object MVO-3D: (1) Does the playback device 200 itself support playback of 3D video images? (2) Has the user selected playback of 3D video images? (3) Does the television 300 support playback of 3D video images? and (4) Is the 3D video playback mode of the playback device 200 in L/R mode or depth mode? Next, in accordance with the results of these determinations, one of the playlist files 521-523 is selected for playback. When the playback device 200 refers to item "title 4", a Java application program is called from the JAR file, in accordance with the application management table in the BD-J object BDJO-3D, and executed. The above-described determination processes are thus performed, and a playlist file is then selected in accordance with the results of determination.

[Selection of Playlist File when Selecting a 3D Video Title]

Figure 53:
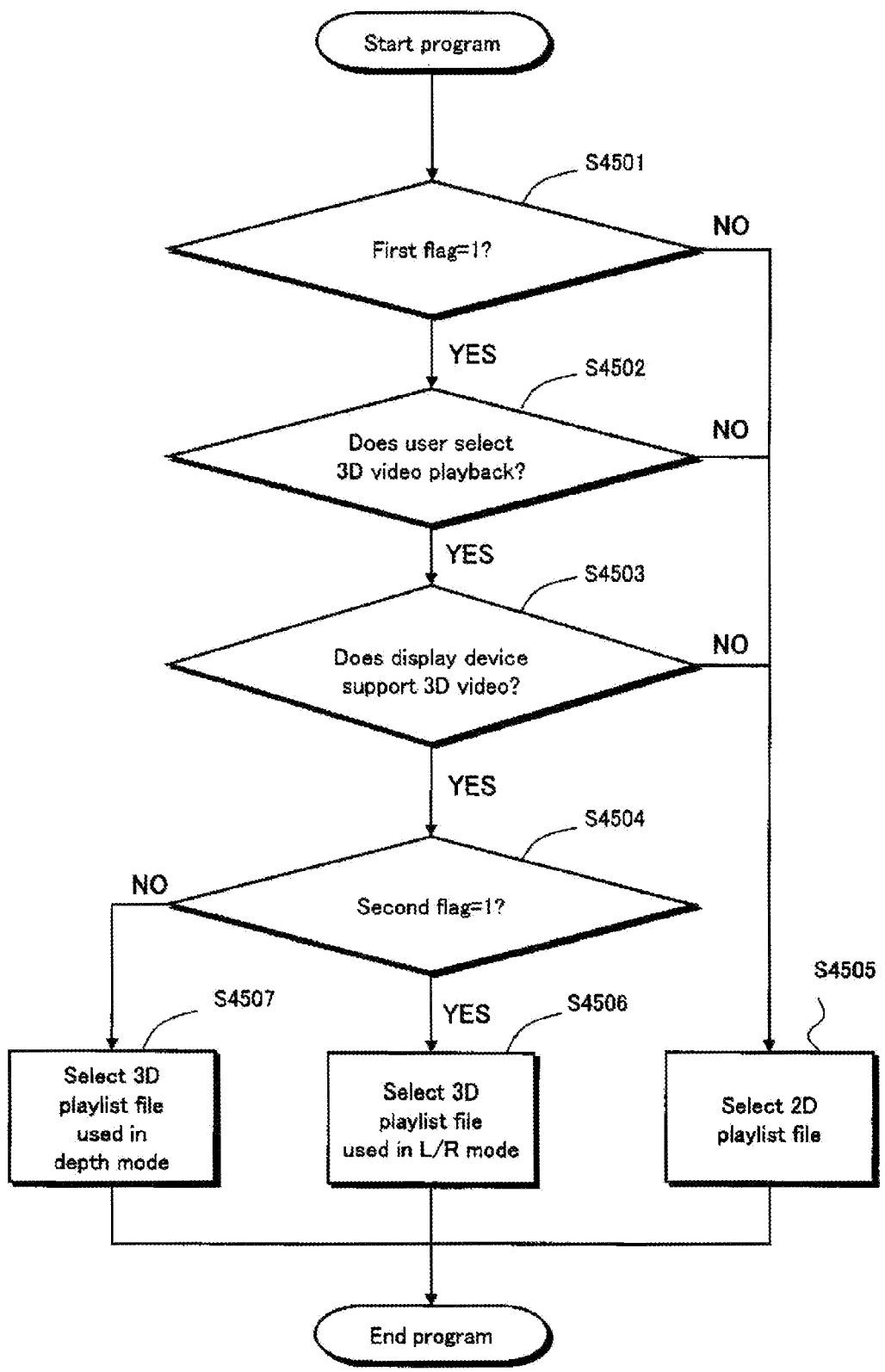
FIG. 53 is a flowchart of selection processing for a playlist file to be played back, the processing being performed when a 3D video title is selected by the playback device 200 shown in FIG. 1.

FIG. 53 is a flowchart of selection processing for a playlist file to be played back, the processing being performed when a 3D video title is selected. In the index table 4410 shown in FIG. 52, selection processing is performed in accordance with the movie object MVO-3D when referring to the item "title 3", and selection processing is performed in accordance with the Java application program specified by the BD-J object BDJO-3D when referring to the item "title 4".

In light of this selection processing, it is assumed that the playback device 200 includes a first flag and a second flag. A value of "0" for the first flag indicates that the playback device 200 only supports playback of 2D video images, whereas "1" indicates support of 3D video images as well. A value of "0" for the second flag indicates that the playback device 200 is in L/R mode, whereas "1" indicates depth mode.

In step S4501, the playback device 200 checks the value of the first flag. If the value is 0, processing proceeds to step S4505. If the value is 1, processing proceeds to step S4502.

In step S4502, the playback device 200 displays a menu on the television 300 for the user to select playback of either 2D or 3D video images. If the user selects playback of 2D video images via operation of a remote control 105 or the like, processing proceeds to step S4505, whereas if the user selects 3D video images, processing proceeds to step S4503.

In step S4503, the playback device 200 checks whether the television 300 supports playback of 3D video images. Specifically, the playback device 200 exchanges CEC messages with the television 300 via an HDMI cable 122 to check with the television 300 as to whether it supports playback of 3D video images. If the television 300 does support playback of 3D video images, processing proceeds to step S4504. If not, processing proceeds to step S4505.

In step S4504, the playback device 200 checks the value of the second flag. If this value is 0, processing proceeds to step 54506. If this value is 1, processing proceeds to step S4507.

In step S4505, the playback device 200 selects for playback the 2D playlist file 521. Note that, at this time, the playback device 200 may cause the television 300 to display the reason why playback of 3D video images was not selected.

In step S4506, the playback device 200 selects for playback the 3D playlist file 522 used in L/R mode.

In step S4507, the playback device 200 selects for playback the 3D playlist file 523 used in depth mode.

Up to now, the recording medium 100 pertaining to the first embodiment of the present invention has been described.

<Structure of 2D Playback Device>

Figure 54:
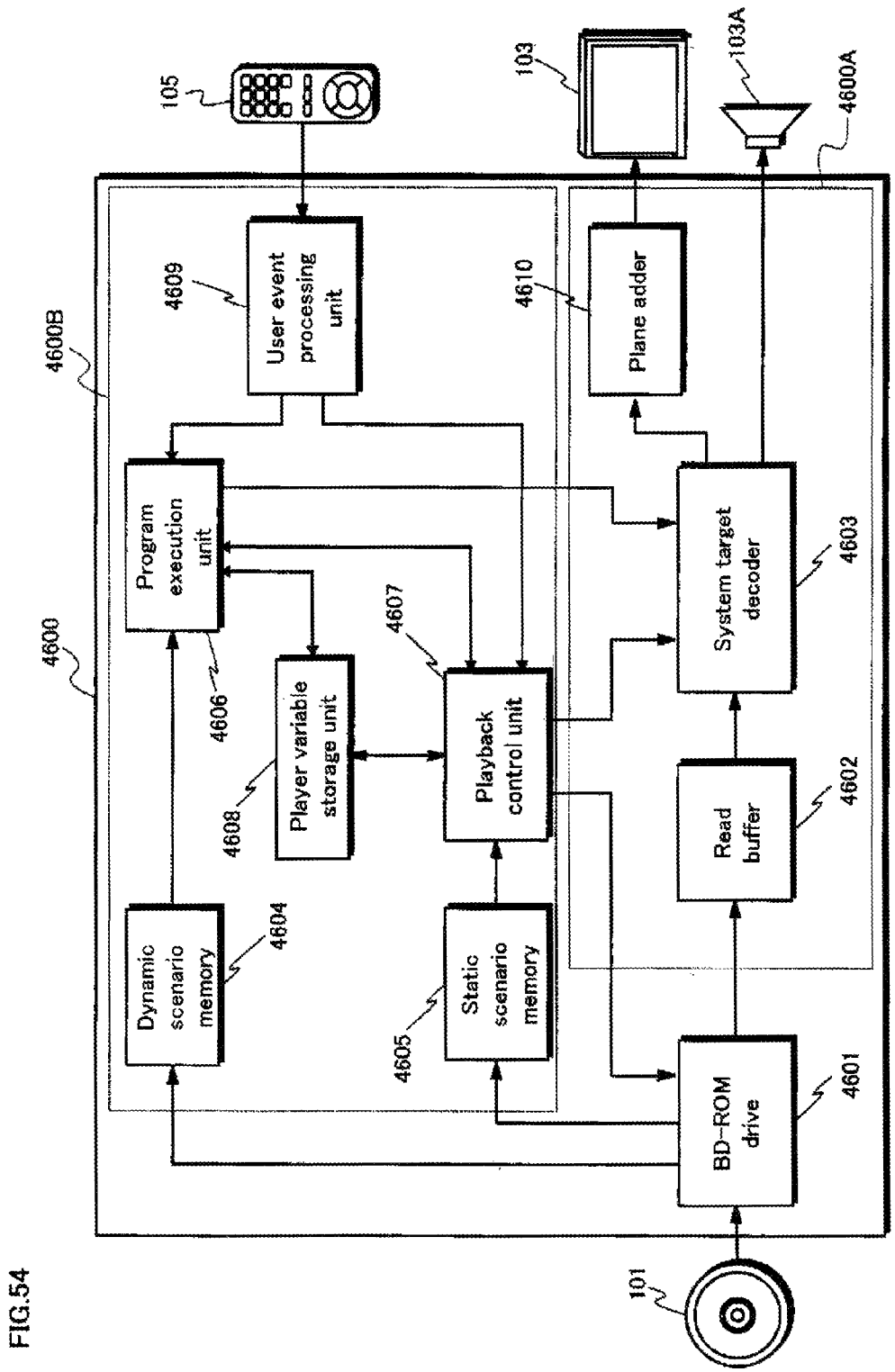
FIG. 54 is a functional block diagram of the playback device 200 in 2D playback mode shown in FIG. 1.

When playing back 2D video contents from a recording medium 100 in 2D playback mode, the playback device 200 operates as a 2D playback device. FIG. 54 is a functional block diagram of a 2D playback device 4600. As shown in FIG. 54, the 2D playback device 4600 has a BD-ROM drive 4601, a playback unit 4600A, and a control unit 4600B. The playback unit 4600A has a read buffer 4602, a system target decoder 4603, and a plane adder 4610. The control unit 4600B has a dynamic scenario memory 4604, a static scenario memory 4605, a program execution unit 4606, a playback control unit 4607, a player variable storage unit 4608, and a user event processing unit 4609. The playback unit 4600A and the control unit 4600B are each implemented on a different integrated circuit, but may alternatively be implemented on a single integrated circuit.

When the recording medium 100 is loaded into the BD-ROM drive 4601, the BD-ROM drive 4601 radiates laser light to the recording medium 100 and detects change in the light reflected from the recording medium 100. Furthermore, using the change in the amount of reflected light, the BD-ROM drive 4601 reads data recorded on the recording medium 100. Specifically, the BD-ROM drive 4601 has an optical pickup, i.e. an optical head. The optical head has a semiconductor laser, a collimate lens, a beam splitter, an objective lens, a collecting lens, and an optical detector. A beam of light radiated from the semiconductor laser sequentially passes through the collimate lens, the beam splitter, and the objective lens to be collected on a recording layer of the recording medium 100. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 4601 reads data from the Recording medium 100 based on a request from the playback control unit 4607. Out of the read data, the extents in the file 2D, i.e. the 2D extents, are transferred to the read buffer 4602; dynamic scenario information is transferred to the dynamic scenario memory 4604; and static scenario information is transferred to the static scenario memory 4605. "Dynamic scenario information" includes an index file, movie object file, and BD-J object file. "Static scenario information" includes a 2D playlist file and a 2D clip information file.

The read buffer 4602, the dynamic scenario memory 4604, and the static scenario memory 4605 are each a buffer memory. A memory device in the playback unit 4600A is used as the read buffer 4602. Memory devices in the control unit 4600B are used as the dynamic scenario memory 4604 and the static scenario memory 4605. In addition, different areas in a single memory device may be used as these buffer memories 4602, 4604 and 4605. The read buffer 4602 stores 2D extents, the dynamic scenario memory 4604 stores dynamic scenario information, and the static scenario memory 4605 stores static scenario information.

The system target decoder 4603 reads 2D extents from the read buffer 4602 in units of source packets and demultiplexes the 2D extents. The system target decoder 4603 then decodes each of elementary streams obtained by the demultiplexing. At this point, information necessary for decoding each elementary stream, such as the type of codec and attribute of the stream, is transferred from the playback control unit 4607 to the system target decoder 4603. For each VAU, the system target decoder 4603 outputs a primary video stream, a secondary video stream, an IG stream, and a PG stream as primary video plane data, secondary video plane data, IG plane data, and PG plane data, respectively. On the other hand, the system target decoder 4603 mixes the decoded primary audio stream and secondary audio stream and transmits the resultant data to an audio output device, such as an internal speaker 103A of the television 300. In addition, the system target decoder 4603 receives graphics data from the program execution unit 4606. The graphics data is used for rendering graphics such as a GUI menu on a screen and is in a raster data format such as JPEG and PNG. The system target decoder 4603 processes the graphics data and outputs the data as image plane data. Details of the system target decoder 4603 are described below.

The user event processing unit 4609 detects a user operation via the remote control 105 or the front panel of the playback device 200. Based on the user operation, the user event processing unit 4609 requests the program execution unit 4606 or the playback control unit 4607 to perform a relevant process. For example, when a user instructs to display a pop-up menu by pushing a button on the remote control 105, the user event processing unit 4609 detects the push and identifies the button. The user event processing unit 4609 further requests the program execution unit 4606 to execute a command corresponding to the button, i.e. a command to display the pop-up menu. On the other hand, when a user pushes a fast-forward or a rewind button on the remote control 105, for example, the user event processing unit 4609 detects the push, identifies the button, and requests the playback control unit 4607 to fast-forward or rewind the playlist currently being played back.

The playback control unit 4607 controls transfer of different types of data, such as 2D extents, an index file, etc. from the recording medium 100 to the read buffer 4602, the dynamic scenario memory 4604, and the static scenario memory 4605. A file system managing the directory file structure shown in FIG. 7 is used for this control. That is, the playback control unit 4607 causes the BD-ROM drive 4601 to transfer the files to each of the buffer memories 4602, 4604 and 4605 using a system call for opening files. The file opening is composed of a series of the following processes. First, a file name to be detected is provided to the file system by a system call, and an attempt is made to detect the file name from the directory/file structure. When the detection is successful, the file entry for the target file is first transferred to memory in the playback control unit 4607, and an FCB (File Control Block) is generated in the memory. Subsequently, a file handle for the target file is returned from the file system to the playback control unit 4607. After this, the playback control unit 4607 can transfer the target file from the Recording medium 100 to each of the buffer memories 4602, 4604 and 4605 by showing the file handle to the BD-ROM drive 4601.

The playback control unit 4607 decodes the file 2D to output video data and audio data by controlling the BD-ROM drive 4601 and the system target decoder 4603. Specifically, the playback control unit 4607 first reads a 2D playlist file from the static scenario memory 4605, in response to an instruction from the program execution unit 4606 or a request from the user event processing unit 4609, and interprets the content of the file. In accordance with the interpreted content, particularly with the playback path, the playback control unit 4607 then specifies a file 2D to be played back and instructs the BD-ROM drive 4601 and the system target decoder 4603 to read and decode this file. Such playback processing based on a playlist file is called "playlist playback". In addition, the playback control unit 4607 sets various types of player variables in the player variable storage unit 4608 using the static scenario information. With reference to the player variables, the playback control unit 4607 further specifies to the system target decoder 4603 elementary streams to be decoded and provides the information necessary for decoding the elementary streams.

The player variable storage unit 4608 is composed of a group of registers for storing player variables. Types of player variables include system parameters (SPRM) and general parameters (GPRM). FIG. 55 is a list of SPRMs. Each SPRM is assigned a serial number 4701, and each serial number 4701 is associated with a unique variable value 4702. The contents of major SPRMs are shown below. Here, the numbers in parentheses indicate the serial numbers 4701.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for Karaoke
SPRM(12): Country code for parental management
SPRM(13): Parental level
SPRM(14): Player configuration for Video
SPRM(15): Player configuration for Audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24): Reserved
SPRM(25): Reserved
SPRM(26): Reserved
SPRM(27): Reserved
SPRM(28): Reserved
SPRM(29): Reserved
SPRM(30): Reserved
SPRM(31): Reserved The SPRM(10) indicates the PTS of the picture currently being decoded and is updated every time a picture is decoded and written into the primary video plane memory. Accordingly, the current playback point can be known by referring to the SPRM(10).

The language code for the audio stream of the SPRM(16) and the language code for the subtitle stream of the SPRM(18) show default language codes of the playback device 200. These codes may be changed by a user with use of the OSD or the like for the playback device 200, or may be changed by an application program via the program execution unit 4606. For example, if the SPRM(16) shows "English", in playback processing of a playlist, the playback control unit 4607 first searches the STN table in the PI for a stream entry having the language code for "English". The playback control unit 4607 then extracts the PID from the stream identification information of the stream entry and transmits the extracted PID to the system target decoder 4603. As a result, an audio stream having the same PID is selected and decoded by the system target decoder 4603. These processes can be executed by the playback control unit 4607 with use of the movie object file or the BD-J object file.

During playback processing, the playback control unit 4607 updates the player variables in accordance with the status of the playback. The playback control unit 4607 updates the SPRM(1), the SPRM(2), the SPRM(21) and the SPRM(22) in particular. These SPRM respectively show, in the stated order, the STN of the audio stream, the subtitle stream, the secondary video stream, and the secondary audio stream that are currently being processed. As an example, assume that the audio stream number SPRM(1) has been changed by the program execution unit 4606. In this case, the playback control unit 4607 first searches the STN in the PI currently being played back for a stream entry that includes an STN indicating the changed SPRM(1). The playback control unit 4607 then extracts the PID from the stream identification information in the stream entry and transmits the extracted PID to the system target decoder 4603. As a result, the audio stream having the same PID is selected and decoded by the system target decoder 4603. This is how the audio stream targeted for playback is switched. The subtitle stream and the secondary video stream to be played back can be similarly switched.

The program execution unit 4606 is a processor and executes programs stored in the movie object file or the BD-J object file. The program execution unit 4606 executes the following controls in particular in accordance with the programs. (1) The program execution unit 4606 instructs the playback control unit 4607 to perform playlist playback processing. (2) The program execution unit 4606 generates graphics data for a menu or a game as PNG or JPEG raster data, and transfers the generated data to the system target decoder 4603 to be composited with other video data. Specific contents of these controls can be designed relatively flexibly through program designing. That is, the contents of the controls are determined by the programming procedure of the movie object file and the BD-J object file in the authoring procedure of the recording medium 100.

The plane adder 4610 receives primary video plane data, secondary video plane data, IG plane data, PG plane data, and image plane data from the system target decoder 4603 and composites these data into a video frame or a field by superimposition. The plane adder 4610 outputs the resultant composited video data to the television 300 for display on the screen.

<System Target Decoder>

Figure 56:
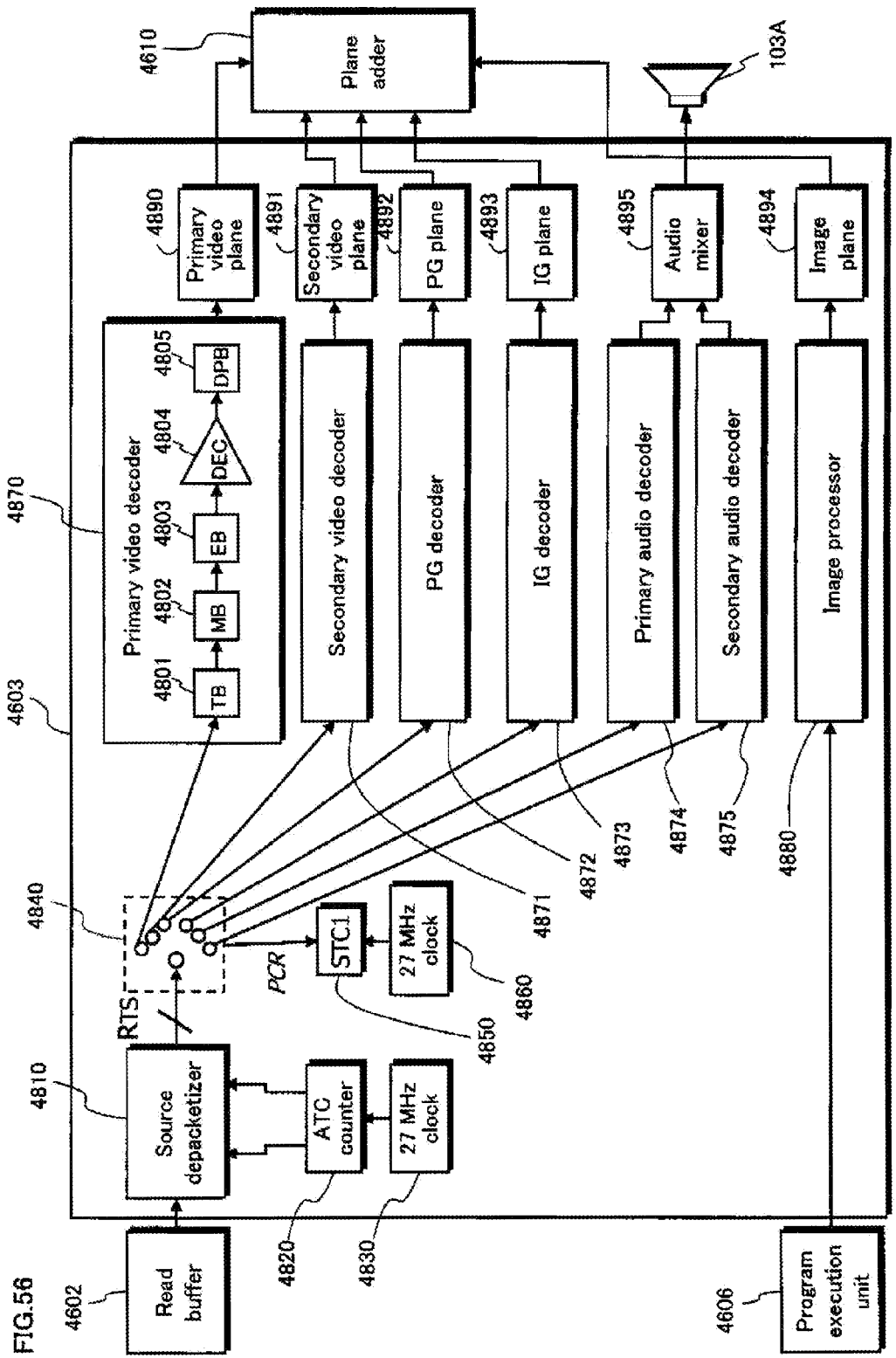
FIG. 56 is a functional block diagram of the system target decoder 4603 shown in FIG. 54.

FIG. 56 is a functional block diagram of the system target decoder 4603. As shown in FIG. 56, the system target decoder 4603 includes a source depacketizer 4810, ATC counter 4820, first 27 MHz clock 4830, PID filter 4840, STC counter (STC1) 4850, second 27 MHz clock 4860, primary video decoder 4870, secondary video decoder 4871, PG decoder 4872, IG decoder 4873, primary audio decoder 4874, secondary audio decoder 4875, image processor 4880, primary video plane memory 4890, secondary video plane memory 4891, PG plane memory 4892, IG plane memory 4893, image plane memory 4894, and audio mixer 4895.

The source depacketizer 4810 reads source packets from the read buffer 4602, extracts the TS packets from the read source packets, and transfers the TS packets to the PID filter 4840. The source depacketizer 4810 further adjusts the time of the transfer in accordance with the ATS of each source packet. Specifically, the source depacketizer 4810 first monitors the value of the ATC generated by the ATC counter 4820. In this case, the value of the ATC depends on the ATC counter 4820, and is incremented in accordance with a pulse of the clock signal of the first 27 MHz clock 4830. Subsequently, at the instant the value of the ATC matches the ATS of a source packet, the source depacketizer 4810 transfers the TS packets extracted from the source packet to the PID filter 4840. By adjusting the time of transfer in this way, the mean transfer rate $R_{TS}$ of TS packets from the source depacketizer 4810 to the PID filter 4840 does not surpass the system rate 3111 shown by the 2D clip information file in FIG. 38.

The PID filter 4840 first monitors PIDs that include the TS packets output by the source depacketizer 4810. When a PID matches a PID pre-specified by the playback control unit 4807, the PID filter 4840 selects the TS packets and transfers them to the decoder 4870-4875 appropriate for decoding of the elementary stream indicated by the PID. For example, if a PID is 0x1011, the TS packets are transferred to the primary video decoder 4870, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder 4871, the primary audio decoder 4874, the secondary audio decoder 4875, the PG decoder 4872, and the IG decoder 4873, respectively.

The PID filter 4840 further detects PCRs from each TS packet using the PID of the TS packet. At this point, the PID filter 4840 sets the value of the STC counter 4850 to a predetermined value. In this case, the value of the STC counter 4850 is incremented in accordance with a pulse of the clock signal of the second 27 MHz clock 4860. In addition, the value to which the STC counter 4850 is set to is indicated to the PID filter 4840 from the playback control unit 4807 in advance. The decoders 4870-4875 each use the value of the STC counter 4850 as the STC. That is, the decoders 4870-4875 adjust the timing of decoding processing of the TS packets output from the PID filter 4840 in accordance with the time indicated by the PTS or the DTS included in the TS packets.

The primary video decoder 4870, as shown in FIG. 56, includes a transport stream buffer (TB) 4801, multiplexing buffer (MB) 4802, elementary stream buffer (EB) 4803, compressed video decoder (DEC) 4804, and decoded picture buffer (DPB) 4805. The TB 4801, MB 4802, EB 4803, and DPB 4805 are each a buffer memory and use an area of a memory device internally provided in the primary video decoder 4870. Alternatively, some or all of the TB 4801, the MB 4802, the EB 4803, and the DPB 4805 may be separated in different memory devices. The TB 4801 stores the TS packets received from the PID filter 4840 as they are. The MB 4802 stores PES packets reconstructed from the TS packets stored in the TB 4801. Note that when the TS packets are transferred from the TB 4801 to the MB 4802, the TS header is removed from each TS packet. The EB 4803 extracts encoded VAUs from the PES packets and stores the extracted, encoded VAUs therein. A VAU includes compressed pictures, i.e., an I picture, B picture, and P picture. Note that when data is transferred from the MB 4802 to the EB 4803, the PES header is removed from each PES packet. The DEC 4804 decodes pictures from each VAU in the EB 4803 at the time shown by the DTS included in the original TS packet. The DEC 4804 may also refer to the decode switch information shown in FIG. 13 to decode pictures from each VAU sequentially, regardless of the DTS. The DEC 4804 switches the decoding scheme in accordance with the compression encoding formats, e.g., MPEG-2, MPEG-4 AVC, and VC1, and the stream attribute of the compressed pictures stored in each VAU. The DEC 4804 further transfers the decoded pictures, i.e., a frame or field, to the DPB 4805. The DPB 4805 temporarily stores the decoded pictures. When decoding a P picture or a B picture, the DEC 4804 refers to the decoded pictures stored in the DPB 4805. The DPB 4805 further writes each of the stored pictures into the primary video plane memory 4890 at the time shown by the PTS included in the original TS packet.

The secondary video decoder 4871 includes the same structure as the primary video decoder 4870. The secondary video decoder 4871 first decodes the TS packets of the secondary video stream received from the PID filter 4840 into uncompressed pictures. Subsequently, the secondary video decoder 4871 writes the resultant uncompressed pictures into the secondary video plane memory 4891 at the time shown by the PTS included in the TS packet.

The PG decoder 4872 decodes the TS packets received from the PID filter 4840 into uncompressed graphics data and writes the resultant uncompressed graphics data to the PG plane memory 4892 at the time shown by the PTS included in the TS packet.

The IG decoder 4873 decodes the TS packets received from the PID filter 4840 into uncompressed graphics data and writes the resultant uncompressed graphics data to the IG plane memory 4893 at the time shown by the PTS included in the TS packet.

The primary audio decoder 4874 first stores the TS packets received from the PID filter 4840 in a buffer provided therein. Subsequently, the primary audio decoder 4874 removes the TS header and the PES header from each TS packet in the buffer, and decodes the remaining data into uncompressed LPCM audio data. Furthermore, the primary audio decoder 4874 transmits the resultant audio data to the audio mixer 4895 at the time shown by the PTS included in the TS packet. The primary audio decoder 4874 changes a decoding scheme of the uncompressed audio data in accordance with the compression encoding format, e.g. AC-3 or DTS, and the stream attribute of the primary audio stream, which are included in the TS packets.

The secondary audio decoder 4875 has the same structure as the primary audio decoder 4874. The secondary audio decoder 4875 first decodes the TS packets of the secondary audio stream received from the PID filter 4840 into uncompressed LPCM audio data. Subsequently, the secondary audio decoder 4875 transmits the uncompressed LPCM audio data to the audio mixer 4895 at the time shown by the PTS included in the TS packet. The secondary audio decoder 4875 changes a decoding scheme of the uncompressed audio data in accordance with the compression encoding format, e.g. Dolby Digital Plus or DTS-HD LBR, and the stream attribute of the primary audio stream, included in the TS packets.

The audio mixer 4895 receives uncompressed audio data from both the primary audio decoder 4874 and from the secondary audio decoder 4875 and then mixes (superimposes) the received data. The audio mixer 4895 also transmits the resultant composited audio to an internal speaker 103A of the television 300 or the like.

The image processor 4880 receives graphics data, i.e., PNG or JPEG raster data, along with the PTS thereof from the program execution unit 4806. Upon the reception of the graphics data, the image processor 4880 renders the graphics data and writes the graphics data to the image plane memory 4894.

<Structure of 3D Playback Device>

When playing back 3D video contents from a Recording medium 100 in 3D playback mode, the playback device 200 operates as a 3D playback device. The fundamental part of the device's structure is identical to the 2D playback device shown in FIGS. 54 to 56. Therefore, the following is a description of sections of the structure of the 2D playback device that are enlarged or modified, incorporating by reference the above description of the 2D playback device for details on the fundamental parts thereof. Regarding the playback processing of 2D video images in accordance with 2D playlist files, i.e. the playback processing of the 2D playlist, the 3D playback device has the same structure as the 2D playback device. Accordingly, the details on this structure are hereby incorporated from the description of the 2D playback device by reference. The following description assumes playback processing of 3D video images in accordance with 3D playlist files, i.e. 3D playlist playback processing.

Figure 57:
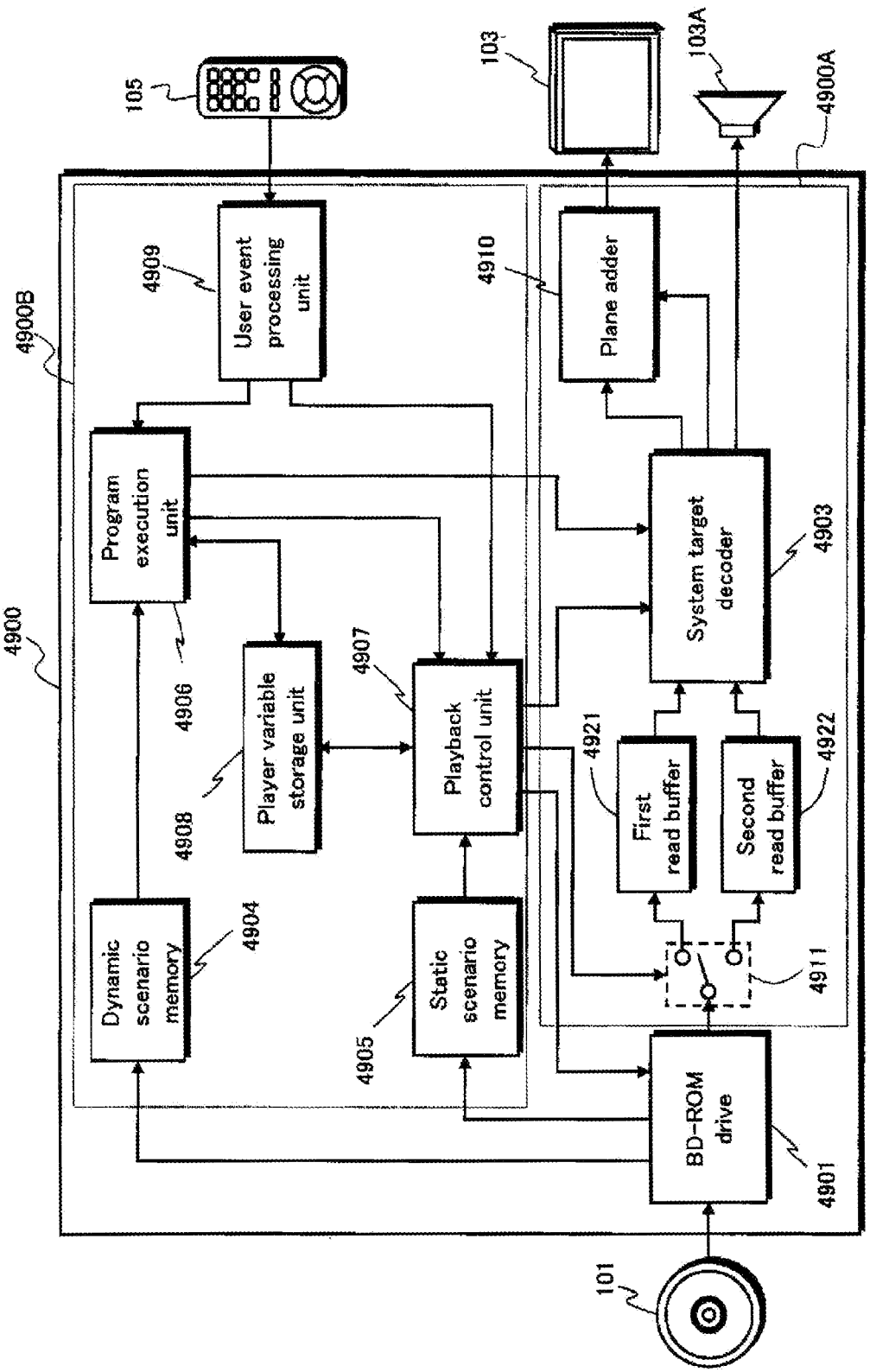
FIG. 57 is a functional block diagram of the playback device 200 shown in FIG. 1 in 3D playback mode.

FIG. 57 is a functional block diagram of the 3D playback device 4900. The 3D playback device 4900 includes a BD-ROM drive 4901, a playback unit 4900A, and a control unit 4900B. The playback unit 4900A includes a switch 4911, a first read buffer 4921, a second read buffer 4922, a system target decoder 4903, and a plane adder 4910. The control unit 4900B includes a dynamic scenario memory 4904, a static scenario memory 4905, a program execution unit 4906, a playback control unit 4907, a player variable storage unit 4908, and a user event processing unit 4909. The playback unit 4900A and the control unit 4900B are mounted on a different integrated circuit, but may alternatively be mounted on a single integrated circuit. In particular, the dynamic scenario memory 4904, the static scenario memory 4905, the program execution unit 4906, and the user event processing unit 4909 have an identical structure with the 2D playback device shown in FIG. 54. Accordingly, details thereof are incorporated by reference to the above explanation of the 2D playback device.

The BD-ROM drive 4901 includes elements identical to the BD-ROM drive 4601 in the 2D playback device shown in FIG. 54. When the playback control unit 4907 indicates a range of LBN, the BD-ROM drive 4901 reads data from the sector group on the recording medium 100 indicated by the range. In particular, a source packet group belonging to extents in the file SS, i.e. 3D extents, is transferred from the BD-ROM drive 4901 to the switch 4911. In this case, each 3D extent includes one or more pairs of a base-view and dependent-view data block, as shown in FIGS. 18D and 41. These data blocks need to be transferred in parallel to different read buffers, i.e. read buffers 4921 and 4922. Accordingly, the BD-ROM drive 4901 needs to have at least the same access speed as the BD-ROM drive 4601 in the 2D playback device.

The switch 4911 receives 3D extents from the BD-ROM drive 4901. On the other hand, the switch 4911 receives, from the playback control unit 4907, information indicating the boundary in each data block included in the 3D extents, e.g. the number of source packets from the beginning of the 3D extent to each boundary. In this case, the playback control unit 4907 generates this information by referring to the extent start point in the clip information file.

The switch 4911 further refers to this information to extract base-view data blocks from each 3D extent, then transmitting the data blocks to the first read buffer 4921. Conversely, the switch 4911 transmits the remaining dependent-view data blocks to the second read buffer 4922.

The first read buffer 4921 and the second read buffer 4922 are buffer memories that use a memory element in the playback unit 4900A. In particular, different areas in a single memory element are used as the read buffers 4921 and 4922. Alternatively, different memory elements may be used as the read buffers 4921 and 4922. The first read buffer 4921 receives base-view data blocks from the switch 4911 and stores these data blocks. The second read buffer 4922 receives dependent-view data blocks from the switch 4911 and stores these data blocks.

First, the system target decoder 4903 alternately reads base-view data blocks stored in the first read buffer 4921 and dependent-view data blocks stored in the second read buffer 4922. Next, the system target decoder 4903 separates elementary streams from each source packet via demultiplexing and furthermore, from the separated streams, decodes the data shown by the PID indicated by the playback control unit 4907. The system target decoder 4903 then writes the decoded elementary streams in internal plane memory according to the type thereof. The base-view video stream is written in the left-view video plane memory, and the dependent-view video stream is written in the right-view plane memory. On the other hand, the secondary video stream is written in the secondary video plane memory, the IG stream in the IG plane memory, and the PG stream in the PG plane memory. When stream data other than the video stream is composed of a pair of base-view stream data and dependent-view stream data, a pair of corresponding plane memories are prepared for the left-view plane data and right-view plane data. The system target decoder 4903 also processes graphics data from the program execution unit 4906, such as JPEG or PNG raster data, and writes this data in the image plane memory.

The system target decoder 4903 associates the output of plane data from the left-video and right-video plane memories with B-D presentation mode and B-B presentation mode. When the playback control unit 4907 indicates B-D presentation mode, the system target decoder 4903 alternately outputs plane data from the left-video and right-video plane memories. On the other hand, when the playback control unit 4907 indicates B-B presentation mode, the system target decoder 4903 outputs plane data from only the left-video or right-video plane memory twice per frame while maintaining the operation mode in 3D playback mode.

Furthermore, the system target decoder 4903 associates the output of the graphics plane memories, i.e. various types of graphics plane data from the PG plane memory, IG plane memory, and image plane memory, with 2 plane mode, 1 plane mode+offset mode, and 1 plane+zero offset mode. When the playback control unit 4907 indicates 2 plane mode, the system target decoder 4903 alternately outputs left-view and right-view graphics plane data from each of the graphics plane memories. When the playback control unit 4907 indicates 1 plane+offset mode or 1 plane+zero offset mode, the system target decoder 4903 outputs graphics plane data from each of the graphics plane memories while maintaining the operation mode in 3D playback mode. When the playback control unit 4907 indicates 1 plane+offset mode, the system target decoder 4903 furthermore outputs the offset value designated by the playback control unit 4907 to the plane adder 4910. In this case, the playback control unit 4907 sets the offset value based on the offset table in the clip information file. On the other hand, when the playback control unit 4907 indicates 1 plane+zero offset mode, the system target decoder 4903 outputs "0" as the offset value to the plane adder 4910.

Upon receiving a request from, for example, the program execution unit 4906 for performing 3D playlist playback processing, the playback control unit 4907 first refers to the 3D playlist file stored in the static scenario memory 4905. Next, in accordance with the 3D playlist file and following the sequence shown in FIG. 51, the playback control unit 4907 indicates to the BD-ROM drive 4901 the ranges of the LBN for the sector group on which the 3D extent to be read is recorded. The playback control unit 4907 also refers to the 3D meta data in the clip information file stored in the static scenario memory 4905 to search for the extent start point for each 3D extent to be read. The playback control unit 4907 furthermore generates information that indicates the boundary of the data blocks included in each 3D extent and then transmits this information to the switch 4911.

Additionally, the playback control unit 4907 refers to the STN table and STN table SS in the 3D playlist file to control the operation requirements of the system target decoder 4903 and the plane adder 4910. For example, the playback control unit 4907 selects the PID for the elementary stream to be played back and outputs the PID to the system target decoder 4903. The playback control unit 4907 also selects the presentation mode for each plane in accordance with the offset during popup 4111 in the STN table SS and indicates these presentation modes to the system target decoder 4903 and plane adder 4910.

As in the 2D playback device, the player variable storage unit 4908 includes the SPRM shown in FIG. 55. However, any two of the SPRM(24)-(32) that were reserved in FIG. 55 include the first flag and second flag shown in FIG. 53. For example, the SPRM(24) may include the first flag, and the SPRM(25) the second flag. In this case, when the SPRM(24) is "0", the playback device 200 only supports playback of 2D video images, and when it is "1", the playback device 200 also supports 3D video image playback. When the SPRM (25) is "0", the 3D video image playback mode of the playback device 200 is L/R mode, and when it is "1", the 3D video image playback mode is depth mode.

The plane adder 4910 receives each type of plane data from the system target decoder 4903 and superimposes the pieces of plane data to create one composite frame or field. In particular, in L/R mode, the left-video plane data represents the left-view video plane, and the right-video plane data represents the right-view video plane. Accordingly, from among the other pieces of plane data, the plane adder 4910 superimposes pieces that represent the left-view on the left-view plane data and pieces that represent the right-view on the right-view plane data. On the other hand, in depth mode, the right-video plane data represents a depth map for a video plane representing the left-video plane data. Accordingly, the plane adder 4910 first generates a pair of left-view video plane data and right-view video plane data from both pieces of video plane data. Subsequently, the plane adder 4910 performs the same composition processing as in L/R mode.

When receiving an indication of 1 plane+offset mode or 1 plane+zero offset mode from the playback control unit 4907 as the presentation mode for the secondary video plane, PG plane, IG plane, or image plane, the plane adder 4910 performs cropping processing on the plane data received from the system target decoder 4903. A pair of left-view plane data and right-view plane data is thus generated. In particular, when 1 plane+offset mode is indicated, the cropping processing refers to the offset value indicated by the system target decoder 4903 or the program execution unit 4906. On the other hand, when 1 plane+zero offset mode is indicated, the offset value is set to "0" during cropping processing. Accordingly, the same plane data is output repeatedly to represent the left-view and right-view. Subsequently, the plane adder 4910 performs the same composition processing as in L/R mode. The composited frame or field is output to the television 300 and displayed on the screen.

<System Target Decoder>

Figure 58:
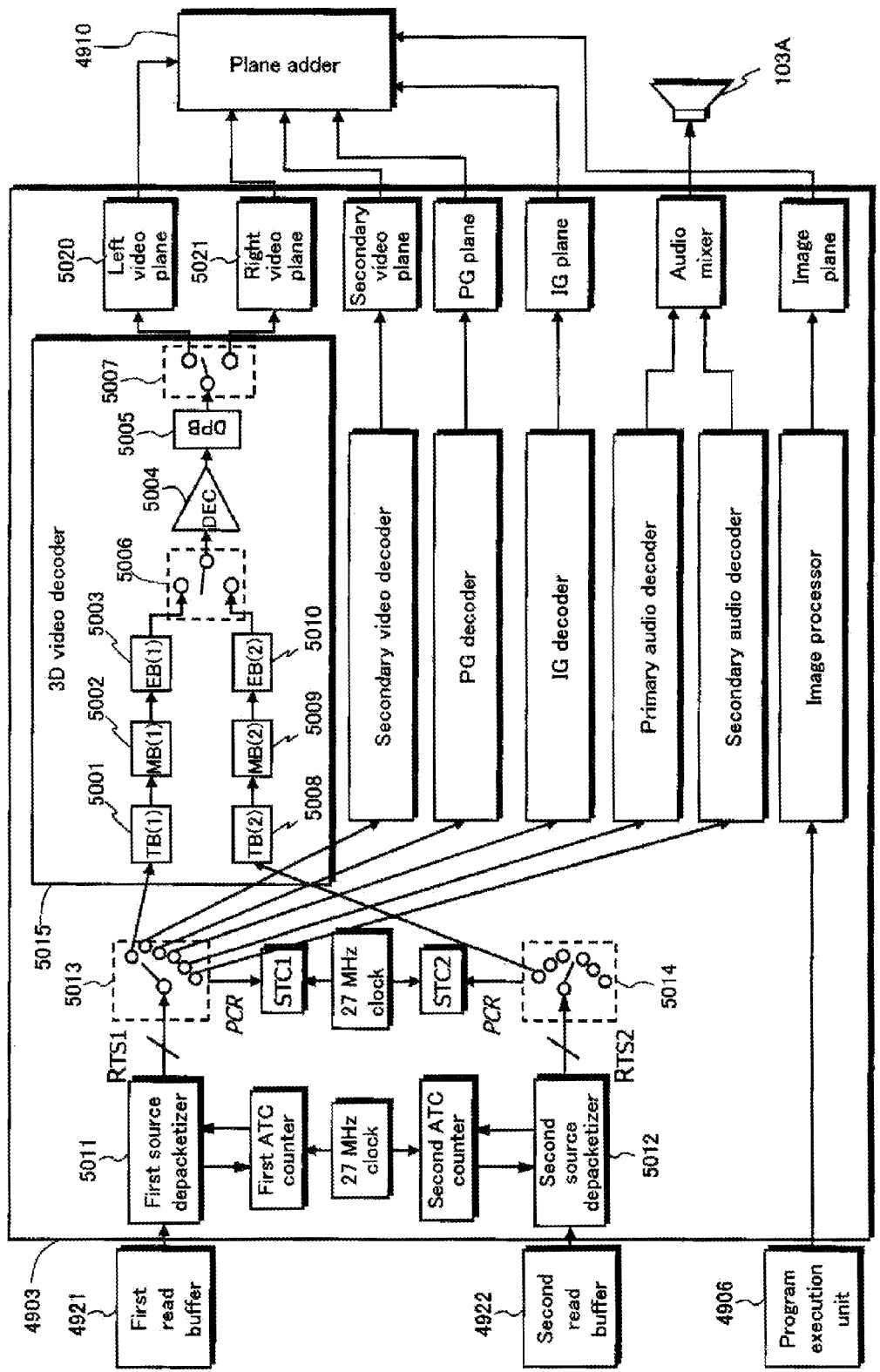
FIG. 58 is a functional block diagram of the system target decoder 4903 shown in FIG. 57.

FIG. 58 is a functional block diagram of the system target decoder 4903. The structural elements shown in FIG. 58 differ from the 2D playback device shown in FIG. 54 in the following two points: 1) the input channel from the read buffer to each decoder is doubled, and 2) the main video decoder supports 3D playback mode, and the secondary video decoder, PG decoder, and IG decoder support 2 plane mode. That is, these video decoders can all alternately decode a base-view stream and a dependent-view stream. On the other hand, the primary audio decoder, secondary audio decoder, audio mixer, image processor, and plane memories are similar to those in the 2D playback device shown in FIG. 54. Accordingly, among the structural elements shown in FIG. 58, those differing from the structural elements shown in FIG. 54 are described below, and details about similar structural elements are incorporated by reference to the description of FIG. 54. Furthermore, since the video decoders each have a similar structure, only the structure of the primary video decoder 5015 is described below, with this description being incorporated by reference with regards to the structure of other video decoders.

The first source depacketizer 5011 reads source packets from the first read buffer 4921, retrieves TS packets included in the source packets, and transmits the TS packets to the first PID filter 5013. The second source depacketizer 5012 reads source packets from the second read buffer 4922, retrieves TS packets included in the source packets, and transmits the TS packets to the second PID filter 5014. Each of the source depacketizers 5011 and 5012 further adjusts the time of transferring the TS packets in accordance with the ATS of the source packets. This adjustment is made with the same method as the source depacketizer 4610 shown in FIG. 54, and therefore the description thereof provided for FIG. 54 is hereby incorporated by reference. With this sort of adjustment, the mean transfer rate $R_{TS1}$ of TS packets from the first source depacketizer 5011 to the first PID filter 5013 does not exceed the system rate 3011 indicated by the 2D clip information file shown in FIG. 37. Similarly, the mean transfer rate $R_{TS2}$ of TS packets from the second source depacketizer 5012 to the second PID filter 5014 does not exceed the system rate indicated by the dependent-view clip information file.

The first PID filter 5013 compares the PID of each TS packet received from the first source depacketizer 5011 with the selected PID. The playback control unit 4907 designates the selected PID beforehand in accordance with the STN table in the 3D playlist file. When the two PIDs match, the first PID filter 5013 transfers the TS packets to the decoder assigned to the PID. For example, if a PID is 0x1011, the TS packets are transferred to TB(1) 5001 in the primary video decoder 5015, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, or IG decoder respectively.

The second PID filter 5014 compares the PID of each TS packet received from the second source depacketizer 5012 with the selected PID. The playback control unit 4907 designates the selected PID beforehand in accordance with the STN table SS in the 3D playlist file. Specifically, when the two PIDs match, the second PID filter 5014 transfers the TS packet to the decoder assigned to the PID. For example, if a PID is 0x1012 or 0x1013, the TS packets are transferred to TB(2) 5008 in the primary video decoder 5015, whereas TS packets with PIDs ranging from 0x1B20-0x1B3F, 0x1220-0x127F, and 0x1420-0x147F are transferred to the secondary video decoder, PG decoder, or IG decoder respectively.

The primary video decoder 5015 includes a TB(1) 5001, MB(1) 5002, EB(1) 5003, TB(2) 5008, MB(2) 5009, EB(2) 5010, buffer switch 5006, DEC 5004, DPB 5005, and picture switch 5007. The TB(1) 5001, MB(1) 5002, EB(1) 5003, TB(2) 5008, MB(2) 5009, EB(2) 5010 and DPB 5005 are all buffer memories, each of which uses an area of the memory elements included in the primary video decoder 5015. Note that some or all of these buffer memories may be separated on different memory elements.

The TB(1) 5001 receives TS packets that include a base-view video stream from the first PID filter 5013 and stores the TS packets as they are. The MB(1) 5002 stores PES packets reconstructed from the TS packets stored in the TB(1) 5001. The TS headers of the TS packets are removed at this point. The EB(1) 5003 extracts and stores encoded VAUs from the PES packets stored in the MB(1) 5002. The PES headers of the PES packets are removed at this point.

The TB(2) 5008 receives TS packets that include a dependent-view video stream from the second PID filter 5014 and stores the TS packets as they are. The MB(2) 5009 stores PES packets reconstructed from the TS packets stored in the TB(2) 5008. The TS headers of the TS packets are removed at this point. The EB(2) 5010 extracts and stores encoded VAUs from the PES packets stored in the MB(2) 5009. The PES headers of the PES packets are removed at this point.

The buffer switch 5006 transfers the VAUs stored in the EB(1) 5003 and the EB(2) 5010 to the DEC 5004 at the times indicated by the DTSs included in the original TS packets. In this case, the DTSs for a pair of pictures belonging to the same 3D VAU between the base-view video stream and dependent-view stream are the same. Accordingly, from among the pairs of VAUs that have the same DTSs and that are stored by the EB (1) 5003 and the EB (2) 5010, the buffer switch 5006 first transmits a pair stored in the EB(1) 5003 to the DEC 5004. Additionally, the buffer switch 5006 may receive back from the DEC 5004 the decode switch information 1401, shown in FIG. 13, in the VAU. In such a case, the buffer switch 5006 can determine if it should transfer the next VAU to the EB(1) 5003 or to the EB(2) 5010 by referring to the decode switch information.

The DEC 5004 decodes VAUs transferred from the buffer switch 5006. In this case, the DEC 5004 uses different decoding methods according to the encoding format (e.g. MPEG-2, MPEG-4 AVC and VC1) of the compressed pictures contained in the VAU and according to the stream attribute. The DEC 5004 further transfers the decoded pictures, namely the video frames or fields, to the DPB 5005.

The DPB 5005 temporarily stores the decoded, uncompressed pictures. When the DEC 5004 decodes a P picture or a B picture, the DPB 5005 supplies the DEC 5004 with reference pictures from among the stored, uncompressed pictures in accordance with a request from the DEC 5004.

The picture switch 5007 writes the uncompressed pictures from the DPB 5005 to either the left-video plane memory 5020 or the right-video plane memory 5021 at the time indicated by the PTS included in the original TS packet. In this case, the PTSs for a pair of pictures belonging to the same 3D VAU between the base-view video stream and dependent-view video stream are the same. Accordingly, from among the pairs of pictures that have the same PTSs and that are stored by the DPB 5005, the picture switch 5007 first writes the picture belonging to the base-view video stream in the left-video plane memory 5020 and then writes the picture belonging to the dependent-view video stream in the right-video plane memory 5021.

<Plane Adders>

Figure 59:
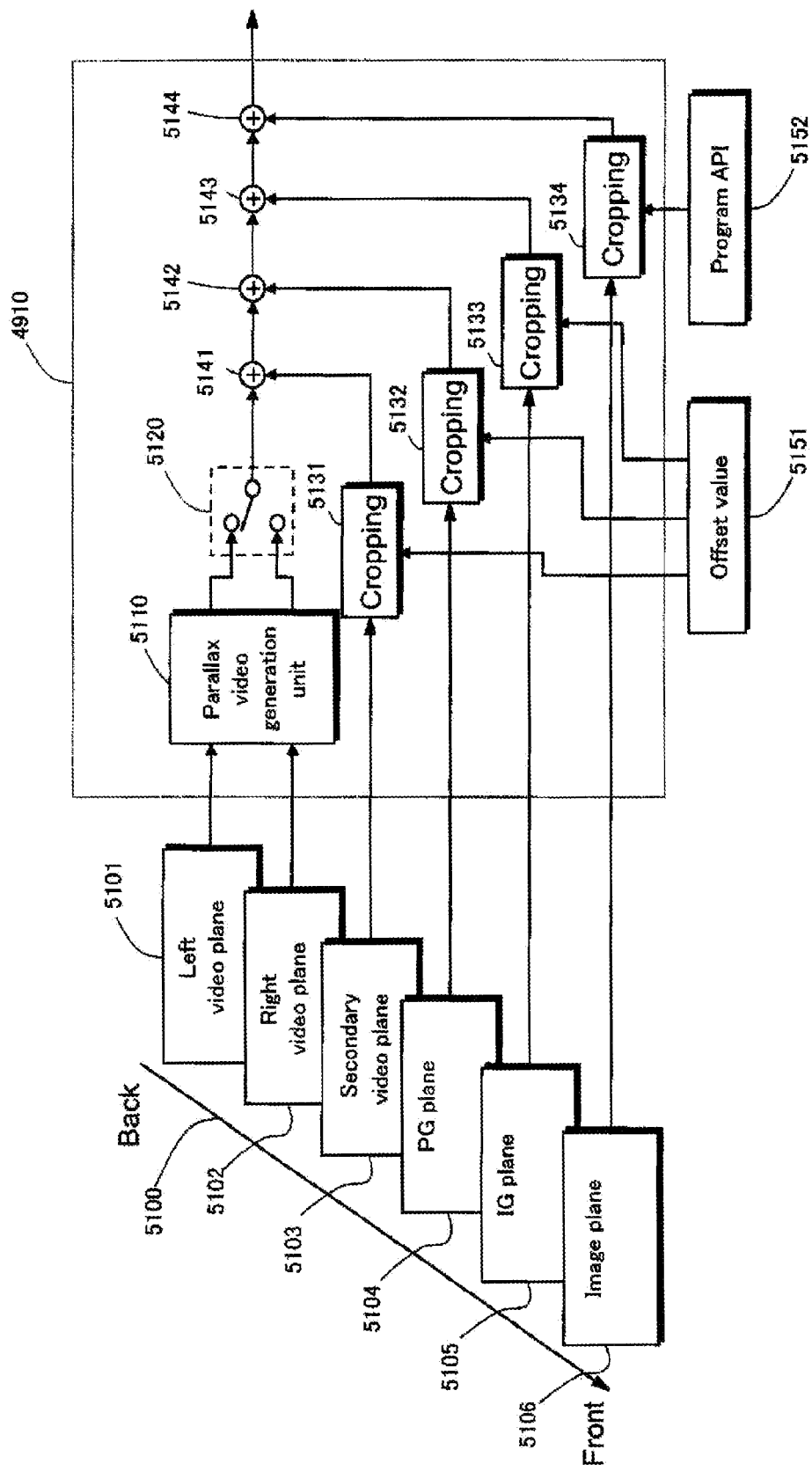
FIG. 59 is a functional block diagram of the plane adder 4910 shown in FIG. 57.

FIG. 59 is a functional block diagram of the plane adder 4910. As shown in FIG. 59, the plane adder 4910 includes a parallax video generation unit 5110, a switch 5120, four cropping processing units 5131-5134, and four adders 5141-5144.

The parallax video generation unit 5110 receives left-video plane data 5101 and right-video plane data 5102 from the system target decoder 4903. When the playback device 200 is in L/R mode, the left-video plane data 5101 represents the left-view video plane, and the right-video plane data 5102 represents the right-view video plane. At this point, the parallax video generation unit 5110 transmits the left-video plane data 5101 and the right-video plane data 5102 as they are to the switch 5120. On the other hand, when the playback device 200 is in depth mode, the left-video plane data 5101 represents the video plane for 2D video images, and the right-video plane data 5102 represents a depth map for the 2D video images. In this case, the parallax video generation unit 5110 first calculates the binocular parallax for each element in the 2D video images using the depth map. Next, the parallax video generation unit 5110 processes the left-video plane data 5101 to shift the presentation position of each element in the video plane for 2D video images to the left or right according to the calculated binocular parallax. This generates a pair of video planes representing the left-view and right-view. The parallax video generation unit 5110 further transmits the pair of video planes to the switch 5120 as a pair of pieces of left-video and right-video plane data.

When the playback control unit 4907 indicates B-D presentation mode, the switch 5120 transmits left-video plane data 5101 and right-video plane data 5102 with the same PTS to the first adder 5141 in that order. When the playback control unit 4907 indicates B-B presentation mode, the switch 5120 transmits one of the left-video plane data 5101 and right-video plane data 5102 with the same PTS twice per frame to the first adder 5141, discarding the other piece of plane data.

The cropping processing units 5131-5134 include the same structure as a pair of the parallax video generation unit 5110 and switch 5120. These structures are used in 2 plane mode. When the playback device 200 is in depth mode, the plane data from the system target decoder 4903 is converted into a pair of left-view and right-view pieces of plane data. When the playback control unit 4907 indicates B-D presentation mode, the left-view and right-view pieces of plane data are alternately transmitted to each of the adders 5141-5144. On the other hand, when the playback control unit 4907 indicates B-B presentation mode, one of the left-view and right-view pieces of plane data is transmitted twice per frame to each of the adders 5141-5144, and the other piece of plane data is discarded.

In 1 plane+offset mode, the first cropping processing unit 5131 receives an offset value 5151 from the system target decoder 4903 and refers to this value to perform cropping on the secondary video plane data 5103. The secondary video plane data 5103 is thus converted into a pair of pieces of secondary video plane data that represent a left-view and a right-view and are alternately transmitted. On the other hand, in 1 plane+zero offset mode, the secondary video plane data 5103 is transmitted twice.

In 1 plane+offset mode, the second cropping processing unit 5132 receives an offset value 5151 from the system target decoder 4903 and refers to this value to perform cropping on the PG plane data 5104. The PG plane data 5104 is thus converted into a pair of pieces of PG plane data that represent a left-view and a right-view and are alternately transmitted. On the other hand, in 1 plane+zero offset mode, the PG plane data 5104 is transmitted twice.

In 1 plane+offset mode, the third cropping processing unit 5133 receives an offset value 5151 from the system target decoder 4903 and refers to this value to perform cropping on the IG plane data 5105. The IG plane data 5105 is thus converted into a pair of pieces of IG plane data that represent a left-view and a right-view and are alternately transmitted. On the other hand, in 1 plane+zero offset mode, the IG plane data 5105 is transmitted twice.

Figures 60A, 60B:
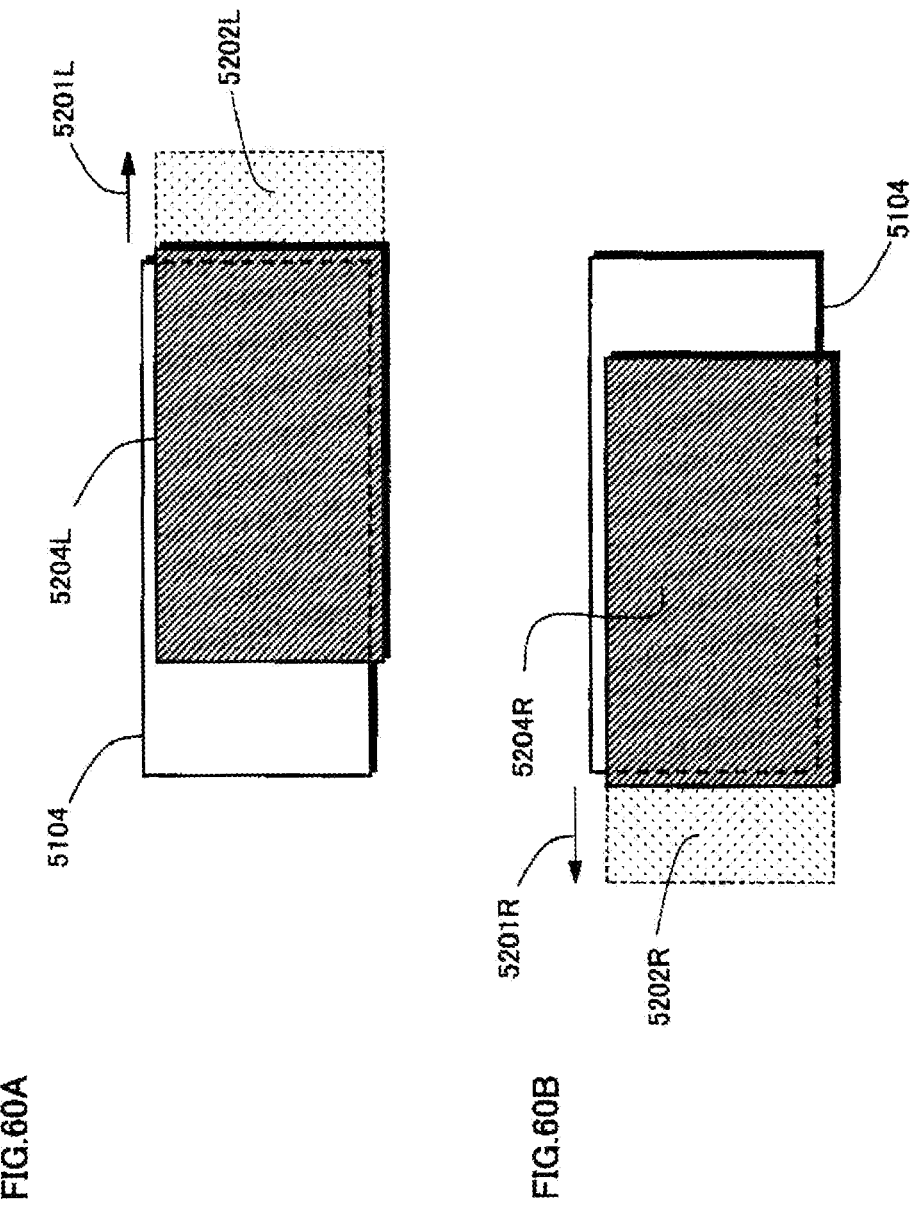
FIGS. 60A and 60B are schematic diagrams showing cropping processing by the second cropping processing unit 5132 shown in FIG. 59.

FIGS. 60A and 60B are schematic diagrams showing cropping processing by the second cropping processing unit 5132. In FIGS. 60A and 60B, a pair of left-view PG plane data 5204L and right-view PG plane data 5204R are generated from PG plane data 5104 as follows. First, the second cropping processing unit 5132 retrieves the offset value assigned to the PG plane from the offset value 5151. Next, the second cropping processing unit 5132 shifts the left-view and right-view presentation positions of the graphics video indicated by the PG plane data 5104 in accordance with the offset value. This results in a left-view and right-view pair of pieces of PG plane data. Note that in 1 plane+zero offset mode, the offset value is "0", and thus the original PG plane data is preserved as is. The first cropping processing unit 5131 similarly performs cropping processing on the secondary video plane data 5103, and the third cropping processing unit 5133 similarly performs cropping processing on the IG plane data 5105.

As shown in FIG. 60A, when the sign of the offset value indicates that the depth of a 3D video image is closer than the screen, the second cropping processing unit 5132 first shifts each piece of pixel data in the PG plane data 5104 from its original position to the right by a number of pixels 5201L, which is the same as the offset value. When the sign of the offset value indicates that the depth of a 3D video image is deeper than the screen, the second cropping processing unit 5132 shifts pixel data to the left. Next, the second cropping processing unit 5132 removes the section of pixel data 5202L that protrudes outside the range of the PG plane data 5104 to the right (or left). The second cropping processing unit 5132 then outputs the remaining pixel data 5204L as the left-view PG plane data.

As shown in FIG. 60B, when the sign of the offset value indicates that the depth of a 3D video image is closer than the screen, the second cropping processing unit 5132 first shifts each piece of pixel data in the PG plane data 5104 from its original position to the left by a number of pixels 5201R, which is the same as the offset value. When the sign of the offset value indicates that the depth of a 3D video image is deeper than the screen, the second cropping processing unit 5132 shifts pixel data to the right. Next, the second cropping processing unit 5132 removes the section of pixel data 5202R that protrudes outside the range of the PG plane data 5104 to the left (or right). The second cropping processing unit 5132 then outputs the remaining pixel data 5204R as the right-view PG plane data.

Figure 61A:
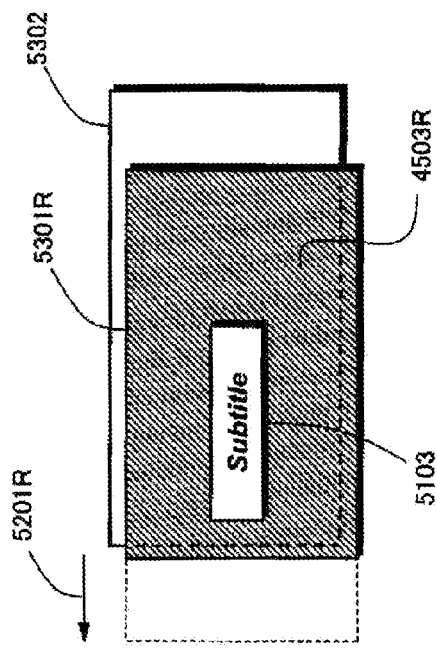
FIGS. 61A, 61B, and 61C are schematic diagrams respectively showing the left-view and right-view PG planes generated by the cropping processing shown in FIGS. 60A and 60B, as well as the 3D video image perceived by a viewer based on these PG planes.
Figure 61B:
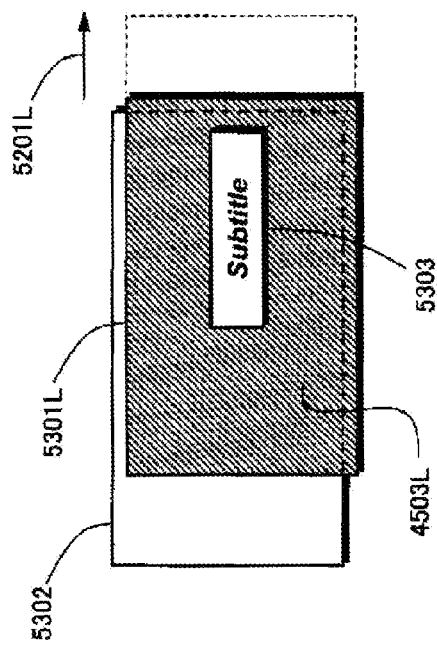
Figure 61C:
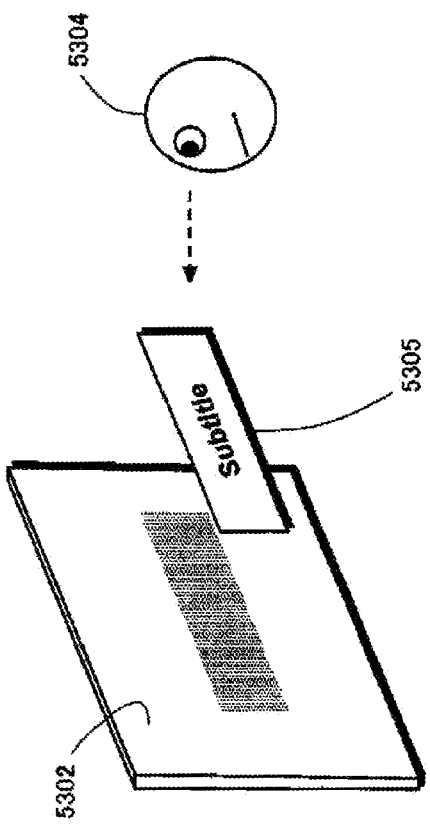

FIGS. 61A, 61B, and 61C are schematic diagrams respectively showing the left-view and right-view PG planes generated by the cropping processing shown in FIG. 60, as well as the 3D video image perceived by a viewer based on these PG planes. As shown in FIG. 61A, the left-view PG plane 5301L is shifted to the right from the range of the screen 5302 by an offset value 5201L. As a result, the subtitle 2D video image 5303 in the left-view PG plane 5301L appears shifted to the right from its original position by the offset value 5201L. As shown in FIG. 61B, the right-view PG plane 5301R is shifted to the left from the range of the screen 5302 by an offset value 5201R. As a result, the subtitle 2D video image 5303 in the right-view PG plane 5301R appears shifted to the left from its original position by the offset value 5201R. When these PG planes 5301L and 5301R are alternately displayed on the screen 5302, then as shown in FIG. 61C, a viewer 5304 perceives the subtitle 3D video image 5305 as closer than the screen 5302. The distance between the 3D video image 5305 and the screen 5302 can be adjusted with the offset values 5201L and 5201R. When the position of each piece of pixel data in the PG plane data 5104 is shifted in the opposite direction than is shown in FIGS. 60A and 60B, the viewer 5304 perceives the subtitle 3D video image 5305 to be further back than the screen 5302.

In 1 plane+offset mode, cropping processing is thus used to generate a pair of a left-view and right-view pieces of plane data from a single piece of plane data. This allows a parallax video image to be displayed from just one piece of plane data. In other words, a sense of depth can be given to a planar image. In particular, a viewer can be made to perceive this planar image as closer or further back than the screen. Note that in 1 plane+zero offset mode, the offset value is "0", and thus the planar image is preserved as is.

Once again referring to FIG. 59, the image plane data 5106 is graphics data transmitted from the program execution unit 4906 to the system target decoder 4903 and decoded by the system target decoder 4903. The graphics data is raster data such as JPEG data or PNG data, and shows a GUI graphics component such as a menu. The fourth cropping processing unit 5134 performs the cropping processing on the image plane data 5106 as do the other cropping processing units 5131-5133. However, unlike the other cropping processing units 5131-5133, the fourth cropping processing unit 5134 receives the offset value from a program API 5152 instead of from the system target decoder 4903. In this case, the program API 5152 is executed by the program execution unit 4906. In this way, the offset information corresponding to the depth of the image represented by the graphics data is calculated and output to the fourth cropping processing unit 5134.

First, the first adder 5141 receives video plane data from the switch 5120 and receives secondary plane data from the first cropping processing unit 5131. Next, the first adder 5141 superimposes one set of video plane data and secondary plane data at a time, outputting the result to the second adder 5142. The second adder 5142 receives PG plane data from the second cropping processing unit 5132, superimposes the PG plane data on the plane data from the first adder 5141, and outputs the result to the third adder 5143. The third adder 5143 receives IG plane data from the third cropping processing unit 5133, superimposes the IG plane data on the plane data from the second adder 5142, and outputs the result to the fourth adder 5144. The fourth adder 5144 receives image plane data from the fourth cropping processing unit 5134, superimposes the image plane data on the plane data from the third adder 5143, and outputs the result to the television 300. As a result, the left-video plane data 5101 or right-video plane data 5102, the secondary plane data 5103, the PG plane data 5104, the IG plane data 5105, and the image plane data 5106 are superimposed in the order shown by the arrow 5100 in FIG. 59. Via this composition processing, for each video image shown by plane data, the left-video image plane or right-video image plane, secondary video plane, IG plane, PG plane, and image plane appear to overlap in this order on the screen of the television 300.

In addition to the above-stated processing, the plane adder 4910 performs processing to convert an output format of the plane data combined by the four adders 5141-5144 into a format that complies with the 3D display method adopted in a device such as the television 300 to which the data is output. If an alternate-frame sequencing method is adopted in the device, for example, the plane adder 4910 outputs the composited plane data pieces as one frame or one field. On the other hand, if a method that uses a lenticular lens is adopted in the device, the plane adder 4910 composites a pair of left-view and right-view pieces of plane data as one frame or one field of video data with use of the built-in buffer memory. Specifically, the plane adder 4910 temporarily stores and holds in the buffer memory the left-view plane data that has been composited first. Subsequently, the plane adder 4910 composites the right-view plane data, and further composites the resultant data with the left-view plane data held in the buffer memory. During composition, the left-view and right-view pieces of plane data are each divided, in a vertical direction, into small rectangular areas that are long and thin, and the small rectangular areas are arranged alternately in the horizontal direction in one frame or one field so as to reconstitute the frame or the field. In this way, the pair of left-view and right-view pieces of plane data is combined into one video frame or field, which the plane adder 4910 then outputs to the corresponding device.

Up to now, the playback apparatus has been described.

<Conditions that the Size of Data Blocks should Meet for Seamless Playback of Video Images>

As shown in FIGS. 15 and 41, a Recording medium 100 according to an embodiment of the present invention has an interleaved arrangement wherein base-view data blocks and dependent-view data blocks are alternately arranged one at a time. Furthermore, at locations where a long jump is necessary, such as layer boundaries, a base-view data block and duplicate data thereof are arranged as a block exclusively for 2D playback and a block exclusively for 3D playback, as shown in FIGS. 20, 24, 26, 28, 30, and 32. The arrangement of these data blocks is in accordance with the above description and is useful for seamless playback of both 2D video images and 3D video images. To further ensure such seamless playback, it is sufficient for the size of each data block to meet conditions based on the capability of the playback device 200. The following is a description of these conditions.

<Conditions Based on Capability in 2D Playback Mode>

Figure 62:
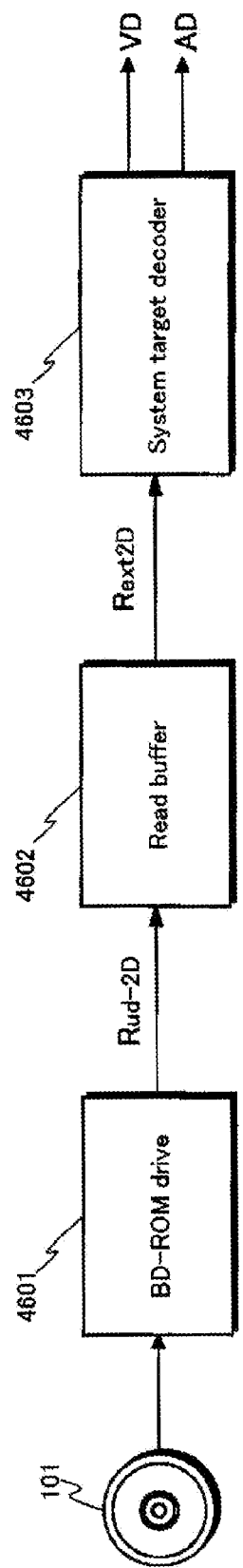
FIG. 62 is a schematic diagram showing the playback processing system in the playback device 200 in 2D playback mode shown in FIG. 54.

FIG. 62 is a schematic diagram showing the playback processing system in the playback device 200 in 2D playback mode. As shown in FIG. 62, from among the elements shown in FIG. 54, this playback processing system includes the BD-ROM drive 4601, read buffer 4602, and system target decoder 4603. The BD-ROM drive 4601 reads 2D extents from the recording medium 100 and transfers the 2D extents to the read buffer 4602 at a read rate $R_{ud\text{-}2D}$. The system target decoder 4603 reads source packets from each 2D extent accumulated in the read buffer 4602 at a mean transfer rate $R_{ext2D}$ and decodes the source packets into video data VD and audio data AD.

The mean transfer rate $R_{ext2D}$ is the same as 192/188 times the mean transfer rate $R_{TS}$ of TS packets from the source depacketizer 3711 to the PID filter 3713 shown in FIG. 45. In general, this mean transfer rate $R_{ext2D}$ changes for each 2D extent. The maximum value $R_{max2D}$ of the mean transfer rate $R_{ext2D}$ is the same as 192/188 times the system rate for the file 2D. In this case, the 2D clip information file specifies the system rate, as shown in FIG. 37. Also, the above coefficient 192/188 is the ratio of bytes in a source packet to bytes in a TS packet. The mean transfer rate $R_{ext2D}$ is conventionally represented in bits/second and specifically equals the value of the size of a 2D extent expressed in bits divided by the extent ATC time. The "size of an extent expressed in bits" is eight times the product of the number of source packets in the extent and the number of bytes per source packet (=192 bytes).

The read rate $R_{ud\text{-}2D}$ is conventionally expressed in bits/second and is set at a higher value, e.g. 54 Mbps, than the maximum value $R_{max}2D$ of the mean transfer rate $R_{ext}2D$: $R_{ud\text{-}2D} > R_{max}2D$. This prevents underflow in the read buffer 4602 due to decoding processing by the system target decoder 4603 while the BD-ROM drive 4601 is reading a 2D extent from the Recording medium 100.

Figure 63:
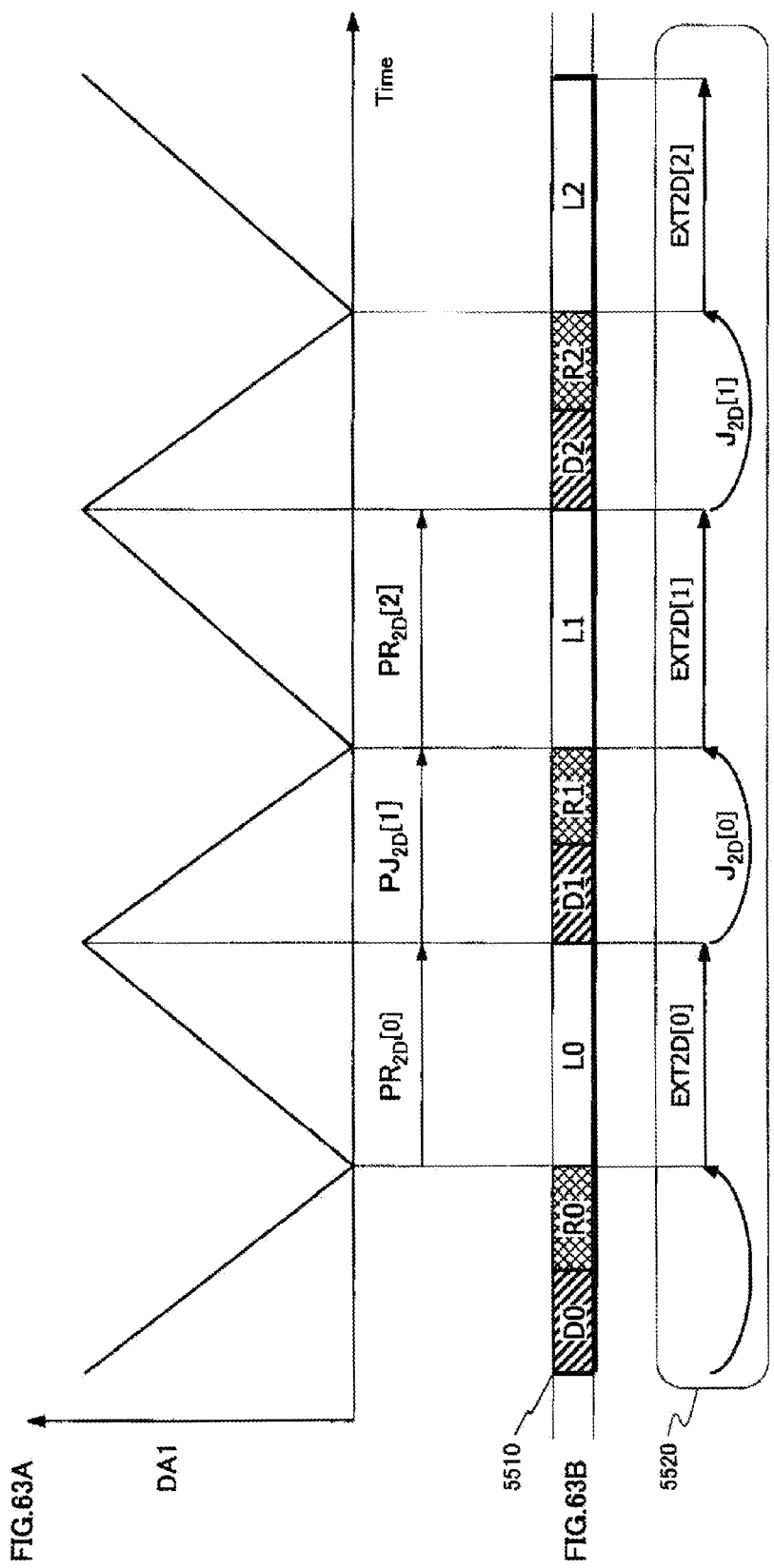
FIG. 63A is a graph showing the change in the data amount DA stored in the read buffer 4602 during playback processing of 2D extents by the playback processing system shown in FIG. 62.
FIG. 63B is a schematic diagram showing the relationship between a 3D extent block 5510 that includes these 2D extents and a playback path 5520 in 2D playback mode.

FIG. 63A is a graph showing the change in the data amount DA stored in the read buffer 4602 during playback processing of 2D extents. FIG. 63B is a schematic diagram showing the relationship between a 3D extent block 5510 that includes these 2D extents and a playback path 5520 in 2D playback mode. As shown in FIG. 63B, the 3D extent block 5510 is composed of a base-view data block group and a dependent-view data block group in an interleaved arrangement. In accordance with the playback path 5520, the base-view data blocks L0, L1, . . . are each treated as one 2D extent EXT2D [0], EXT2D[1], . . . and are read from the recording medium 100 into the read buffer 4602. First, during the read period $PR_{2D}[0]$ for the top base-view data block L0, i.e. the 2D extent EXT2D[0], the accumulated data amount DA increases at a rate equal to $R_{ud-2D}$-$R_{ext2D}$[0], the difference between the read rate $R_{ud-2D}$ and the mean transfer rate $R_{ext2D}$[0], as shown in FIG. 63A.

When the top 2D extent EXT2D[0] is read to the end, a first jump $J_{2D}$[0] occurs. During the jump period $PJ_{2D}$[0], reading of the subsequent two data blocks D1 and R1 is skipped, and reading of data from the Recording medium 100 is suspended. Accordingly, during the first jump period $PJ_{2D}$[0], the accumulated data amount DA decreases at the mean transfer rate $R_{ext2D}$[0], as shown in FIG. 63A.

The following is assumed here: the data amount accumulated in the read buffer 4602 during the first read period $PR_{2D}$[0], i.e. the size $S_{ext2D}$[0] of the top 2D extent EXT2D[0], is the same as the data amount transferred from the read buffer 4602 to the system target decoder 4603 from the read period $PR_{2D}$[0] through the first jump period $PJ_{2D}$[0]. In this case, as shown in FIG. 63A, upon completion of the first jump period $PJ_{2D}$[0], the accumulated data amount DA does not fall below the value at the start of the first read period $PR_{2D}$[0].

After the first jump $J_{2D}$[0], reading of the next base-view data block L1, i.e. the 2D extent EXT2D[1], begins. During the read period $PR_{2D}$[1], the accumulated data amount DA increases again at a rate equal to $R_{ud-2D}$-$R_{ext2D}$[1], the difference in data transfer rates, as shown in FIG. 63A.

Reading and transfer operations by the BD-ROM drive 4601 are not actually performed continuously, but rather intermittently, as shown in FIG. 63A. During the read periods $PR_{2D}$[0], $PR_{2D}$[1], . . . for each 2D extent, this prevents the accumulated data amount DA from exceeding the capacity of the read buffer 4602, i.e. overflow in the read buffer 4602. Accordingly, the graph in FIG. 63A represents what is actually a step-wise increase as an approximated straight increase.

In this way, in accordance with the playback path 5520, reading of a 2D extent Ln=EXT2D[n] (n=0, 1, 2 . . . ) and a jump $J_{2D}$[n] to skip over the recording area of a pair of a dependent-view data blocks Dn, Rn are alternately repeated in 2D playback mode. Accordingly, the accumulated data amount DA in the read buffer 4602 increases during a read period $PR_{2D}$[n] at a rate of $R_{ud-2D}$-$R_{ext2D}$[n] and decreases during a jump period $PJ_{2D}$[n] at a rate of $R_{ext2D}$[n]. Therefore, in order to seamlessly play back 2D video images from these 2D extents EXT2D[n], it suffices to meet the following conditions [1] and [2].

[1] While maintaining provision of data from the read buffer 4602 to the system target decoder 4603 during each jump period $PJ_{2D}$[n], it is necessary to ensure continual output from the system target decoder 4603. As is clear from FIG. 55A, if the data amount accumulated in the read buffer 4602 during each read period $PR_{2D}$[n], i.e. the size $S_{ext2D}$[n] of each 2D extent EXT2D[n], is the same as the data amount transferred from the read buffer 4602 to the system target decoder 4603 from the read period $PR_{2D}$[n] through the next jump period $PJ_{2D}$[n], then the accumulated data amount DA does not return to the value immediately before the read period $PR_{2D}$[n] during the jump period $PJ_{2D}$[n]. In particular, underflow does not occur in the read buffer 4602. In this case, the length of the read period $PR_{2D}$[n] equals $S_{ext2D}$[n]/$R_{ud-2D}$, the value obtained by dividing the size $S_{ext2D}$[n] of a 2D extent EXT2D[n] by the read rate $R_{ud-2D}$. Accordingly, it suffices for the size $S_{ext2D}$[n] of each 2D extent EXT2D[n] to satisfy expression 1.

$$S_{ext2D}[n] \geq \left(\frac{S_{ext2D}[n]}{R_{ud-2D}} + T_{jump-2D}[n]\right) \times R_{ext2D}[n] \quad (1)$$

-continued
$$\therefore S_{ext2D}[n] \geq CEIL\left(\frac{R_{ext2D}[n]}{8} \times \frac{R_{ud-2D}}{R_{ud-2D} - R_{ext2D}[n]} \times T_{jump-2D}[n]\right)$$

In expression 1, the jump time $T_{jump-2D}$[n] represents the length of the jump period $PJ_{2D}$[n] in seconds. The read rate $R_{ud-2D}$ and the mean transfer rate $R_{ext2D}$ are both expressed in bits per second. Accordingly, in expression 1, the mean transfer rate $R_{ext2D}$ is divided by 8 to convert the size $S_{ext2D}$[n] of the 2D extent from bits to bytes. That is, the size $S_{ext2D}$[n] of the 2D extent is expressed in bytes. The function CEIL( ) is an operation to round up fractional numbers after the decimal point of the value in parentheses.

[2] Since the capacity of the read buffer 4602 is limited, the maximum value of the jump period $T_{jump-2D}$[n] is limited. In other words, even if the accumulated data amount DA immediately before a jump period $PJ_{2D}$[n] is the maximum capacity of the read buffer 4602, if the jump time $t_{jump-2D}$[n] is too long, the accumulated data amount DA will reach zero during the jump period $PJ_{2D}$[n], and there is a danger of underflow occurring in the read buffer 4602. Hereinafter, the time for the accumulated data amount DA to decrease from the maximum capacity of the read buffer 4602 to zero while data supply from the recording medium 100 to the read buffer 4602 has stopped, that is, the maximum value of the jump time $T_{jump-2D}$ that guarantees seamless playback, is referred to as the "maximum jump time".

In standards of optical discs, the relationships between jump distances and maximum jump times are determined from the access speed of the optical disc drive and other factors. FIG. 64 is an example of a correspondence table between jump distances $S_{jump}$, and maximum jump times $T_{jump}$ for a BD-ROM disc. In FIG. 64, jump distances $S_{jump}$, are represented in units of sectors, and maximum jump times $T_{jump}$, are represented in milliseconds. In this figure, 1 sector=2,048 bytes. As shown in FIG. 64, when a jump distance $S_{jump}$, is zero sectors or is within a range of 1-10,000 sectors, 10,001-20,000 sectors, 20,001-40,000 sectors, 40,001 sectors-1/10 stroke, and 1/10 stroke or greater, the corresponding maximum jump time $T_{jump}$, is 50 ms, 250 ms, 300 ms, 350 ms, 700 ms, and 1400 ms, respectively.

When the jump distance $S_{jump}$, is equal to zero sectors, the maximum jump time is particularly referred to as a "zero sector transition time $T_{jump-0}$". A "zero sector transition" is a movement of the optical pickup between two consecutive data blocks. During a zero sector transition period, the optical pickup head temporarily suspends its read operation and waits. The zero sector transition time may include, in addition to the time for shifting the position of the optical pickup head via revolution of the Recording medium 100, overhead caused by error correction processing. "Overhead caused by error correction processing" refers to excess time caused by performing error correction processing twice using an ECC block when the boundary between ECC blocks does not match the boundary between two consecutive data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is assessed as the total time for reading the excess data, i.e. 32 sectors×2,048 bytes×8 bits/byte×2 instances/read rate $R_{ud-2D}$. Note that by configuring each data block in ECC block units, the overhead caused by error correction processing may be removed from the zero sector transition time.

When the recording medium 100 is a multilayer disc, during a long jump caused by switching layers, in addition to the maximum jump time $T_{jump}$ specified in FIG. 64, a designated time, such as 350 ms, for switching between recording layers, e.g. for performing a focus jump, is also necessary. Hereinafter, this time is referred to as a "layer switching time".

Based on the above considerations, the jump time $T_{jump-2D}$[n] to be substituted into expression 1 is determined by the sum of two parameters, TJ [n] and TL [n]: $T_{jump-2D}$[n]=TJ [n]+TL [n]. The first parameter TJ[n] represents the maximum jump time specified for each jump distance by BD-ROM disc standards. The first parameter TJ[n] equals, for example, the maximum jump time in the table in FIG. 64 that corresponds to the number of sectors from the end of the $n^{th}$ 2D extent EXT2D[n] to the end of the $(n+1)^{th}$ 2D extent EXT2D[n+1], i.e. the jump distance. When there is the layer boundary LB between the $n^{th}$ 2D extent EXT2D[n] and the $(n+1)^{th}$ 2D extent EXT2D[n+1], the second parameter TL[n] equals the layer switching time, e.g. 350 ms, and when there is no layer boundary LB, the second parameter TL[n] equals zero. For example, when the maximum value of the jump time $T_{jump-2D}$[n] is limited to 700 ms, then the jump distance between the two 2D extents EXT2D[n] and EXT2D[n+1] is permitted to be up to ⅟₁₀ strokes (approximately 1.2 GB) when there is no layer boundary between these 2D extents and 40,000 sectors (approximately 78.1 MB) when there is a layer boundary.

<Conditions Based on 3D Playback Mode>

Figure 65:
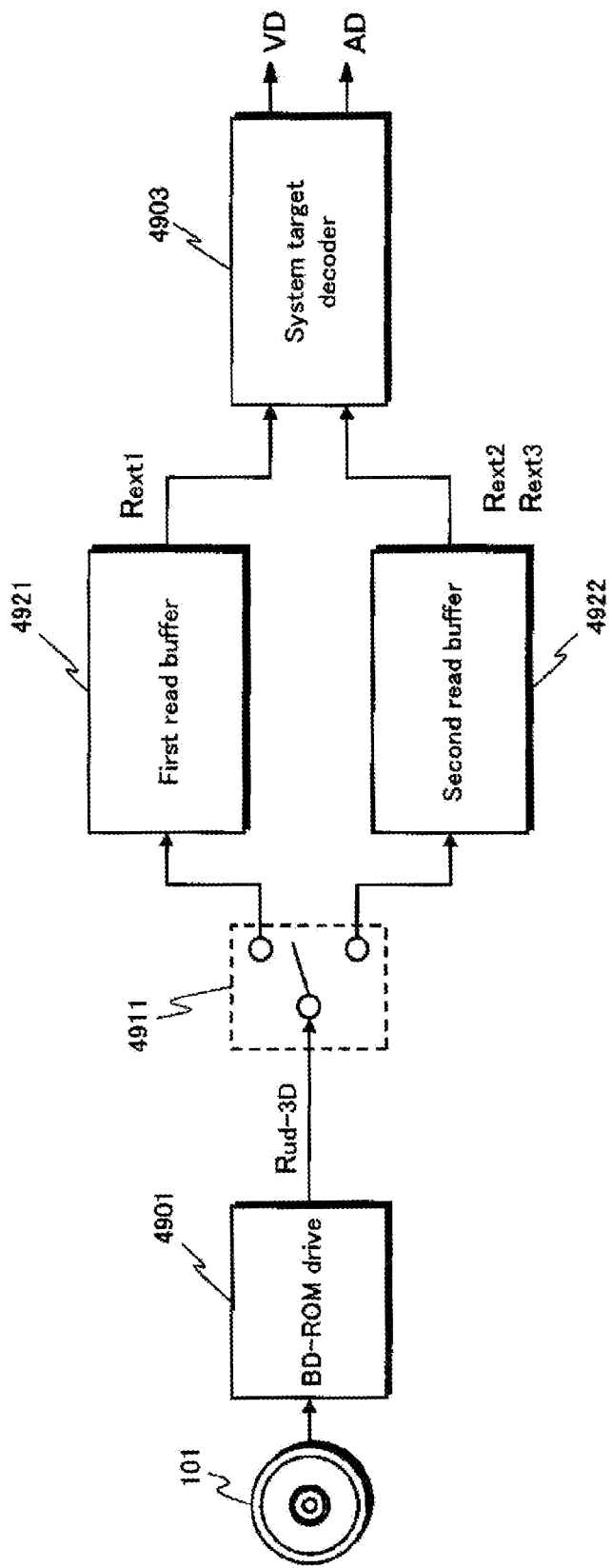
FIG. 65 is a schematic diagram showing the playback processing system in the playback device 200 in 3D playback mode shown in FIG. 57.

FIG. 65 is a schematic diagram showing the playback processing system in the playback device 200 in 3D playback mode. As shown in FIG. 65, from among the elements shown in FIG. 57, this playback processing system includes the BD-ROM drive 4901, switch 4911, first read buffer 4921, second read buffer 4922, and system target decoder 4903. The BD-ROM drive 4901 reads 3D extents from the Recording medium 100 and transfers the 3D extents to the switch 4911 at a read rate $R_{ud-3D}$. The switch 4911 extracts base-view extents and dependent-view extents from 3D extents and separates the extracted extents. The base-view extents are stored in the first read buffer 4921, and the dependent-view extents are stored in the second read buffer 4922. The accumulated data in the second read buffer 4922 consists of right-view extents in L/R mode and of depth map extents in depth mode. The system target decoder 4903 reads source packets from the base-view extents accumulated in the first read buffer 4921 at a first mean transfer rate $R_{ext1}$. The system target decoder 4903 in L/R mode reads source packets from the right-view extents accumulated in the second read buffer 4922 at a second mean transfer rate $R_{ext2}$. The system target decoder 4903 in depth mode reads source packets from the depth map extents accumulated in the second read buffer 4922 at a third mean transfer rate $R_{ext3}$. The system target decoder 4903 also decodes pairs of read base-view extents and dependent-view extents into video data VD and audio data AD.

The first mean transfer rate $R_{ext1}$ is referred to as the "base-view transfer rate". The base-view transfer rate $R_{ext1}$ equals 192/188 times the mean transfer rate $R_{TS1}$ of TS packets from the first source depacketizer 5011 to the first PID filter 5013 shown in FIG. 58. In general, this base-view transfer rate $R_{ext1}$ changes for each base-view extent. The maximum value $R_{max1}$ of the base-view transfer rate $R_{ext1}$ equals 192/188 times the system rate for the file 2D. The 2D clip information file specifies the system rate. The base-view transfer rate $R_{ext1}$ is conventionally represented in bits/second and specifically equals the value of the size of a base-view extent expressed in bits divided by the extent ATC time. The extent ATC time represents the range of the ATSs assigned to source packets in the base-view extent. Accordingly, the extent ATC time equals the time necessary to transfer all of the source packets in the base-view extent from the first read buffer 4921 to the system target decoder 4903.

The second mean transfer rate $R_{ext2}$ is referred to as the "right-view transfer rate", and the third mean transfer rate $R_{ext3}$ is referred to as the "depth map transfer rate". Both transfer rates $R_{ext2}$ and $R_{ext3}$ equal 192/188 times the mean transfer rate $R_{TS2}$ of TS packets from the second source depacketizer 5012 to the second PID filter 5014. In general, these transfer rates $R_{ext2}$ and $R_{ext3}$ change for each dependent-view extent. The maximum value $R_{max2}$ of the right-view transfer rate $R_{ext2}$ equals 192/188 times the system rate for the file DEP that includes the right-view video stream, and the maximum value $R_{max3}$ of the depth map transfer rate $R_{ext3}$ equals 192/188 times the system rate for the file DEP that includes the depth map stream. The right-view clip information file and depth map clip information file specify the respective system rates. The transfer rates $R_{ext2}$ and $R_{ext3}$ are conventionally represented in bits/second and specifically equal the value of the size of each dependent-view extent expressed in bits divided by the extent ATC time. The extent ATC time represents the range of the ATSs assigned to source packets in the dependent-view extent. Accordingly, the extent ATC time equals the time necessary to transfer all of the source packets in the dependent-view extent from the second read buffer 4922 to the system target decoder 4903.

The read rate $R_{ud-3D}$ is conventionally expressed in bits/second and is set at a higher value, e.g. 72 Mbps, than the maximum values $R_{max1}$–$R_{max3}$ of the first through third mean transfer rates $R_{ext1}$–$R_{ext3}$: $R_{ud-3D}$>$R_{max1}$, $R_{ud-3D}$>$R_{max2}$, $R_{ud-3D}$>$R_{max3}$. This prevents underflow in the read buffers 4921 and 4922 due to decoding processing by the system target decoder 4903 while the BD-ROM drive 4901 is reading a 3D extent from the recording medium 100.

[L/R Mode]

Figure 66A:
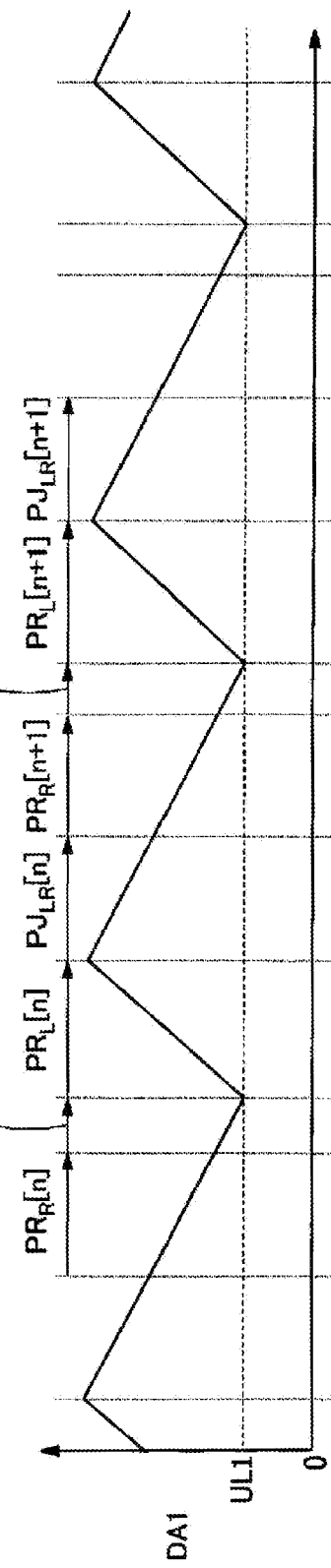
FIGS. 66A and 66B are graphs showing the change in data amounts DA1 and DA2 accumulated in the read buffers 4921 and 4922 during playback processing of a 3D extent block in L/R mode by the playback processing system shown in FIG. 65.
Figure 66B:
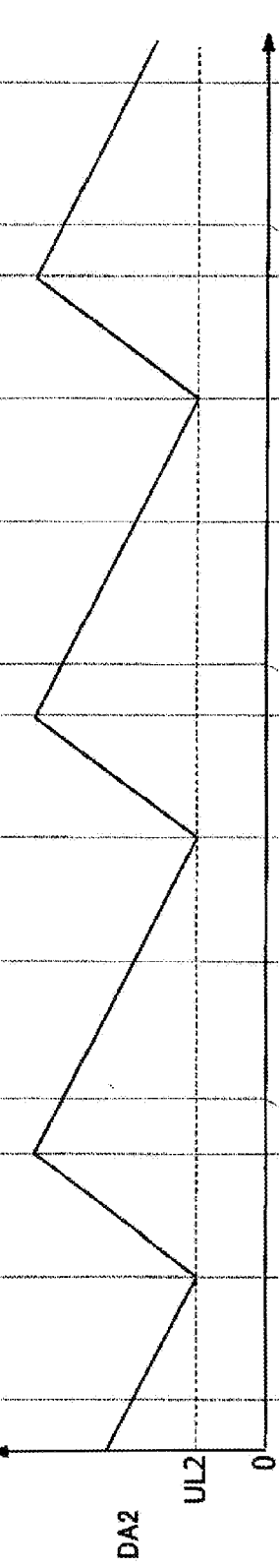
Figure 66C:
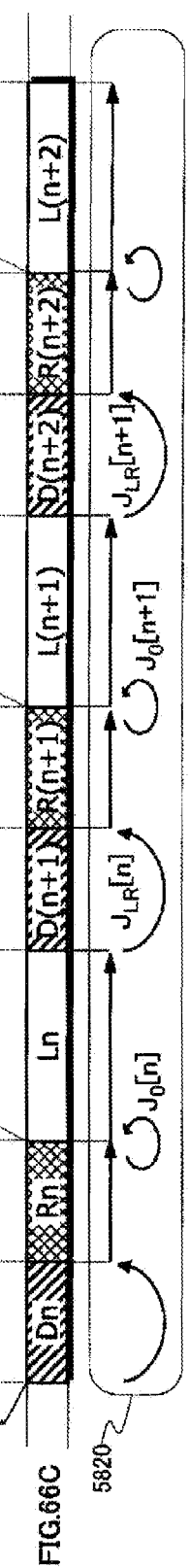
FIG. 66C is a schematic diagram showing the relationship between a 3D extent block 5810 and a playback path 5820 in L/R mode.

FIGS. 66A and 66B are graphs showing the change in data amounts DA1 and DA2 accumulated in the read buffers 4921 and 4922 during playback processing of a 3D extent block in L/R mode. FIG. 66C is a schematic diagram showing the relationship between a 3D extent block 5810 and a playback path 5820 in L/R mode. As shown in FIG. 66C, the 3D extent block 5810 is composed of a base-view data block group and a dependent-view data block group in an interleaved arrangement. In accordance with the playback path 5820, each pair of adjacent right-view data blocks Rk and base-view data blocks Lk (k=0, 1, 2, . . . ) is read as one 3D extent EXTSS[k]. For convenience of explanation, it is assumed that (n−1) 3D extents have already been read, and that an integer n is sufficiently larger than one. In this case, the accumulated data amounts DA1 and DA2 in the read buffers 4921 and 4922 are already maintained at or above the respective lower limits UL1 and UL2. These lower limits UL1 and UL2 are referred to as a "buffer margin amount". The method for guaranteeing the buffer margin amounts UL1 and UL2 is described later.

As shown in FIG. 66C, during the $(2n-1)^{th}$ read period $PR_R$[n], the $n^{th}$ right-view extent Rn is read from the Recording medium 100 into the second read buffer 4922. During the $(2n-1)^{th}$ read period $PR_R$[n], the accumulated data amount DA2 in the second read buffer 4922 increases at a rate equal to $R_{ud-3D}$–$R_{ext2}$[n], the difference between the read rate $R_{ud-3D}$ and a right-view transfer rate $R_{ext2}$[n], as shown in FIG. 66B. Conversely, as shown in FIG. 66A, the accumulated data amount DA1 in the first read buffer 4921 decreases at a base-view transfer rate $R_{ext1}[n-1]$.

When the end of the $n^{th}$ right-view extent Rn is read, an $n^{th}$ zero sector transition $J_0[n]$ occurs. During the $n^{th}$ zero sector transition period $PJ_0[n]$, reading of data from the recording medium 100 is suspended. Accordingly, the accumulated data amount DA1 in the first read buffer 4921 continues to decrease at the base-view transfer rate $R_{ext1}[n-1]$, and the accumulated data amount DA2 in the second read buffer 4922 decreases at the right-view transfer rate $R_{ext2}[n]$.

Upon completion of the $n^{th}$ zero sector transition period $PJ_0[n]$, the $2n^{th}$ read period $PR_L[n]$ begins. During the $2n^{th}$ read period $PR_L[n]$, the $n^{th}$ base-view extent Ln is read from the Recording medium 100 into the first read buffer 4921. Accordingly, the accumulated data amount DA1 in the first read buffer 4921 increases at a rate equal to $R_{ud-3D} - R_{ext1}[n]$, the difference between the read rate $R_{ud-3D}$ and a base-view transfer rate $R_{ext1}[n]$, as shown in FIG. 66A. Conversely, as shown in FIG. 66B, the accumulated data amount DA2 in the second read buffer 4922 continues to decrease at the right-view transfer rate $R_{ext2}[n]$.

When the end of the $n^{th}$ base-view extent Ln is read, an $n^{th}$ jump $J_{LR}[n]$ occurs. During the $n^{th}$ jump period $PJ_{LR}[n]$, reading of the $(n+1)^{th}$ depth map extent $D(n+1)$ is skipped, and therefore reading of data from the recording medium 100 is suspended. Accordingly, during the $n^{th}$ jump period $PJ_{LR}[n]$, the accumulated data amount DA1 in the first read buffer 4921 decreases at the base-view transfer rate $R_{ext1}[n]$, as shown in FIG. 66A. Meanwhile, the accumulated data amount DA2 in the second read buffer 4922 continues to decrease at the right-view transfer rate $R_{ext2}[n]$, as shown in FIG. 66B.

The following is assumed here: the data amount accumulated in the second read buffer 4922 during the $(2n-1)^{th}$ read period $PR_R[n]$, i.e. the size $S_{ext2}[n]$ of the $n^{th}$ right-view extent Rn, is at least equal to the data amount transferred from the second read buffer 4922 to the system target decoder 4903 from the $(2n-1)^{th}$ read period $PR_R[n]$ through the $n^{th}$ jump period $PJ_{LR}[n]$. In this case, as shown in FIG. 66B, upon completion of the jump period $PJ_{LN}[n]$, the accumulated data amount DA2 in the second read buffer 4922 does not fall below the second buffer margin amount UL2.

Upon completion of the $n^{th}$ jump period $PJ_{LR}[n]$, the $(2n+1)^{th}$ read period $PR_R[n+1]$ begins. During the $(2n+1)^{th}$ read period $PR_R[n+1]$, the $(n+1)^{th}$ right-view extent $R(n+1)$ is read from the Recording medium 100 into the second read buffer 4922. Accordingly, as shown in FIG. 66B, the accumulated data amount DA2 in the second read buffer 4922 increases at a rate equal to $R_{ud-3D} - R_{ext2}[n+1]$, the difference between the read rate $R_{ud-3D}$ and a right-view transfer rate $R_{ext2}[n+1]$. Conversely, the accumulated data amount DA1 in the first read buffer 4921 continues to decrease at the base-view transfer rate $R_{ext1}[n]$, as shown in FIG. 66A.

When the end of the $(n+1)^{th}$ right-view extent $R(n+1)$ is read, an $(n+1)^{th}$ zero sector transition $J_0[n+1]$ occurs. During the $(n+1)^{th}$ zero sector transition period $PJ_0[n+1]$, reading of data from the recording medium 100 is suspended. Accordingly, the accumulated data amount DA1 in the first read buffer 4921 continues to decrease at the base-view transfer rate $R_{ext1}[n]$, and the accumulated data amount DA2 in the second read buffer 4922 decreases at the right-view transfer rate $R_{ext2}[n+1]$.

The following is assumed here: the data amount accumulated in the first read buffer 4921 during the $2n^{th}$ read period $PR_L[n]$, i.e. the size $S_{ext1}[n]$ of the $n^{th}$ base-view extent Ln, is at least equal to the data amount transferred from the first read buffer 4921 to the system target decoder 4903 from the $2n^{th}$ read period $PR_L[n]$ through the $(n+1)^{th}$ zero sector transition period $PJ_0[n+1]$. In this case, as shown in FIG. 66A, upon completion of the $(n+1)^{th}$ zero sector transition period $PJ_0[n+1]$, the accumulated data amount DA1 in the first read buffer 4921 does not fall below the first buffer margin amount UL1.

For seamless playback of 3D video images from the 3D extents $EXTSS[n]=Rn+Ln$, $EXTSS[n+1]=R(n+1)+L(n+1)$, ... despite the jumps between these extents, it suffices to repeat the above changes in the accumulated data amounts DA1 and DA2. To do so, the following three conditions [3], [4], and [5] should be met.

[3] The size $S_{ext1}[n]$ of the $n^{th}$ base-view extent Ln is at least equal to the data amount transferred from the first read buffer 4921 to the system target decoder 4903 from the $2n^{th}$ read period $PR_L[n]$ through the $(n+1)^{th}$ zero sector transition period $PJ_0[n+1]$. The length of the $2n^{th}$ read period $PR_L[n]$ equals $S_{ext1}[n]/R_{ud-3D}$, the value obtained by dividing the size $S_{ext1}[n]$ of the $n^{th}$ base-view extent Ln by the read rate $R_{ud-3D}$. The length of the $(2n+1)^{th}$ read period $PR_R[n+1]$ equals $S_{ext2}[n+1]/R_{ud-3D}$, the value obtained by dividing the size $S_{ext2}[n+1]$ of the $(n+1)^{th}$ right-view extent $R(n+1)$ by the read rate $R_{ud-3D}$. Accordingly, it suffices for the size $S_{ext1}[n]$ of the $n^{th}$ base-view extent Ln to satisfy expression 2.

$$S_{ext1}[n] \geq \qquad (2)$$
$$\left(\frac{S_{ext1}[n]}{R_{ud-3D}} + T_{jump-3D}[n] + \frac{S_{ext2}[n+1]}{R_{ud-3D}} + T_{jump-0}[n+1]\right) \times R_{ext1}[n]$$
$$\therefore S_{ext1}[n] \geq CEIL\left\{\frac{R_{ext1}[n]}{8} \times \frac{R_{ud-3D}}{R_{ud-3D} - R_{ext1}[n]} \times \right.$$
$$\left.\left(T_{jump-3D}[n] + \frac{S_{ext2}[n+1]}{R_{ud-3D}} + T_{jump-0}[n+1]\right)\right\}$$

[4] The size $S_{ext2}[n]$ of the $n^{th}$ right-view extent Rn is at least equal to the data amount transferred from the second read buffer 4922 to the system target decoder 4903 from the $(2n-1)^{th}$ read period $PR_R[n]$ through the $n^{th}$ jump period $PJ_{LR}[n]$. The length of the $(2n-1)^{th}$ read period $PR_R[n]$ equals $S_{ext2}[n]/R_{ud-3D}$, the value obtained by dividing the size $S_{ext2}[n]$ of the $n^{th}$ right-view extent Rn by the read rate $R_{ud-3D}$. Accordingly, it suffices for the size $S_{ext2}[n]$ of the $n^{th}$ right-view extent Rn to satisfy expression 3.

$$S_{ext1}[n] \geq \qquad (3)$$
$$\left(\frac{S_{ext1}[n]}{R_{ud-3D}} + T_{jump-3D}[n] + \frac{S_{ext2}[n+1]}{R_{ud-3D}} + T_{jump-0}[n+1]\right) \times R_{ext1}[n]$$
$$\therefore S_{ext1}[n] \geq CEIL\left\{\frac{R_{ext1}[n]}{8} \times \frac{R_{ud-3D}}{R_{ud-3D} - R_{ext1}[n]} \times \right.$$
$$\left.\left(T_{jump-3D}[n] + \frac{S_{ext2}[n+1]}{R_{ud-3D}} + T_{jump-0}[n+1]\right)\right\}$$

[5] Unlike the jump time $T_{jump-2D}[n]$ substituted into expression 1, the jump time $T_{jump-3D}[n]$ to be substituted into expressions 2 and 3 is determined by only the first parameter $TJ[n]$: $T_{jump-3D}[n]=TJ[n]$. The first parameter $TJ[n]$ equals, for example, the maximum jump time in the table in FIG. 54 that corresponds to the number of sectors from the end of the $n^{th}$ base-view extent Ln to the top of the $(n+1)^{th}$ right-view extent $R(n+1)$, i.e. the jump distance.

[Depth Mode]

FIGS. 67A and 67B are graphs showing the change in data amounts DA1 and DA2 stored in the read buffers 4921 and 4922 during playback processing of a 3D extent block in depth mode. FIG. 67C is a schematic diagram showing the relationship between a 3D extent block 5910 and a playback path 5920. As shown in FIG. 67C, the 3D extent block 5810 is composed of data block groups in an interleaved arrangement similar to the 3D extent block 5810 shown in FIG. 66C. In accordance with the playback path 5920, depth map data blocks Dk and base-view data blocks Lk (k=0, 1, 2, ...) are read as one extent. As in FIG. 58, it is assumed that (n−1) 3D extents have already been read, and that an integer n is sufficiently larger than one. In this case, the accumulated data amounts DA1 and DA2 in the read buffers 4921 and 4922 are already maintained at or above the respective buffer margin amounts UL1 and UL2.

As shown in FIG. 67C, during the $(2n-1)^{th}$ read period $PR_D[n]$ the $n^{th}$ depth map extent Dn is read from the Recording medium 100 into the second read buffer 4922. During the $(2n-1)^{th}$ read period $PR_D[n]$, the accumulated data amount DA2 in the second read buffer 4922 increases at a rate equal to $R_{ud-3D}-R_{ext3}[n]$, the difference between the read rate $R_{ud-3D}$ and a depth map transfer rate $R_{ext3}[n]$, as shown in FIG. 67B. Conversely, as shown in FIG. 67A, the accumulated data amount DA1 in the first read buffer 4921 decreases at a base-view transfer rate $R_{ext1}[n-1]$.

When the end of the $n^{th}$ depth map extent Dn is read, an $n^{th}$ jump $J_{LD}[n]$ occurs. During the $n^{th}$ jump period $PJ_{LD}[n]$, reading of the $n^{th}$ right-view extent Rn is skipped, and therefore reading of data from the recording medium 100 is suspended. Accordingly, during the $n^{th}$ jump period $PJ_{LD}[n]$, the accumulated data amount DA1 in the first read buffer 4921 continues to decrease at the base-view transfer rate $R_{ext1}[n-1]$, as shown in FIG. 67A. Meanwhile, the accumulated data amount DA2 in the second read buffer 4922 decreases at the depth map transfer rate $R_{ext3}[n]$, as shown in FIG. 67B.

After completion of the $n^{th}$ jump period $PJ_{LD}[n]$, the $2n^{th}$ read period $PR_L[n]$ begins. During the $2n^{th}$ read period $PR_L[n]$, the $n^{th}$ base-view extent Ln is read from the Recording medium 100 into the first read buffer 4921. Accordingly, as shown in FIG. 67A, the accumulated data amount DA1 in the first read buffer 4921 increases at a rate equal to $R_{ud-3D}-R_{ext1}[n]$, the difference between the read rate $R_{ud-3D}$ and a base-view transfer rate $R_{ext1}[n]$. Conversely, the accumulated data amount DA2 in the second read buffer 4922 continues to decrease at the depth map transfer rate $R_{ext3}[n]$, as shown in FIG. 67B.

When the end of the $n^{th}$ base-view extent Ln is read, an $n^{th}$ zero sector transition $J_0[n]$ occurs. During the $n^{th}$ zero sector transition period $PJ_0[n]$, reading of data from the recording medium 100 is suspended. Accordingly, the accumulated data amount DA1 in the first read buffer 4921 decreases at the base-view transfer rate $R_{ext1}[n]$, and the accumulated data amount DA2 in the second read buffer 4922 continues to decrease at the depth map transfer rate $R_{ext3}[n]$ The following is assumed here: the data amount accumulated in the second read buffer 4922 during the $(2n-1)^{th}$ read period $PR_D[n]$, i.e. the size $S_{ext3}[n]$ of the $n^{th}$ depth map extent Dn, is at least equal to the data amount transferred from the second read buffer 4922 to the system target decoder 4903 from the $(2n-1)^{th}$ read period $PR_D[n]$ through the $n^{th}$ zero sector transition period $PJ_0n$. In this case, as shown in FIG. 67B, upon completion of the $n^{th}$ zero sector transition period $PJ_0[n]$, the accumulated data amount DA2 in the second read buffer 4922 does not fall below the second buffer margin amount UL2.

Upon completion of the $n^{th}$ zero sector transition period $PJ_0[n]$, the $(2n+1)^{th}$ read period $PR_D[n+1]$ begins. During the $(2n+1)^{th}$ read period $PR_D[n+1]$, the $(n+1)^{th}$ depth map extent $D(n+1)$ is read from the Recording medium 100 into the second read buffer 4922. Accordingly, the accumulated data amount DA1 in the first read buffer 4921 continues to decrease at the base-view transfer rate $R_{ext1}[n]$, as shown in FIG. 67A. Conversely, as shown in FIG. 67B, the accumulated data amount DA2 in the second read buffer 4922 increases at a rate of $R_{ud-3D}-R_{ext3}[n+1]$.

When the end of the $(n+1)^{th}$ depth map extent $D(n+1)$ is read, an $(n+1)^{th}$ jump $J_{LD}[n+1]$ occurs. During the $(n+1)^{th}$ jump period $PJ_{LD}[n+1]$, reading of the $(n+1)^{th}$ right-view extent $R(n+1)$ is skipped, and therefore reading of data from the recording medium 100 is suspended. Accordingly, during the $(n+1)^{th}$ jump period $PJ_{LD}[n+1]$, the accumulated data amount DA1 in the first read buffer 4921 continues to decrease at the base-view transfer rate $R_{ext1}[n]$, and the accumulated data amount DA2 in the second read buffer 4922 decreases at a depth map transfer rate $R_{ext3}[n+1]$.

Upon completion of the $(n+1)^{th}$ jump period $PJ_{LD}[n+1]$, the $(2n+2)^{th}$ read period $PR_L[n+1]$ begins. During the $(2n+2)^{th}$ read period $PR_L[n+1]$, the $(n+1)^{th}$ base-view extent $L(n+1)$ is read from the Recording medium 100 into the first read buffer 4921. Accordingly, as shown in FIG. 67A, the accumulated data amount DA1 in the first read buffer 4921 increases at a rate of $R_{ud-3D}-R_{ext1}[n+1]$. Conversely, the accumulated data amount DA2 in the second read buffer 4922 continues to decrease at the depth map transfer rate $R_{ext3}[n+1]$, as shown in FIG. 67B.

The following is assumed here: the data amount accumulated in the first read buffer 4921 during the $2n^{th}$ read period $PR_L[n]$, i.e. the size $S_{ext1}[n]$ of the $n^{th}$ base-view extent Ln, is at least equal to the data amount transferred from the first read buffer 4921 to the system target decoder 4903 from the $2n^{th}$ read period $PR_L[n]$ through the $(n+1)^{th}$ jump period $PJ_{LD}[n+1]$. In this case, as shown in FIG. 67A, upon completion of the $(n+1)^{th}$ jump period $PJ_{LD}[n+1]$, the accumulated data amount DA1 in the first read buffer 4921 does not fall below the first buffer margin amount UL1.

For seamless playback of 3D video images from the depth map extents Dn, D (n+1), ... and the base-view extents Ln, L (n+1), ... despite the jumps between these extents, it suffices to repeat the above changes in the accumulated data amounts DA1 and DA2. To do so, the following conditions [6], [7], and [8] need to be met.

[6] The size $S_{ext1}[n]$ of the $n^{th}$ base-view extent Ln is at least equal to the data amount transferred from the first read buffer 4921 to the system target decoder 4903 from the $2n^{th}$ read period $PR_L[n]$ through the $(n+1)^{th}$ jump period $PJ_{LD}[n+1]$. The length of the $2n^{th}$ read period $PR_L[n]$ equals $S_{ext1}[n]/R_{ud-3D}$, the value obtained by dividing the size $S_{ext1}[n]$ of the $n^{th}$ base-view extent Ln by the read rate $R_{ud-3D}$. The length of the $(2n+1)^{th}$ read period $PR_D[n+1]$ equals $S_{ext3}[n+1]/R_{ud-3D}$, the value obtained by dividing the size $S_{ext3}[n+1]$ of the $(n+1)^{th}$ depth map extent $D(n+1)$ by the read rate $R_{ud-3D}$. Accordingly, it suffices for the size $S_{ext1}[n]$ of the $n^{th}$ base-view extent Ln to satisfy expression 4.

$$S_{ext1}[n] \geq \qquad (4)$$

$$\left( \frac{S_{ext1}[n]}{R_{ud-3D}} + T_{jump-0}[n] + \frac{S_{ext3}[n+1]}{R_{ud-3D}} + T_{jump-3D}[n+1] \right) \times R_{ext1}[n]$$

$$\therefore S_{ext1}[n] \geq CEIL\left\{ \frac{R_{ext1}[n]}{8} \times \frac{R_{ud-3D}}{R_{ud-3D} - R_{ext1}[n]} \times \right.$$

$$\left. \left( T_{jump-0}[n] + \frac{S_{ext3}[n+1]}{R_{ud-3D}} + T_{jump-3D}[n+1] \right) \right\}$$

[7] The size $S_{ext3}[n]$ of the $n^{th}$ depth map extent Dn is at least equal to the data amount transferred from the second read buffer 4922 to the system target decoder 4903 from the $(2n-1)^{th}$ read period $PR_D[n]$ through the $n^{th}$ zero sector transition period $PJ_0[n]$. The length of the $(2n-1)^{th}$ read period $PR_D[n]$ equals $S_{ext3}[n]/R_{ud-3D}$, the value obtained by dividing the size $S_{ext3}[n]$ of the $n^{th}$ depth map extent Dn by the read rate $R_{ud-3D}$. Accordingly, it suffices for the size $S_{ext3}[n]$ of the $n^{th}$ depth map extent Dn to satisfy expression 5.

$$S_{ext3}[n] \geq \left( \frac{S_{ext3}[n]}{R_{ud-3D}} + T_{jump-3D}[n] + \frac{S_{ext1}[n]}{R_{ud-3D}} + T_{jump-0}[n] \right) \times R_{ext3}[n] \quad (5)$$

$$\therefore S_{ext3}[n] \geq CEIL\left\{ \frac{R_{ext3}[n]}{8} \times \frac{R_{ud-3D}}{R_{ud-3D} - R_{ext3}[n]} \times \left( T_{jump-3D}[n] + \frac{S_{ext1}[n]}{R_{ud-3D}} + T_{jump-0}[n] \right) \right\}$$

[8] The jump time $T_{jump-3D}[n]$ to be substituted into expressions 4 and 5 equals, for example, the maximum jump time in the table in FIG. 64 that corresponds to the number of sectors from the end of the $n^{th}$ depth map extent Dn to the start of the $n^{th}$ base-view extent Ln, i.e. the jump distance. Note that in the arrangement of data block groups in this embodiment of the present invention, a pair of a depth map extent Dn and a base-view extent Ln with the same extent ATC times are not arranged with a layer boundary therebetween.

The zero sector transition time $T_{jump-0}[n]$ equals the specified value determined only by the time required for an actual zero sector transition, regardless of whether there is the layer boundary LB between the $n^{th}$ base-view extent Ln and the $(n+1)^{th}$ depth map extent $D(n+1)$.

Based on the above considerations, in order to permit seamless playback of 2D video images, of 3D video images in L/R mode, and of 3D video images in depth mode from the data block groups in an interleaved arrangement, it suffices for the size of each data block to satisfy all of the above expressions 1-5. In particular, the size of the base-view data block should be equal to or greater than the largest value among the right-hand side of expressions 1, 2, and 4. Hereinafter, the lower limit on the size of a data block that satisfies all of the expressions 1-5 is referred to as the "minimum extent size".

<Read Buffer Margin Amount>

The lower limits UL1 and UL2 of the accumulated data amounts DA1 and DA2 in the read buffers 4921 and 4922, shown in FIGS. 66A, 66B, 67A, and 67B, represent buffer margin amounts. The "buffer margin amount" is the lower limit of the accumulated data amount that is to be maintained in each read buffer 4921 during reading of a single 3D extent block, i.e. successive data block groups in an interleaved arrangement. During reading of stream data, a long jump occurs between two different 3D extent blocks when the recording layer being read is switched or when read processing is interrupted to read from another file. The term "another file" refers to a file other than the AV stream file and includes, for example, a movie object file, BD-J object file, and JAR file. The long jump is longer than jumps that occur within the 3D extent block that is derived from expressions 2-5. Furthermore, the timing of a long jump caused by interruption to read another file is irregular and may occur even during the reading of a single data block. Accordingly, rather than setting the minimum extent size by substituting the maximum jump time of a long jump into expressions 2-5, it is more advantageous to maintain the buffer margin amount at a level capable of preventing underflow in the read buffers during a long jump.

Figure 68:
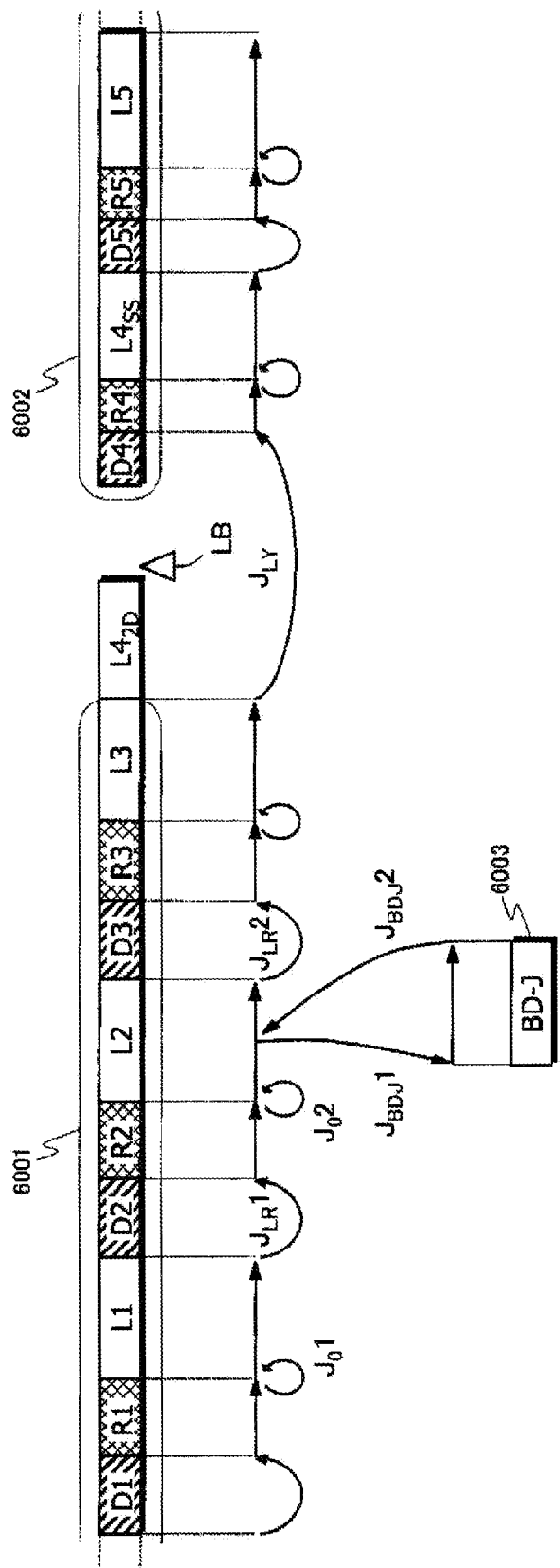
FIG. 68 is a schematic diagram showing the long jumps $J_{LY}$, $J_{BDJ}1$, and $J_{BDJ}2$ produced during playback processing in L/R mode by the playback processing system shown in FIG. 65.

FIG. 68 is a schematic diagram showing the long jumps $J_{LY}$, $J_{BDJ}1$, and $J_{BDJ}2$ produced during playback processing in L/R mode. As shown in FIG. 68, a first 3D extent block 6001 is arranged on the first recording layer, which is located before the layer boundary LB. Between the end of the first 3D extent block 6001 L3 and the layer boundary LB, a block exclusively for 2D playback L4$_{2D}$ is recorded. On the other hand, a second 3D extent block 6002 is recorded on the second recording layer, which is located after the layer boundary LB. Furthermore, a BD-J object file 6003 is recorded in an area distant from both 3D extent blocks 6001 and 6002. During playback processing from the first 3D extent block 6001 to the second 3D extent block 6002, a long jump $J_{LY}$ occurs when switching layers. In contrast, reading of the first 3D extent block 6001 is interrupted for reading of the BD-J object file 6003, and thus a pair of long jumps $J_{BDJ}1$ and $J_{BDJ}2$ occur. The buffer margin amounts UL1 and UL2 necessary for the long jumps $J_{LY}$ and $J_{BDJ}$ are calculated as follows.

The maximum jump time $T_{jump-LY}$ for a long jump $J_{LY}$ caused by layer switching equals the sum of the layer switching time and the maximum jump time, as per the table in FIG. 64, corresponding to the jump distance of the first long jump $J_{LY}$. This jump distance equals the number of sectors between the end of the base-view data block L3, the last block in the first 3D extent block 6001, and the beginning of the top right-view data block R4 in the second 3D extent block 6002. Note also that the base-view transfer rate $R_{ext1}$ does not exceed the maximum value $R_{max1}$. It thus follows that the data amount consumed from the first read buffer during the long jump $J_{LY}$ does not exceed the product of the maximum value $R_{max1}$ of the base-view transfer rate and the maximum jump time $T_{jump-LY}$. The value of this product is set as the first buffer margin amount UL1. In other words, the first buffer margin amount UL1 is calculated via equation 6.

$$UL1 = CEIL\left( \frac{R_{max1}}{8} \times T_{jump-LY} \right) \quad (6)$$

For example, when the maximum jump distance is 40,000 sectors, then as per the table in FIG. 64, the maximum jump time $T_{jump-LY}$ is 700 ms, which includes the layer switching time of 350 ms. Accordingly, when the system rate corresponding to the file 2D is 48 Mbps, the first buffer margin amount UL1 equals (48 Mbps×192/188)×0.7 seconds=approximately 4.09 MB.

Similarly, the maximum value of the data amount consumed from the second read buffer 4922 during the long jump $J_{LY}$, i.e. the product of the maximum value $R_{max2}$ of the right-view transfer rate and the maximum jump time $T_{jump-LY}$, is determined to be the second buffer margin amount UL2. In other words, the second buffer margin amount UL2 is calculated via equation 7.

$$UL2 = CEIL\left( \frac{R_{max2}}{8} \times T_{jump-LY} \right) \quad (7)$$

For example, when the maximum jump distance is 40,000 sectors, meaning that the maximum jump time $T_{jump-LY}$ is 700 ms, and when the system rate corresponding to the first file DEP is 16 Mbps, the second buffer margin amount UL2 equals (16 Mbps×192/188)×0.7 seconds=approximately 1.36 MB.

Referring again to FIG. 68, when reading of the BD-J object file 6003 interrupts the read period of the first 3D extent block 6001, a first long jump $J_{BDJ}1$ occurs. In this way, the position targeted for reading shifts from the recording area of the second base-view data block L2 to the recording area of the BD-J object file 6003. The corresponding jump time $T_{BDJ}$ is set to a predetermined fixed value, e.g. 900 ms. Next, the BD-J object file 6003 is read. The time required for reading equals the value of eight times the size $S_{BDJ}$ of the extent belonging to the file 6003 divided by the read rate $R_{ud-3D}$, or $8 \times S_{BDJ}[n] R_{ud-3D}$ (normally, the extent size $S_{BDJ}$ is expressed in bytes, and the read rate $R_{ud-3D}$ in bits/second; therefore, it is necessary to multiply by eight). Next, a second long jump $J_{BDJ}2$ occurs. The position targeted for reading thus returns from the recording area of the BD-J object file 6003 back to the recording area of the second base-view data block L2. The corresponding jump time $T_{BDJ}$ is equal to the first jump period, e.g. 900 ms. During the two jumps $J_{BDJ}1$ and $J_{BDJ}2$ and the reading of the BD-J object file 6003, data is not read into the first read buffer 4921. Accordingly, the maximum value of the amount of data consumed from the first read buffer 4921 during this time is determined to be the first read buffer margin amount UL1. In other words, the first read buffer margin amount UL1 is calculated via equation 8.

$$UL2 = \text{CEIL}\left(\frac{R_{max1}}{8} \times \left(2 \times T_{BDJ} + \frac{8 \times S_{BDJ}}{R_{ud-3D}}\right)\right) \quad (8)$$

Similarly, the maximum value of the data amount consumed from the second read buffer 4922 during the two long jumps $J_{BDJ}1$ and $J_{BDJ}2$ and reading of the BD-J object file 6003 is determined to be the second buffer margin amount UL2. In other words, the second buffer margin amount UL2 is calculated via equation 9.

$$UL2 = \text{CEIL}\left(\frac{R_{max2}}{8} \times \left(2 \times T_{BDJ} + \frac{8 \times S_{BDJ}}{R_{ud-3D}}\right)\right) \quad (9)$$

The first buffer margin amount UL1 is set to the larger of the values of the right-hand side of equations 6 and 8. The second buffer margin amount UL2 is set to the larger of the values of the right-hand side of equations 7 and 9.

<Minimum Capacity of the Read Buffers>

During playback processing of the successive 3D extent blocks shown in FIGS. 66C and 67C, the minimum value of the capacity necessary for each of the read buffers 4921 and 4922 is calculated as follows.

When the $n^{th}$ base-view data block Ln (n=0, 1, 2, ...) is read in 3D playback mode, it suffices for the capacity RB1[$n$] necessary for the first read buffer 4921 to be equal to or greater than the highest value of the peaks in the graphs shown in FIGS. 66A and 67A. If the size $S_{ext1}$ of the base-view data block to be read is fixed, then the peak value reaches its maximum when the base-view transfer rate $R_{ext1}$ equals its maximum value $R_{max1}$. Accordingly, the capacity RB1[$n$] should satisfy expression 10 in both L/R mode and depth mode.

$$RB1[n] \geq \text{CEIL}\left(UL1 + \frac{R_{ud-3D} - R_{max1}[n]}{8} \times \frac{S_{ext1}[n]}{R_{ud-3D}}\right) \quad (10)$$

When the $n^{th}$ right-view data block Rn is read in L/R mode, it suffices for the capacity $RB2_{LR}[n]$ necessary for the second read buffer 4922 to be equal to or greater than the highest value of the peaks in the graph shown in FIG. 66B. If the size $S_{ext2}$ of the right-view data block to be read is fixed, then the peak value reaches its maximum when the right-view transfer rate $R_{ext2}$ equals its maximum value $R_{max2}$. Accordingly, the capacity $RB2_{LR}[n]$ should satisfy expression 11.

$$RB2_{LR}[n] \geq \max\left\{\text{CEIL}\left(UL2 + \frac{R_{ud-3D} - R_{max2}}{8} \times \frac{S_{ext2}[n]}{R_{ud-3D}}\right), S_{ext2}[n]\right\} \quad (11)$$

In this embodiment, any of the right-view data blocks may be read first by interrupt playback. In such a case, the system target decoder 4903 does not read data from the second read buffer 4922 until the entire right-view data block that is read first is stored in the second read buffer 4922. Accordingly, unlike the capacity RB1[$n$] of the first read buffer 4921, the capacity $RB2_{LR}[n]$ of the second read buffer 4922 needs to further meet the condition of being "at least larger than the size $S_{ext2}[n]$ of the $n^{th}$ right-view data block Rn".

Similarly, when reading the $n^{th}$ depth map data block Dn, the capacity $RB2_{LD}[n]$ of the second read buffer 4922 should satisfy expression 12.

$$RB2_{LD}[n] \geq \max\left\{\text{CEIL}\left(UL2 + \frac{R_{ud-3D} - R_{max3}}{8} \times \frac{S_{ext3}[n]}{R_{ud-3D}}\right), S_{ext3}[n]\right\} \quad (12)$$

<Advantages of Separating Playback Paths Before and after a Layer Boundary>

On a recording medium 100 according to this embodiment of the present invention, the data block groups before and after a layer boundary are recorded in one of the arrangements 1-6 shown in FIGS. 20, 24, 26, 28, 30, and 32. As a result, before and after layer switching, a specified portion of the base-view video stream is played back from the block exclusively for 2D playback $Ln_{2D}$ in 2D playback mode and from the block exclusively for 3D playback $Ln_{SS}$ in 3D playback mode. In this case, unlike the arrangement shown in FIG. 22, the size $S_{ext2D}$ of the 2D extent storing the specified portion equals the sum of the size $S_{ext1}$ of the base-view extent and the size of the block exclusively for 2D playback $Ln_{2D}$. While expression 1 is satisfied by this sum $S_{ext2D}$, expressions 2-5 are satisfied by the size of data blocks other than the block exclusively for 2D playback $Ln_{2D}$. Accordingly, the lower limit of the sizes $S_{ext2}$ and $S_{ext3}$ of the dependent-view extents that satisfy expressions 2-5, i.e. the minimum extent sizes, can effectively be further reduced independently of adjusting the size of the block exclusively for 2D playback $Ln_{2D}$ in order for the size $S_{ext2D}$ of the entire 2D extent to satisfy expression 1. Therefore, as is clear from expressions 11 and 12, the minimum capacities $RB2_{LR}$ and $RB2_{LD}$ of the second read buffer 4922 can effectively be further reduced independently of expression 1.

<Extent ATC Time in a 3D Extent Block>

In a 3D extent block, i.e. a data block group in an interleaved arrangement, consecutive data blocks Dn, Rn, Ln (n=0, 1, 2, ...) all have the same extent ATC time. In other words, the difference in ATSs from the source packet at the top of each data block until the source packet at the top of the next data block is the same. However, when calculating this difference, the occurrence of wraparound in the ATS needs to be taken into consideration. In this case, within the same time measured by the ATC, the first source depacketizer 5011 retrieves TS packets from all of the source packets in the base-view data block Ln and transfers the TS packets to the first PID filter 5013, and the second source depacketizer 5012 retrieves TS packets from all of the source packets in the dependent-view data block Dn or Rn and transfers the TS packets to the second PID filter 5014. Accordingly, particularly during interrupt playback, the primary video decoder 5015 can easily synchronize decoding of TS packets between the base-view video stream and the dependent-view video stream.

<Conditional Expressions of Extent Size Referring to Extent ATC Time>

In expressions 2-5, the size of base-view extents and dependent-view extents is restricted by the size of subsequently located extents. However, from the perspective of using extents in the authoring process, it is preferable that the conditions on the size of each extent be expressed in a form that does not depend on the size of other extents. Accordingly, expressions 2-5 are redefined by conditional expressions that refer to extent ATC time.

As already described, three contiguous extents Dn, Rn, Ln (n=0, 1, 2, ...) all have the same extent ATC time $T_{ext}[n]$. The minimum value of these extent ATC times is set as the minimum extent ATC time $minT_{ext}$, and the maximum value as the maximum extent ATC time $maxT_{ext}$: $minT_{ext} \leq T_{ext}[n] \leq maxT_{ext}$. In this case, the sizes $S_{ext1}[n]$, $S_{ext2}[n]$, and $S_{ext3}[n]$ of the $n^{th}$ extents EXT1[n], EXT2[n], and EXT3[n] are limited to the ranges in expressions 13, 14, and 15.

$$\text{CEIL}(R_{ext1}[n] \times minT_{ext}/8) \leq S_{ext1}[n] \leq \text{CEIL}(R_{ext1}[n] \times maxT_{ext}/8) \tag{13}$$

$$\text{CEIL}(R_{ext2}[n] \times minT_{ext}/8) \leq S_{ext2}[n] \leq \text{CEIL}(R_{ext2}[n] \times maxT_{ext}/8) \tag{14}$$

$$\text{CEIL}(R_{ext3}[n] \times minT_{ext}/8) \leq S_{ext3}[n] \leq \text{CEIL}(R_{ext3}[n] \times maxT_{ext}/8) \tag{15}$$

Subsequently, the difference between the maximum extent ATC time $maxT_{ext}$ and the minimum extent ATC time $minT_{ext}$ is set as a fixed value Tm: $maxT_{ext} = minT_{ext} + Tm$. In this case, the minimum extent ATC time $minT_{ext}$ is calculated as follows, referring to the minimum extent sizes, i.e. the right-hand side of expressions 2-5.

When the size of the $n^{th}$ base-view extent equals the minimum extent size, then from expressions 2 and 13, the minimum extent ATC time $minT_{ext}$ satisfies expression 16.

$$R_{ext1}[n] \times minT_{ext} \geq R_{ext1}[n] \times \frac{R_{ud-3D}}{R_{ud-3D} - R_{ext1}[n]} \times \tag{16}$$

$$\left( T_{jump-3D}[n] + \frac{S_{ext2}[n+1]}{R_{ud-3D}} + T_{jump-0}[n+1] \right)$$

$$\therefore minT_{ext} \geq \frac{R_{ud-3D}}{R_{ud-3D} - R_{ext1}[n]} \times$$

$$\left( T_{jump-3D}[n] + \frac{S_{ext2}[n+1]}{R_{ud-3D}} + T_{jump-0}[n+1] \right)$$

The size $S_{ext2}[n+1]$ of the $(n+1)^{th}$ right-view extent is allowed to be up to the product of the maximum value $R_{max2}$ of the right-view transfer rate $R_{ext2}$ and the maximum extent ATC time $maxT_{ext}$: $S_{ext2}[n+1] \leq R_{max2} \times maxT_{ext} = R_{max2} \times (minT_{ext} + Tm)$. Furthermore, the base-view transfer rate $R_{ext1}[n]$ does not exceed the maximum value $R_{max1}$: $R_{ext1}[n] \leq R_{max1}$. Since the minimum extent ATC time $minT_{ext}$ should be the upper limit of the right-hand side of expression 16, expression 17 should be satisfied.

$$minT_{ext} \geq \frac{R_{ud-3D}}{R_{ud-3D} - R_{max1}} \times \tag{17}$$

$$\left( T_{jump-3D}[n] + \frac{R_{max2} \times maxT_{ext}}{R_{ud-3D}} + T_{jump-0}[n+1] \right) =$$

$$\frac{R_{ud-3D}}{R_{ud-3} - R_{max1}} \times$$

$$\left( T_{jump-3D}[n] + \frac{R_{max2} \times (minT_{ext} + Tm)}{R_{ud-3D}} + T_{jump-0}[n+1] \right)$$

$$\therefore minT_{ext} \geq \frac{R_{ud-3D} - R_{max1}}{R_{ud-3D} - R_{max1} - R_{max2}} \times$$

$$\left( T_{jump-3D}[n] + \frac{R_{max2} \times Tm}{R_{ud-3D}} + T_{jump-0}[n+1] \right)$$

If expression 4 is similarly modified instead of expression 2, the minimum extent ATC time $minT_{ext}$ should further satisfy expression 18.

$$minT_{ext} \geq \frac{R_{ud-3D} - R_{max1}}{R_{ud-3D} - R_{max1} - R_{max3}} \times \tag{18}$$

$$\left( T_{jump-0}[n] + \frac{R_{max3} \times Tm}{R_{ud-3D}} + T_{jump-3D}[n+1] \right)$$

On the other hand, when the size of the $n^{th}$ base-view extent equals the minimum extent size, the corresponding extent ATC time equals the minimum extent ATC time $minT_{ext}$. Since the $n^{th}$ right-view extent shares the same extent ATC time as the base-view extent, then from expressions 3 and 14, the minimum extent ATC time $minT_{ext}$ satisfies expression 19.

$$R_{ext2}[n] \times minT_{ext} \geq R_{ext2}[n] \times \frac{R_{ud-3D}}{R_{ud-3D} - R_{ext2}[n]} \times \tag{19}$$

$$\left( T_{jump-0}[n] + \frac{S_{ext1}[n]}{R_{ud-3D}} + T_{jump-3D}[n] \right) =$$

$$R_{ext2}[n] \times \frac{R_{ud-3D}}{R_{ud-3D} - R_{ext2}[n]} \times$$

$$\left( T_{jump-0}[n] + \frac{R_{ext1}[n] \times minT_{ext}}{R_{ud-3D}} + T_{jump-3D}[n] \right)$$

$$\therefore minT_{ext} \geq \frac{R_{ud-3D}}{R_{ud-3D} - R_{ext2}[n]} \times$$

$$\left( T_{jump-0}[n] + \frac{R_{ext1}[n] \times minT_{ext}}{R_{ud-3D}} + T_{jump-3D}[n] \right)$$

The right-view transfer rate $R_{ext2}[n]$ does not exceed the maximum value $R_{max2}$ and the base-view transfer rate $R_{ext1}[n]$ does not exceed the maximum value $R_{max1}$: $R_{ext2}[n] \leq$ $R_{max2}$, and $R_{ext1}[n] \leq R_{max1}$. Since the minimum extent ATC time $\min T_{ext}$ should be the upper limit of the right-hand side of expression 19, expression 20 should be satisfied.

$$\min T_{ext} \geq \qquad (2)$$

$$\frac{R_{ud\text{-}3D}}{R_{ud\text{-}3D} - R_{max2}} \times \left( T_{jump\text{-}0}[n] + \frac{R_{max1} \times \min T_{ext}}{R_{ud\text{-}3D}} + T_{jump\text{-}3D}[n] \right)$$

$$\therefore \min T_{ext} \geq \frac{R_{ud\text{-}3D} - R_{max2}}{R_{ud\text{-}3D} - R_{max1} - R_{max2}} \times \left( T_{jump\text{-}0}[n] + T_{jump\text{-}3D}[n] \right)$$

If expression 5 is used instead of expression 3, then similarly the minimum extent ATC time $\min T_{ext}$ should satisfy expression 21.

$$\min T_{ext} \geq \frac{R_{ud\text{-}3D} - R_{max3}}{R_{ud\text{-}3D} - R_{max1} - R_{max3}} \times \left( T_{jump\text{-}3D}[n] + T_{jump\text{-}0}[n] \right) \qquad (21)$$

As a result, the minimum extent ATC time $\min T_{ext}$ is specified as the maximum value among the right-hand side of expressions 17, 18, 20, and 21. In this case, the zero sector transition time $T_{jump\text{-}0}$, the jump time $T_{jump\text{-}3D}$, and the fluctuation range Tm of the extent ATC time can be restricted to predetermined, fixed values. In particular, in modification (F) described below, the jump time $T_{jump\text{-}3D}$ may be assessed with reference to the maximum jump distance MAX_EXTJUMP3D. In this way, the minimum extent ATC time $\min T_{ext}$ can substantially be determined only by constants such as the maximum value $R_{max}$ of the mean transfer time. Accordingly, the conditions on the extent size shown in expressions 13-15 are useful during the authoring process.

<Guaranteeing the Buffer Margin Amount>

The buffer margin amounts UL1 and UL2 are guaranteed in the following way. First, the condition that "the extent ATC time $T_{ext}$ is equal to or greater than the minimum extent ATC time $\min T_{ext}$" is placed on the design of each data block. In this case, as shown in expressions 17, 18, 20, and 21 the minimum extent ATC time $\min T_{ext}$ is a value calculated when the mean transfer rates $R_{ext1}$, $R_{ext2}$, and $R_{ext3}$ equal their respective maximum values $R_{max1}$, $R_{max2}$, and $R_{max3}$. The actual mean transfer rates $R_{ext1}$, $R_{ext2}$, and $R_{ext3}$, however, are generally lower than their respective maximum values $R_{max1}$, $R_{max2}$, and $R_{max3}$. Accordingly, the actual sizes of the data blocks $R_{ext1} \times T_{ext}$, $R_{ext2} \times T_{ext}$, and $R_{ext3} \times T_{ext}$ are generally smaller than the values assumed in the above conditions, i.e. $R_{max1} \times T_{ext}$, $R_{max2} \times T_{ext}$, and $R_{max3} \times T_{ext}$. Therefore, after the start of reading of each data block, reading of the next data block begins before the extent ATC time $T_{ext}$ passes. In other words, the accumulated data amounts DA1 and DA2 in the read buffers 4921 and 4922 generally start to increase again before returning to their value at the start of reading, unlike the case shown in FIGS. 66A, 66B, 67A, and 67B. The accumulated data amounts DA1 and DA2 therefore increase by a predetermined amount each time a pair of a base-view and a dependent-view data block is read. As a result, by continuously reading a certain number of data blocks into the read buffers 4921 and 4922, the buffer margin amounts UL1 and UL2 are guaranteed.

Figure 69A:
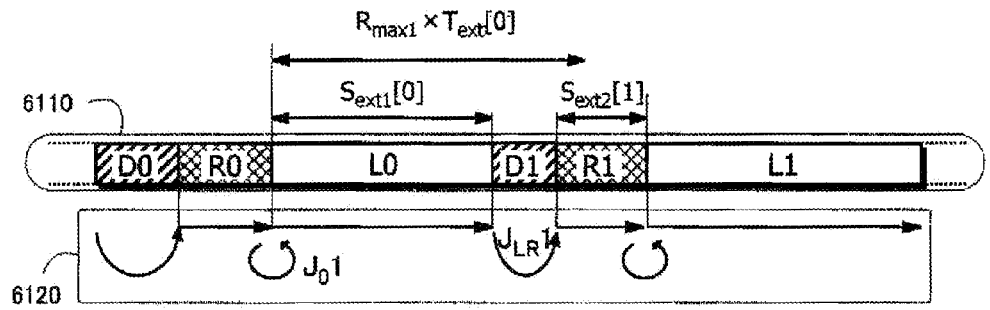
FIG. 69A is a schematic diagram showing the relationship between a 3D extent block 6110 and a playback path 6120 in L/R mode.

FIG. 69A is a graph showing the relationship between a 3D extent block 6110 and a playback path 6120 in L/R mode. As shown in FIG. 69A, the 3D extent block 6110 is composed of base-view data block groups Lk and dependent-view data block groups Dk and Rk (k=0, 1, 2, . . . ) in an interleaved arrangement. In accordance with the playback path 6120, each pair of adjacent right-view data blocks Rk and base-view data blocks Lk is read as one 3D extent, i.e. as a pair of a dependent-view extent and a base-view extent. The extent size $S_{ext2}[k]$ of the base-view extent Lk equals the product of the base-view transfer rate $R_{ext1}[k]$ and the extent ATC time $T_{ext}[k]$: $S_{ext2}[k] = R_{ext1}[k] \times T_{ext}[k]$. This extent size $S_{ext2}[k]$ is generally smaller than the product of the maximum value $R_{max}$ the base-view transfer rate and the extent ATC time $T_{ext}[k]$: $S_{ext1}[k] < R_{max1} \times T_{ext}[k]$. The same is true for the extent sizes $S_{ext3}[k]$ and $S_{ext2}[k]$ of the dependent-view extents Dk and Rk.

Figure 69B:
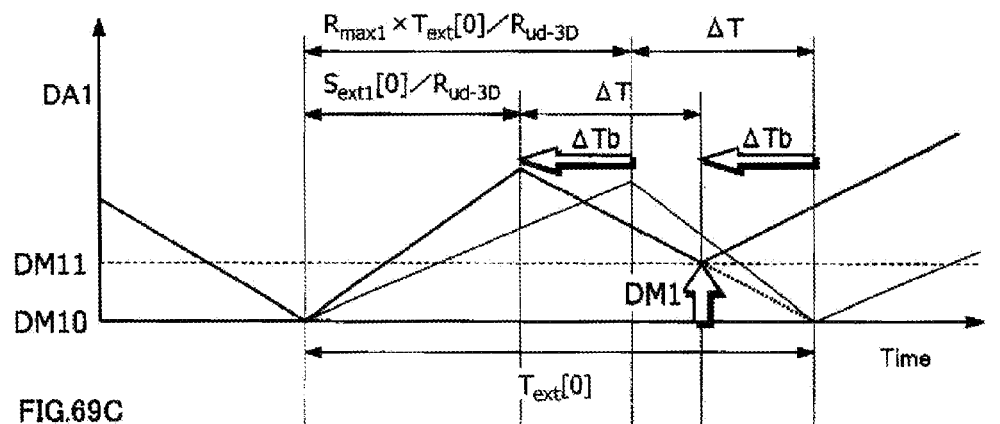
FIGS. 69B and 69C are graphs showing the change in data amounts DA1 and DA2 stored in the read buffers 4921 and 4922 when a 3D extent block, composed of data blocks having a size equal to or larger than the expanded minimum extent size, is read by the playback processing system shown in FIG. 65.

FIG. 69B is a graph showing the change in the data amount DA1 in the first read buffer 4921 when the 3D extent block 6110 is read in accordance with the playback path 6120 in L/R mode. The thin line indicates changes when the mean transfer rates $R_{ext1}[k]$. $R_{ext2}[k]$, and $R_{ext3}[k]$ equal the maximum values $R_{max1}$, $R_{max2}$, and $R_{max3}$. On the other hand, the thick line indicates changes when the transfer rate $R_{ext2}[0]$ of the top base-view extent L0 is lower than the maximum value $R_{max1}$. Note that for convenience of explanation, it is assumed that the dependent-view transfer rates $R_{ext2}[k]$ and $R_{ext3}[k]$ equal their respective maximum values $R_{max2}$ and $R_{max3}$. In this case, the sizes $R_{ext2}[k] \times T_{ext}[k]$ and $R_{ext3}[k] \times T_{ext}[k]$ of the dependent-view extents equal the maximum possible assumed values, $R_{max2}[k] \times T_{ext}[k]$ and $R_{max3}[k] \times T_{ext}[k]$.

As shown in FIG. 69B, for the thin line, after an extent ATC time $T_{ext}[0]$ has passed from the start of reading of the top base-view extent L0, reading of the next base-view extent L1 begins. Accordingly, the accumulated data amount DA1 at this point is substantially equal to the value DM10 at the start of reading. Conversely, for the thick line, a time $S_{ext1}[0]/R_{ud\text{-}3D}$ is necessary to read the entire top base-view extent L0 from the Recording medium 100 into the first read buffer 4921. This time is shorter than the time $R_{max1}[k] \times T_{ext}[0]/R_{ud\text{-}3D}$ in the thin line by a time $\Delta$Tb: $\Delta$Tb = $S_{ext1}[0]/R_{ud\text{-}3D}$ − $R_{max1} \times T_{ext}[0]/R_{ud\text{-}3D}$ = ($R_{ext1}[0] - R_{max1}) \times T_{ext}[0]/R_{ud\text{-}3D}$.

Accordingly, the accumulated data amount DA1 reaches its peak in the thick line earlier than in the thin line by a time of $\Delta$Tb. On the other hand, the sizes $S_{ext2}[1]$ and $S_{ext3}[1]$ of the dependent-view extents D1 and R1 are the same for both lines: $R_{max2} \times T_{ext}[1]$ and $R_{max3} \times T_{ext}[1]$. Accordingly, the time $\Delta$T from the peak of the accumulated data amount DA1 until the start of reading of the next base-view extent L1 is the same for both lines. As a result, unlike the thin line, reading of the next base-view extent L1 begins in the thick line at a time that is $\Delta$Tb earlier than the extent ATC time $T_{ext}$ has passed from the start of reading of the top base-view extent L0. As a result, the value DM11 of the accumulated data amount DA1 at that point increases over the value DM10 at the start of reading of the top base-view extent L0 by an increment DM1[0]. As is clear from FIG. 61B, this increase DM1[0] equals the product of the actual rate of decrease $R_{ext1}[0]$ of the accumulated data amount DA1 and the time $\Delta$Tb: DM1[0] = $R_{ext1}[0] \times \Delta$Tb = $R_{ext1}[0] \times (R_{ext1}[0] - R_{max1}) \times T_{ext}[0]/R_{ud\text{-}3D}$.

Figure 69C:
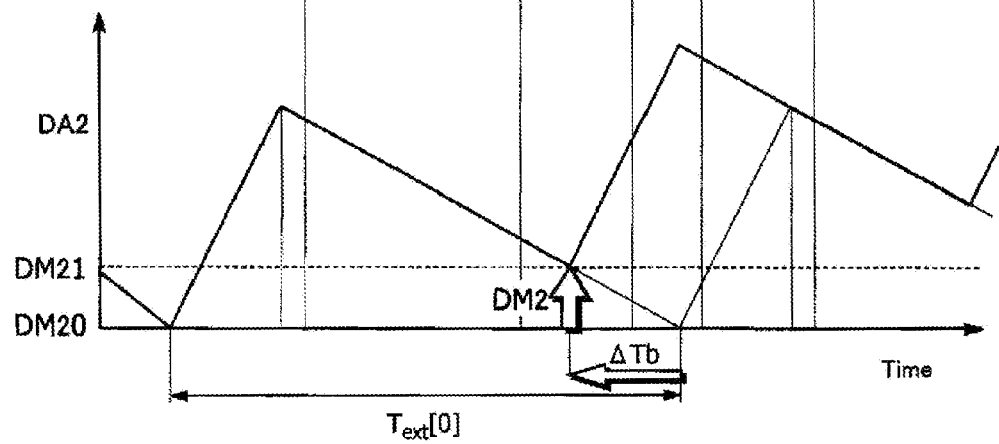

FIG. 69C is a graph showing the change in the data amount DA2 in the second read buffer 4922 while the data amount DA1 in the first read buffer 4921 changes as shown in FIG. 69B. The thin line indicates changes when the mean transfer rates $R_{ext1}[k]$, $R_{ext2}[k]$, and $R_{ext3}[k]$ equal the maximum values $R_{max1}$, $R_{max2}$, and $R_{max3}$. On the other hand, the thick line indicates changes when the transfer rate $R_{ext1}[0]$ of the top base-view extent L0 is lower than the maximum value $R_{max1}$. Note that for convenience of explanation, it is assumed that the dependent-view transfer rates $R_{ext2}[k]$ and $R_{ext3}[k]$ equal their respective maximum values $R_{max2}$ and $R_{max3}$.

As shown in FIG. 69C, for the thin line, after an extent ATC time $T_{ext}[0]$ has passed from the start of reading of the top right-view extent R0, reading of the next right-view extent R1 begins. Accordingly, the accumulated data amount DA2 at this point is substantially equal to the value DM20 at the start of reading. Conversely, for the thick line, the entire top base-view extent L0 is read from the recording medium 100 into the first read buffer 4921 earlier than in the thin line by a time ΔTb. Accordingly, reading of the next right-view extent R1 begins in the thick line earlier than in the thin line by a time ΔTb, i.e. at a time ΔTb earlier than the extent ATC time $T_{ext}$ has passed from the start of reading of the top right-view extent R0. As a result, the value DM21 of the accumulated data amount DA2 at that point increases over the value DM20 at the start of reading of the top right-view extent R0 by an increment DM2[0]. As is clear from FIG. 69C, this increase DM2[0] equals the product of the actual rate of decrease $R_{ext2}[0]$ of the accumulated data amount DA2 and the time ΔTb: $DM2[0]=R_{ext2}[0]\times\Delta Tb=R_{ext2}[0]\times(R_{ext1}[0]-R_{max1})\times T_{ext}[0]/R_{ud-3D}$.

In FIGS. 69, it is assumed that the dependent-view transfer rates $R_{ext2}[k]$ and $R_{ext3}[k]$ equal their respective maximum values $R_{max2}$ and $R_{max3}$. The actual dependent-view transfer rates $R_{ext2}[k]$ and $R_{ext3}[k]$ however, are generally lower than their respective maximum values $R_{max2}$ and $R_{max3}$. In this case, as in FIG. 69B, the accumulated data amount DA2 in FIG. 69C reaches its peak earlier by a time ΔTd: $\Delta Td=S_{ext2}[0]/R_{ud-3D}-R_{max2}\times T_{ext}[0]/R_{ud-3D}=(R_{ext2}[0]-R_{max2})\times T_{ext}[0]/R_{ud-3D}$. In the graph in FIG. 69B, the time ΔT from the peak of the accumulated data amount DA1 to the start of reading of the next base-view extent L1 is shortened by the same time ΔTd. In light of these changes, each time a pair of a base-view extent Lk and a right-view extent Rk is processed, the accumulated data amounts DA1 and DA2 in the read buffers increase by increments DM1[k] and DM2[k], as shown in expressions 22 and 23.

$$DM1[k] = R_{ext1}[k]\times(\Delta Tb + \Delta Td) = R_{ext1}[k]\times \qquad (22)$$
$$\{(R_{ext1}[k]-R_{max1})+(R_{ext2}[k]-R_{max2})\}\times T_{ext}[k]/R_{ud-3D}$$

$$DM2[k] = R_{ext2}[k]\times(\Delta Tb + \Delta Td) = R_{ext2}[k]\times \qquad (23)$$
$$\{(R_{ext1}[k]-R_{max1})+(R_{ext2}[k]-R_{max2})\}\times T_{ext}[k]/R_{ud-3D}$$

In L/R mode, each time a base-view extent Lk and a right-view extent Rk are read from a 3D extent EXTSS[k] into the read buffers 4921 and 4922, the accumulated data amounts DA1 and DA2 increase by increments DM1[k] and DM2[k]. Similarly in depth mode, each time a base-view extent Lk and a depth-map extent Dk are read into the read buffers 4921 and 4922, the accumulated data amounts DA1 and DA2 increase by increments DM3[k] and DM4[k]. These increments DM3[k] and DM4[k] are shown in expressions 24 and 25.

$$DM3[k]=R_{ext1}[k]\times\{(R_{ext1}[k]-R_{max1})+(R_{ext3}[k]-R_{max3})\}\times T_{ext}[k]/R_{ud-3D} \qquad (24)$$

$$DM4[k]=R_{ext3}[k]\times\{(R_{ext1}[k]-R_{max1})+(R_{ext3}[k]-R_{max3})\}\times T_{ext}[k]/R_{ud-3D} \qquad (25)$$

Accordingly, when the total $Tsum=T_{ext}[0]+T_{ext}[1]+T_{ext}[2]+\ldots$ of the extent ATC time for the entire 3D extent block 6110 satisfies expression 26, the buffer margin amounts UL1 and UL2 in the read buffers 4921 and 4922 can be guaranteed by reading the entire 3D extent block 6110.

$$UL1 \leq \min\left(\sum_k DM1[k], \sum_k DM3[k]\right) \approx \qquad (26)$$
$$\min\left(R_{ext1-av}\times\frac{(R_{max1}+R_{max2})-(R_{ext1-av}+R_{ext2-av})}{R_{ud-3D}}\times T_{sum},\right.$$
$$\left.R_{ext1-av}\times\frac{(R_{max1}+R_{max3})-(R_{ext1-av}+R_{ext3-av})}{R_{ud-3D}}\times T_{sum}\right)$$

$$UL2 \leq \min\left(\sum_k DM2[k], \sum_k DM4[k]\right) \approx$$
$$\min\left(R_{ext2-av}\times\frac{(R_{max1}+R_{max2})-(R_{ext1-av}+R_{ext2-av})}{R_{ud-3D}}\times T_{sum},\right.$$
$$\left.R_{ext3-av}\times\frac{(R_{max1}+R_{max3})-(R_{ext1-av}+R_{ext3-av})}{R_{ud-3D}}\times T_{sum}\right)$$

$$\therefore T_{sum} \geq \max\left(\frac{UL1\times R_{ud-3D}}{R_{ext1-av}\times\{(R_{max1}+R_{max2})-(R_{ext1-av}+R_{ext2-av})\}},\right.$$
$$\frac{UL1\times R_{ud-3D}}{R_{ext1-av}\times\{(R_{max1}+R_{max3})-(R_{ext1-av}+R_{ext3-av})\}},$$
$$\frac{UL2\times R_{ud-3D}}{R_{ext2-av}\times\{(R_{max1}+R_{max2})-(R_{ext1-av}+R_{ext2-av})\}},$$
$$\left.\frac{UL2\times R_{ud-3D}}{R_{ext3-av}\times\{(R_{max1}+R_{max3})-(R_{ext1-av}+R_{ext3-av})\}}\right)$$

The following approximation is used here: throughout the 3D extent block 6110, the base-view transfer rate $R_{ext1}[k]$ equals the mean value $R_{ext1-av}$, and the dependent-view transfer rates $R_{ext2}[k]$ and $R_{ext3}[k]$ respectively equal the mean values $R_{ext2-av}$ and $R_{ext3-av}$.

Note that during reading of successive 3D extent blocks, the accumulated data amounts DA1 and DA2 in the read buffers continue to increase, provided that a long jump does not occur. Accordingly, when the accumulated data amounts DA1 and DA2 exceed a predetermined threshold, the playback device 200 causes the BD-ROM drive 4901 to stop reading and transfer operations. The read rate $R_{ud-3D}$ thus decreases, which restricts the rise in the accumulated data amounts DA1 and DA2. Overflow in the read buffers 4921 and 4922 can thus be avoided.

(Method 1 for Accumulating Buffer Margin Amounts)

The following explains how to accumulate the buffer margin amounts secured in the read buffers for layer switching jump, during AV playback.

In the explanation of the arrangement for seamless connection between 3D extent blocks, it has been explained that the player continues the playback of 3D images by consuming the buffer margin amount UL1 accumulated in the first read buffer 4921 before the jump and the buffer margin amount UL2 accumulated in the second read buffer 4922 before the jump.

Figure 70:
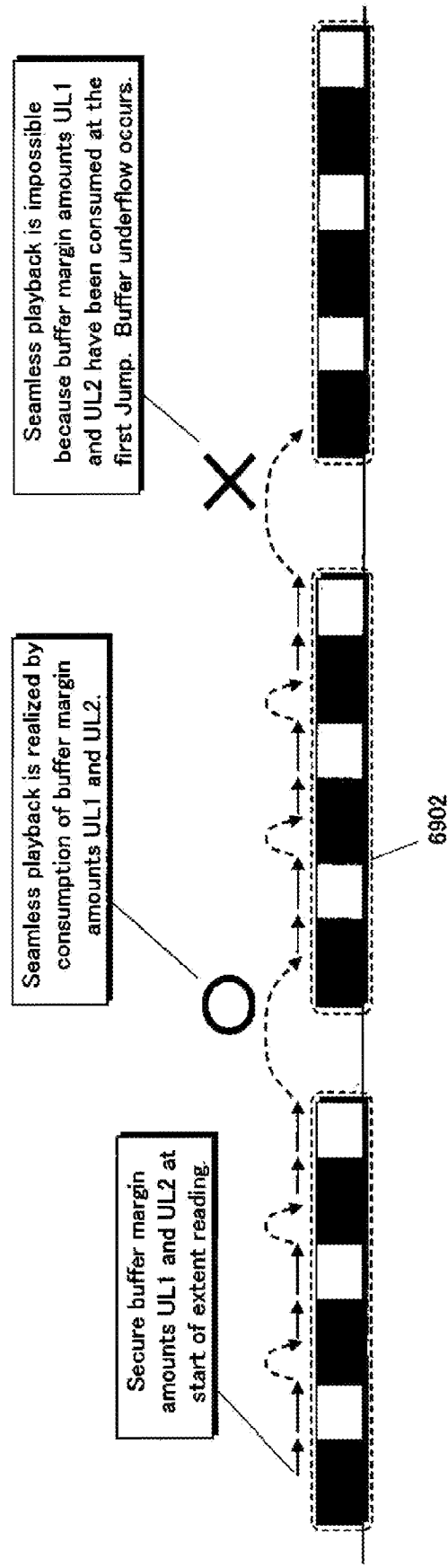
FIG. 70 shows a data structure for seamless connection among three or more 3D extent blocks.

Also, it has been explained that the buffer margin amount UL1 of the first read buffer 4921 and the buffer margin amount UL2 of the second read buffer 4922 are secured by buffering at the start of playback of 3D images. However, in the case of seamless connection among three or more 3D extent blocks as shown in FIG. 70, the buffer margin amounts UL1 and UL2 are consumed at the first jump between 3D extent blocks, and the remaining amount will be not sufficient at the second jump between 3D extent blocks. This causes a buffer underflow, and makes seamless playback impossible.

Thus when a 3D extent block is seamlessly connected from another 3D extent block and seamlessly connects to yet another 3D extent block, it is necessary to accumulate the buffer margin amounts UL1 and UL2 in the read buffers (1) 3702 and (2) 3711 before a jump between 3D extent blocks while playing back 3D images. Here, a 3D extent block that is seamlessly connected from another 3D extent block and seamlessly connects to yet another 3D extent block is denoted as seamless 3D extent block 6902.

In view of the above, the following limitations may be put on the "average bit rate" and the "total extent ATC time of 3D extent blocks" in the section of the seamless 3D extent block 6902. As a result, it is possible to secure the buffer margin amounts UL1 and UL2 at the playback of the section of the seamless 3D extent block 6902.

$$\text{Total extent } ATC \text{ time of seamless 3D extent block} >= \text{MAX}(UL1 \times Rud3D/(REXT1 \times \{(RMAX1+RMAX2)-(REXT1+REXT2)\}), \\ UL1 \times Rud3D/(REXT1 \times \{(RMAX1+RMAX3)-(REXT1+REXT3)\}), UL2 \times Rud3D/(REXT2 \times \{(RMAX1+RMAX2)-(REXT1+REXT2)\}), \\ UL2 \times Rud3D/(REXT3 \times \{(RMAX1+RMAX3)-(REXT1+REXT3)\})) \quad (27)$$

UL1 and UL2 are buffer margin amounts (unit: bits) of the read buffers, calculated based on the jump time to a 3D extent block that precedes a seamless 3D extent block. MAX( ) is a function that returns a large value. REXT1 is an average bit rate of a 2D/left-eye AV stream in the 3D extent block section. REXT2 is an average bit rate of a file DEP stream in the 3D extent block section. REXT3 is an average bit rate of a depth-map AV stream in the 3D extent block section.

Figure 71:
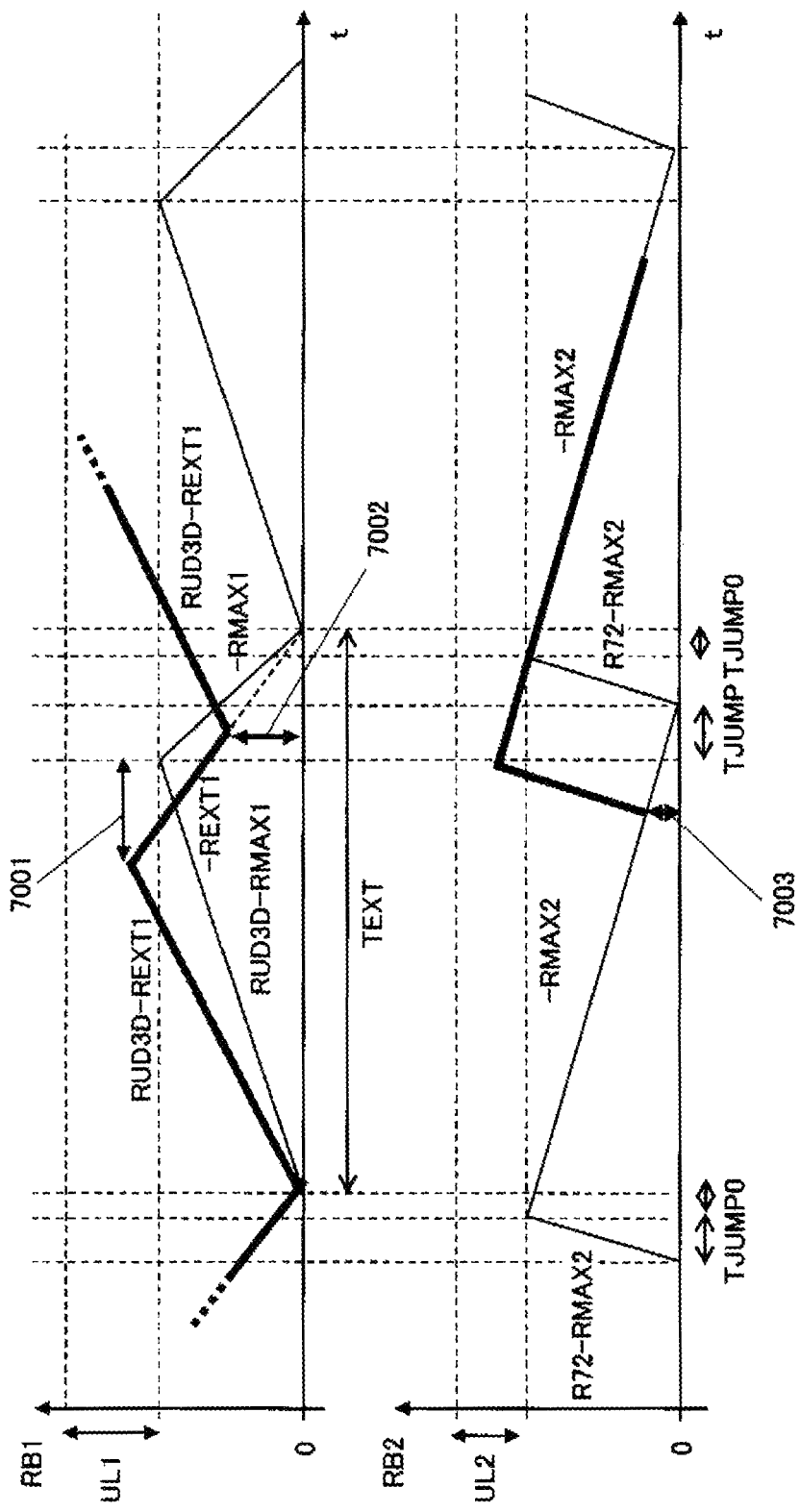
FIG. 71 shows accumulation of buffer margin amounts.

The following explains the basis for Expression above, with reference to FIG. 71. Although the case of playing back 3D images in the L/R mode is explained here, Expression for the depth mode can be obtained in the similar manner.

FIG. 71 shows the transition of data amounts of data accumulated in the first read buffer 4921 and the second read buffer 4922. This drawing shows the state immediately after the jump to the seamless 3D extent block. It is assumed that the playback is started after the buffer margin amounts UL1 and UL2 have been completely consumed. It is also assumed that the extents are interleaved according to the definitions of the minimum extent size and the maximum extent size explained above.

The minimum extent size and the maximum extent size are calculated based on the assumption that the average bit rate of the extents is RMAX1 or RMAX2. The normal lines in FIG. 71 each show the transition of the amount of the accumulated data when the average bit rate of the extents is RMAX1 or RMAX2. On the other hand, the bold lines in FIG. 70 each show the transition of the amount of the accumulated data when the average bit rate of the extents (REXT1[n]) of the 2D/left-eye AV stream is REXT1 that is less than RMAX1.

When the bit rate of the extents of the 2D/left-eye AV stream is less than RMAX1, the reading of the extents completes earlier than when the bit rate is RMAX1. This brings forward the transition of the amount of the accumulated data by brought-forward time indicated by the arrow 7001. As a result, the size indicated by the arrow 7002 (the brought-forward time×REXT1) is accumulated as the buffer margin amount. The brought-forward time can be represented by TEXT×(RMAX1−REXT1)/RUD3D, where TEXT is the playback time of the extents. Also, the transition of the amount of the data accumulated in the second read buffer 4922 is also brought forward. As a result, the size indicated by the arrow 7003 (the brought-forward time×REXT2) is accumulated as the buffer margin amount.

Similarly, when the bit rate of the extents of the file DEP stream is REXT2 that is less than RMAX2, the transition of the amount of the accumulated data is brought forward. As a result, the buffer margin amounts are accumulated in the first read buffer 4921 and the second read buffer 4922.

When the playback time of the extents of the 2D/left-eye AV stream and the extents of the corresponding file DEP stream is TEXT, and their respective average bit rates are REXT1 and REXT2, the buffer margin amount accumulated in the first read buffer 4921 and the buffer margin amount accumulated in the second read buffer 4922, accumulated through the reading of the extents, can be expressed as follows.

$$\text{Buffer margin amount accumulated in the first read buffer 4921 (unit: bits)} = TEXT \times (REXT1 \times \{(RMAX1+RMAX2)-(REXT1+REXT2)\}/RUD3D \quad (28)$$

$$\text{Buffer margin amount accumulated in read buffer (2) (unit: bits)} = TEXT \times (REXT2 \times \{(RMAX1+RMAX2)-(REXT1+REXT2)\}/RUD3D \quad (29)$$

Thus Expression (27) can be obtained from Expressions (28) and (29) by setting the time for accumulating UL1 and UL2 required for a jump in the seamless connection.

(Method 2 for Accumulating Buffer Margin Amounts)

The following explains another method for accumulating the buffer margin amounts secured in the read buffers for layer switching jump, during AV playback.

A size of each extent included in the seamless 3D extent block 6902 is set to be equal to or larger than the minimum extent size calculated by Expressions (1)-(5). Here, these expressions are modified by adding a margin for accumulating a buffer margin amount. The modified expressions are as follows.

$$SEXT1[n] >= \text{CEIL}((Rud3D \times REXT1[n])/(Rud3D - REXT1[n]) \times (Tjump0 + SEXT2[n+1]/Rud3D + Tjump + Tmergin)/8) \quad (30)$$

$$SEXT2[n] >= \text{CEIL}((Rud3D \times REXT2[n])/(Rud3D - REXT2[n]) \times (Tjump0 + SEXT1[n]/Rud3D + Tjump + Tmergin)/8) \quad (31)$$

$$SEXT1[n] >= \text{CEIL}((Rud3D \times REXT1[n])/(Rud3D - REXT1[n]) \times (Tjump + SEXT3[n+1]/Rud3D + Tjump0 + Tmergin)/8) \quad (32)$$

$$SEXT3[n] >= \text{CEIL}((Rud3D \times REXT3[n])/(Rud3D - REXT3[n]) \times (Tjump + SEXT1[n]/Rud3D + Tjump0 + Tmergin)/8) \quad (33)$$

Tmergin is a margin time (unit: seconds) for accumulating a buffer margin amount.

Figure 72:
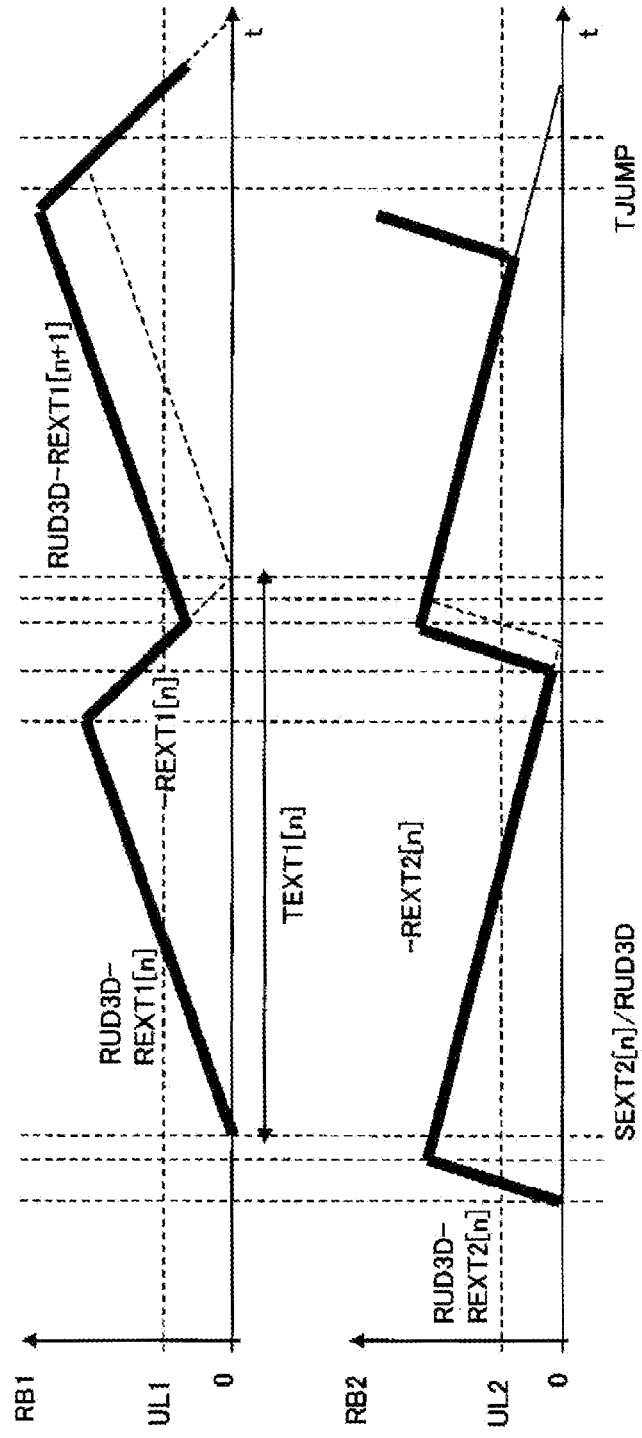
FIG. 72 shows a transition of data amounts accumulated in the read buffer when playing back 3D images in L/R mode.

The following describes a transition of data amounts of data accumulated in the read buffer when playing back 3D images in L/R mode with use of FIG. 72.

By including extents each having the minimum extent size calculated in the above-mentioned manner in the seamless 3D extent block 6902, extra Tmergin×REXT1[n] amount of data is accumulated in the first read buffer 4921 as one extent of a 2D/left-eye AV stream is read, as shown in the transition of data amount of FIG. 72. Also, extra Tmergin×REXT2[n] amount of data is accumulated in the second read buffer 4922 as one extent of a file DEP stream is read.

Also, input of extent data of a 2D/left-eye AV stream to the first read buffer 4921 is brought forward by Tmergin as one extent of a file DEP stream is read. Therefore, extra Tmergin×REXT1[n] amount of data is accumulated in the first read buffer 4921 each time one extent of the file DEP stream is read. Similarly, input of extent data of a right AV stream to the second read buffer 4922 is brought forward by Tmergin as one extent of a 2D/left-eye AV stream is read. Therefore, extra Tmergin×REXT1[n] amount of data is accumulated in the second read buffer 4922 each time one extent of the 2D/left-eye AV stream is read.

In view of the above, the following limitations may be put on the "total extent ATC time of 3D extent blocks" in the section of the seamless 3D extent block 6902. As a result, it is possible to secure the buffer margin amounts UL1 and UL2 at the playback of the section of the seamless 3D extent block 6902.

$$\text{Total extent } ATC \text{ time of seamless } 3D \text{ extent block} >= \text{MAX}(UL1/(2 \times T\text{mergin} \times REXT1/TEXT), UL2/(2 \times T\text{mergin} \times REXT2/TEXT), UL2/(2 \times T\text{mergin} \times REXT3/TEXT)) \quad (34)$$

UL1 and UL2 are buffer margin amounts (unit: bits) of the read buffers, calculated based on the jump time to a 3D extent block that follows a seamless 3D extent block. MAX( ) is a function that returns a large value. REXT1 is an average bit rate of a 2D/left-eye AV stream in the 3D extent block section. REXT2 is an average bit rate of a file DEP stream in the 3D extent block section. REXT3 is an average bit rate of a depth-map AV stream in the 3D extent block section. TEXT is an average extent ATC time of one extent.

Note that the above limitation and the limitation put on the "average bit rate" and the "total extent ATC time of 3D extent blocks" may be defined together. That is to say, the "total extent ATC time of seamless 3D extent block" may be defined as follows.

$$\text{Total extent } ATC \text{ time of seamless } 3D \text{ extent block} >= \text{MAX}(UL1/(2 \times T\text{mergin} \times REXT1/TEXT + ((REXT1 \times \{(RMAX1+RMAX2)-(REXT1+REXT2)\})/Rud3D),$$

$$UL1/(2 \times T\text{mergin} \times REXT1/TEXT + ((REXT1 \times \{(RMAX1+RMAX3)-(REXT1+REXT3)\})/Rud3D),$$

$$UL2/(2 \times T\text{mergin} \times REXT2/TEXT + ((REXT2 \times \{(RMAX1+RMAX2)-(REXT1+REXT2)\})/Rud3D),$$

$$UL2/(2 \times T\text{mergin} \times REXT3/TEXT + ((REXT3 \times \{(RMAX1+RMAX3)-(REXT1+REXT3)\})/Rud3D)) \quad (35)$$

<Buffer Margin Amounts Required for 3D Playback of Data of Arrangement 1>

The following describes buffer margin amounts required to play back 3D images using the data of arrangement 1 shown in FIG. 20.

First, a buffer margin amount required to playback 3D images in L/R mode is explained.

Figures 73A, 73B, 73C:
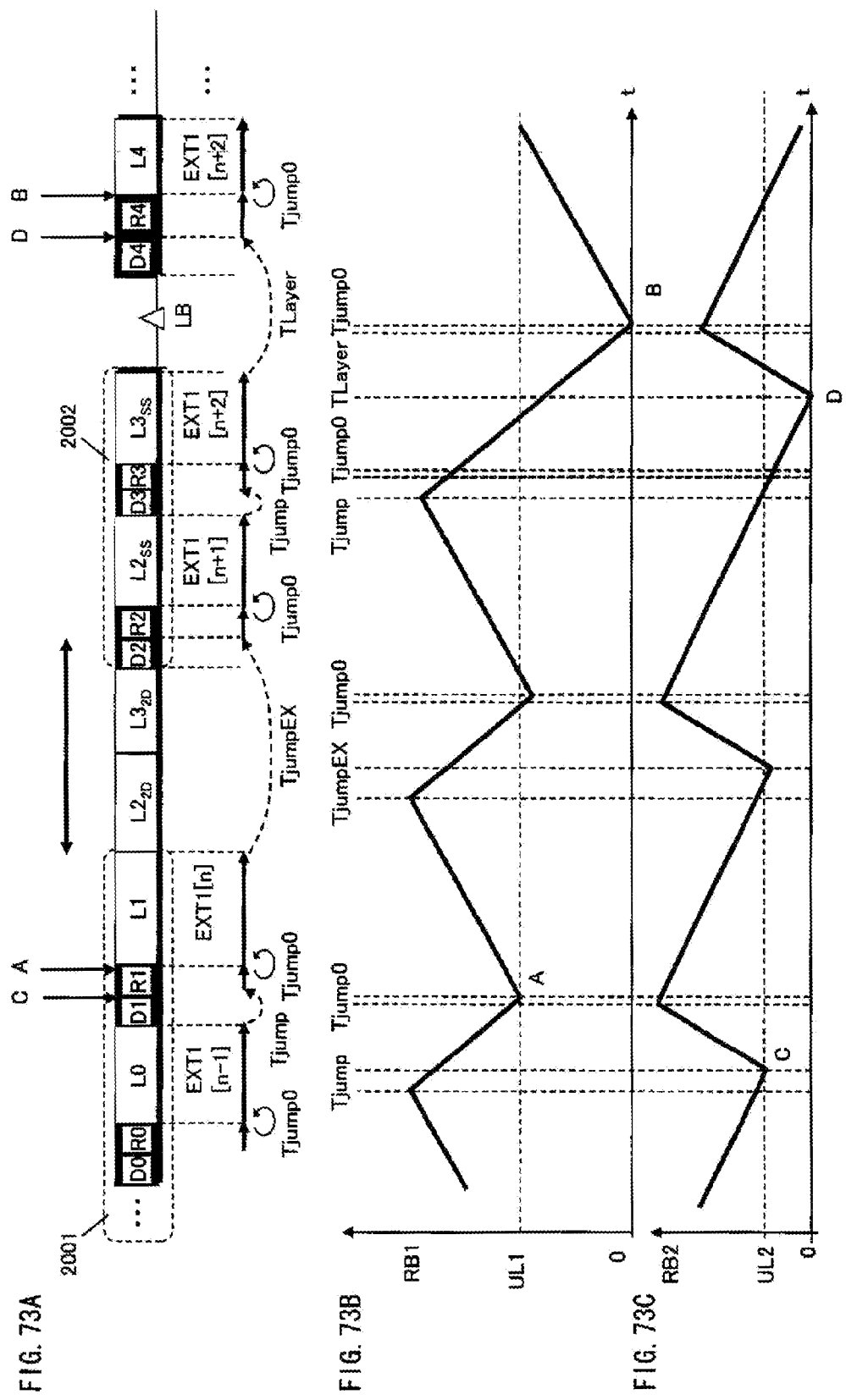
FIG. 73A shows a long jump which occurs while the data of arrangement 1 is played back in L/R mode, and FIGS. 73B and 73C respectively show a transition of a data amount accumulated in the first read buffer 4921 and a transition of a data amount accumulated in the second read buffer 4922 when the data of arrangement 1 is played back in L/R mode.

FIG. 73A shows a long jump which occurs while the data of arrangement 1 is played back in L/R mode. FIGS. 73B and 73C respectively show a transition of a data amount accumulated in the first read buffer 4921 and a transition of a data amount accumulated in the second read buffer 4922 when the data of arrangement 1 is played back in L/R mode.

Here, a size of each of three data blocks D3, R3, and L3$_{SS}$ which are arranged at the end of pre-jump 3D extent block 2002 and whose extent ATC times match one another is assumed 0 with consideration to the worst value of the required buffer margin amount.

First, the buffer margin amount UL1 accumulated in the first read buffer 4921 is explained. The underflow of the first read buffer 4921 will be prevented in the seamless connection when the data is played back in a path shown in FIG. 73A as long as the underflow is not caused before B, which is immediately before a head left-view data block L4 in the succeeding playitem is read. That is to say, a size of the read buffer at B only needs to satisfy $\geq 0$. For this, the buffer margin amount (UL1) is required to be accumulated by A (immediately before the left-view data block L1 at the end of 3D extent block 2001 is read) in FIG. 73.

A decreased amount of data in the first read buffer 4921 from A to B can be calculated according to the following expression.

$$\text{The decreased amount of data in the first read buffer} \\ 4921 \text{ from } A \text{ to } B = (T\text{jump}EX + 3 \times T\text{jump0} + T\text{jump} + T\text{LAYER} + 2 \times SEXT2/RUD3D) \times \\ RMAX1 = 2 \times (T\text{jump0} + T\text{jump} + SEXT2/RUD3D) \times \\ RMAX1 + (T\text{jump0} + T\text{jump}EX + T\text{LAYER} - T\text{jump}) \times RMAX1 \quad (36)$$

SEXT2 is a size of a right-view data block that exists between A and B. An increased amount of data in the first read buffer 4921 from A to B can be calculated according to the following expression.

$$\text{The increased amount of data in the first read buffer} \\ 4921 \text{ from } A \text{ to } B = 2 \times SEXT1/RUD3D \times (RUD3D - RMAX1) \quad (37)$$

SEXT1 is a size of a left-view data block that exists between A and B. Accordingly, the required buffer margin amount at A is calculated as follows according to Expressions (36) and (37).

$$UL1 = \text{the decreased amount of data in the first read buffer } 4921 \text{ from } A \text{ to } B - \text{the increased amount of data in the first read buffer } 4921 \text{ from } A \text{ to } B = 2 \times \\ (T\text{jump0} + T\text{jump} + SEXT2/RUD3D) \times RMAX1 + \\ (T\text{jump0} + T\text{jump}EX + T\text{LAYER} - T\text{jump}) \times \\ RMAX1 - 2 \times SEXT1/RUD3D \times (RUD3D - RMAX1) \quad (38)$$

Here, a minimum extent size is determined such that (Tjump0+Tjump+SEXT2/RUD3D)×RMAX1 and SEXT1/RUD3D×(RUD3D−RMAX1) are each 0 or more. That is to say, as long as a size of an extent is equal to or larger than the minimum extent size satisfying Expression (2), these values become always equal to or larger than 0.

As the value becomes 0 when considering the worst value, the buffer margin amount UL1 required for the playback in the depth mode is the following Expression (39) which is derived from Expression (38).

$$UL1 = \text{CEIL}(T\text{jump}EX + T\text{LAYER} + T\text{jump0} - T\text{jump}) \times RMAX1 \quad (39)$$

Next, the buffer margin amount accumulated in the second read buffer 4922 is explained. The underflow of the second read buffer 4922 will be prevented in the seamless connection as long as the underflow is not caused before D, which is immediately before the right-view data block R4 arranged at the head of the succeeding playitem is read. That is to say, a size of the read buffer at D only needs to satisfy $\geq 0$. For this, the buffer margin amount (UL2) is required to be accumulated by C (immediately before the right-view data block R1 arranged at the end of the 3D extent block 2001 is read) in FIG. 73.

A decreased amount of data in the second read buffer 4922 from C to D can be calculated according to the following expression.

$$\text{The decreased amount of data in the second read} \\ \text{buffer } 4922 \text{ from } C \text{ to } D = (T\text{jump}EX + 3 \times T\text{jump0} + T\text{jump} + T\text{LAYER} + 2 \times SEXT1/RUD3D) \times \\ RMAX2 = 2 \times (T\text{jump0} + T\text{jump} + SEXT1/RUD3D) \times \\ RMAX2 + (T\text{jump0} + T\text{jump}EX + T\text{LAYER} - T\text{jump}) \times RMAX2 \quad (40)$$

SEXT1 is a size of a left-view data block that exists between C and D. An increased amount of data in the second read buffer 4922 from C to D can be calculated according to the following expression.

The increased amount of data in the second read buffer 4922 from $C$ to $D=2\times SEXT2/RUD3D\times(RUD3D-RMAX2)$ (41)

SEXT2 is a size of a left-view data block that exists between C and D. Accordingly, the required buffer margin amount at C is calculated as follows according to Expressions (40) and (41).

$UL2$=the decreased amount of data in the second read buffer 4922 from $C$ to $D$–the increased amount of data in the second read buffer 4922 from $C$ to $D=2\times(Tjump0+Tjump+SEXT1/RUD3D)\times RMAX2+(Tjump0+TjumpEX+TLAYER-Tjump)\times RMAX2-2\times SEXT2/RUD3D\times(RUD3D-RMAX2)$ (42)

Here, a minimum extent size is determined such that (Tjump0+Tjump+SEXT1/RUD3D)×RMAX2 and SEXT2/RUD3D×(RUD3D−RMAX2) are each 0 or more. That is to say, as long as a size of an extent is equal to or larger than the minimum extent size satisfying Expression (3), these values become always equal to or larger than 0.

As the value becomes 0 when considering the worst value, the buffer margin amount UL2 required for the playback in the depth mode is the following Expression (43) which is derived from Expression (42).

$UL2=CEIL(TjumpEX+TLAYER+Tjump0-Tjump)\times RMAX2$ (43)

Described above are the buffer margin amounts required for the playback of the data of arrangement 1 in the L/R mode.

Next, a buffer margin amount required to play back the data of arrangement 1 in depth mode is explained.

Figures 74A, 74B, 74C:
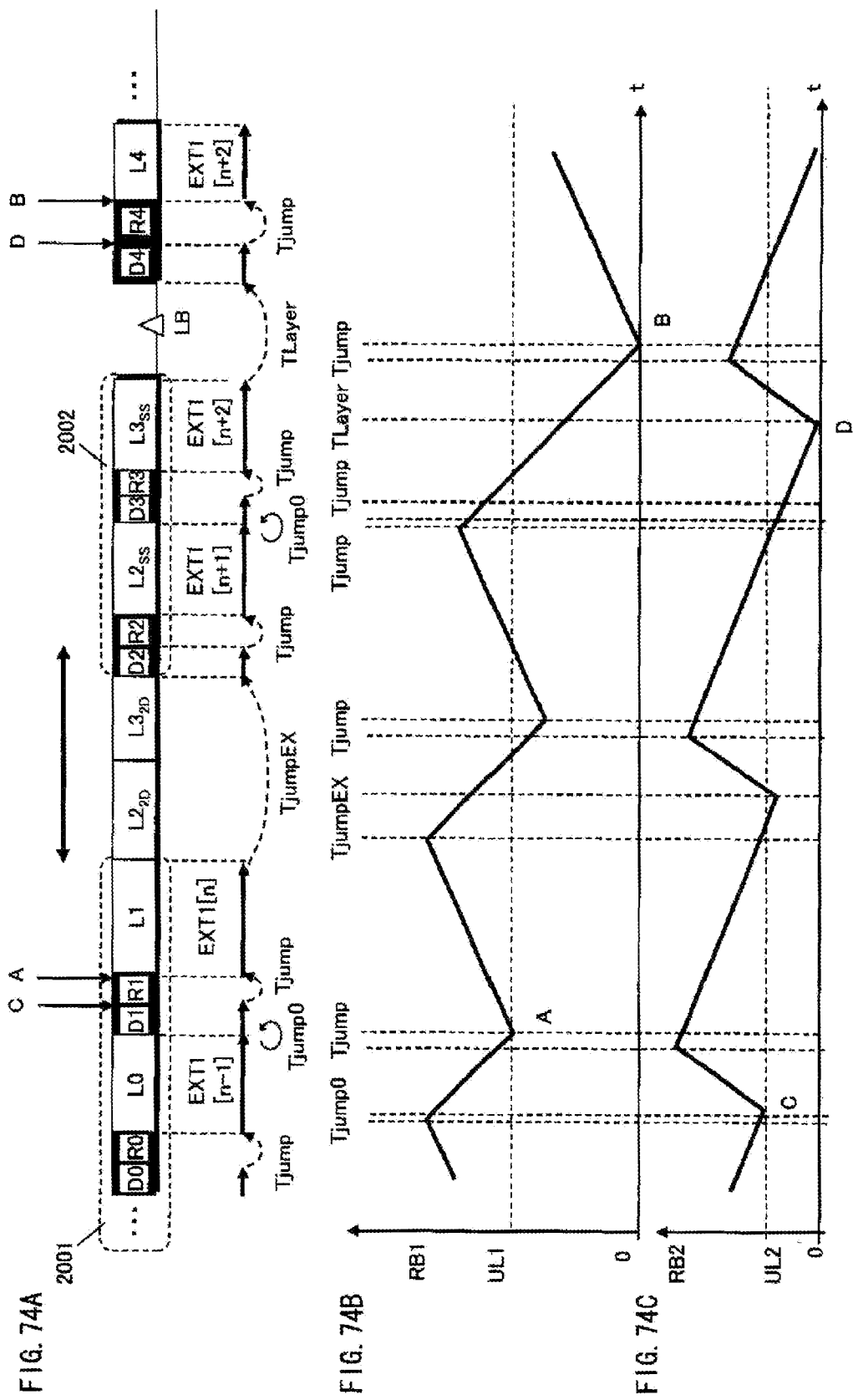
FIG. 74A shows a long jump which occurs while the data of arrangement 1 is played back in depth mode, and FIGS. 73B and 73C respectively show a transition of a data amount accumulated in the first read buffer 4921 and a transition of a data amount accumulated in the second read buffer 4922 when the data of arrangement 1 is played back in depth mode.

FIG. 74A shows a long jump which occurs while the data of arrangement 1 is played back in depth mode. FIGS. 73B and 73C respectively show a transition of a data amount accumulated in the first read buffer 4921 and a transition of a data amount accumulated in the second read buffer 4922 when the data of arrangement 1 is played back in depth mode.

Here, a size of each of three data blocks D3, R3, and L3$_{SS}$ which are arranged at the end of pre-jump 3D extent block 2002 and whose extent ATC times match one another is assumed 0 with consideration to the worst value of the required buffer margin amount.

First, the buffer margin amount UL1 accumulated in the first read buffer 4921 is explained. The underflow of the first read buffer 4921 will be prevented in the seamless connection when the data is played back in a path shown in FIG. 74A as long as the underflow is not caused before B, which is immediately before a head left-view data block L4 in the succeeding playitem is read. That is to say, a size of the read buffer at B only needs to satisfy ≧0. For this, the buffer margin amount (UL1) is required to be accumulated by A (immediately before the left-view data block L1 at the end of 3D extent block 2001 is read) in FIG. 74.

A decreased amount of data in the first read buffer 4921 from A to B can be calculated according to the following expression.

The decreased amount of data in the first read buffer 4921 from $A$ to $B=(TjumpEX+3\times Tjump+Tjump0+TLAYER+2\times SEXT3/RUD3D)\times RMAX1=2\times(Tjump0+Tjump+SEXT3/RUD3D)\times RMAX1+(Tjump+TjumpEX+TLAYER-Tjump0)\times RMAX1$ (44)

SEXT3 is a size of a depthmap data block that exists between A and B. An increased amount of data in the first read buffer 4921 from A to B can be calculated according to the following expression.

The increased amount of data in the first read buffer 4921 from $A$ to $B=2\times SEXT1/RUD3D\times(RUD3D-RMAX1)$ (45)

SEXT1 is a size of a left-view data block that exists between A and B. Accordingly, the required buffer margin amount at A is calculated as follows according to Expressions (44) and (45).

$UL1$=the decreased amount of data in the first read buffer 4921 from $A$ to $B$–the increased amount of data in the first read buffer 4921 from $A$ to $B=2\times(Tjump0+Tjump+SEXT3/RUD3D)\times RMAX1+(Tjump+TjumpEX+TLAYER-Tjump0)\times RMAX1-2\times SEXT1/RUD3D\times(RUD3D-RMAX1)$ (46)

Here, a minimum extent size is determined such that (Tjump0+Tjump+SEXT3/RUD3D)×RMAX1 and SEXT1/RUD3D×(RUD3D−RMAX1) are each 0 or more. That is to say, as long as a size of an extent is equal to or larger than the minimum extent size satisfying Expression (4), these values become always equal to or larger than 0.

As the value becomes 0 when considering the worst value, the buffer margin amount UL1 required for the playback in the L/R mode is the following Expression (47) which is derived from Expression (46).

$UL1=CEIL(TjumpEX+TLAYER-Tjump0+Tjump)\times RMAX1$ (47)

Next, the buffer margin amount accumulated in the second read buffer 4922 is explained. The underflow of the second read buffer 4922 will be prevented in the seamless connection as long as the underflow is not caused before D, which is immediately before the depthmap data block D4 arranged at the head of the succeeding playitem is read. That is to say, a size of the read buffer at D only needs to satisfy ≧0. For this, the buffer margin amount (UL2) is required to be accumulated by C (immediately before the depthmap data block D1 arranged at the end of the 3D extent block 2001 is read) in FIG. 74.

A decreased amount of data in the second read buffer 4922 from C to D can be calculated according to the following expression.

The decreased amount of data in the second read buffer 4922 from $C$ to $D=(TjumpEX+3\times Tjump+Tjump0+TLAYER+2\times SEXT1/RUD3D)\times RMAX3=2\times(Tjump0+Tjump+SEXT2/RUD3D)\times RMAX3+(Tjump+TjumpEX+TLAYER-Tjump0)\times RMAX3$ (48)

SEXT1 is a size of a left-view data block that exists between C and D. An increased amount of data in the second read buffer 4922 from C to D can be calculated according to the following expression.

The increased amount of data in the second read buffer 4922 from $C$ to $D=2\times SEXT3/RUD3D\times(RUD3D-RMAX3)$ (49)

SEXT3 is a size of a depthmap data block that exists between C and D. Accordingly, the required buffer margin amount at C is calculated as follows according to Expressions (48) and (49).

$UL2$=the decreased amount of data in the second read buffer 4922 from $C$ to $D$–the increased amount of data in the second read buffer 4922 from $C$ to $D=2\times(Tjump0+Tjump+SEXT1/RUD3D)\times$ $$RMAX3+(Tjump+TjumpEX+TLAYER-Tjump0)\times RMAX3-2\times SEXT3/RUD3D\times (RUD3D-RMAX3) \quad (50)$$

Here, a minimum extent size is determined such that $(Tjump0+Tjump+SEXT1/RUD3D)\times RMAX3$ and $SEXT3/RUD3D\times(RUD3D-RMAX3)$ are each 0 or more. That is to say, as long as a size of an extent is equal to or larger than the minimum extent size satisfying Expression (5), these values become always equal to or larger than 0.

As the value becomes 0 when considering the worst value, the buffer margin amount UL2 required for the playback in the L/R mode is the following Expression (51) which is derived from Expression (50).

$$UL2=\mathrm{CEIL}(TjumpEX+TLAYER-Tjump0+Tjump)\times RMAX3 \quad (51)$$

Described above are the buffer margin amounts required for the playback of the data of arrangement 1 in the depth mode.

The 2D/3D playback can seamlessly play back the data of arrangement 1 described in FIG. 20 by securing the above calculated UL1 and UL2 as a buffer margin amount.

<Buffer Margin Amounts Required for 3D Playback of Data of Arrangement 2>

The following describes buffer margin amounts required to play back 3D images using the data of arrangement 2 shown in FIG. 24. First, buffer margin amounts required to play back 3D images in depth mode are explained.

FIG. 75 shows a long jump which occurs while the data of arrangement 2 is played back in L/R mode. FIGS. 75B and 75C respectively show a transition of a data amount accumulated in the first read buffer 4921 and a transition of a data amount accumulated in the second read buffer 4922 when the data of arrangement 2 is played back in L/R mode.

Here, a size of each of three data blocks D3, R3, and $L3_{SS}$ which are arranged at the end of pre-jump 3D extent block 2002 and whose extent ATC times match one another is assumed 0 with consideration to the worst value of the required buffer margin amount.

First, the buffer margin amount UL1 accumulated in the first read buffer 4921 is explained. The underflow of the first read buffer 4921 will be prevented in the seamless connection when the data is played back in a path shown in FIG. 75A as long as the underflow is not caused before B, which is immediately before a head left-view data block L4 in the succeeding playitem is read. That is to say, a size of the read buffer at B only needs to satisfy ≧0. For this, the buffer margin amount (UL1) is required to be accumulated by A (immediately before the left-view data block L1 at the end of 3D extent block 2001 is read) in FIG. 75.

A decreased amount of data in the first read buffer 4921 from A to B can be calculated according to the following expression.

The decreased amount of data in the first read buffer
4921 from $A$ to $B=(2\times Tjump+Tjump0+TLAYER+SEXT3/RUD3D)\times RMAX1=(Tjump0+Tjump+SEXT3/RUD3D)\times RMAX1+(Tjump+TLAYER)\times RMAX1$ (52)

SEXT3 is a size of a depthmap data block that exists between A and B. An increased amount of data in the first read buffer 4921 from A to B can be calculated according to the following expression.

The increased amount of data in the first read buffer
4921 from $A$ to $B=SEXT1/RUD3D\times(RUD3D-RMAX1)$ (53)

SEXT1 is a size of a left-view data block that exists between A and B. Accordingly, the required buffer margin amount at A is calculated as follows according to Expressions (52) and (53).

UL1=the decreased amount of data in the first read
buffer 4921 from $A$ to $B$-the increased amount of
data in the first read buffer 4921 from $A$ to
$B=(Tjump0+Tjump+SEXT3/RUD3D)\times RMAX1+(Tjump+TLAYER)\times RMAX1-SEXT1/RUD3D\times(RUD3D-RMAX1)$ (54)

Here, a minimum extent size is determined such that $(Tjump0+Tjump+SEXT3/RUD3D)\times RMAX1$ and $SEXT1/RUD3D\times(RUD3D-RMAX1)$ are each 0 or more. That is to say, as long as a size of an extent is equal to or larger than the minimum extent size satisfying Expression (3), these values become always equal to or larger than 0.

As the value becomes 0 when considering the worst value, the buffer margin amount UL1 required for the playback in the depth mode is the following Expression (55) which is derived from Expression (54).

$$UL1=\mathrm{CEIL}(TLAYER+Tjump0)\times RMAX1 \quad (55)$$

Next, the buffer margin amount accumulated in the second read buffer 4922 is explained. The underflow of the second read buffer 4922 will be prevented in the seamless connection as long as the underflow is not caused before D, which is immediately before the right-view data block R4 arranged at the head of the succeeding playitem is read. That is to say, a size of the read buffer at D only needs to satisfy ≧0. For this, the buffer margin amount (UL2) is required to be accumulated by C (immediately before the right-view data block R1 arranged at the end of the 3D extent block 2001 is read) in FIG. 75.

A decreased amount of data in the second read buffer 4922 from C to D can be calculated according to the following expression.

A decreased amount of data in the second read buffer 4922 from C to D can be calculated according to the following expression.

The decreased amount of data in the second read
buffer 4922 from $C$ to $D=(2\times Tjump+Tjump0+TLAYER+SEXT1/RUD3D)\times RMAX3=(Tjump0+Tjump+SEXT1/RUD3D)\times RMAX3+(Tjump+TLAYER)\times RMAX3$ (56)

SEXT1 is a size of a left-view data block that exists between C and D. An increased amount of data in the second read buffer 4922 from C to D can be calculated according to the following expression.

The increased amount of data in the second read
buffer 4922 from $C$ to $D=SEXT3/RUD3D\times(RUD3D-RMAX3)$ (57)

SEXT2 is a size of a depthmap data block that exists between C and D. Accordingly, the required buffer margin amount at C is calculated as follows according to Expressions (56) and (57).

UL2=the decreased amount of data in the second read
buffer 4922 from $C$ to $D$-the increased amount
of data in the second read buffer 4922 from $C$ to
$D=(Tjump0+Tjump+SEXT1/RUD3D)\times RMAX3+(Tjump+TLAYER)\times RMAX3-SEXT3/RUD3D\times(RUD3D-RMAX3)$ (58)

Here, a minimum extent size is determined such that $(Tjump0+Tjump+SEXT1/RUD3D)\times RMAX3$ and $SEXT3/RUD3D\times(RUD3D-RMAX3)$ are each 0 or more. That is to say, as long as a size of an extent is equal to or larger than the minimum extent size satisfying Expression (3), these values become always equal to or larger than 0.

As the value becomes 0 when considering the worst value, the buffer margin amount UL2 required for the playback in the depth mode is the following Expression (59) which is derived from Expression (58).

$$UL2 = CEIL(TLAYER + Tjump0) \times RMAX3 \quad (59)$$

Described above are the buffer margin amounts required for playing back the data of arrangement 2 in the depth mode. Next, a buffer margin amount required for playing back 3D images in L/R mode is explained.

The buffer margin amount required for playing back 3D images in L/R mode can be calculated according to the following expression.

$$UL1 = CEIL(TLAYER + Tjump0) \times RMAX1 \quad (60)$$

$$UL2 = CEIL(TLAYER + Tjump0) \times RMAX2 \quad (61)$$

These expressions can be explained in the same manner as the case of depth mode.

The 2D/3D playback can seamlessly play back the data of arrangement 2 described in FIG. 24 by securing the above calculated UL1 and UL2 as a buffer margin amount.

Here, the buffer margin amount required for playing back the data of arrangement 2 in L/R mode that is calculated by Expressions (60) and (61) is smaller than that required to play back the data of arrangement 1 in L/R mode calculated by Expressions (39) and (43). Also, the buffer margin amount required for playing back the data of arrangement 2 in depth mode that is calculated by Expressions (55) and (59) is smaller than that required for playing back the data of arrangement 1 in depth mode calculated by Expressions (47) and (51).

Accordingly, the data structure of arrangement 2 described using FIG. 24 can suppress the buffer margin amounts (UL1, UL2) required for the seamless connection smaller compared to the data structure of arrangement 1. As a result, sizes of the first read buffer 4921 and the second read buffer 4922 required for playing back 3D images can be reduced.

Note that the following condition described above, which is not required in the data structure explained using FIG. 20, is required to arrange data in the data structure explained using FIG. 24.

Also, the end extent of the 2D/left-eye AV stream in the 3D extent block 2001 needs to be equal to or larger than the minimum extent size for the 2D playback device obtained by Expression (2), where Tjump is a jump distance from the end of the end extent of the 2D/left-eye AV stream in the 3D extent block 2001 to the 2D pre-jump extent EXT2D[1]. The jump distance from the end extent of the 2D/left-eye AV stream in the 3D extent block 2001 to the 2D pre-jump extent EXT2D [1] is set to be equal to or smaller than a maximum jump distance determined by a given specification based on a jump performance of the 2D playback device.

Figure 76:
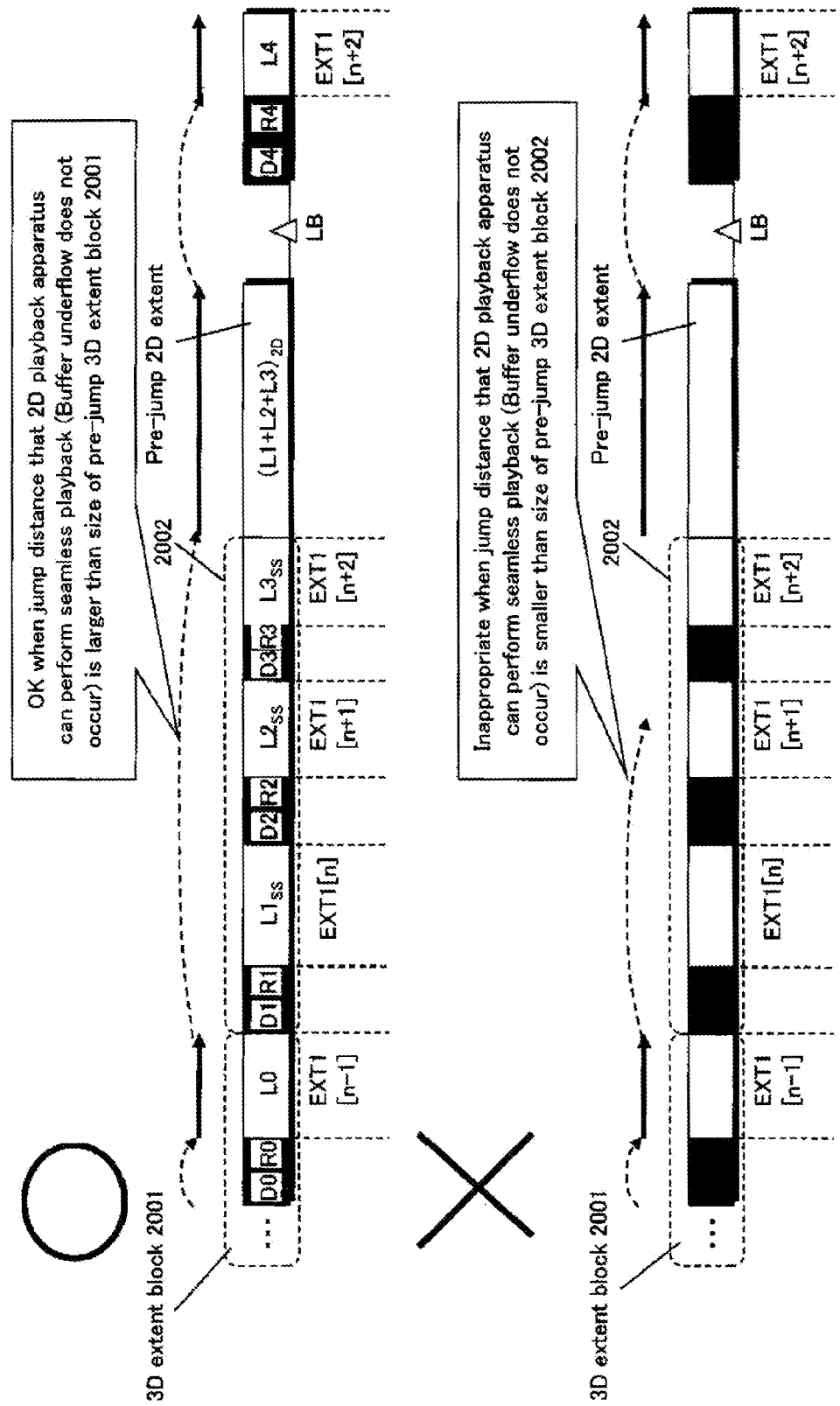
FIG. 76 shows a condition of the data arrangement when playitems are seamlessly connected together.

As shown in FIG. 76, when reading the left-view data block L1 at the end of the 3D extent block 2001 having a size determined by the condition of an extent size of a 3D extent block and a jump distance required for the 2D playback device to perform seamless playback is larger than a size of the pre-jump 3D extent block 2002, data can be arranged in the data structure explained using FIG. 24. However, when reading the left-view data block L1 at the end of the 3D extent block 2002 having a size determined by the condition of an extent size of a 3D extent block and a jump distance required for the 2D playback device to perform seamless playback is smaller than a size of the pre-jump 3D extent block, data cannot be arranged in the data structure explained using FIG. 24.

Accordingly, it is preferable to arrange data in the data structure explained using arrangement 2 shown in FIG. 24 when the above condition is met, and to arrange data in the data structure explained using arrangement 1 shown in FIG. 20 when the above condition is not met.

Also, as shown in Expression (1), an extent size required to perform seamless playback in the 2D playback mode depends on a system rate. When specifying a system rate of a left-view video stream meeting the above condition, and a system rate of an AV stream is higher than the system rate of the left-view video stream, data may be arranged in the data structure of arrangement 1 explained using FIG. 20, and a system rate of an AV stream is lower than the system rate of the left-view video stream, data may be arranged in the data structure of arrangement 2 explained using FIG. 24.

Note that in arrangement 2 shown in FIG. 24, the pre-jump 2D extent EXT2D[n] is composed only of blocks exclusively for 2D, and accordingly, the pre-jump 2D extent EXT2D[n] needs to be copied into a block exclusively for 3D that has the same data size as the pre-jump 2D extent EXT2D[n]. On the other hand, in arrangement 1 shown in FIG. 20, the base-view data block Ln which is used as part of the pre-jump 2D extent EXT2D[n] is also used as part of the 3D extent EXTSS[n], and accordingly, it is preferable in a manner that an increase of a size of duplicate data stored in different extents can be suppressed.

<Buffer Margin Amounts Required for 3D Playback of Data of Arrangement 3>

The following describes buffer margin amounts required to play back 3D images using the data of arrangement 3 shown in FIG. 26. First, a buffer margin amount required to play back 3D images in depth mode is explained.

Figures 77A, 77B, 77C:
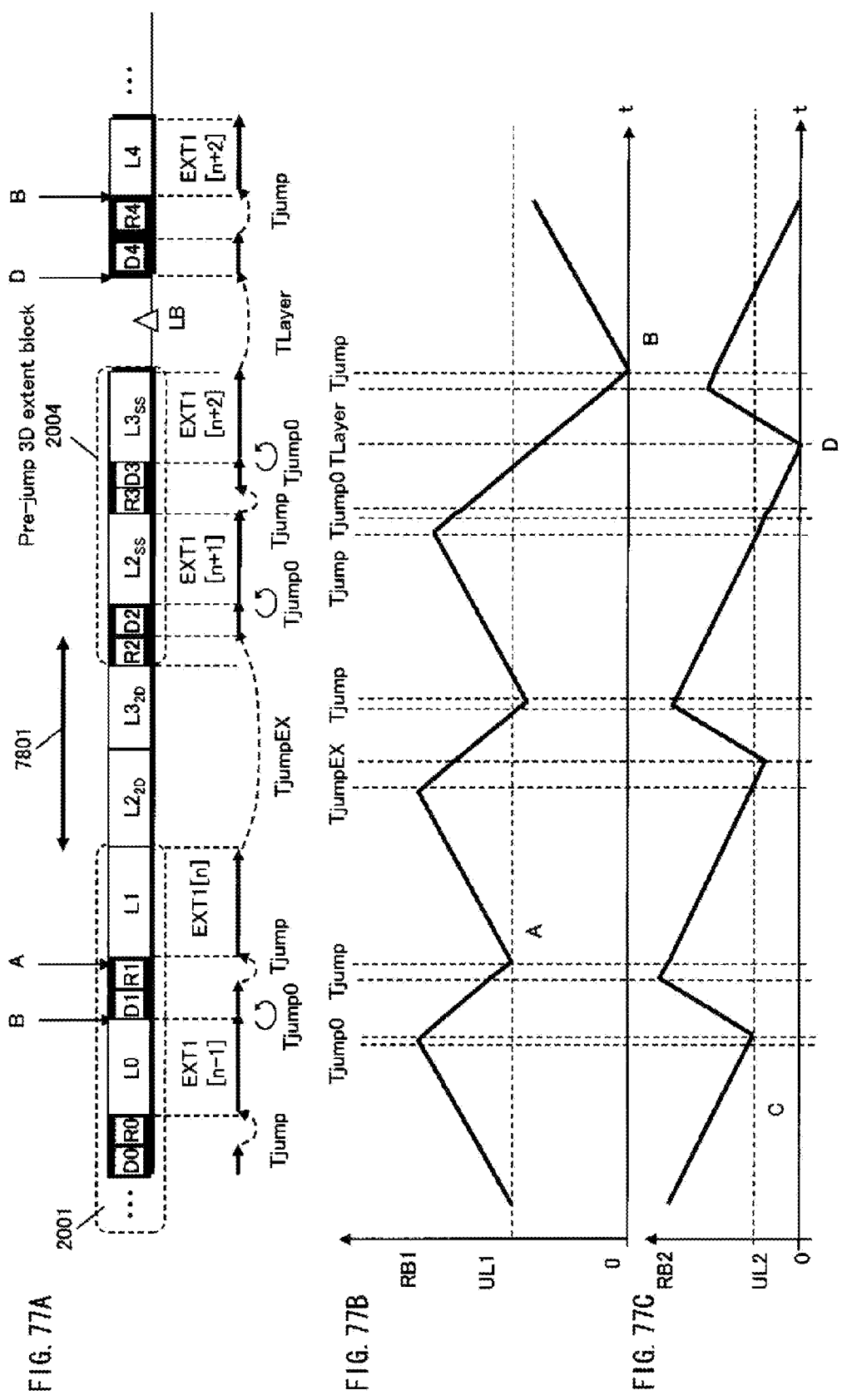
FIG. 77A shows a long jump which occurs while the data of arrangement 3 is played back in depth mode, and FIGS. 77B and 77C respectively show a transition of a data amount accumulated in the first read buffer 4921 and a transition of a data amount accumulated in the second read buffer 4922 when the data of arrangement 3 is played back in depth mode.

FIG. 77 shows a long jump which occurs while the data of arrangement 3 is played back in depth mode. FIGS. 77B and 77C respectively show a transition of a data amount accumulated in the first read buffer 4921 and a transition of a data amount accumulated in the second read buffer 4922 when the data of arrangement 3 is played back in depth mode.

Here, a size of each of three data blocks D3, R3, and L3$_{SS}$ which are arranged at the end of pre-jump 3D extent block 2002 and whose extent ATC times match one another is assumed 0 with consideration to the worst value of the required buffer margin amount.

First, the buffer margin amount UL1 accumulated in the first read buffer 4921 is explained. The underflow of the first read buffer 4921 will be prevented in the seamless connection when the data is played back in a path shown in FIG. 77A as long as the underflow is not caused before B, which is immediately before a head left-view data block L4 in the succeeding playitem is read. That is to say, a size of the read buffer at B only needs to satisfy $\geq 0$. For this, the buffer margin amount (UL1) is required to be accumulated by A (immediately before the left-view data block L1 at the end of 3D extent block 2001 is read) in FIG. 77.

The decreased amount of data in the first read buffer 4921 from $A$ to $B = (2 \times Tjump + 2 \times Tjump0 + TLAYER + TjumpEX + SEXT3/RUD3D) \times RMAX1 = (Tjump0 + Tjump + SEXT3/RUD3D) \times RMAX1 + (TjumpEX + TLAYER) \times RMAX1$ \quad (62)

SEXT3 is a size of a depthmap data block that exists between A and B. An increased amount of data in the first read buffer 4921 from A to B can be calculated as follows.

The increased amount of data in the first read buffer 4921 from $A$ to $B = 2 \times SEXT1/RUD3D \times (RUD3D - RMAX1)$ \quad (63)

SEXT1 is a size of a left-view data block that exists between A and B. Accordingly, the required buffer margin amount at A is calculated as follows according to Expressions (62) and (63).

$UL1$=the decreased amount of data in the first read buffer 4921 from $A$ to $B$–the increased amount of data in the first read buffer 4921 from $A$ to $B$=2×($T$jump0+$T$jump+SEXT3/$RUD3D$)×$R$MAX1+($T$jump$EX$+$T$LAYER)×$R$MAX1−2×SEXT1/$RUD3D$×($RUD3D$−$R$MAX1)  (64)

Here, a minimum extent size is determined such that ($T$jump0+$T$jump+SEXT3/RUD3D)×RMAX1 and SEXT1/RUD3D×(RUD3D−RMAX1) are each 0 or more. That is to say, as long as a size of an extent is equal to or larger than the minimum extent size satisfying Expression (3), these values become always equal to or larger than 0.

As the value becomes 0 when considering the worst value, the buffer margin amount UL1 required for the playback in the depth mode is the following Expression (65) which is derived from Expression (64).

$UL1$=CEIL($T$LAYER+$T$jump$EX$)×$R$MAX1  (65)

Next, the buffer margin amount accumulated in the second read buffer 4922 is explained. The underflow of the second read buffer 4922 will be prevented in the seamless connection as long as the underflow is not caused before D, which is immediately before the right-view data block R4 arranged at the head of the succeeding playitem is read. That is to say, a size of the read buffer at D only needs to satisfy $\geq 0$. For this, the buffer margin amount (UL2) is required to be accumulated by C (immediately before the right-view data block R1 arranged at the end of the 3D extent block 2001 is read) in FIG. 77.

A decreased amount of data in the second read buffer 4922 from C to D can be calculated according to the following expression.

The decreased amount of data in the second read buffer 4922 from $C$ to $D$=(2×$T$jump+2×$T$jump0+$T$jump$EX$+$T$LAYER+2×SEXT1/$RUD3D$)×$R$MAX3=2×($T$jump0+$T$jump+SEXT1/$RUD3D$)×$R$MAX3+($T$jump$EX$+$T$LAYER)×$R$MAX3  (66)

SEXT1 is a size of a left-view data block that exists between C and D. An increased amount of data in the second read buffer 4922 from C to D can be calculated as follows.

The increased amount of data in the second read buffer 4922 from $C$ to $D$=2×SEXT3/$RUD3D$×($RUD3D$−$R$MAX3)  (67)

SEXT3 is a size of a depthmap data block that exists between C and D. Accordingly, the required buffer margin amount at C is calculated as follows according to Expressions (66) and (67).

$UL2$=the decreased amount of data in the second read buffer 4922 from $C$ to $D$–the increased amount of data in the second read buffer 4922 from $C$ to $D$=2×($T$jump0+$T$jump+SEXT1/$RUD3D$)×$R$MAX3+($T$jump$EX$+$T$LAYER)×$R$MAX3−2×SEXT3/$RUD3D$×($RUD3D$−$R$MAX3)  (68)

Here, a minimum extent size is determined such that ($T$jump0+$T$jump+SEXT1/RUD3D)×RMAX3 and SEXT3/RUD3D×(RUD3D−RMAX3) are each 0 or more. That is to say, as long as a size of an extent is equal to or larger than the minimum extent size satisfying Expression (3), these values become always equal to or larger than 0.

As the value becomes 0 when considering the worst value, the buffer margin amount UL2 required for the playback in the depth mode is the following Expression (69) which is derived from Expression (68).

$UL2$=CEIL($T$LAYER+$T$jump$EX$)×$R$MAX3  (69)

Described above are the buffer margin amounts required for playing back the data of arrangement 3 in the depth mode.

Next, a buffer margin amount required for playing back 3D images in L/R mode is described.

The buffer margin amount required for playing back 3D images in L/R mode can be calculated according to the following expression.

$UL1$=CEIL($T$jump$EX$+$T$LAYER)×$R$MAX1  (70)

$UL2$=CEIL($T$jump$EX$+$T$LAYER)×$R$MAX2  (71)

These expressions can be explained in the same manner as the case of depth mode.

The 2D/3D playback device can seamlessly play back the data of arrangement 3 described in FIG. 26 by securing the above calculated UL1 and UL2 as a buffer margin amount.

Here, when the 2D/3D playback device can playback 3D images in both L/R and depth modes, the required buffer margin amount becomes the worst value. The worst value (maximum value) of the buffer margin amount required for playing back 3D images having the data structure explained using FIG. 20 is equal to the buffer margin amount required for playing back 3D images in depth mode having a size calculated by Expressions (47) and (51). The worst value (maximum value) of the buffer margin amount required for playing back 3D images having the data structure explained using FIG. 26 is equal to the buffer margin amount required for playing back 3D images in L/R mode having a size calculated by Expressions (70) and (71), or the buffer margin amount required for playing back 3D images in depth mode having a size calculated by Expressions (65) and (69). Here, each of the size calculated by Expressions (70) and (71) and the size calculated by Expressions (65) and (69) is smaller than the size calculated by Expressions (47) and (51). In other words, arrangement 3 can suppress the buffer margin amounts (UL1, UL2) required for the seamless connection for both depth and L/R modes smaller compared to the data structure of arrangement 1. Accordingly, in terms of a size of a read buffer, when the 2D/3D playback device can play back 3D images in both L/R and depth modes, it is preferable to arrange, in the recording medium, stream data according to the data structure of arrangement 1 explained using FIG. 26.

(Data Structure to Reduce a Size of a Read Buffer for Seamless Connection)

Figure 78:
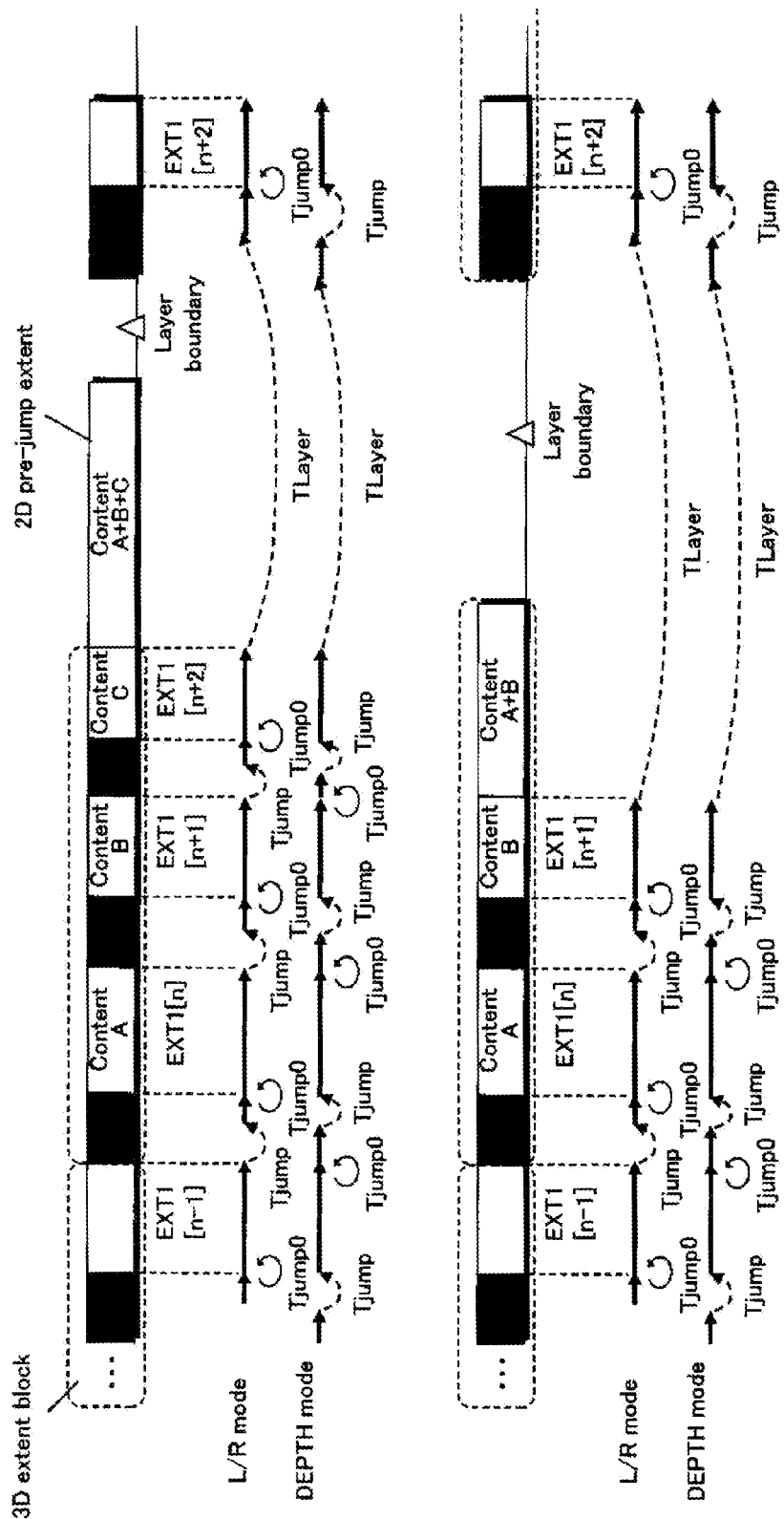
FIG. 78 shows data arrangements to downsize a read buffer required for the 2D/3D playback apparatus to play back 3D images.

In addition to the data arrangement for seamless connection described in FIGS. 20, 24 and 26, the following describes data arrangement to reduce a size of a read buffer required for the 2D/3D playback device to play back 3D images with use of FIG. 78.

Described below is data arrangement to reduce a size of a read buffer required for playing back 3D images.

An upper level of FIG. 78 shows a playback path for L/R mode and a playback path for depth mode using arrangement 3 explained in FIG. 26.

In the data structure of the upper level of FIG. 78, a size of each of the left-view data block, the right-view data block, and the depthmap data block arranged at the end of pre-jump 3D extent block 7501 does not need to satisfy the minimum extent size obtained by Expressions (2) to (5). The reason is as follows. When defining a minimum extent size as "the average transfer rate of extents×the minimum extent ATC time" (e.g. REXT1[$n$]×MIN_TEXT) and defining a maximum extent size as "the average transfer rate of extents×the minimum extent ATC time" (e.g. REXT1[$n$]×MIN_TEXT), for example, an extra extent not satisfying the minimum extent size can be left depending on the playback time of a content.

For example, it is presumed that the minimum extent ATC time is two seconds, the maximum extent ATC time=the minimum extent ATC time, and the ACT time of an AV stream is 11 seconds. In this case, when dividing extents in units of two seconds, which is the minimum extent ATC time, from the head of the AV stream, an extent having one second extent ATC time is left at the end of the extent.

It is preferable that an end extent set satisfies a minimum extent size obtained by Expressions (2) to (5) as shown in the lower level of FIG. 78, because buffer margin amounts UL1 and UL2 required for the 2D/3D playback device can be reduced.

The following limitation is put so that the end extent set can satisfy the minimum extent size obtained by Expressions (2) to (5).

A maximum extent ATC time is defined as follows, where a minimum ATC time of an AV stream for seamless playback is TDURATION.

$$TMAX\_TEXT \geq (TMIN\_TEXT \times TDURATION)/(TDURATION-MIN\_TEXT) \quad (72)$$

Figure 79:
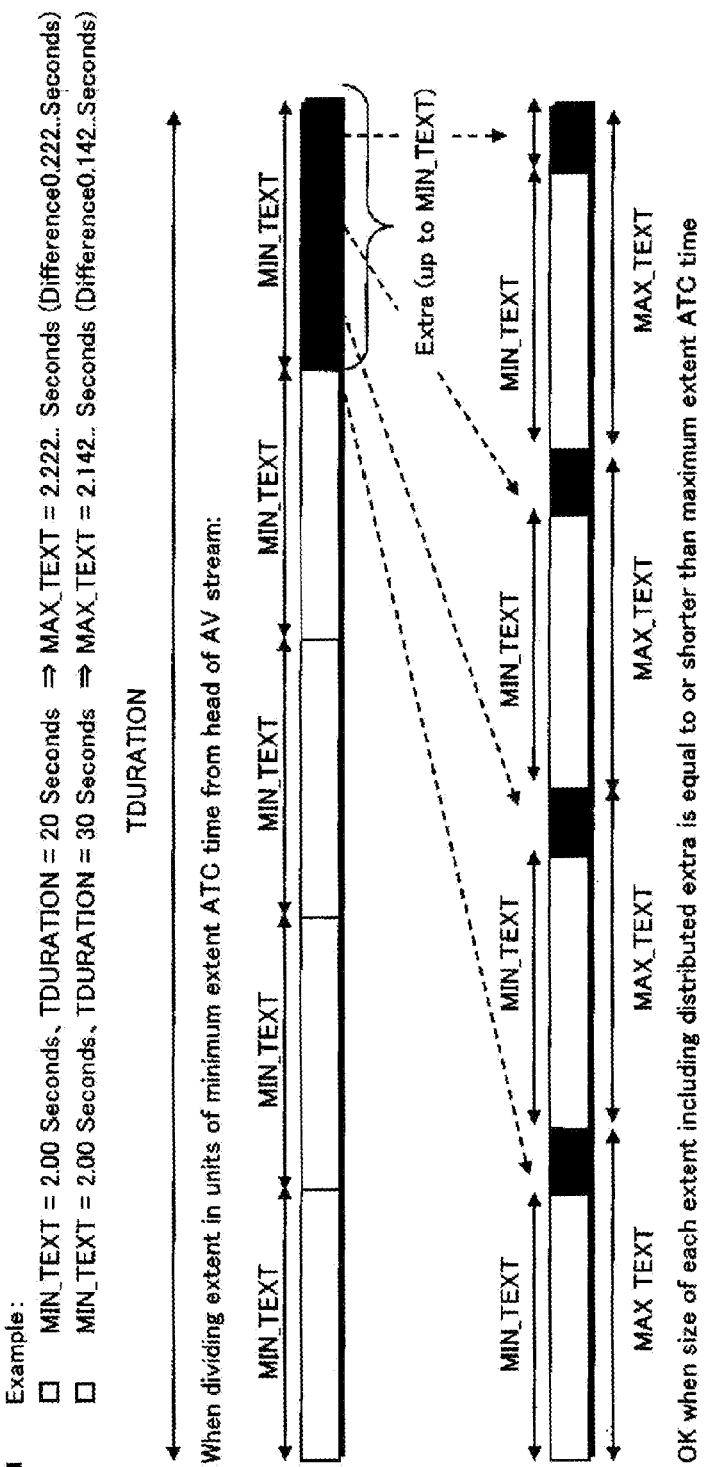
FIG. 79 explains a limitation for an end extent set to satisfy a minimum extent size calculated by Expressions (2)-(5)

The lower level of FIG. 79 describes the basis thereof. When dividing extents in units of the minimum extent ATC time from the head of the AV stream, and an extent not satisfying a minimum extent size is left at the end of the AV stream, the maximum value of a size of the extent is MIN_T-EXT. If the MIN_TEXT at the end is distributed to each extent having been divided in units of the minimum extent ATC time and the each extent including the distributed extra is equal to or shorter than the maximum extent ATC time, an extra extent cannot be left.

In examples of FIG. 79, when MIN_TEXT is two seconds and TDURATION is 20 seconds, the maximum extent ATC time is 2.222 seconds. When MIN_TEXT is two seconds and TDURATION is 30 seconds, the maximum extent ATC time is 2.142 seconds. The longer the maximum extent ATC time is, the larger the extent size becomes. Thus a size of a buffer required for the 2D/3D playback device is increased. Therefore, values of MAX_TEXT and TDURATION are properly set based on a parameter relating to, for example, a jump performance. Such limitation may be put based on a given specification. For example, the ATC time (TDURATION) of an AV stream for seamless playback is set to be equal to or longer than 30 seconds, and MAX_TEXT is set to be 2.15 seconds.

Within the above limitation, the end extent set can satisfy the minimum extent ATC time at all times. Therefore, the buffer margin amounts UL1 and UL2 required for the 2D/3D playback device can be reduced.

The reason why the buffer margin amounts UL1 and UL2 can be reduced can be explained by using a calculation method explained using FIG. 75.

The method for calculating the buffer margin amounts UL1 and UL2 in L/R mode are illustrated in FIG. 80.

<Multi Angle>

As shown in FIG. 81A, as a data arrangement to realize multi angle in 2D video, a plurality of multiplexed stream groups showing angle videos may be arranged in an interleaved manner for each angle.

In order to realize a multi angle of 3D images, as shown in FIG. 81B, a block in which blocks of the left-view video stream, the right-view video stream, and the depth map stream that belong to one angle are arranged in an interleaved manner may be considered as one block, and the multi angle may be realized by arranging these blocks in an interleaved manner for each angle.

<Other Data Structures for Realizing Multi Angle of 3D Images>

Figures 82A, 82B:
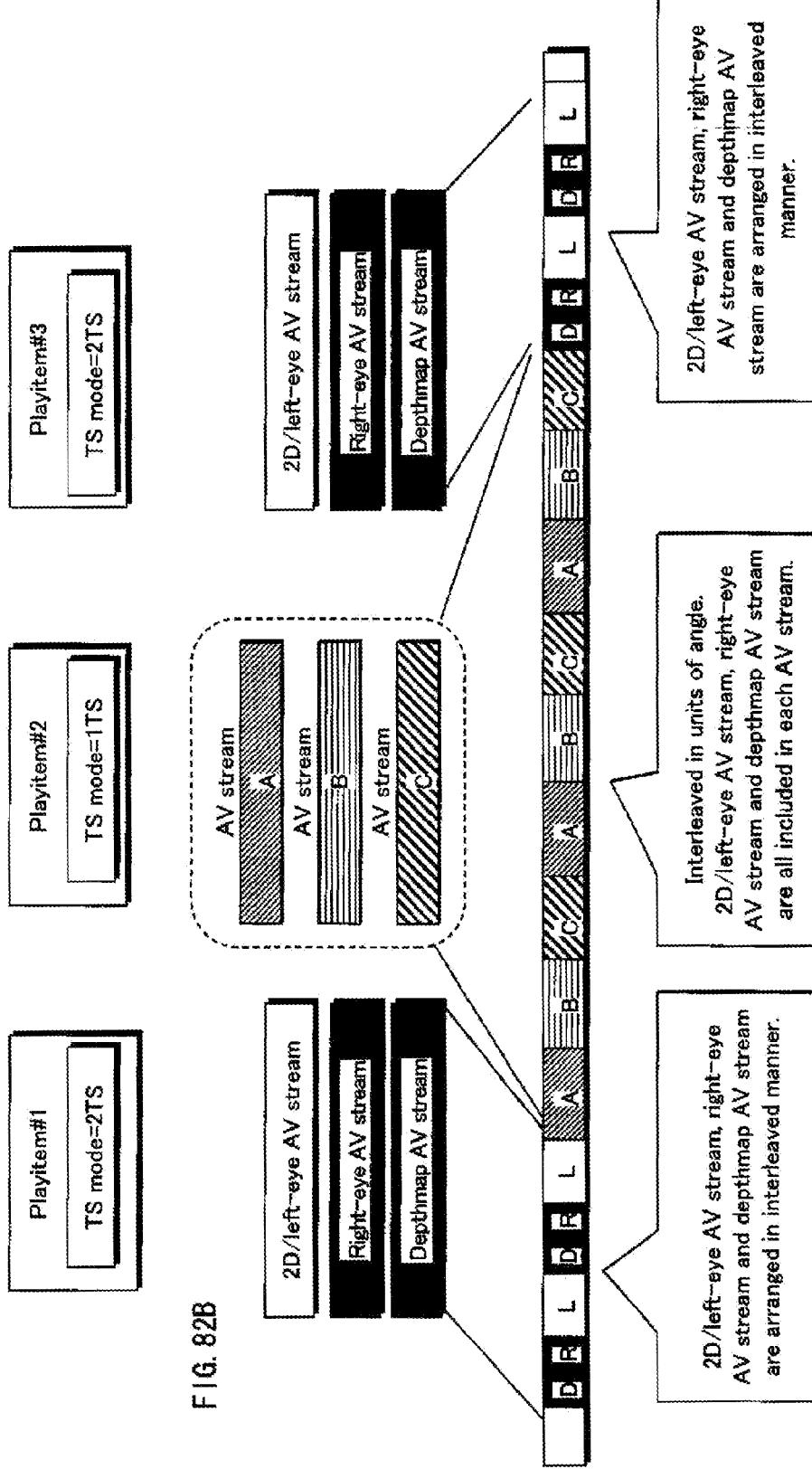
FIG. 82 shows a modification of the structure to realize the multi angle of a 3D image.

Note that when realizing the multi angle of 3D images as shown in FIG. 82B, in a multi angle section, extents of the left-view video stream, the dependent-view video stream, and the depth map stream may not have to be separated into different files, but may be contained in one multiplexed stream. In this case, in order to play back the multiplexed stream by the 2D playback apparatus, the sum of the left-view video stream, the dependent-view video stream, and the depth map stream needs to be within a system rate of an AV stream.

In such a modification, in order to respond to a case where the number of AV streams to be transferred to the system target decoder is changed between playitems, each playitem is provided with a flag showing the number of TSs to be played back, as shown in FIG. 82B. Specifically, In the case of playitems #1 and #3 for playing back two AV streams (a left-view video stream and a dependent-view video stream in L/R mode, and a left-view video stream and a depth map video stream in depth mode) to play back 3D images in a non-multi angle section, a TS mode is set as a 2TS mode, whereas in the case of playitem #2 for playing back one AV stream to play back 3D images in a multi angle section, the Ts mode is set as a 1TS mode. This allows the 2D/3D playback device to change the number of AV streams to be transferred to the system target decoder by using the flag. Note that the flag may be added as the connection condition. For example, a mode in which 2TS is switched to 1TS may be indicated by the connection condition "7", and a mode in which 1TS is switched to 2TS may be indicated by the connection condition "8".

The following gives details for supporting multi angle playback of 3D images.

<Stereoscopic Interleaved Stream File>

Described below is a data allocation of a recording area in which a streoscopic interleaved file constituting a multi angle is recorded.

Figure 83A:
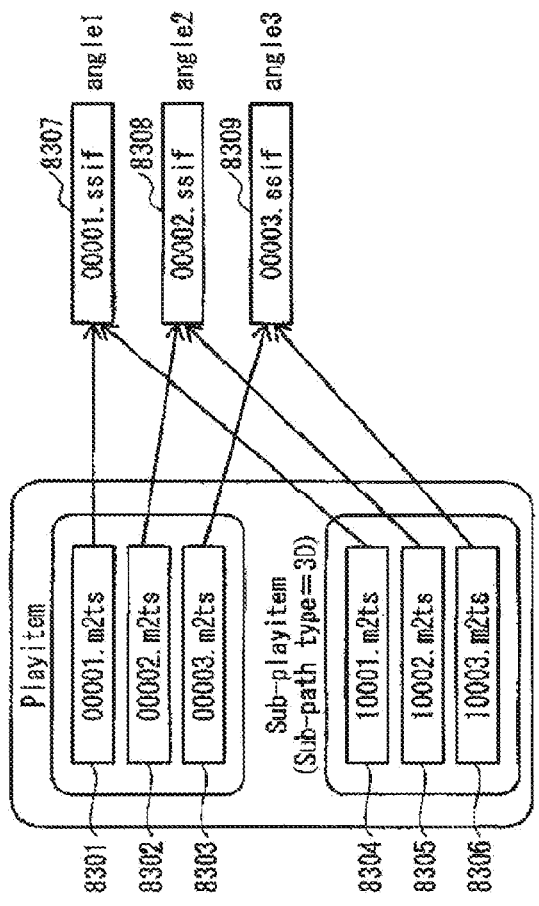
FIG. 83A shows stream files referred to by playitems and subplayitems of 3D playlist.

FIG. 83A shows stream files referred to by playitems and sub-playitems of a 3D playlist. The playitems and sub-playitems of the 3D playlist include a multi angle flag indicating constitution of a multi angle section. In the playitems and sub-playitems that constitute a multi angle section, the flag is set ON. FIG. 83A shows a 3D playlist that includes playitems and sub-playitems belonging to a multi angle section which can be played back by switching three angle images, i.e., a 3D image of angle number 1 (hereinafter, referred to as A1 image), a 3D image of angle number 2 (hereinafter, referred to as A2 image), and a 3D image of angle number 3 (hereinafter, referred to as A3 image).

The playitems of the multi angle section respectively have reference clip information 8301, reference clip information 8302, and reference clip information 8303 which correspond with stream files storing therein the base-view video streams of the angle images. The sub-playitems of the multi angle section, whose sub-path types indicate 3D, respectively have reference clip information 8304, reference clip information 8305, and reference clip information 8306 which correspond with stream files storing therein the dependent-view video streams of the angle images. In the present figure, in the frame of each reference clip information, the file name of the stream file corresponding to the reference clip information is shown.

The reference clip information 8301 and the reference clip information 8304 specify the base-view stream of the A1 image and the dependent-view stream, and accordingly, as described referring to FIGS. 40E and 51, the playback device can play back a first file SS (000001.ssif) 8307 storing therein the A1 image, using an extent start point of the clip information indicated by the reference clip information 8301 and the reference clip information 8304. The reference clip information 8302 and the reference clip information 8305 specify the base-view stream of the A2 image and the dependent-view stream, and accordingly, the playback device can play back a second file SS (000002.ssif) 8308 storing therein the A2 image, using an extent start point of the clip information indicated by the reference clip information 8302 and the reference clip information 8305. Furthermore, the reference clip information 8303 and the reference clip information 8306 specify the base-view stream of the A3 image and the dependent-view stream, and accordingly, the playback device can play back a third file SS (000003.ssif) 8309 storing therein the A3 image, using an extent start point of the clip information indicated by the reference clip information 8303 and the reference clip information 8306.

Figure 83B:
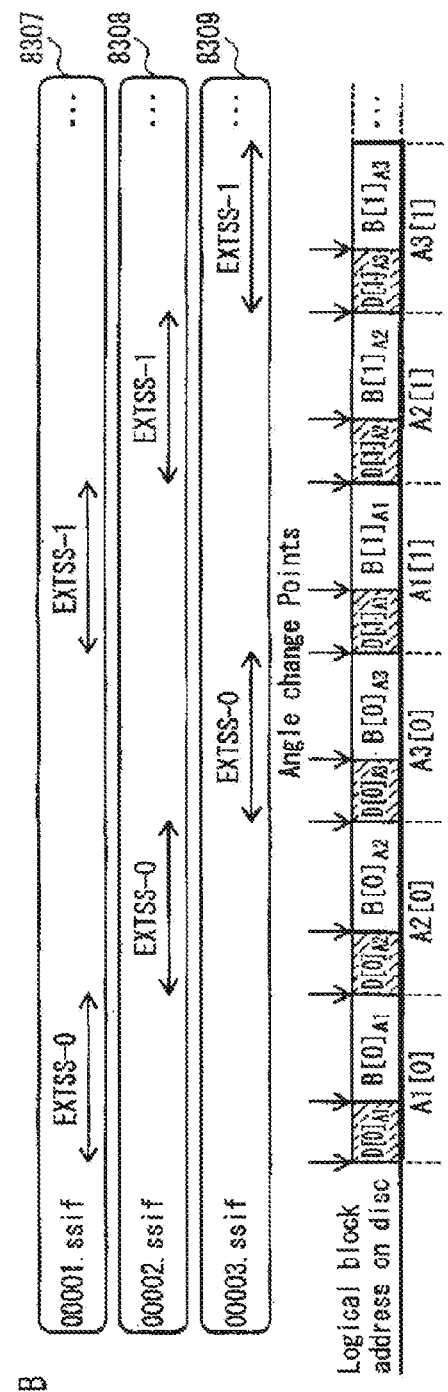
FIG. 83B shows data allocation of a recording area in which stream files of angle images are recorded.

FIG. 83B shows a physical data allocation of the first file SS 8307, the second file SS 8308, and the third file SS 8309 on the recording medium 100.

For each section for which is_angle_change is set ON, i.e. for each section which allows angle switching, in the entry map of the clip information indicated by the reference clip information 8301 and the reference clip information 8304, the dependent-view video stream and the base-view video stream of the first file SS 8307 are divided into dependent-view data block $D[0]_{A1}$, $D[1]_{A1}$, . . . , and base-view data block $B[0]_{A1}$, $B[1]_{A1}$, . . . , respectively. $D[n]_{A1}$ and $B[n]_{A1}$ constitute an "interleaved unit" $A1[n]$ (n=0, 1, . . . ) of the file SS 8307. The interleaved unit $A1[n]$ can be accessed as n-th extent of the first file SS 8307.

For each section for which is_angle_change is set ON, i.e. for each section which allows angle switching, in the entry map of the clip information indicated by the reference clip information 8302 and the reference clip information 8305, the dependent-view video stream and the base-view video stream of the second file SS 8308 are divided into dependent-view data block $D[0]_{A2}$, $D[1]_{A2}$, . . . , and base-view data block $B[0]_{A2}$, $B[1]_{A2}$, . . . , respectively. $D[n]_{A2}$ and $B[n]_{A2}$ constitute an "interleaved unit" $A2[n]$ (n=0, 1, . . . ) of the second file SS 8308. The interleaved unit $A2[n]$ can be accessed as n-th extent of the second file SS 8308.

For each section for which is_angle_change is set ON, i.e. for each section which allows angle switching, in the entry map of the clip information indicated by the reference clip information 8303 and the reference clip information 8306, the dependent-view video stream and the base-view video stream of the second file SS 8309 are divided into dependent-view data block $D[0]_{A3}$, $D[1]_{A3}$, . . . , and base-view data block $B[0]_{A3}$, $B[1]_{A3}$, . . . , respectively. $D[n]_{A1}$ and $B[n]_{A1}$ constitute an "interleaved unit" $A3[n]$ (n=0, 1, . . . ) of the third file SS 8309. The interleaved unit $A3[n]$ can be accessed as n-th extent of the third file SS 8309.

As shown in the lowest part of the figure, these interleaved unit group are contiguously recorded along the track on the recording medium. Furthermore, the interleaved unit of A1, i.e. A1[0], A1[1], . . . , the interleaved unit of A2, i.e. A2[0], A2[1], . . . , and the interleaved unit of A3, i.e. A3[0], A3[1], . . . , are alternately arranged in the order of the A1 image, A2 image and A3 image.

Figure 84:
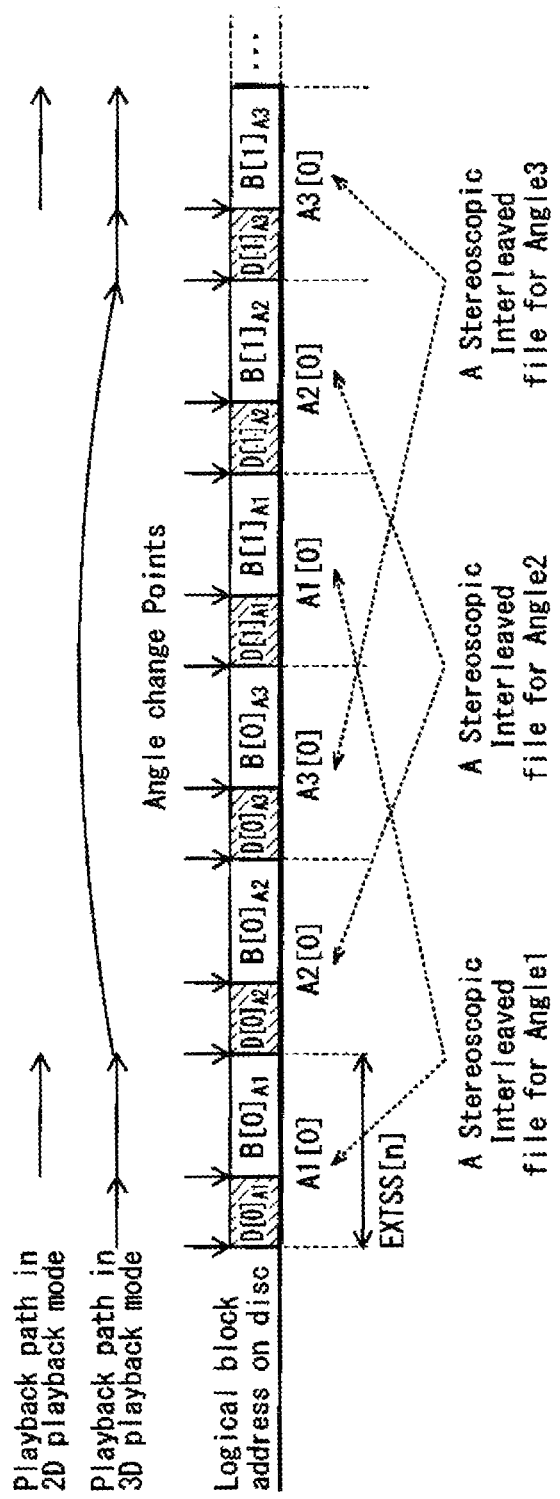
FIG. 84 shows a playback path when angle 1 is switched to angle 3.
Figures 85A, 85B:
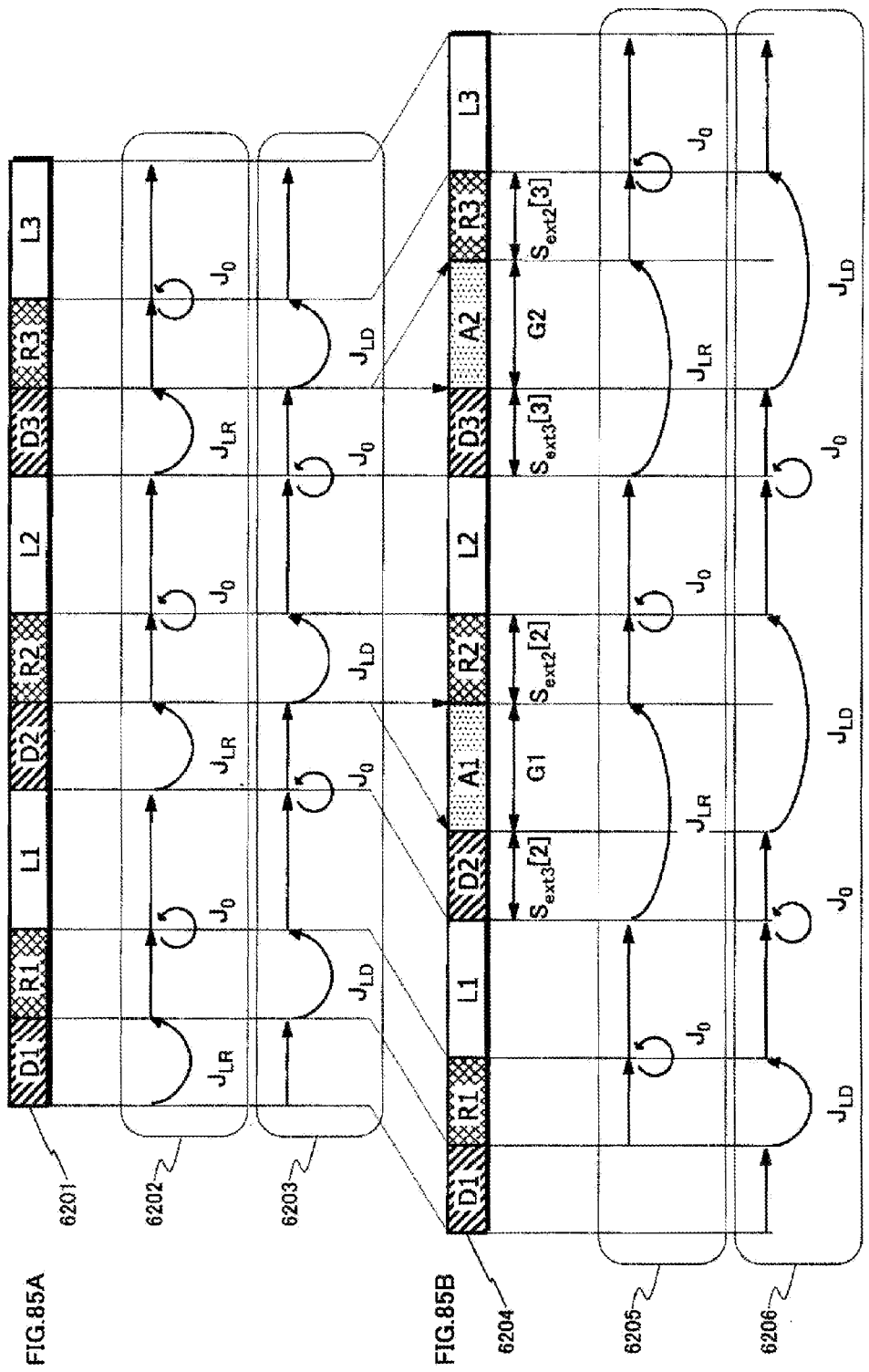
FIG. 85A is a schematic diagram showing, on a BD-ROM disc according to the first embodiment of the present invention, data blocks in an interleaved arrangement that includes only multiplexed stream data.
FIG. 85B is a schematic diagram showing data blocks in an interleaved arrangement that includes extents belonging to another file.

FIG. 84 explains playback paths in a storage area in which the first file SS 8307, the second file SS 8308, and the third file SS 8309 are arranged as shown in FIG. 83.

In the following, explanation is given on an example case in which the angle image for playback is switched from angle 1 to angle 3 in the multi angle section.

In 2D playback mode, first, the base-view data block $B[0]_{A1}$ constituting the first interleaved unit A1[0] of the first file SS 8307 is read as an image of angle number 1. Subsequently, during playback, the image is switched to angle number 3, causing a jump from the end of $B[0]_{A1}$ to the head of the base-view data block $B[1]_{A3}$ of the interleaved unit A3[1], in the third file SS 8309, where angle switching is possible, and $B[0]_{A1}$ is read.

In 3D playback mode, first, the dependent-view data block $D[0]_{A1}$ and the base-view data block $B[0]_{A1}$ constituting the first interleaved unit A1[0] of the first file SS 8307 are consecutively read as an image of angle number 1. Subsequently, during playback, the image is switched to angle number 3, causing a jump from the end of $B[0]_{A1}$ to the head of the dependent-view data block $D[1]_{A3}$ of the interleaved unit A3[1], in the third file SS 8309, where angle switching is possible, and the dependent-view data block $D[1]_{A3}$ and the subsequent base-view data block $B[0]_{A3}$ are read.

In the above-described manner, the base-view video stream and the dependent-view video stream of different angle images are read by the playback device in accordance with the setting of the angle number.

<Modifications>

(A) The first embodiment of the present invention pertains to the arrangement of extents when storing 3D video images on a recording medium. However, the present invention can also be used for storage of high frame rate video on a recording medium. Specifically, the high frame rate video can for example be divided into an odd-numbered frame group and an even-numbered frame group, which can be considered as a base-view video stream and a dependent-view video stream and recorded on a recording medium with the arrangement of extents as described in the first embodiment. A playback device that only supports video playback at a normal frame rate can play back video for the odd-numbered frame group from the recording medium. Conversely, a playback device that supports video playback at a high frame rate can choose to play back video for only the odd-numbered frame group or video for both frame groups. In this way, compatibility with a playback device that only supports video playback at a normal frame rate can be ensured on a recording medium on which high frame rate video is stored.

(B) In the first embodiment of the present invention, the base-view video stream represents the left-view, and the dependent-view video stream represents the right-view. Conversely, however, the base-view video stream may represent the right-view and the dependent-view video stream the left-view.

(C) The offset table 3041 shown in FIG. 39A includes a table 3210 of offset entries 3203 for each PID. The offset table may additionally include a table of offset entries for each plane. In this case, analysis of the offset table by the 3D playback device can be simplified. Furthermore, a lower limit, such as one second, may be placed on the length of the valid section of an offset entry in conjunction with the capabilities of the 3D playback device with regards to plane composition.

(D) The 3D playlist file shown in FIG. 48 includes one sub-path indicating the playback path of the sub-TS. Alternatively, the 3D playlist file may include sub-paths indicating playback paths for different sub-TSs. For example, the sub-path type of one sub-path may be "3D L/R", and the sub-path type of another sub-path may be "3D depth". When 3D video images are played back in accordance with this 3D playlist file, the playback device 102 can easily switch between L/R mode and depth mode by switching the sub-path for playback between these two types of sub-paths. In particular, this switching processing can be performed faster than switching the 3D playlist file itself.

The 3D playlist file may include multiple sub-paths of the same sub-path type. For example, when 3D video images for the same scene are represented with different binocular parallaxes by using multiple right-views that share the same left-view, a different file DEP is recorded on the BD-ROM disc 101 for each different right-view video stream. The 3D playlist file then contains multiple sub-paths with a sub-path type of "3D L/R". These sub-paths individually specify the playback path for the different files DEP. Additionally, one file 2D may include two or more types of depth map stream. In this case, the 3D playlist file includes multiple sub-paths with a sub-path type of "3D depth". These sub-paths individually specify the playback path for the files DEP that include the depth map streams. When 3D video images are played back in accordance with such a 3D playlist file, the sub-path for playback can quickly be switched, for example in accordance with user operation, and thus the binocular parallax for 3D video images can be changed without substantial delay. In this way, users can easily be allowed to select a desired binocular parallax for 3D video images.

(E) In order to accurately calculate the extent ATC time when evaluating the mean transfer rate $R_{ext}$ of data from the read buffer to the system target decoder, the size of each extent can be regulated as a fixed multiple of the source packet length. Furthermore, when a particular extent includes more source packets than this multiple, the sum of (i) the product of the number of source packets exceeding the multiple and the transfer time per source packet (=188×8/system rate) and (ii) the extent ATC time corresponding to the multiple can be considered to be the extent ATC time for the particular extent. Additionally, the extent ATC time can be defined as the sum of (iii) the value of the time interval from the ATS of the top source packet in an extent until the ATS of the last source packet in the same extent and (iv) the transfer time per source packet. In this case, reference to the next extent is unnecessary for calculation of the extent ATC time, and thus the calculation can be simplified. Note that in the above-described calculation of extent ATC time, the occurrence of wraparound in the ATS needs to be taken into consideration.

(F) Among data block groups in an interleaved arrangement, extents that belong to a different file, for example a BD-J object file, may be recorded. FIG. 86A is a schematic diagram showing data blocks in an interleaved arrangement that includes only multiplexed stream data. FIG. 86B is a schematic diagram showing data blocks in an interleaved arrangement that includes extents belonging to another file.

As shown in FIG. 86A, the data block group 6201 includes depth map data blocks D1, D2, and D3, right-view data blocks R1, R2, and R3, and base-view data blocks L1, L2, and L3 in an alternating arrangement. In the playback path 6202 in L/R mode, pairs of adjacent right-view and left-view data blocks R1+L1, R2+L2, and R3+L3 are read in order. In each pair, a zero sector transition $J_0$ occurs between the right-view data block and the base-view data block. Furthermore, reading of each depth map data block D1, D2, and D3 is skipped by a jump $J_{LR}$. In the playback path 6203 in depth mode, depth map data blocks D1, D2, and D3 and base-view data blocks L1, L2, and L3 are alternately read. A zero sector transition jump $J_0$ occurs between adjacent base-view data blocks and depth map data blocks. Furthermore, reading of each right-view data block R1, R2, and R3 is skipped by a jump $J_{LD}$.

On the other hand, as shown in FIG. 86B, extents A1 and A2 belonging to a different file are inserted among the data block group 6204, which is the same as in FIG. 86A. This "different file" may be, for example, a movie object file, BD-J object file, or JAR file. These extents A1 and A2 are both inserted between a depth map data block and right-view data block that are adjacent in FIG. 86A. In this case, in the playback path 6205 in L/R mode, the distance of the jump $J_{LR}$ is longer than in the playback path 6202 shown in FIG. 86A. However, the zero sector transition jump $J_0$ need not be changed into a regular jump, which is not the case if the extents A1 and A2 are inserted next to a base-view data block. The same is true for the playback path 6206 in depth mode. As is clear from FIG. 64, the maximum jump time generally increases more when changing a zero sector transition to a regular jump than when changing the jump distance. Accordingly, as is clear from expressions 2-5, the minimum extent size generally increases more when changing a zero sector transition to a regular jump than when changing the jump distance. Therefore, when inserting extents A1 and A2 into the data block group 6201, which has an interleaved arrangement, the extents A1 and A2 are inserted between depth map data blocks and right-view data blocks, as shown in FIG. 86B. The increase in minimum extent size caused by this insertion is thereby suppressed, making it possible to avoid increasing the minimum capacity of the read buffers.

Furthermore, in the arrangement shown in FIG. 86B, the sizes in sectors G1 and G2 of the extents A1 and A2 may be restricted to be equal to or less than the maximum jump distance MAX_EXTJUMP3D: $G1 \leq$ MAX_EXTJUMP3D and $G2 \leq$ MAX_EXTJUMP3D. This maximum jump distance MAX_EXTJUMP3D represents, in sectors, the maximum jump distance among the jumps $J_{LR}$ and $J_{LD}$ occurring within the data block group 6204. With this restriction, the maximum jump time that is to be substituted in the right-hand side of expressions 2-5 does not easily increase, and thus the minimum extent size does not easily increase. Accordingly, it is possible to avoid an increase in the minimum capacity of the read buffers due to insertion of the extents A1 and A2.

Additionally, the sums of (i) the sizes G1 and G2 of the extents A1 and A2 and (ii) the sizes $S_{ext3}[2]$, $S_{ext2}[2]$, $S_{ext3}[3]$, and $S_{ext2}[3]$ of the dependent-view data blocks D2, R2, D3, and R3 adjacent to the extents A1 and A2 may be restricted to be equal to or less than the maximum jump distance MAX_EXTJUMP3D.

$$\text{CEIL}(S_{ext3}[2]/2{,}048) + G1 \leq \text{MAX\_EXTJUMP3}D,$$

$$\text{CEIL}(S_{ext2}[2]/2{,}048) + G1 \leq \text{MAX\_EXTJUMP3}D,$$

$$\text{CEIL}(S_{ext3}[3]/2{,}048) + G2 \leq \text{MAX\_EXTJUMP3}D,$$

$$\text{CEIL}(S_{ext2}[3]/2{,}048) + G2 \leq \text{MAX\_EXTJUMP3}D.$$

In these expressions, the size in bytes of a dependent-view data block is divided by 2,048, the number of bytes per sector, to change the units of the size from bytes to sectors. As long as these conditions are met, the maximum jump time to be inserted into the right-hand side of expressions 2-5 does not exceed a fixed value. For example, if the maximum jump distance MAX_EXTJUMP3D is fixed at 40,000 sectors, then the maximum jump time from FIG. 64 does not exceed 350 ms. Accordingly, the minimum extent size does not exceed a fixed value. It is thus possible to reliably avoid an increase in the minimum capacity of the read buffers due to insertion of the extents A1 and A2.

Apart from the above restrictions, the sums of (i) the sizes G1 and G2 of the extents A1 and A2 and (ii) the sizes $S_{ext3}[2]$, $S_{ext2}[2]$, $S_{ext3}[3]$, and $S_{ext2}[3]$ of the dependent-view data blocks D2, R2, D3, and R3 adjacent to the extents A1 and A2 may be further restricted to be equal to or less than the maximum jump distance MAX_JUMP(•) corresponding to the size of each dependent-view data block.

$$\text{CEIL}(S_{ext3}[2]/2{,}048) + G1 \leq \text{MAX\_JUMP}(S_{ext3}[2])$$

$$\text{CEIL}(S_{ext2}[2]/2{,}048)+G1 \leq \text{MAX\_JUMP}(S_{ext2}[2])$$

$$\text{CEIL}(S_{ext3}[3]/2{,}048)+G2 \leq \text{MAX\_JUMP}(S_{ext3}[3])$$

$$\text{CEIL}(S_{ext2}[3]/2{,}048)+G2 \leq \text{MAX\_JUMP}(S_{ext2}[3]).$$

When the size of the dependent-view data block is expressed in sectors and the corresponding maximum jump time obtained from the table in FIG. 64, the maximum jump distance MAX_JUMP(•) refers to the maximum value of the range of sectors to which the maximum jump time corresponds. For example, if the size of the dependent-view data block is 5,000 sectors, then the maximum jump time in the table in FIG. 64 for 5,000 sectors is 250 ms, which corresponds to a range of 1-10,000 sectors. Accordingly, the maximum jump distance MAX_JUMP (5,000×2,048 bytes) is the maximum value in this range, i.e. 10,000 sectors. As long as the above conditions are met, the maximum jump time to be inserted into the right-hand side of expressions 2-5 does not change, and thus the minimum extent size does not change. Accordingly, it is possible to reliably avoid an increase in the minimum capacity of the read buffers due to insertion of the extents A1 and A2.

(File Arrangement for Inserting Files Different from an AV Stream Between Interleaved Extents)

Next, a detailed description is given of a preferable arrangement of extents for inserting files different from an AV stream (such as BD program files) between interleaved extents.

Figure 87:
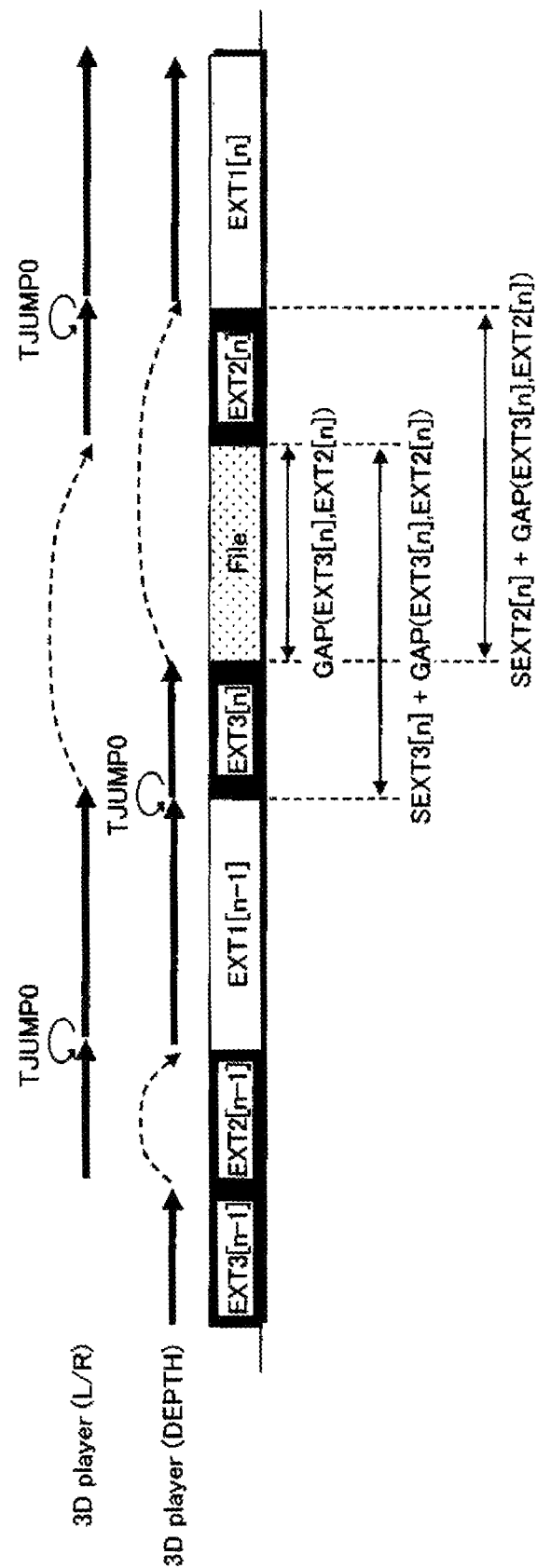
FIG. 87 shows size conditions for inserting a different file between interleaved extents of an AV stream.

The upper level of FIG. 87 shows the case where extents of an AV stream are continuously arranged. In the case of a playback path for the L/R mode of the 2D/3D playback apparatus, EXT2 [n] and EXT1[n] are continuous, and thus the time for moving between these extents is the jump time of when the jump distance is 0 sector (Tjump0). In the case of a playback path for the depth mode of the 2D/3D playback apparatus, EXT1[n] and EXT3[n+1] are continuous, and thus the time for moving between these extents is the jump time of when the jump distance is 0 sector (Tjump0). As explained above, during the Tjump0, the drive can continuously read extents at a high speed. Thus the Tjump0 is shorter than other jump times, as shown in FIG. 64.

However, in some cases, a file different from an AV stream (such as a BD program file) may be arranged in the section where extents of the AV stream are arranged. In such cases, it is impossible to arrange all the extents continuously, unlike the case shown in the upper level of FIG. 87. A file different from an AV stream is inserted between extents.

As shown in the middle level of FIG. 87, when a file different from an AV stream is arranged between EXT1[n] and EXT3[n+1], EXT1[n] and EXT3[n+1] are not continuous, though EXT2[n] and EXT1[n] are continuous. If this is the case, in the playback path for the L/R mode of the 2D/3D playback apparatus, the jumping between EXT2[n] and EXT1[n] can be performed in Tjump0 because they are continuous. However, in the playback path for the depth mode of the 2D/3D playback apparatus, there is no section in which extents are continuous (Tjump0). Thus, it requires a longer jump time than the playback path for the L/R mode.

Here, the minimum extent size of SEXT1[n] for seamless playback by the 2D/3D playback apparatus needs to satisfy Expressions (2) and (4). Similarly, the minimum extent size of SEXT2[n] needs to satisfy Expression (3), and that of SEXT3 [n] needs to satisfy Expression (5). In the arrangement shown in the middle level of FIG. 87, the value of the Tjump0 in Expressions (4) and (5) is large, and accordingly the minimum extent size of SEXT1[n] and SEXT3[n] is large.

Since the extent size is large, the buffer size required for the 2D/3D playback apparatus is large, as Expressions (10) to (12) indicate.

In view of this, when files different from an AV stream are inserted between extents of the AV stream, each file is inserted between EXT3[n] and EXT2[n] (EXT2[n], EXT1[n] and EXT3[n+1] are arranged continuously). With such an arrangement, the playback path for the L/R mode of the 2D/3D playback apparatus enables the drive to move from one extent to another in Tjump0 because EXT2[n] and EXT1[n] are continuous. Also, the playback path for the depth mode of the 2D/3D playback apparatus enables the drive to move from one extent to another in Tjump0 because EXT1[n] and EXT3[n+1] are continuous. Thus the value of the Tjump0 in Expressions (2), (3), (4) and (5) can be reduced, and accordingly the minimum extent size can be smaller than that in the arrangement shown in the middle level of FIG. 87.

Note that when a file different from an AV stream is inserted between EXT3[n] and EXT2[n], the size of such a file may be limited as follows.

$$GAP(\text{EXT3}[n], \text{EXT2}[n]) \leq \text{MAX\_EXTJUMP3}D \qquad (73)$$

$$GAP(\text{EXT3}[n], \text{EXT2}[n]) \leq \text{MAX\_EXTJUMP3}D \qquad (74)$$

Figure 88:
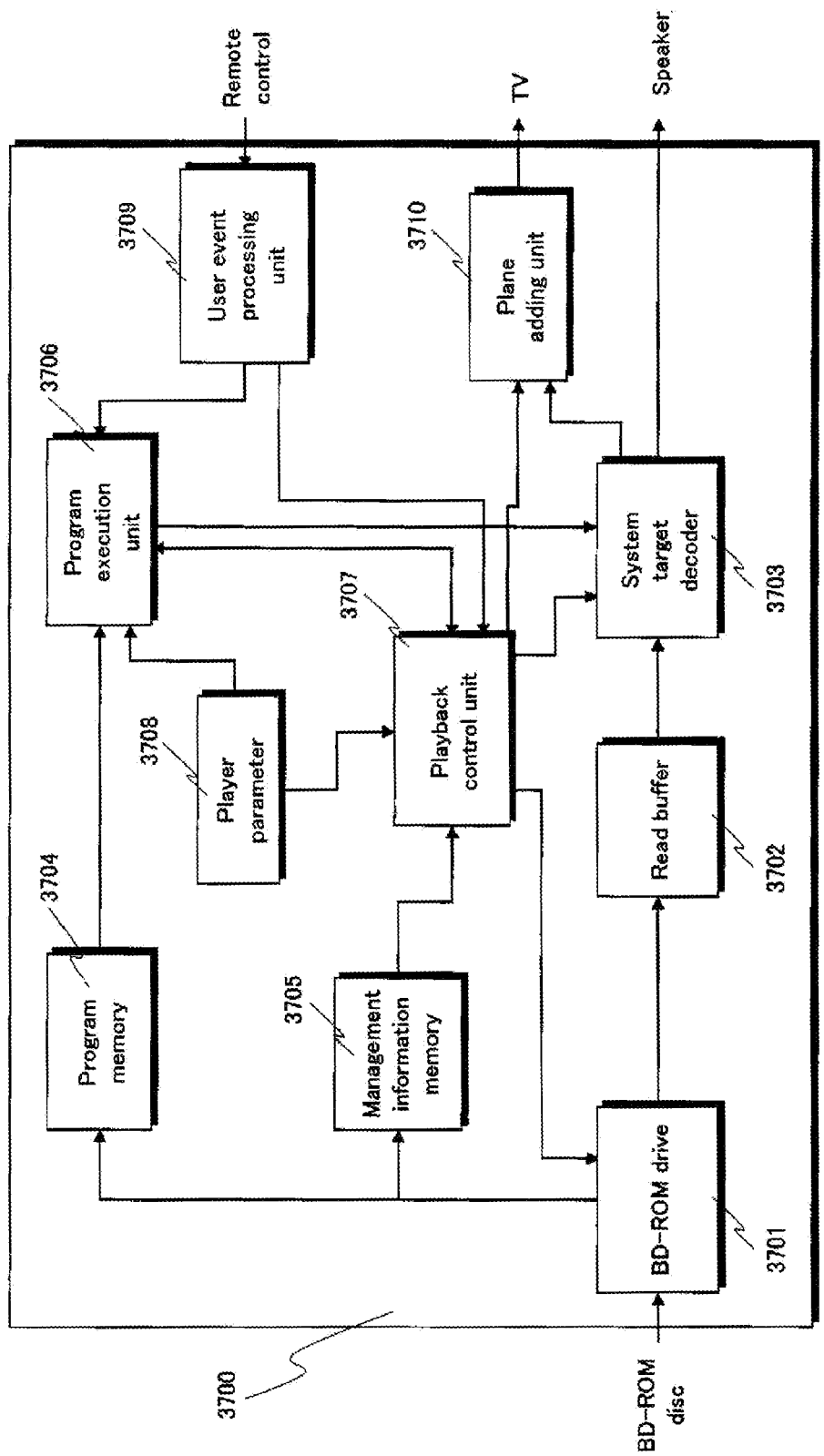
FIG. 88 shows a structure of the 2D/3D playback device when using one read buffer.

As shown in FIG. 88, an interval between the end of EXT3 [n] and the head of EXT2[n] is denoted as GAP(EXT3[n], EXT2[n]) (unit: blocks). MAX_EXTJUMP3D (unit: blocks) indicates the maximum jump distance in the interleaved extent section. Such limitations prevent an extent size from becoming too large due to excessive increase of the value of Tjump in Expressions (2), (3), (4) and (5) resulting from excessive increase of the interval between EXT3[n] and EXT2[n].

Note that when a file different from an AV stream is inserted between EXT3[n] and EXT2[n], the size of the file may be limited as follows.

$$\text{CEIL}(SEXT3[n]/2048)+GAP(\text{EXT3}[n], \text{EXT2}[n]) \leq \\ \text{MAX\_EXTJUMP3}D \qquad (75)$$

$$\text{CEIL}(SEXT2[n]/2048)+GAP(\text{EXT3}[n], \text{EXT2}[n]) \leq \\ \text{MAX\_EXTJUMP3}D \qquad (76)$$

As shown in FIG. 88, an interval between the end of EXT3 [n] and the head of EXT2[n] is denoted as GAP(EXT3[n], EXT2[n]) (unit: blocks). MAX_EXTJUMP3D (unit: blocks) indicates the maximum jump distance in the interleaved extent section. Such limitations more effectively limit the minimum extent size compared to Expressions (73) and (74). According to Expressions (73) and (74), when MAX_EXTJUMP3D is 10000 blocks for example, the jump distance between extents might exceed 10000 depending on the values of SEXT3[n] and SEXT2[n]. This increases the value of Tjump to, for example, 250 ms in the example shown in FIG. 64. On the other hand, Expressions (75) and (76) fix the maximum jump distance between extents. When MAX_EXTJUMP3D is 10000 blocks for example, the value of Tjump does not exceed a fixed value (in FIG. 64, Tjump does not exceed 250 ms).

Note that when a file different from an AV stream is inserted between EXT3[n] and EXT2[n], the size of the file may be limited as follows.

$$\text{CEIL}(SEXT3[n]/2048)+GAP(\text{EXT3}[n], \text{EXT2}[n]) \leq \\ \text{MAX\_JUMP}(SEXT3[n]) \qquad (77)$$

$$\text{CEIL}(SEXT2[n]/2048)+GAP(\text{EXT3}[n], \text{EXT2}[n]) \leq \\ AX\_\text{JUMP}(SEXT2[n]) \qquad (78)$$

As shown in FIG. 88, an interval between the end of EXT3 [n] and the head of EXT2[n] is denoted as GAP(EXT3[n], EXT2[n]) (unit: blocks). MAX_JUMP (SEXT3[n]) (unit: blocks) indicates the maximum jump distance (unit: blocks) that can be reached in a time required for jumping of SEXT3 [n]. MAX_JUMP (SEXT2[n]) (unit: blocks) indicates the maximum jump distance (unit: blocks) that can be reached in a time required for jumping of SEXT2 [n]. For example, when SEXT3 [n] is 5000×2048 (Byte), the time for jumping over this extent is 250 ms as shown in FIG. 64. According to the table shown in FIG. 64, MAX_JUMP (SEXT3[n]) for 250 ms is 10000 blocks. Such limitations with Expressions (77) and (78) more effectively limit the minimum extent size than those with Expressions (75) and (76), because the value of Tjump in Expressions (2), (3), (4) and (5) does not change even if the interval between EXT3[n] and EXT2[n] changes.

Note that, as for extents of an AV stream arranged in an interleaved manner, the sizes of the EXT3[n] and EXT2[n] may be limited as follows so that a gap between interleaved extents is not allowed.

$$\text{CEIL}(SEXT3[n]/2048) \leq \text{MAX\_EXTJUMP3}D \quad (79)$$

$$\text{CEIL}(SEXT2[n]/2048) \leq \text{MAX\_EXTJUMP3}D \quad (80)$$

As shown in FIG. 88, MAX_EXTJUMP3D (unit: blocks) indicates the maximum jump distance in the interleaved extent section. Such limitations can fix the maximum jump distance between extents. For example, when MAX_EXTJUMP3D is 10000 blocks, the value of Tjump does not exceed a predetermined fixed value (in FIG. 64, Tjump does not exceed 250 ms).

Second Embodiment

In the first embodiment, as shown in FIG. 54, data is input to the system target decoder by using two buffers, i.e., the first read buffer 4921 and the second read buffer 4922. However, in the second embodiment, a structure that realizes 3D video playback by using only one buffer will be explained.

Figure 89:
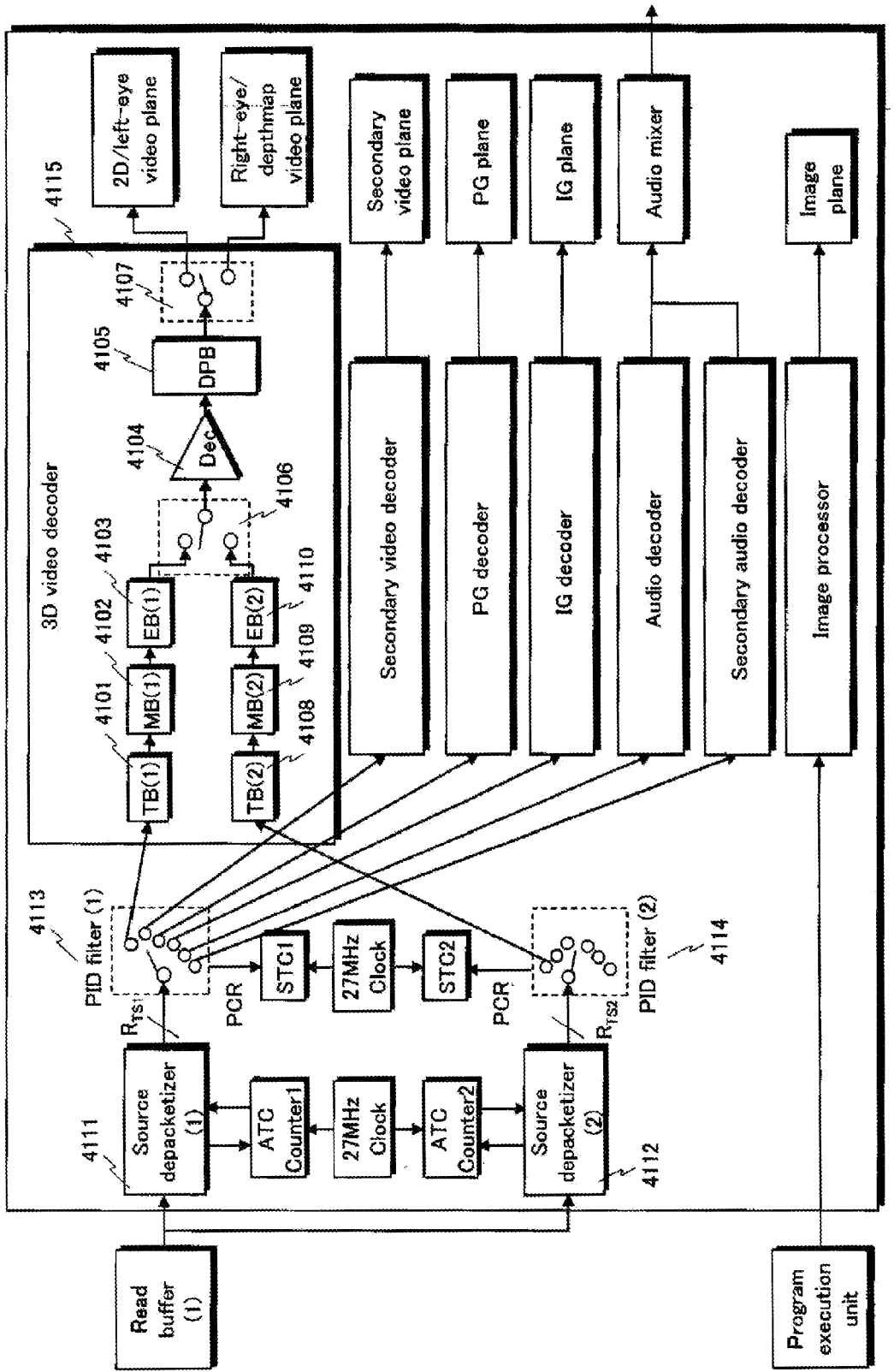
FIG. 89 shows a structure of the system target decoder when using one read buffer.
Figure 90:
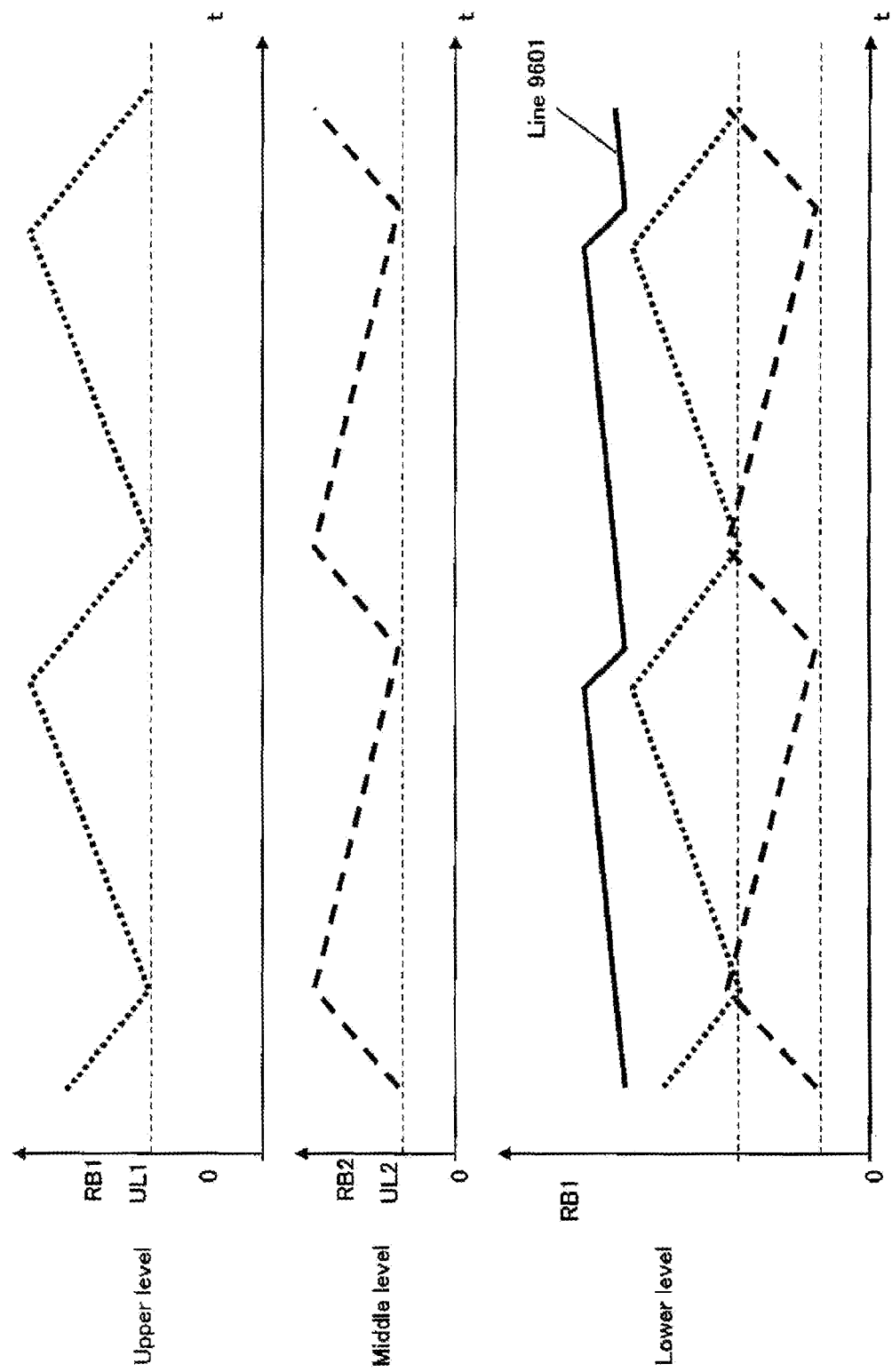
FIG. 90 shows a transition of data amounts accumulated in the first read buffer 4921 and the second read buffer 4922, and a transition of data amounts accumulated in the read buffer when using one read buffer.

Specifically, as shown in FIG. 89, data is input to the system target decoder 3703 from only the read buffer 3707, and, as shown in FIG. 90, the data may be input to the source depacketizer (1) 4111 and the source depacktizer (2) 4112 from the read buffer 3707.

This structure can cause a size of the read buffer required for the 2D/3D playback apparatus to play back 3D images to be reduced.

Figure 91:
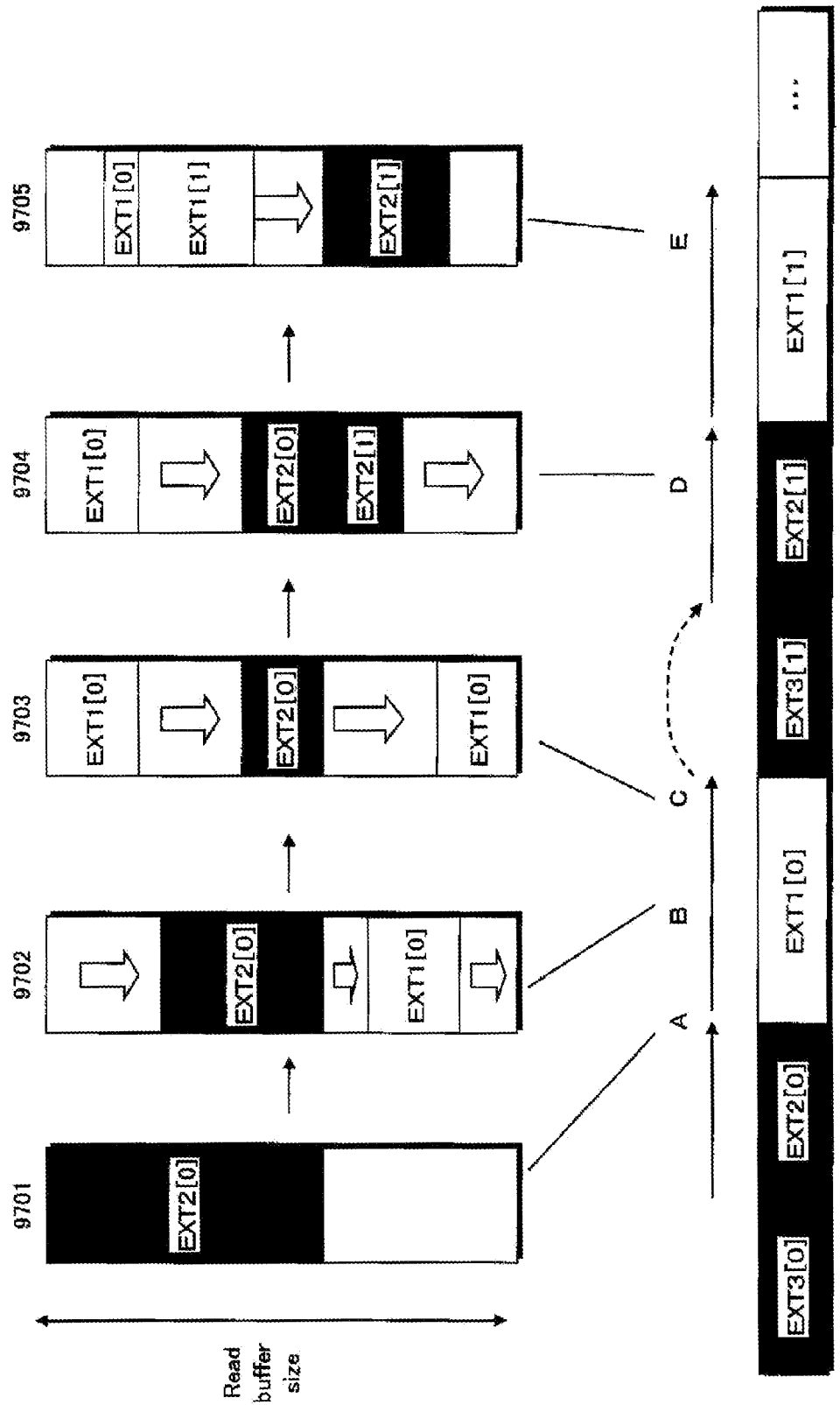
FIG. 91 schematically shows a transition of data amounts accumulated in the first read buffer 4921 when using one read buffer.

The upper level of FIG. 91 shows a transition of data amounts of data accumulated in the first read buffer 4921 during 3D playback when using two buffers, i.e., the first read buffer 4921 and the second read buffer 4922.

The middle level of FIG. 91 shows a transition of data amounts of data accumulated in the second read buffer 4922 during 3D playback when using two buffers, i.e., the first read buffer 4921 and the second read buffer 4922.

A peak of the data amount of data accumulated in the first read buffer 4921 in the upper level of FIG. 91 and a peak of the data amount of data accumulated in the second read buffer 4922 in the middle level of FIG. 91 do not coincide with each other. Therefore, when inputting EXT1[n] and EXT2 [n] (or EXT3 [n]) to the first read buffer 4921, a buffer size can be reduced, as shown by a line 9601 in the lower level of FIG. 91, compared with a case where two read buffers are used.

Figure 92:
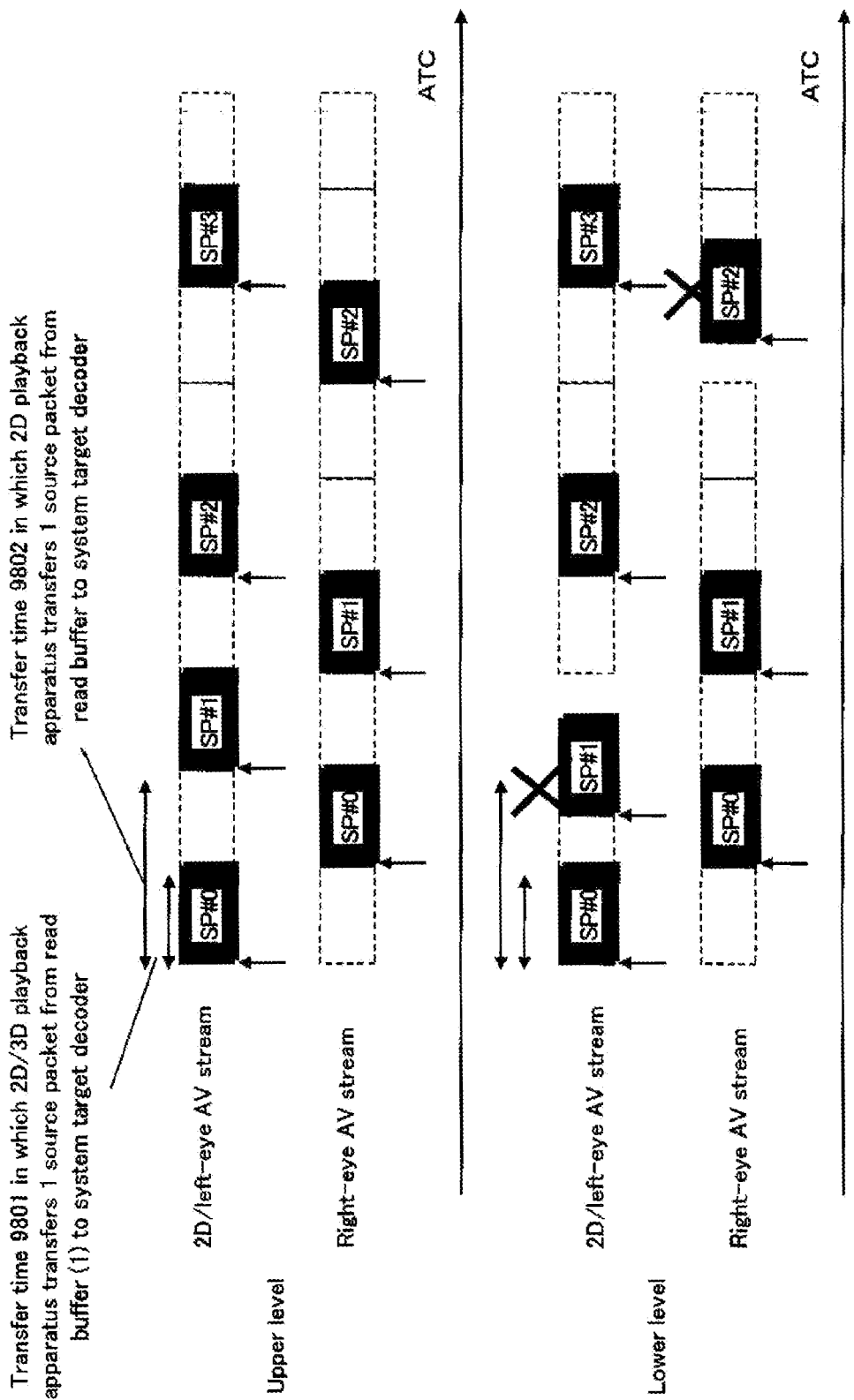
FIG. 92 shows a structure of ATS provided to a source packet in an AV stream when using one read buffer.

In this case, a total system rate of AV streams input to the first read buffer 4921×192/188 is required as a transfer rate from the first read buffer 4921. The upper level of FIG. 92 schematically shows a transition of data amounts of data accumulated in the first read buffer 4921 when using one read buffer. The upper level of FIG. 92 shows the transition of data amount when playing back 3D images in L/R mode. Also, each box represents the first read buffer 4921. 9701 shows data accumulated in the read buffer (1) 3707 at a time when EXT2[0], which is a head extent of a 3D extent block shown in the lower level of FIG. 92, has been read (at A). At a time when the head EXT2[0] is read, data is not transferred to the system target decoder 3703. Thus data of EXT2[0] is accumulated in the buffer. 9702 shows data accumulated in the read buffer (1) 3707 at a time when EXT1[0] is being read (at B). When data is started to be transferred to the system target decoder 3703, the data of EXT2[0] accumulated in the read buffer (1) 3707 is reduced as the data is transferred to the system target decoder 3703. At the same time, data of EXT1 [0] is accumulated in the read buffer (1) 3707, but simultaneously reduced as the data is transferred to the system target decoder 3703. 9703 shows data accumulated in the read buffer (1) 3707 at a time when EXT1[0] has been read (at C). 9704 shows data accumulated in the read buffer (1) 3707 at a time when EXT2[1] is being read (at D). The data of EXT1[0] accumulated in the read buffer (1) 3707 is reduced as the data is transferred to the system target decoder 3703. At the same time, data of EXT2[1] is accumulated in the read buffer (1) 3707, but simultaneously reduced as the data is transferred to the system target decoder 3703. In this way, the present invention can be realized by one buffer, i.e., the read buffer (1) 3707.

Here, data is transferred to the system target decoder 3703 at a timing shown by the ATS provided to a source packet as described above. When two AV streams are input to the first read buffer 4921 and the same ATS is provided to each source packet written in each of the two AV streams, these source packets cannot be transferred from the first read buffer 4921 to the system target decoder 3703 at the same timing. That is to say, data cannot be transferred to the system target decoder 3703 at the timing shown by the ATS. The following describes an example where there are a source packet in the 2D/left-eye AV stream to which ATS=100 is provided and a source packet in the file DEP stream to which ATS=100 is provided. When the source packet in the 2D/left-eye AV stream to which ATS=100 is provided is transferred first, the source packet in the file DEP stream to which ATS=100 is provided is transferred to a source depacketizer (2) 4112 in the system target decoder after transfer time of 1 source packet has passed since a time shown by ATS. This can cause a buffer underflow in a decoding process by the system target decoder 3703.

Figure 93:
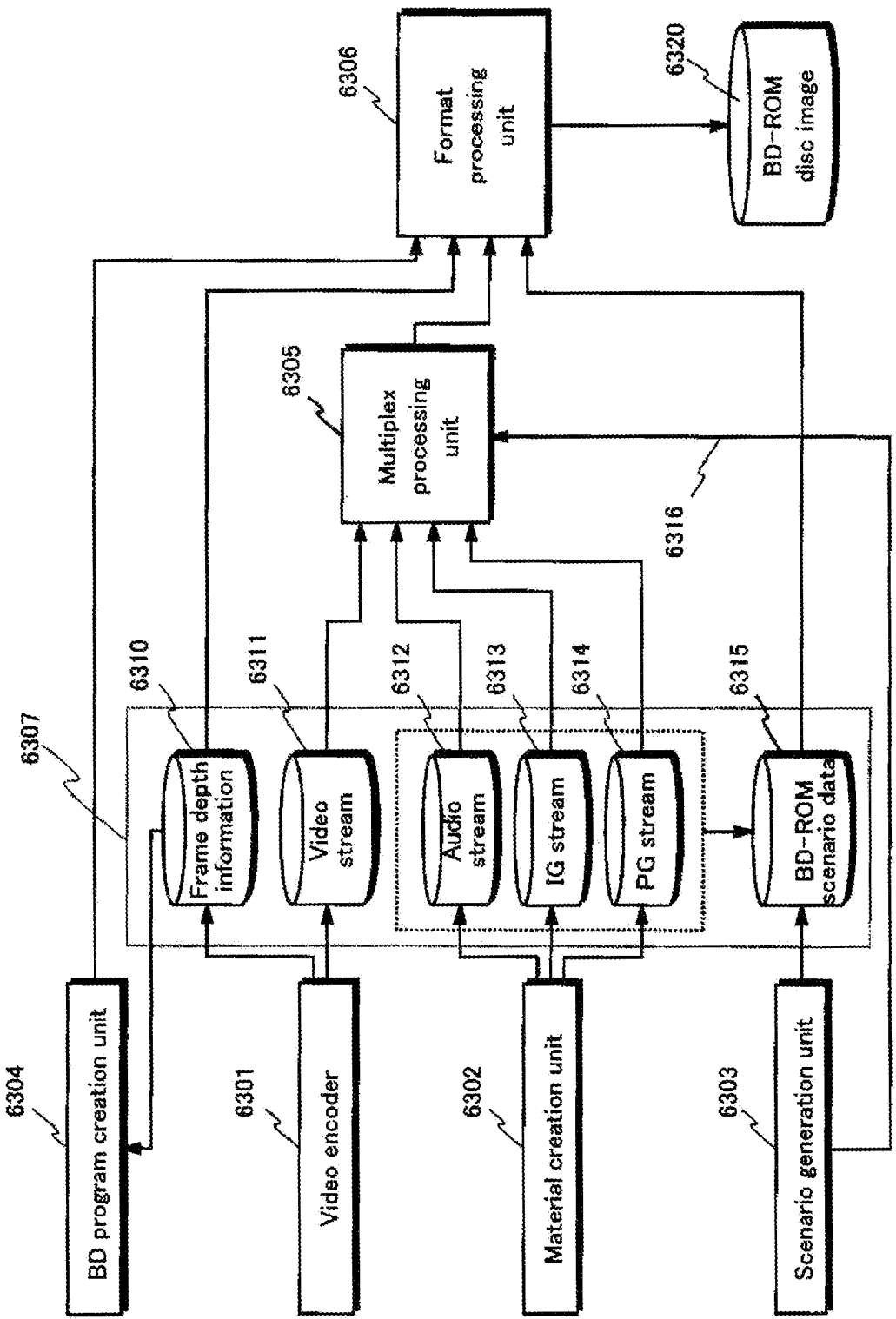
FIG. 93 is a block diagram showing an inner structure of a recording device pertaining to a third embodiment of the present invention.

In order to solve the problem, ATS provided to a source packet in an AV stream is set as shown in the upper level of FIG. 93. The upper level of FIG. 93 shows source packet strings in the 2D/left-eye AV stream and the file DEP stream, and source packets are arranged in an ATC time. SP#N denotes each source packet, and the suffix N is incremented, where a head source packet in an AV stream is 0. And an arrow provided to the head of each source packet shows an ATS timing. A size of box of each source packet shows a transfer time (hereinafter, referred to as "3D source packet transfer time 9801") in which the 2D/3D playback apparatus transfers each source packet to the system target decoder. An arrow 9801 shows a transfer time in which the 2D/3D playback apparatus transfers one source packet from the read buffer (1) 3707 to the system target decoder, and an arrow 9802 shows a transfer time (hereinafter, referred to as "2D source packet transfer time 9802") in which the 2D playback apparatus transfers one source packet from the read buffer to the system target decoder.

As shown in the upper level of FIG. 93, intervals between ATSs provided to adjacent source packets in the 2D/left-eye AV stream have to be equal to or larger than the 2D source packet transfer time 9802, otherwise the 2D playback apparatus fails to transfer data to the system target decoder in time. An example shown in the lower level of FIG. 93 is inappropriate, because an interval between ATSs of SP#0 and SP#1 in the 2D/left-eye AV stream is smaller than a transfer time in which the 2D playback apparatus transfers one source packet from the read buffer to the system target decoder. Also, (i) an interval between ATS provided to a source packet in the file DEP stream and an ATC time obtained by adding the 3D source packet transfer time 9801 to the ATS cannot overlap with (ii) an interval between ATS provided to a source packet in the 2D/left-eye AV stream and an ATC time obtained by adding the 3D source packet transfer time 9801 to the ATS. The example shown in the lower level of FIG. 93 is inappropriate, because SP#2 in the file DEP stream overlaps with SP#3 in the 2D/left-eye AV stream.

By constituting AV streams within such limitation, it becomes possible to prevent two source packets each provided with the same ATS from being input to one read buffer, i.e. the read buffer (1) 3707 here.

Third Embodiment

The following describes, as the second embodiment of the present invention, a recording device and a recording method for recording the recording medium of the first embodiment of the present invention.

The recording device described here is called an authoring device. The authoring device, generally located at a creation studio that creates movie contents to be distributed, is used by authoring staff. First, in accordance with operations by the authoring staff, the recording apparatus converts movie content into a digital stream that is compression encoded in accordance with an MPEG specification, i.e. into an AV stream file. Next, the recording device generates a scenario, which is information defining how each title included in the movie content is to be played back. Specifically, the scenario includes the above-described dynamic scenario information and static scenario information. Then, the recording device generates a volume image or an update kit for a BD-ROM disc from the aforementioned digital stream and scenario.

Lastly, the recording device records the volume image on the recording medium in accordance with the arrangements of extents explained in the first embodiment.

FIG. 93 is a block diagram showing the internal structure of the above-described recording device. As shown in FIG. 93, the recording device includes a video encoder 6301, material creation unit 6302, scenario generation unit 6303, BD program creation unit 6304, multiplex processing unit 6305, format processing unit 6306, and database unit 6307.

The database unit 6307 is a nonvolatile storage device embedded in the recording device and is in particular a hard disk drive (HDD). Alternatively, the database unit 6307 may be an external HDD connected to the recording device, a nonvolatile semiconductor memory device embedded in the recording device, or an external nonvolatile semiconductor memory device connected to the recording device.

The video encoder 6301 receives video data, such as uncompressed bitmap data, from the authoring staff, and compresses the received video data in accordance with a compression/encoding scheme such as MPEG-4 AVC or MPEG-2. This process converts primary video data into a primary video stream and secondary video data into a secondary video stream. In particular, 3D video image data is converted into a base-view video stream and a dependent-view video stream. The video encoder 6301 converts the left-view video stream into a base-view video stream by performing inter-picture predictive encoding with the pictures in the left-view video stream. On the other hand, the video encoder 6301 converts the right-view video stream into a dependent-view video stream by performing inter-picture predictive encoding with not only the pictures in the right-view video stream but also the pictures in the base-view video stream. Note that the right-view video stream may be converted into a base-view video stream. Furthermore, the left-view video stream may be converted into the dependent-view video stream. The converted video streams 6311 are stored in the database unit 6307.

During the above-described process of inter-picture predictive encoding, the video encoder 6301 further detects motion vectors between left video images and right video images and calculates depth information of each 3D video image based on the detected motion vectors. The calculated depth information of each 3D video image is organized into the frame depth information 6310 that is stored in the database unit 6307.

Figure 94:
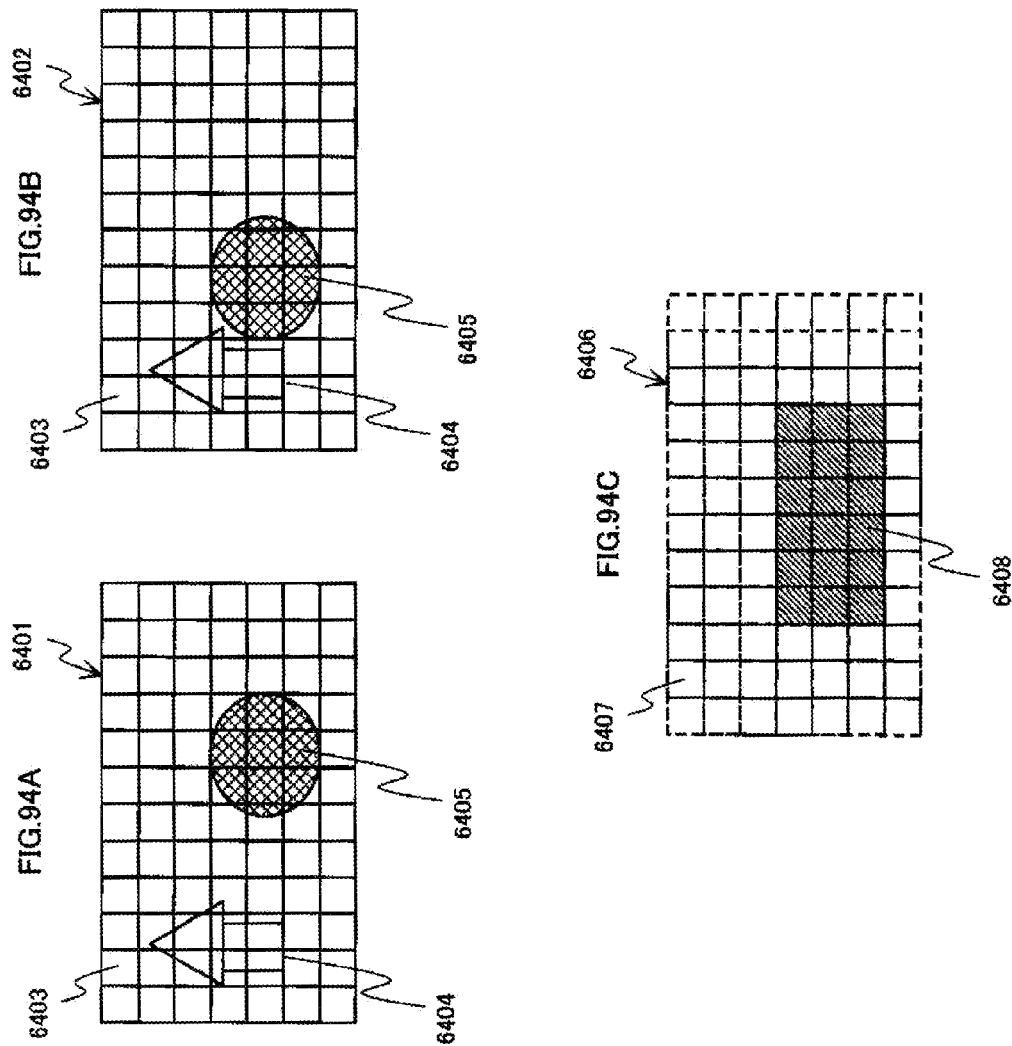
FIGS. 94A and 94B are schematic diagrams showing a left-video image picture and a right-video image picture used in display of one scene in a 3D video image in a recording device according to the third embodiment of the present invention.
FIG. 94C is a schematic diagram showing depth information calculated from these pictures by a video encoder 6301.

FIGS. 94A and 94B are schematic diagrams showing a left-video image picture and a right-video image picture used in display of one scene in a 3D video image, and FIG. 64C is a schematic diagram showing depth information calculated from these pictures by a video encoder 6301.

The video encoder 6301 first compresses each picture using the redundancy between the left and right pictures. At that time, the video encoder 6301 compares an uncompressed left picture and an uncompressed right picture on a per-macroblock basis (each macroblock containing a matrix of 8×8 or 16×16 pixels) so as to detect a motion vector for each image in the two pictures. Specifically, as shown in FIGS. 94A and 94B, a left video picture 6401 and a right video picture 6402 are each divided into macroblocks 6403, the entirety of which represents a matrix. Next, the areas occupied by the image data in picture 6401 and picture 6402 are compared for each macroblock 6403, and a motion vector between these pieces of image data is detected based on the result of the comparison. For example, the area occupied by image 6404 showing a "house" in picture 6401 is substantially the same as that in picture 6402. Accordingly, a motion vector is not detected from such areas. On the other hand, the area occupied by image 6405 showing a "circle" in picture 6401 is substantially different from the area in picture 6402. Accordingly, a motion vector indicating the displacement between the images 6405 showing the "circles" in the pictures 6401 and 6402 is detected from these areas.

The video encoder 6301 next makes use of the detected motion vector not only when compressing the pictures 6401 and 6402, but also when calculating the binocular parallax pertaining to a 3D video image constituted from the pieces of image data 6404 and 6405. Furthermore, in accordance with the binocular parallax thus obtained, the video encoder 6301 calculates the "depths" of each image, such as the images 6404 and 6405 of the "house" and "circle". The information indicating the depth of each image may be organized, for example, into a matrix 6406 the same size as the matrix of the macroblocks in pictures 6401 and 6402 as shown in FIG. 94C. The frame depth information 6310 shown in FIG. 93 includes this matrix 6406. In this matrix 6406, blocks 6407 are in one-to-one correspondence with the macroblocks 6403 in pictures 6401 and 6402. Each block 6407 indicates the depth of the image shown by the corresponding macroblocks 6403 by using, for example, a depth of eight bits. In the example shown in FIGS. 94A-C, the depth of the image 6405 of the "circle" is stored in each of the blocks in an area 6408 in the matrix 6406. This area 6408 corresponds to the entire areas in the pictures 6401 and 6402 that represent the image 6405.

Referring again to FIG. 93, the material creation unit 6302 creates elementary streams other than video streams, such as an audio stream 6312, PG stream 6313, and IG stream 6314 and stores the created streams into the database unit 6307. For example, the material creation unit 6302 receives uncompressed LPCM audio data from the authoring staff, encodes the uncompressed LPCM audio data in accordance with a compression/encoding scheme such as AC-3, and converts the encoded LPCM audio data into the audio stream 6312. The material creation unit 6302 additionally receives a subtitle information file from the authoring staff and creates the PG stream 6313 in accordance with the subtitle information file. The subtitle information file defines image data for showing subtitles, display timings of the subtitles, and visual effects to be added to the subtitles (e.g., fade-in and fade-out). Furthermore, the material creation unit 6302 receives bitmap data and a menu file from the authoring staff and creates the IG stream 6314 in accordance with the bitmap data and the menu file. The bitmap data shows images that are to be presented on a menu. The menu file defines how each button on the menu is to be transitioned from one status to another and defines and visual effects to be added to each button.

The scenario generation unit 6303 creates BD-ROM scenario data 6315 in accordance with an instruction that has been issued by the authoring staff and received via GUI and then stores the created BD-ROM scenario data 6315 in the database unit 6307. The BD-ROM scenario data 6315 described here is a file group that defines methods of playing back the elementary streams 6311-6314 stored in the database unit 6307. Of the file group shown in FIG. 7, the BD-ROM scenario data 6315 includes the index file 511, the movie object file 512, and the playlist files 521-523. The scenario generation unit 6303 further creates a parameter file 6316 and transfers the created parameter file 6316 to the multiplex processing unit 6305. The parameter file 6316 defines, from among the elementary streams 6311-6314 stored in the database unit 6307, stream data to be multiplexed into the main TS and sub-TS.

The BD program creation unit 6304 provides the authoring staff with a programming environment for programming a BD-J object and Java application programs. The BD program creation unit 6304 receives a request from a user via GUI and creates each program's source code according to the request. The BD program creation unit 6304 further creates the BD-J object file 551 from the BD-J object and compresses the Java application programs in the JAR file 561. The files 551 and 561 are transferred to the format processing unit 6306.

Here, it is assumed that the BD-J object is programmed in the following way: the BD-J object causes the program execution units 4606 and 4906 shown in FIGS. 54 and 59 to transfer graphics data for GUI to the system target decoders 4603 and 4903. Furthermore, the BD-J object causes the system target decoders 4603 and 4903 to process graphics data as image plane data. In this case, the BD program creation unit 6304 may set offset information corresponding to the image plane data in the BD-J object by using the frame depth information 6310 stored in the database unit 6307.

In accordance with the parameter file 6316, the multiplex processing unit 6305 multiplexes each of the elementary streams 6311-6314 stored in the database unit 6307 to form a stream file in MPEG-2 TS format. More specifically, as shown in FIG. 10, each of the elementary streams is converted into a source packet sequence, and the source packets included in each sequence are assembled to construct a single piece of multiplexed stream data. In this manner, the main TS and sub-TS are created.

In parallel with the aforementioned processing, the multiplex processing unit 6305 creates the 2D clip information file and dependent-view clip information file by the following procedure. First, the entry map 3130 shown in FIG. 39 is generated for each file 2D and file DEP. Next, referring to each entry map 3130, the extent start point list 3320 shown in FIG. 40 is created. Afterwards, the stream attribute information shown in FIG. 38 is extracted from each elementary stream to be multiplexed into the main TS and sub-TS. Furthermore, as shown in FIG. 38, a combination of an entry map, a piece of 3D meta data, and a piece of stream attribute information is associated with a piece of clip information.

The format processing unit 6306 creates a BD-ROM disc image 6320 of the directory structure shown in FIG. 7 from (i) the BD-ROM scenario data 6315 stored in the database unit 6307, (ii) a group of program files including, among others, a BD-J object file created by the BD program creation unit 6304, and (iii) multiplexed stream data and clip information files generated by the multiplex processing unit 6305. In this directory structure, UDF is used as a file system.

When creating file entries for each of the files 2D, files DEP, and files SS, the format processing unit 6306 refers to the entry maps and 3D meta data included in each of the 2D clip information files and dependent-view clip information files. The SPN for each entry point and extent start point is thereby used in creating each allocation descriptor. In particular, allocation descriptors are created so as to represent the interleaved arrangement shown in FIG. 15. The file SS and file 2D thus share each base-view data block, and the file SS and file DEP thus share each dependent-view data block. On the other hand, at locations where a long jump is necessary, allocation descriptors are created so as to represent one of the arrangements 1-6 respectively shown in FIGS. 20, 24, 26, 28, 30, and 32. In particular, some base-view data blocks are only referred to by allocation descriptors in the file 2D as blocks exclusively for 2D playback, and duplicate data thereof is only referred to by allocation descriptors in the file SS as blocks exclusively for 3D playback. Furthermore, the size of each extent for the base-view and the dependent-view is set so as to satisfy expressions 1-5, and the value of the logical address shown by each allocation descriptor is determined accordingly.

In addition, by using the frame depth information 6310 stored in the database unit 6307, the format processing unit 6306 creates the offset table shown in FIG. 39A for each secondary video stream 6311, PG stream 6313, and IG stream 6314. The format processing unit 6306 furthermore stores the offset table in the 3D meta data for the 2D clip information file. At this point, the positions of image data pieces within left and right video frames are automatically adjusted so that 3D video images represented by one stream avoid overlap with 3D video images represented by other streams in the same visual direction. Furthermore, the offset value for each video frame is also automatically adjusted so that depths of 3D video images represented by one stream avoid agreement with depths of 3D video images represented by other streams.

Thereafter, the BD-ROM disc image 6320 generated by the format processing unit 6306 is converted into data suited for pressing of a BD-ROM disc. This data is then recorded on a BD-ROM disc master. Mass production of the recording medium 100 pertaining to the first embodiment of the present invention is made possible by pressing the master.

Fourth Embodiment

The present embodiment describes an example structure of a playback device for playing back the data of the structure described in an earlier embodiment (FIG. 95), which is realized by using an integrated circuit 3.

Figure 95:
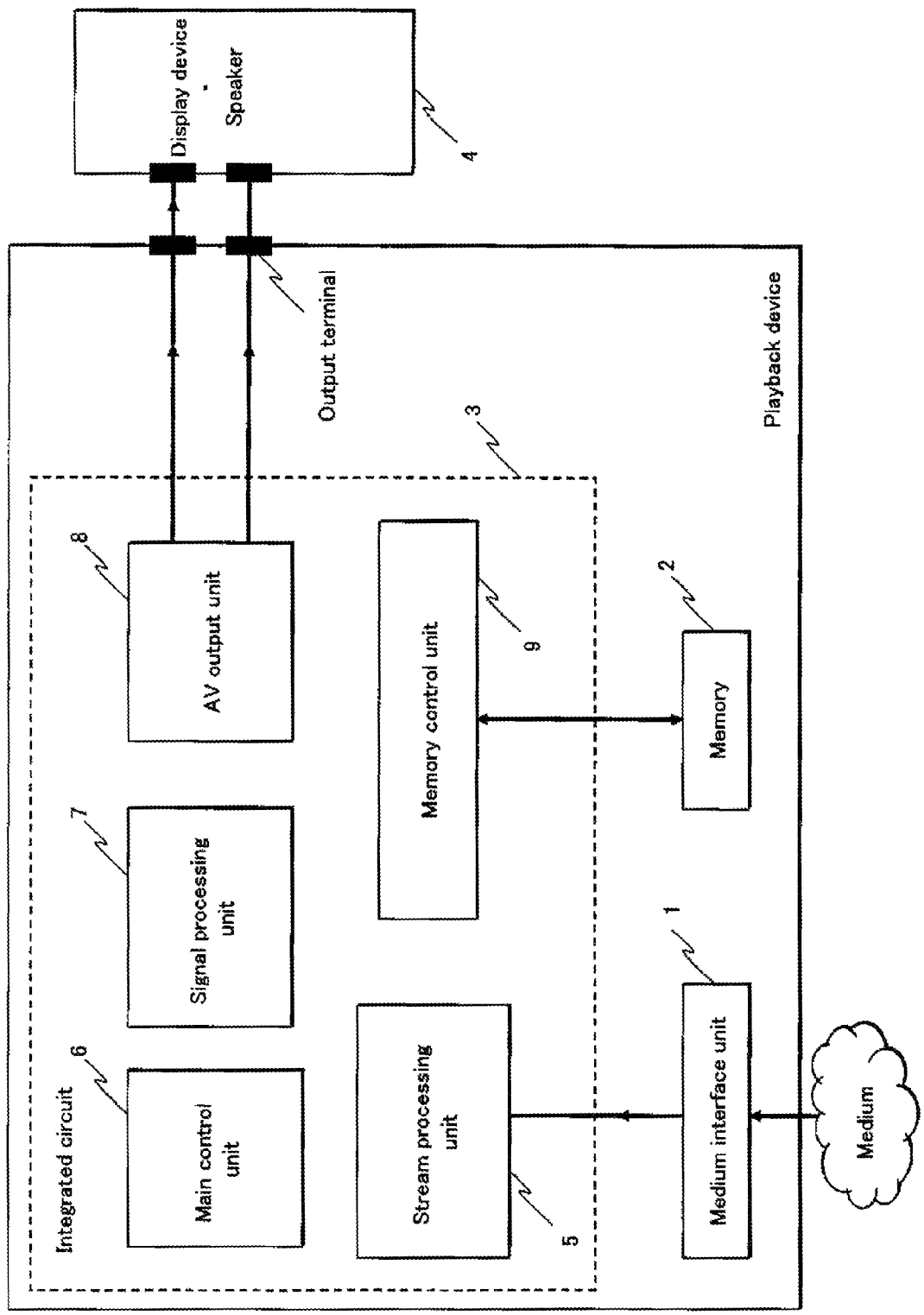
FIG. 95 shows an example structure of a 2D/3D playback device which is realized by using an integrated circuit.

FIG. 95 shows an example structure of a 2D/3D playback device which is realized by using an integrated circuit.

The medium interface unit 1 receives (reads out) data from the medium, and transfers the data to the integrated circuit 3. Note that the medium interface unit 1 receives the data of the structure described in the earlier embodiment. The medium interface unit 1 is, for example: a disc drive when the medium is the optical disc or hard disk; a card interface when the medium is the semiconductor memory such as the SD card or the USB memory; a CAN tuner or Si tuner when the medium is broadcast waves of broadcast including the CATV; or a network interface when the medium is the Ethernet, wireless LAN, or wireless public line.

The memory 2 is a memory for temporarily storing the data received (read out) from the medium, and the data that is being processed by the integrated circuit 3. For example, the SDRAM (Synchronous Dynamic Random Access Memory), DDRx SDRAM (Double-Date-Ratex Synchronous Dynamic Random Access Memory; x=1, 2, 3 . . . ) or the like is used as the memory 2. Note that the number of the memories 2 is not fixed, but may be one or two or more, depending on the necessity.

The integrated circuit 3 is a system LSI for performing the video/audio processing onto the data transferred from the interface unit 1, and includes a main control unit 6, a stream processing unit 5, a signal processing unit 7, a memory control unit 9, and an AV output unit 8.

The main control unit 6 includes a processor core having the timer function and the interrupt function. The processor core controls the integrated circuit 3 as a whole according to the program stored in the program memory or the like. Note that the basic software such as the OS (operating software) is stored in the program memory or the like preliminarily.

The stream processing unit 5, under the control of the main control unit 6, receives the data transferred from the medium via the interface unit 1 and stores it into the memory 2 via the data bus in the integrated circuit 3. The stream processing unit 5, under the control of the main control unit 6, also separates the received data into the video-base data and the audio-base data. As described earlier, on the medium, AV clips for 2D/L including left-view video stream and AV clips for R including right-view video stream are arranged in an interleaved manner, in the state where each clip is divided into some Extents (for example, see FIG. 41, or FIGS. 81 and 82 (multi-angle)). Accordingly, the main control unit 6 performs the control so that, when the integrated circuit 3 receives the left-eye data including left-view video stream, the received data is stored in the first area in the memory 2; and when the integrated circuit 3 receives the right-eye data including right-view video stream, the received data is stored in the second area in the memory 2. Note that the left-eye data belongs to the left-eye Extent, and the right-eye data belongs to the right-eye Extent. Also note that the first and second areas in the memory 2 may be areas generated by dividing a memory logically, or may be physically different memories. In the present embodiment, explanation is given assuming that the left-eye data including the left-view video stream is the main-view data and the right-eye data including the right-view video stream is the sub-view data. However, alternatively, the right-eye data may be the main-view data, and the left-eye data is the sub-view data.

The signal processing unit 7, under the control of the main control unit 6, decodes, by an appropriate method, the video-base data and the audio-base data separated by the stream processing unit 5. The video-base data has been recorded after being encoded by a method such as MPEG-2, MPEG-4 AVC, MPEG-4 MVC, or SMPTE VC-1. Also, the audio-base data has been recorded after being compress-encoded by a method such as Dolby AC-3, Dolby Digital Plus, MLP, DTS, DTS-HD, or Linear PCM. Thus, the signal processing unit 7 decodes the video-base data and the audio-base data by the methods corresponding thereto. Models of the signal processing unit 7 are various decoders of Embodiment 9 shown in FIG. 65.

The AV output unit 8, under the control of the main control unit 6, performs the superimposing of the video-base data having been decoded by the signal processing unit 7, or format conversion of the video-base data and the like, and outputs the data subjected to such processes to the outside of the integrated circuit 3.

Figure 96:
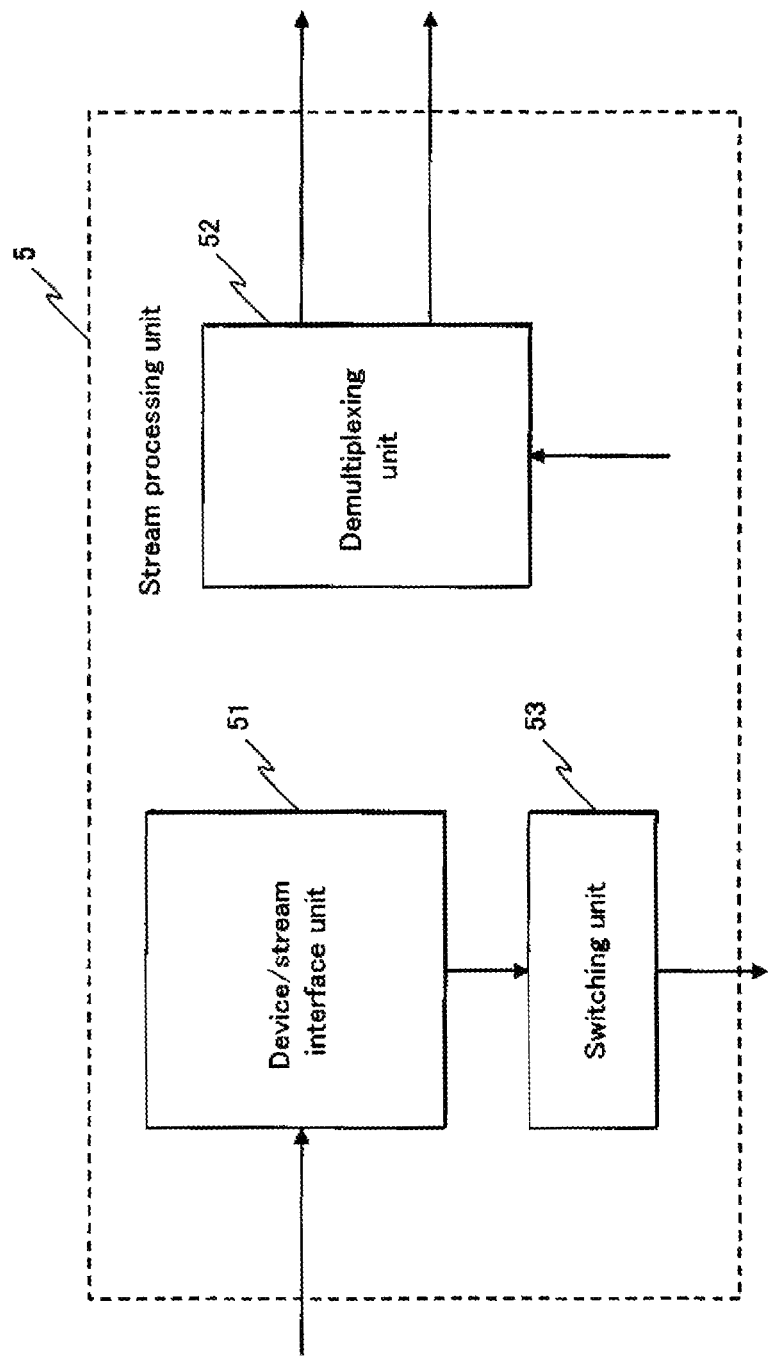
FIG. 96 is a functional block diagram showing a typical structure of the stream processing unit.

FIG. 96 is a functional block diagram showing a typical structure of the stream processing unit 5. The stream processing unit 5 includes a device/stream interface unit 51, a demultiplexing unit 52, and switching unit 53.

The device/stream interface unit 51 is an interface for transferring data between the interface unit 1 and the integrated circuit 3. The device/stream interface unit 51 may be: SATA (Serial Advanced Technology Attachment), ATAPI (Advanced Technology Attachment Packet Interface), or PATA (Parallel Advanced Technology Attachment) when the medium is the optical disc or the hard disk; a card interface when the medium is the semiconductor memory such as the SD card or the USB memory; a tuner interface when the medium is broadcast waves of broadcast including the CATV; or a network interface when the medium is the Ethernet, wireless LAN, or wireless public line. The device/stream interface unit 51 may have a part of the function of the interface unit 1, or the interface unit 1 may be embedded in the integrated circuit 3, depending on the type of the medium.

The demultiplexing unit 52 separates the playback data, transferred from the medium, including video and audio, into the video-base data and the audio-base data. Each Extent, having been described earlier, is composed of source packets of video, audio, PG (subtitle), IG (menu) and the like (sub-view data may not include audio). The demultiplexing unit 52 separates the playback data into video-base TS packets and audio-base TS packets based on the PID (identifier) included in each source packet. The demultiplexing unit 52 transfers the data after the separation to the signal processing unit 7. A model of the demultiplexing unit 52 is, for example, the source depacketizer and the PID filter of Embodiment 9 shown in FIG. 65.

The switching unit 53 switches the output destination (storage destination) so that, when the device/stream interface unit 51 receives the left-eye data, the received data is stored in the first area in the memory 2; and when the integrated circuit 3 receives the right-eye data, the received data is stored in the second area in the memory 2. Here, the switching unit 53 is, for example, DMAC (Direct Memory Access Controller).

Figure 97:
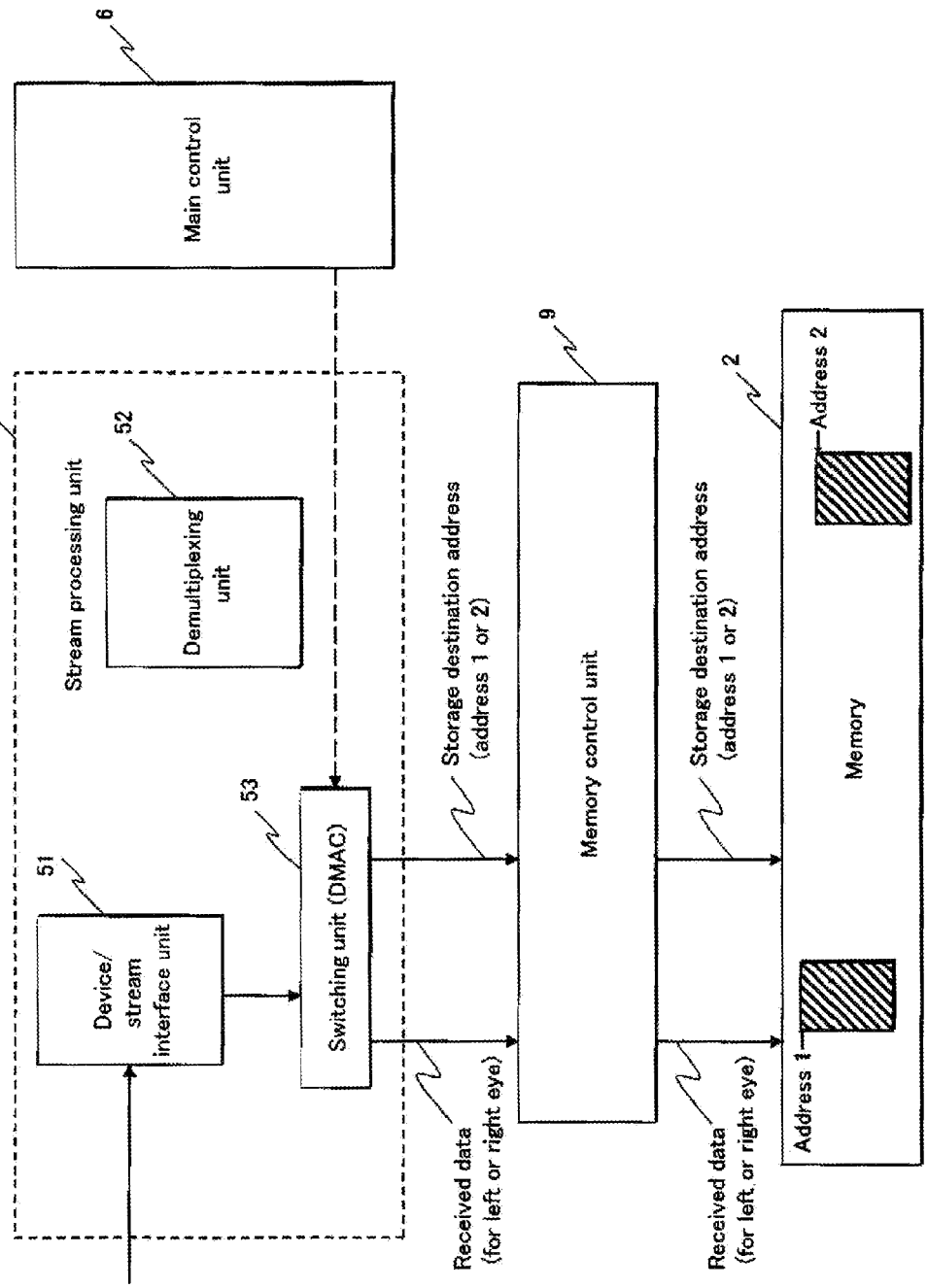
FIG. 97 is a conceptual diagram showing the switching unit 53 and the peripheral when the switching unit 53 is DMAC.

FIG. 97 is a conceptual diagram showing the switching unit 53 and the peripheral when the switching unit 53 is DMAC. The DMAC, under the control of the main control unit 6, transmits the data received by the device stream interface and the data storage destination address to the memory control unit 9. More specifically, the DMAC switches the output destination (storage destination) depending on the received data, by transmitting Address 1 (the first storage area) to the memory control unit 9 when the device stream interface receives the left-eye data, and transmitting Address 2 (the second storage area) to the memory control unit 9 when the device stream interface receives the right-eye data. The memory control unit 9 stores data into the memory 2 in accordance with the storage destination address sent from the DMAC. Note that the main control unit 6 controls the switching unit 53 using extent start points (the file base or file dependent in stereoscopic playback) included in the above-described CLIPINF that has been received prior to playback data and stored in the memory 2. In other words, the main control unit 6 controls the switching unit 53 after recognizing the data received by the device stream IF unit 51 to be left-eye data using the file base, and controls the switching unit 53 to switch the output destination (storage destination) to the memory 2 after recognizing the data received by the device stream IF unit 51 to be right-eye data.

A dedicated circuit for controlling he 53 may be provided, instead of the main control unit 6.

In the above description, the device/stream interface unit 51, demultiplexing unit 52, and switching unit 53 are explained as a typical structure of the stream processing unit 5. However, the stream processing unit 5 may further include an encryption engine unit for decrypting received encrypted data, key data or the like, a secure management unit for controlling the execution of a device authentication protocol between the medium and the playback device and for holding a secret key, and a controller for the direct memory access. In the above, it has been explained that, when the data received from the medium is stored into the memory 2, the switching unit 53 switches the storage destination depending on whether the received data is left-eye data or right-eye data. However, not limited to this, the data received from the medium may be temporarily stored into the memory 2, and then, when the data is to be transferred to the demultiplexing unit 52, the data may be separated into the left-eye data and the right-eye data.

Figure 98:
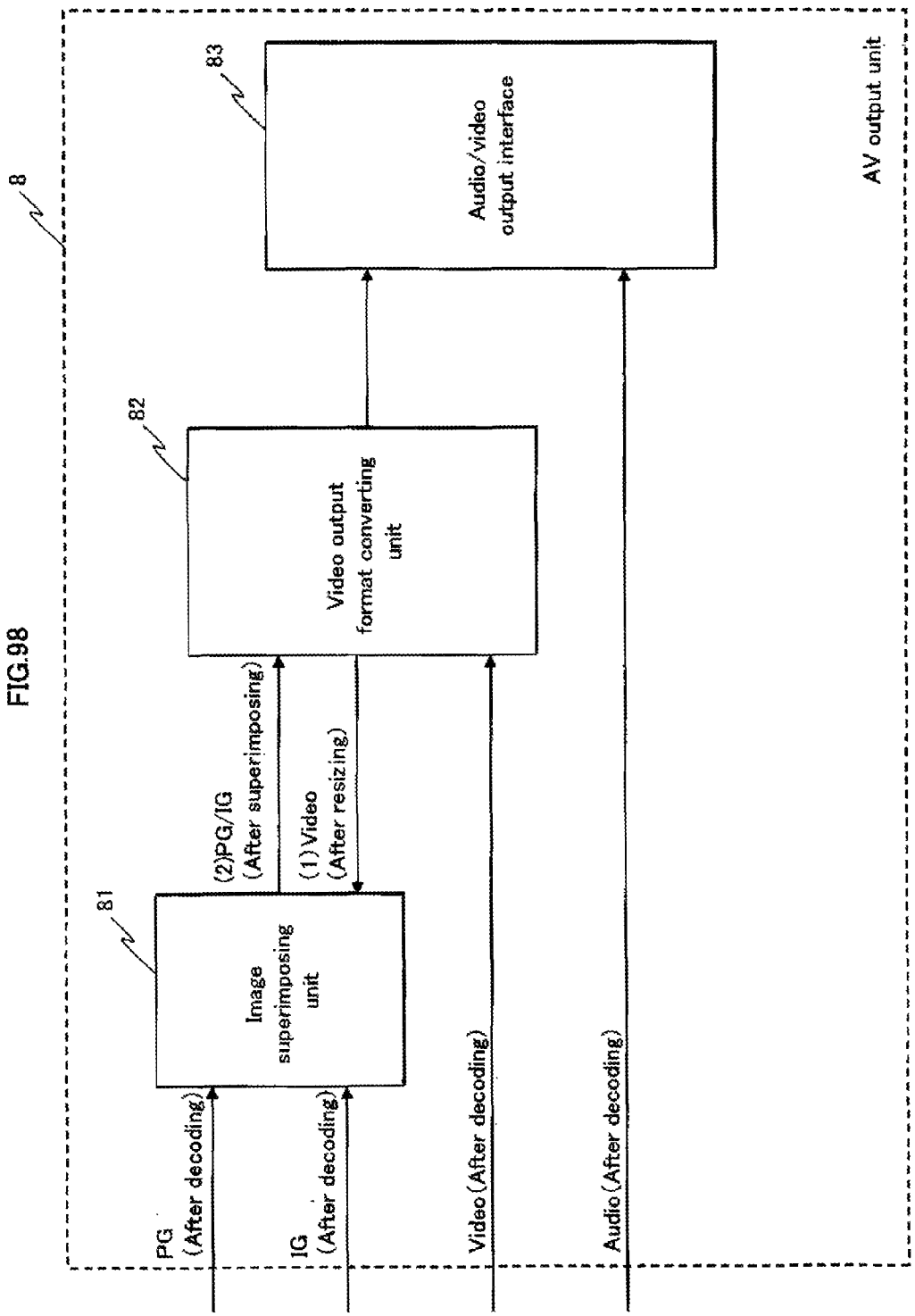
FIG. 98 is a functional block diagram showing a typical structure of an AV output unit.

FIG. 98 is a functional block diagram showing a typical structure of the AV output unit 8. The AV output unit 8 includes an image superimposing unit 81, a video output format converting unit 82, and an audio/video output interface unit 83.

The image superimposing unit 81 superimposes the decoded video-base data. More specifically, the image superimposing unit 81 superimposes the PG (subtitle) and the IG (menu) onto the left-view video data or the right-view video data in units of pictures. A model of the image superimposing unit 81 is, for example, Embodiment 11 and FIG. 98.

The video output format converting unit 82 performs the following processes and the like as necessary: the resize process for enlarging or reducing the decoded video-base data; the IP conversion process for converting the scanning method from the progressive method to the interlace method and vice versa; the noise reduction process for removing the noise; and the frame rate conversion process for converting the frame rate.

The audio/video output interface unit 83 encodes, in accordance with the data transmission format, the video-base data, which has been subjected to the image superimposing and the format conversion, and the decoded audio-base data. Note that, as will be described later, the audio/video output interface unit 83 may be provided outside the integrated circuit 3.

Figure 99:
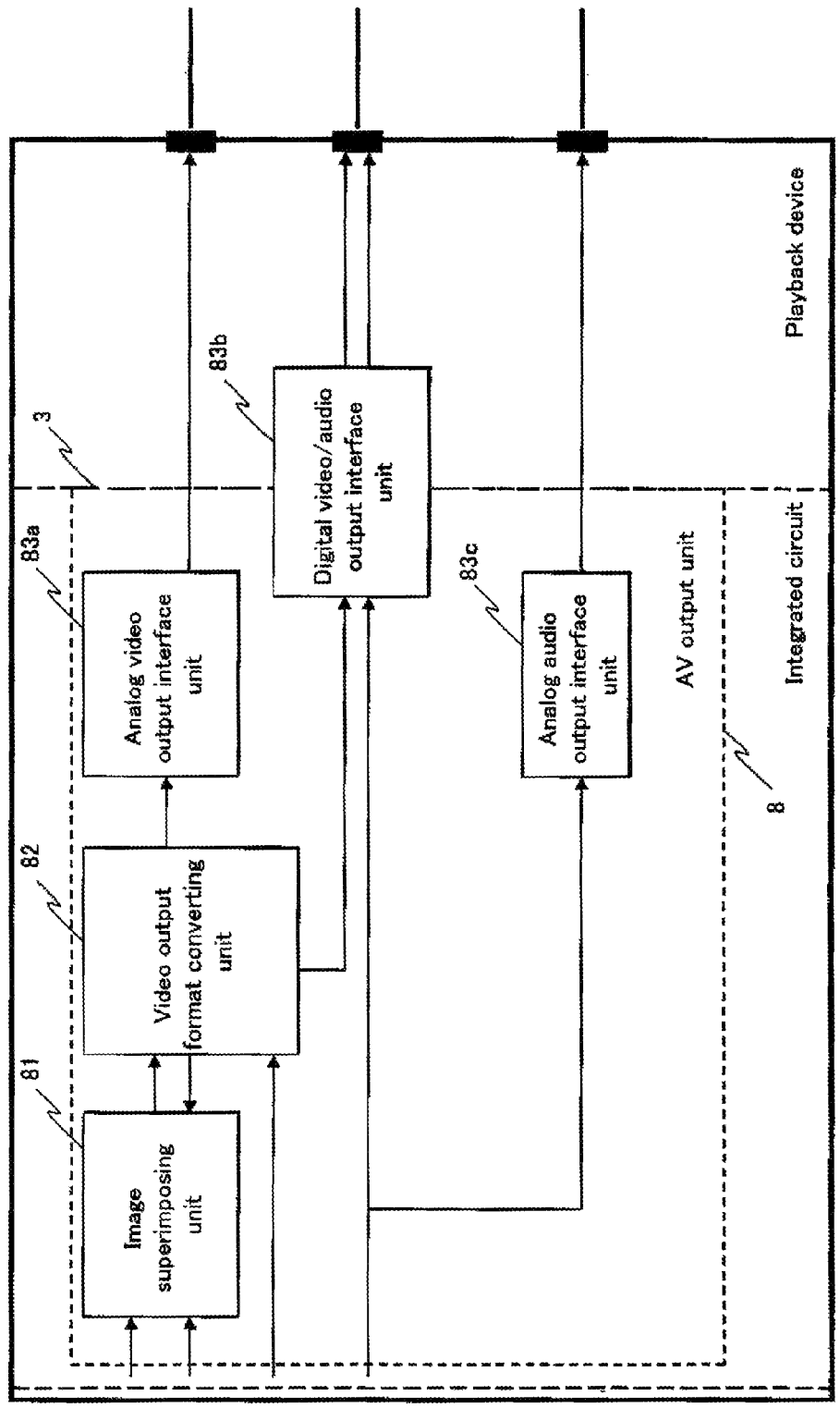
FIG. 99 is an example structure showing the AV output unit, or the data output part of the playback device in more detail.

FIG. 99 is an example structure showing the AV output unit 8, or the data output part of the playback device in more detail. The integrated circuit 3 of the present embodiment and the playback device support a plurality of data transmission formats for the video-base data and the audio-base data. The audio/video output interface unit 83 shown in FIG. 98 corresponds to an analog video output interface unit 83a, a digital video/audio output interface unit 83b, and an analog audio output interface unit 83c.

The analog video output interface unit 83a converts and encodes the video-base data, which has been subjected to the image superimposing process and the output format conversion process, into the analog video signal format, and outputs the conversion result. The analog video output interface unit 83a is, for example: a composite video encoder that supports any of the NTSC method, PAL method, and SECAM method; an encoder for the S image signal (Y/C separation); an encoder for the component image signal; or a DAC (D/A converter).

The digital video/audio output interface unit 83b synthesizes the decoded audio-base data with the video-base data having been subjected to the image superimposing and the output format conversion, encrypts the synthesized data, encodes in accordance with the data transmission standard, and outputs the encoded data. The digital video/audio output interface unit 83b is, for example, HDMI (High-Definition Multimedia Interface).

The analog audio output interface unit 83c, being an audio DAC or the like, performs the D/A conversion onto the decoded audio-base data, and outputs analog audio data.

The transmission format of the video-base data and audio-base data may be switched depending on the data receiving device (data input terminal) supported by the display device/speaker, or may be switched in accordance with the selection by the user. Furthermore, it is possible to transmit a plurality of pieces of data corresponding to the same content in parallel by a plurality of transmission formats, not limited to the transmission by a single transmission format.

In the above description, the image superimposing unit 81, video output format converting unit 82, and audio/video output interface unit 83 are explained as a typical structure of the AV output unit 8. However, the AV output unit 8 may further include, for example, a graphics engine unit for performing the graphics processing such as the filter process, image synthesizing, curvature drawing, and 3D display.

This completes the description of the structure of the playback device in the present embodiment. Note that all of the functional blocks included in the integrated circuit 3 may not be embedded, and that, conversely, the memory 2 shown in FIG. 95 may be embedded in the integrated circuit 3. Also, in the present embodiment, the main control unit 6 and the signal processing unit 7 have been described as different functional blocks. However, not limited to this, the main control unit 6 may perform a part of the process performed by the signal processing unit 7.

Figure 100:
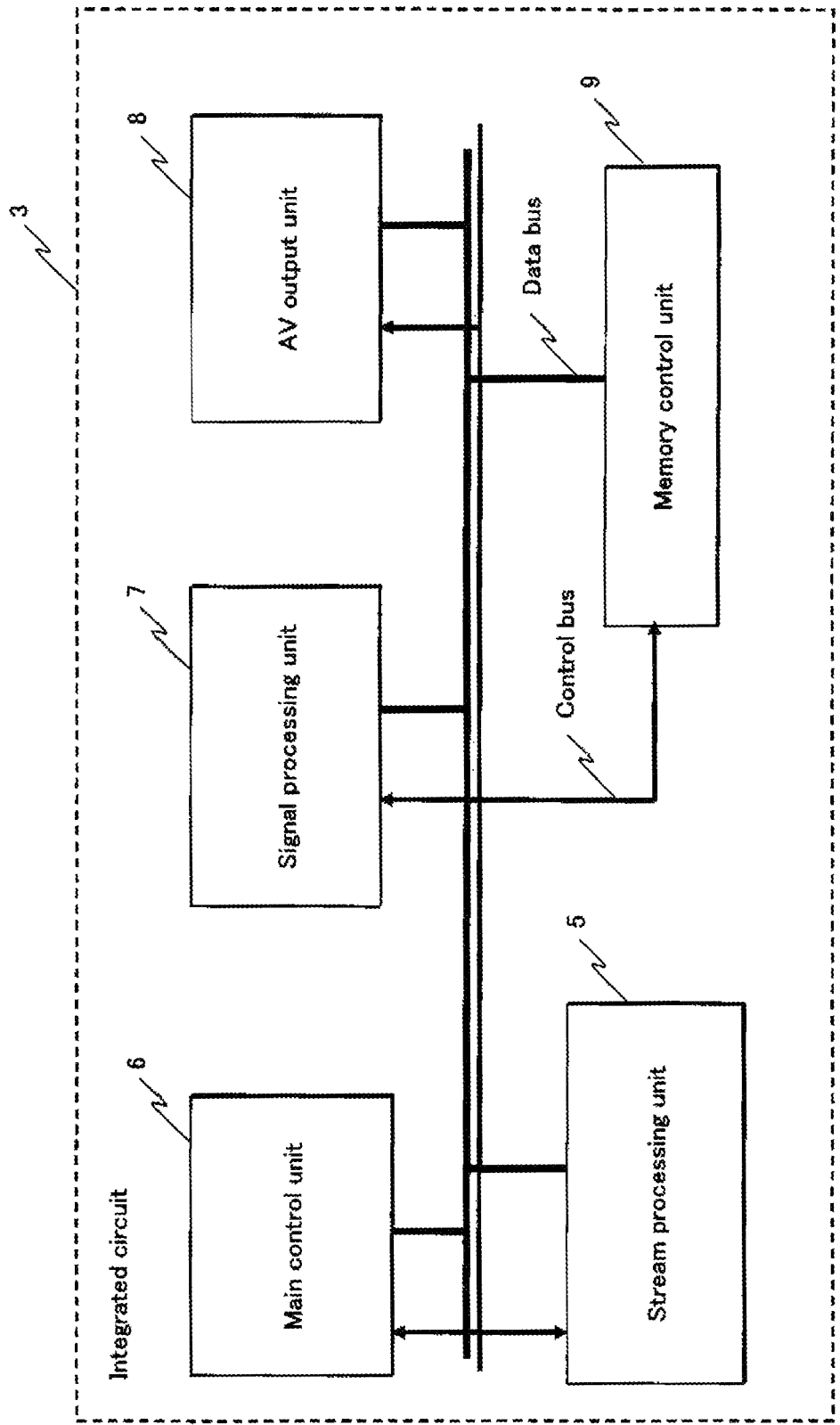
FIG. 100 shows an arrangement of the control buses and data buses in the integrated circuit.
Figure 101:
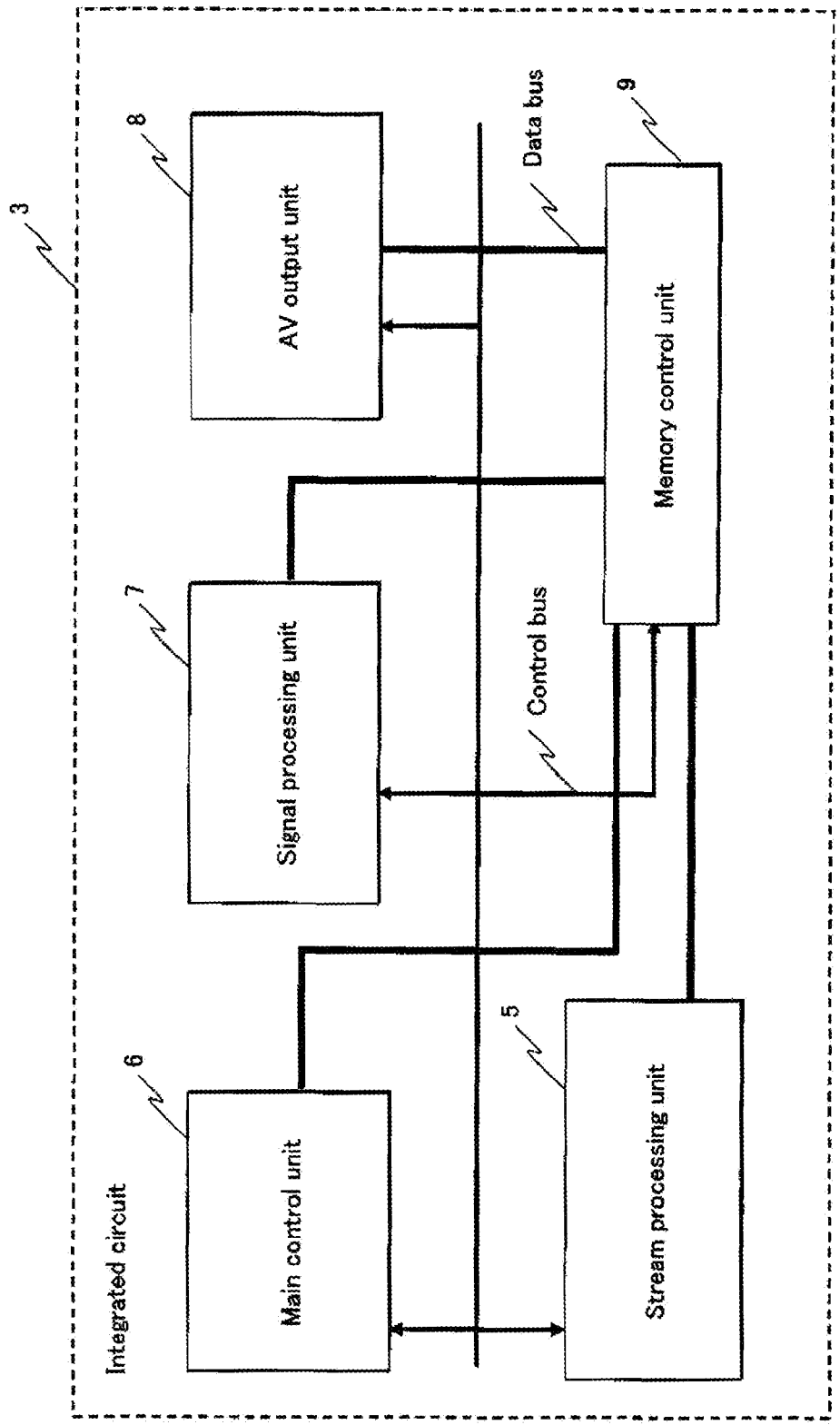
FIG. 101 shows an arrangement of the control buses and data buses in the integrated circuit.

The route of the control buses and the data buses in the integrated circuit 3 is designed in an arbitrary manner depending on the processing procedure of each processing block or the contents of the processing. However, the data buses may be arranged so that the processing blocks are connected directly as shown in FIG. 100, or may be arranged so that the processing blocks are connected via the memory 2 (the memory control unit 9) as shown in FIG. 101.

The integrated circuit 3 may be a multi-chip module that is generated by enclosing a plurality of chips into one package, and its outer appearance is one LSI.

It is also possible to realize the system LSI by using the FPGA (Field Programmable Gate Array) that can be re-programmed after the manufacturing of the LSI, or the reconfigurable processor in which the connection and setting of the circuit cells inside the LSI can be reconfigured.

Next, the operation of the playback device having the above-described structure will be explained.

Figure 102:
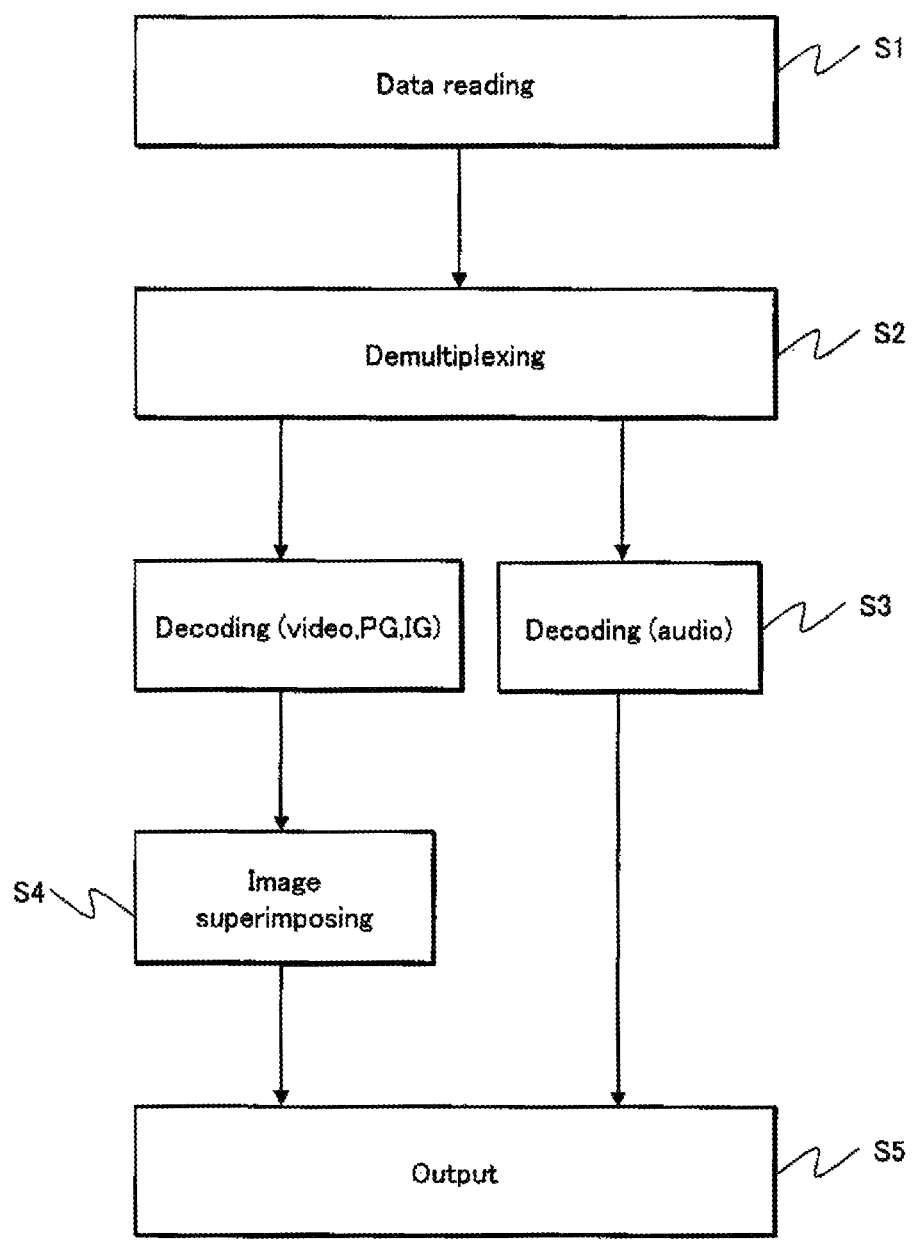
FIG. 102 is a simple flowchart showing an operation procedure in the playback device.

FIG. 102 is a flowchart showing a playback procedure in which data is received (read out) from the medium, is decoded, and is output as a video signal and an audio signal.

S1: data is received (read out) from the medium (the interface unit 1, the stream processing unit 5).

S2: the data received (read out) in S1 is separated into various data (the video-base data and the audio-base data) (the stream processing unit 5).

S3: the various data generated by the separation in S2 are decoded by the appropriate format (the signal processing unit 7).

S4: among the various data decoded in S3, the video-base data is subjected to the superimposing process (the AV output unit 8).

S5: the video-base data and the audio-base data having been subjected to the processes in S2 through S4 are output (the AV output unit 8).

Figure 103:
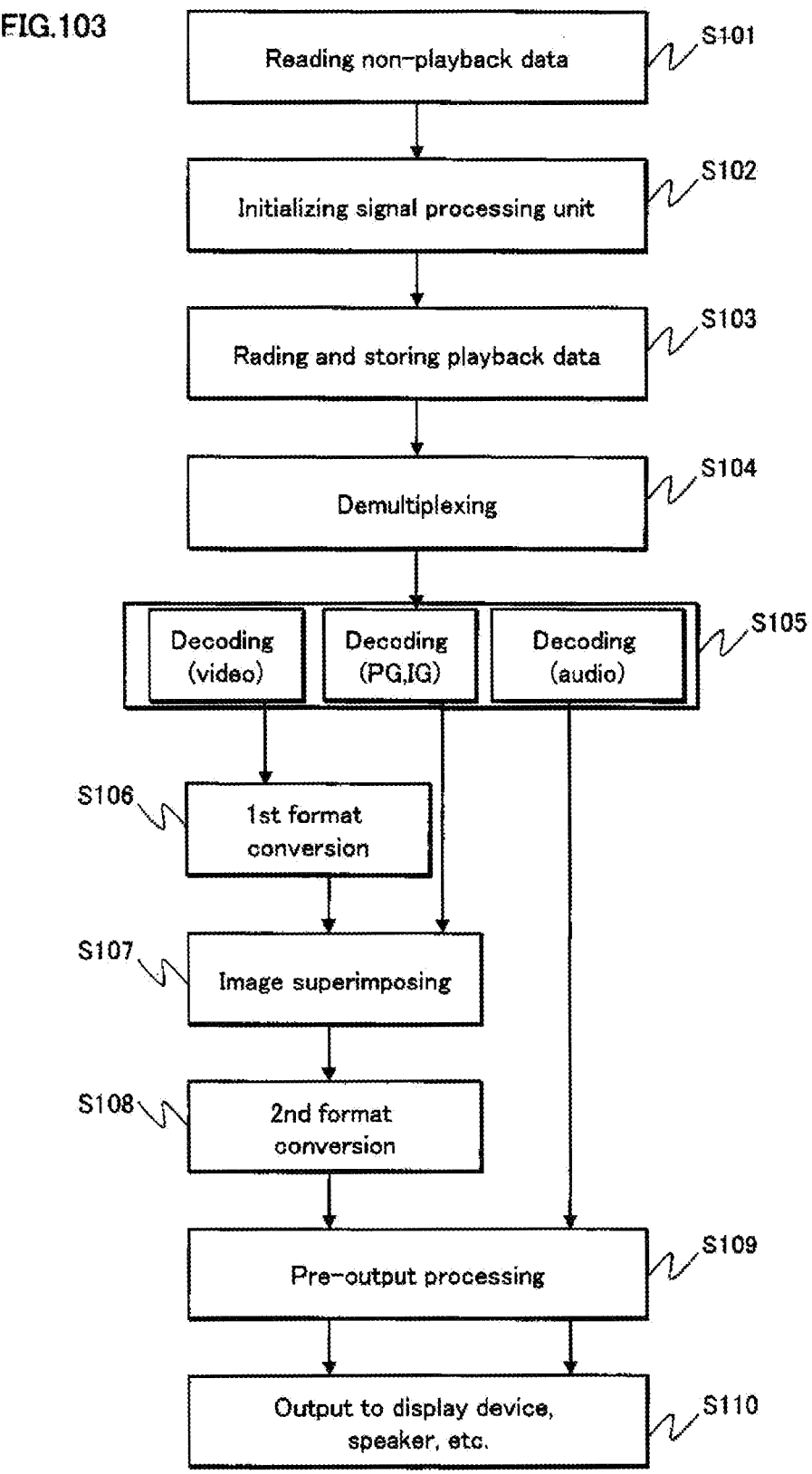
FIG. 103 is a detailed flowchart showing an operation procedure in the playback device.
Figure 104:
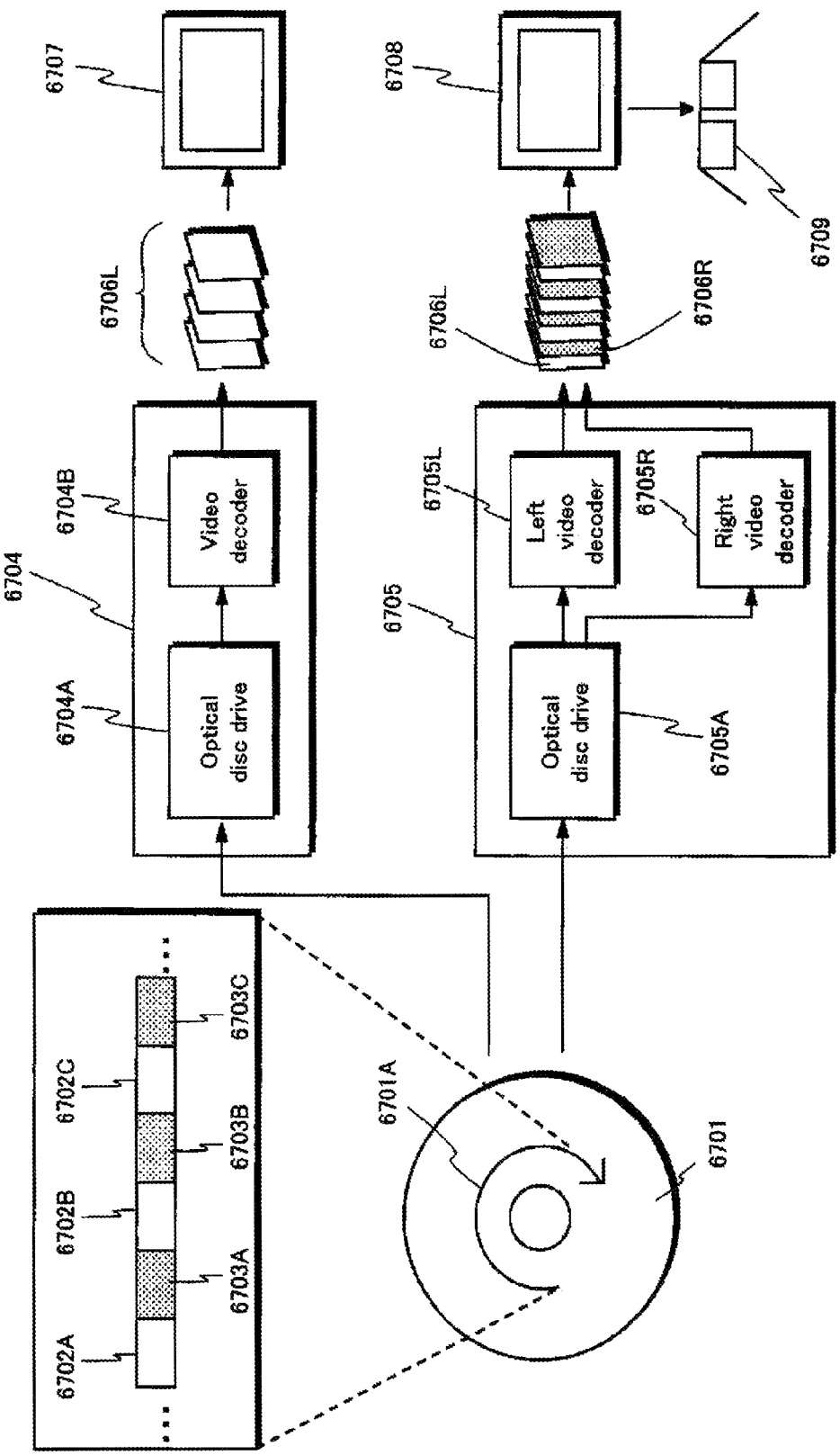
FIG. 104 is a schematic diagram illustrating the technology for ensuring the compatibility of an optical disc storing 3D video content with 2D playback devices.

FIG. 103 is a flowchart showing a detailed playback procedure. Each of the operations and processes is performed under the control of the main control unit 6.

S101: the device/stream interface unit 51 of the stream processing unit 5 receives (reads out) data (PLAYLIST, CLIPINF, etc.) which is other than the data stored in the medium to be played back and is necessary for playback of the data, via the interface unit 1, and stores the received data into the memory 2 (the interface unit 1, the device/stream interface unit 51, the memory control unit 9, the memory 2).

S102: the main control unit 6 recognizes the compression method of the video and audio data stored in the medium by referring to the stream attribute included in the received CLIPINF, and initializes the signal processing unit 7 so that the corresponding decode processing can be performed (the main control unit 6).

S103: the device/stream interface unit 51 of the stream processing unit 5 receives (reads out) the data of video/audio that is to be played back, from the medium via the interface unit 1, and stores the received data into the memory 2 via the stream processing unit 5 and the memory control unit 9. Note that the data is received (read out) in units of Extents, and the main control unit 6 controls the switching unit 53 so that, when the left-eye data is received (read out), the received data is stored in the first area; and when the right-eye data is received (read out), the received data is stored in the second area, and the switching unit 53 switches the data output destination (storage destination) (the interface unit 1, the device/stream interface unit 51, the main control unit 6, the switching unit 53, the memory control unit 9, the memory 2).

S104: the data stored in the memory 2 is transferred to the demultiplexing unit 52 of the stream processing unit 5, and the demultiplexing unit 52 identifies the video-base data (main video, sub-video), PG (subtitle), IG (menu), and audio-base data (audio, sub-audio) based on the PIDs included in the source packets constituting the stream data, and transfers the data to each corresponding decoder in the signal processing unit 7 in units of TS packets (the demultiplexing unit 52).

S105: each in the signal processing unit 7 performs the decode process onto the transferred TS packets by the appropriate method (the signal processing unit 7).

S106: among the video-base data decoded by the signal processing unit 7, the data corresponding to the left-view video stream and the right-view video stream is resized based on the display device (the video output format converting unit 82).

S107: the PG (subtitle) and IG (menu) are superimposed onto the video stream resized in S106 (the image superimposing unit 81).

S108: the IP conversion, which is a conversion of the scanning method, is performed onto the video data after the superimposing in S107 (the video output format converting unit 82).

S109: the encoding, D/A conversion and the like are performed onto video-base data and the audio-base data having been subjected to the above-described processes, based on the data output format of the display device/speaker or the data transmission format for transmission to the display device/speaker. The composite video signal, the S image signal, the component image signal and the like are supported for the analog output of the video-base data. Also, HDMI is supported for the digital output of the video-base data and the audio-base data. (the audio/video output interface unit 83)

S110: the video-base data and the audio-base data having been subjected to the process in S109 is output and transmitted to the display device/speaker (the audio/video output interface unit 83, the display device/speaker).

This completes the description of the operation procedure of the playback device in the present embodiment. Note that the result of process may be temporarily stored into the memory 2 each time a process is completed. Also, in the above operation procedure, the video output format converting unit 82 performs the resize process and the IP conversion process. However, not limited to this, the processes may be omitted as necessary, or other processes (noise reduction process, frame rate conversion process, etc.) may be performed. Furthermore, the processing procedures may be changed if possible.

<Supplementary Explanation>

<<Principle of 3D Video Image Playback>>

Playback methods of 3D video images are roughly classified into two categories: methods using a holographic technique, and methods using parallax video.

A method using a holographic technique is characterized by allowing a viewer to perceive objects in video as stereoscopic by giving the viewer's visual perception substantially the same information as optical information provided to visual perception by human beings of actual objects. However, although a technical theory for utilizing these methods for moving video display has been established, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of a viewer's eyes for the same scene, i.e. the pair of a left-view and a right-view. A method using a parallax video is characterized by playing back the left-view and right-view of a single scene so that the viewer sees each view in only one eye, thereby allowing the user to perceive the scene as stereoscopic.

FIGS. 73A, 73B, 73C are schematic diagrams illustrating the principle of playing back 3D video images (stereoscopic video) according to a method using parallax video. FIG. 73A is a top view of a viewer 6501 looking at a cube 6502 placed directly in front of the viewer's face. FIGS. 73B and 73C are schematic diagrams showing the outer appearance of the cube 6502 as a 2D video image as perceived respectively by the left eye 6501L and the right eye 6501R of the viewer 6501. As is clear from comparing FIG. 73B and FIG. 73C, the outer appearances of the cube 6502 as perceived by the eyes are slightly different. The difference in the outer appearances, i.e., the binocular parallax allows the viewer 6501 to recognize the cube 6502 as three-dimensional. Thus, according to a method using parallax video, left and right 2D video images with different viewpoints are first prepared for a single scene. For example, for the cube 6502 shown in FIG. 73A, the left view of the cube 6502 shown in FIG. 73B and the right view shown in FIG. 73C are prepared. At this point, the position of each viewpoint is determined by the binocular parallax of the viewer 6501. Next, each video image is played back so as to be perceived only by the corresponding eye of the viewer 6501. Consequently, the viewer 6501 recognizes the scene played back on the screen, i.e., the video image of the cube 6502, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, and two-color separation methods.

In alternate frame sequencing, left and right 2D video images are alternately displayed on a screen for a predetermined time, while the viewer observes the screen using shutter glasses. Here, each lens in the shutter glasses is, for example, formed by a liquid crystal panel. The lenses pass or block light in a uniform and alternate manner in synchronization with switching of the 2D video images on the screen. That is, each lens functions as a shutter that periodically blocks an eye of the viewer. More specifically, while a left video image is displayed on the screen, the shutter glasses make the left-side lens transmit light and the right-hand side lens block light. Conversely, while a right video image is displayed on the screen, the shutter glasses make the right-side glass transmit light and the left-side lens block light. As a result, the viewer sees afterimages of the right and left video images overlaid on each other and thus perceives a single 3D video image.

According to the alternate-frame sequencing, as described previously, right and left video images are alternately displayed in a predetermined cycle. For example, when 24 video frames are displayed per second for playing back a normal 2D movie, 48 video frames in total for both right and left eyes need to be displayed for a 3D movie. Accordingly, a display device capable of quickly executing rewriting of the screen is preferred for this method.

In a method using a lenticular lens, a right video frame and a left video frame are respectively divided into reed-shaped small and narrow areas whose longitudinal sides lie in the vertical direction of the screen. In the screen, the small areas of the right video frame and the small areas of the left video frame are alternately arranged in the landscape direction of the screen and displayed at the same time. Here, the surface of the screen is covered by a lenticular lens. The lenticular lens is a sheet-shaped lens constituted from parallel-arranged multiple long and thin hog-backed lenses. Each hog-backed lens lies in the longitudinal direction on the surface of the screen. When a viewer sees the left and right video frames through the lenticular lens, only the viewer's left eye perceives light from the display areas of the left video frame, and only the viewer's right eye perceives light from the display areas of the right video frame. This is how the viewer sees a 3D video image from the parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the display through polarization glasses.

Here, for the polarization glasses, a longitudinal polarization filter is provided for the left lens, and a lateral polarization filter is provided for the right lens. Consequently, the right and left video images are each perceived only by the corresponding eye, thereby allowing the viewer to perceive a stereoscopic video image.

In a method using parallax video, in addition to being constructed from the start by a combination of left and right video images, the 3D video content can also be constructed from a combination of 2D video images and a depth map. The 2D video images represent 3D video images projected on a hypothetical 2D picture plane, and the depth map represents the depth of each pixel in each portion of the 3D video image as compared to the 2D picture plane. When the 3D content is constructed from a combination of 2D video images with a depth map, the 3D playback device or the display device first constructs left and right video images from the combination of 2D video images with a depth map and then creates 3D video images from these left and right video images using one of the above-described methods.

FIG. 74 is a schematic diagram showing an example of constructing a left-view 6603L and a right-view 6603R from a combination of a 2D video image 6601 and a depth map 6602. As shown in FIG. 74, a circular plate 6611 is shown in the background 6612 of the 2D video image 6601. The depth map 6602 indicates the depth for each pixel in each portion of the 2D video image 6601. According to the depth map 6602, in the 2D video image 6601, the display area 6621 of the circular plate 6611 is closer to the viewer than the screen, and the display area 6622 of the background 6612 is deeper than the screen. The parallax video generation unit 6600 in the playback device 102 first calculates the binocular parallax for each portion of the 2D video image 6601 using the depth of each portion indicated by the depth map 6602. Next, the parallax video generation unit 6600 shifts the presentation position of each portion in the 2D video image 6601 in accordance with the calculated binocular parallax to construct the left-view 6603L and the right-view 6603R. In the example shown in FIG. 74, the parallax video generation unit 6600 shifts the presentation position of the circular plate 6611 in the 2D video image 6601 as follows: the presentation position of the circular plate 6631L in the left-view 6603L is shifted to the right by half of its binocular parallax, S1, and the presentation position of the circular plate 6631R in the right-view 6603R is shifted to the left by half of its binocular parallax, S1. In this way, the viewer perceives the circular plate 6611 as being closer than the screen. Conversely, the parallax video generation unit 6600 shifts the presentation position of the background 6612 in the 2D video image 6601 as follows: the presentation position of the background 6632L in the left-view 6603L is shifted to the left by half of its binocular parallax, S2, and the presentation position of the background 6632R in the right-view 6603R is shifted to the right by half of its binocular parallax, S2. In this way, the viewer perceives the background 6612 as being deeper than the screen.

A playback system for 3D video images with use of parallax video has already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<<Data Distribution Via Broadcasting or Communication Circuit>>

The recording medium according to the first embodiment of the present invention may be, in addition to an optical disc, a general removable medium available as a package medium, such as a portable semiconductor memory device including an SD memory card. Also, the first embodiment describes an example of an optical disc in which data has been recorded beforehand, namely, a conventionally available read-only optical disc such as a BD-ROM or a DVD-ROM. However, the embodiment of the present invention is not limited to these. For example, when a terminal device writes a 3D video content that has been distributed via broadcasting or a network into a conventionally available writable optical disc such as a BD-RE or a DVD-RAM, arrangement of the extents according to the above-described embodiment may be used. Here, the terminal device may be incorporated in a playback device, or may be a device different from the playback device.

<<Playback of Semiconductor Memory Card>>

The following describes a data read unit of a playback device in the case where a semiconductor memory card is used as the recording medium according to the first embodiment of the present invention instead of an optical disc.

A part of the playback device that reads data from an optical disc is composed of, for example, an optical disc drive. Conversely, a part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<<Copyright Protection Technique for Data Stored in BD-ROM Disc>>

Here, the mechanism for protecting copyright of data recorded on a BD-ROM disc is described, as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the recording medium 100 shown in FIG. 6, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<<Recording Data on a Recording Medium Through Electronic Distribution>>

The following describes processing to transmit data, such as an AV stream file for 3D video images (hereinafter, "distribution data"), to the playback device according to the first embodiment of the present invention via electronic distribution and cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information, and specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<<Application to Real-Time Recording>>

The third embodiment of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<<Managed Copy>>

The playback device according to the first embodiment of the present invention may write a digital stream recorded on the recording medium 100 on another recording medium via a managed copy. Here, managed copy refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory device such as an SD memory card, Memory Stick™, Compact Flash™, Smart Media™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<<Method for Describing Data Structure>>

Among the data structures in the first embodiment of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in the first embodiment is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes apart of the program. In other words, the data structure is substantially equivalent to a program. Therefore, the data structure needs to be protected as a computer related invention.

<<Management of Playlist File and Clip Information File by Playback Program>>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory device of a computer and is then executed by the computer. The loading process includes compile processing or link processing. By these processes, the playback program is divided into a plurality of sections in the memory device. The sections include a text section, a data section, a bss section, and a stack section. The text section includes a code array of the playback program, an initial value, and non-rewritable data. The data section includes variables with initial values and rewritable data. In particular, the data section includes a file, recorded on the recording device, that can be accessed at any time. The bss section includes variables having no initial value. The data included in the bss section is referenced in accordance with commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording device into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

INDUSTRIAL APPLICABILITY

The information recording medium pertaining to the present invention stores therein 3D video. However, being playable by both a playback device for 2D video and a playback device for 3D video, the information recording medium can supply video contents such as a movie title including 3D video to market without regard to compatibility, thereby contributing activation of the movie market, the consumer device market and the like. Thus, the recording medium and playback device pertaining to the present invention are widely applicable in the movie industry, the consumer device industry, and the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A semiconductor integrated circuit for performing audio and video signal processing on data received from a recording medium, comprising:
  a main-view stream used for monoscopic video playback, a plurality of main-view data blocks formed from the main-view stream;
  a sub-view stream used for stereoscopic video playback in combination with the main-view stream, a plurality of sub-view data blocks formed from the sub-view stream;
  2D management information used in monoscopic video playback; and
  3D management information used in stereoscopic video playback,
  wherein a common data area includes one or more of the plurality of main-view data blocks and one or more of the plurality of sub-view data blocks,
  wherein a 2D data area includes one or more of the plurality of main-view data blocks,
  wherein a 3D data area includes one or more of the plurality of main-view data blocks and one or more of the plurality of sub-view data blocks,
  wherein the 2D management information refers to the one or more of the plurality of main-view data blocks included in the common data area and the one or more of the plurality of main-view data blocks included in the 2D data area,
  wherein the 3D management information refers to the one or more of the plurality of main-view data blocks included in the common data area and the one or more of the plurality of main-view data blocks included in the 3D data area,
  wherein the 2D management information does not refer to the one or more of the plurality of main-view data blocks in the 3D data area,
  wherein the 3D management information does not refer to the one or more of the plurality of main-view data blocks included in the 2D data area,
  wherein the 2D data area is accessed immediately before a long jump that occurs in monoscopic video playback,
  wherein the 3D data area is accessed immediately before a long jump that occurs in stereoscopic video playback,
  wherein the recording medium has the common data area, the 2D data area, and the 3D data area arranged continuously in this order, and
  wherein the one or more of the plurality of main-view data blocks included in the 2D data area and the one or more of the plurality of main-view data blocks included in the 3D data area are identical in content,
  the main-view data blocks and the sub-view data blocks both include visual data,
  at least one of the main-view data blocks and the sub-view data blocks includes audio data, and
  the semiconductor integrated circuit comprises:
  a main control unit operable to control the semiconductor integrated circuit;
  a stream processing unit operable to receive the interleaved stream and, after temporarily storing the received interleaved stream in one of memory units internal and external to the semiconductor integrated circuit, demultiplex the received interleaved stream into the visual data and the audio data;
  a signal processing unit operable to decode the audio data and the visual data; and
  an AV output unit operable to output the decoded audio data and the decoded video data, wherein
  the stream processing unit includes a switching unit that switches a storage location of the received interleaved stream in the memory that has a first area and a second area,
  in stereoscopic video playback, the main control unit causes the switching unit to store data contained in the main-view data blocks in the first area and to store data contained in the sub-view data blocks in the second area, and
  the main control unit uses the 3D management information when causing the switching unit to store the data contained in the main-view data blocks in the first area.

* * * * *